(12) United States Patent
Yamanaka et al.

(10) Patent No.: US 7,333,424 B2
(45) Date of Patent: Feb. 19, 2008

(54) UPPER LAYER NODE, LOWER LAYER NODE, AND NODE CONTROL METHOD

(75) Inventors: Naoaki Yamanaka, Tokyo (JP); Eiji Oki, Tokyo (JP); Kohei Shiomoto, Iruma (JP); Satoru Okamoto, Yokohama (JP); Wataru Imajuku, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1069 days.

(21) Appl. No.: 10/382,267

(22) Filed: Mar. 5, 2003

(65) Prior Publication Data

US 2003/0169684 A1 Sep. 11, 2003

(30) Foreign Application Priority Data

| | | | |
|---|---|---|---|
| Mar. 6, 2002 | (JP) | ............................ | 2002-060435 |
| Mar. 6, 2002 | (JP) | ............................ | 2002-060449 |
| Mar. 6, 2002 | (JP) | ............................ | 2002-060473 |
| Mar. 6, 2002 | (JP) | ............................ | 2002-060477 |
| Mar. 6, 2002 | (JP) | ............................ | 2002-060510 |
| Mar. 6, 2002 | (JP) | ............................ | 2002-060513 |
| Mar. 6, 2002 | (JP) | ............................ | 2002-060525 |

(51) Int. Cl.
*H04J 1/16* (2006.01)
(52) U.S. Cl. ..................... 370/217; 370/221
(58) Field of Classification Search ............... None
See application file for complete search history.

(56) References Cited

U.S. PATENT DOCUMENTS 5,903,568 A 5/1999 Tanaka et al.

6,549,513 B1 * 4/2003 Chao et al. ............... 370/227

(Continued)

FOREIGN PATENT DOCUMENTS

EP 1 152 631 A2 11/2001

(Continued)

OTHER PUBLICATIONS

E. Oki et al., "Multi-Layer Traffic Engineering in Photonic IP Networks", The Institue of Electronics, Information and Communication Engineers, Technical Report of IEICE, PS 2001-102, pp. 43-46, Jan. 18, 2002.

(Continued)

*Primary Examiner*—Andrew C. Lee
(74) *Attorney, Agent, or Firm*—Harness, Dickey & Pierce. P.L.C.

(57) ABSTRACT

An upper layer node is used in a multi-layer network which includes an upper layer network which performs switching and transfer in units of packets, and a lower layer network which includes optical transmission lines and optical switches and accommodate the upper layer network; this upper layer node being connected to the lower layer network which includes lower layer nodes including obstruction restoration sections, and transmission lines, and including: a section which detects the occurrence of an obstruction upon a transmission line which it accommodates; a section which advertises the detection result as obstruction information; a section which retains the topology information for the network; a section which updates the retained topology information according to advertised obstruction information, or obstruction information which it has detected; and an advertisement transfer section which advertises to other upper layer nodes the advertised obstruction information.

153 Claims, 52 Drawing Sheets

U.S. PATENT DOCUMENTS

| | | | |
|---|---|---|---|
| 6,895,441 B1* | 5/2005 | Shabtay et al. | 709/238 |
| 6,925,257 B2* | 8/2005 | Yoo | 398/47 |
| 7,039,009 B2* | 5/2006 | Chaudhuri et al. | 370/225 |
| 7,043,662 B2 | 5/2006 | Shiragaki | |
| 7,046,929 B1* | 5/2006 | Hester et al. | 398/17 |
| 7,158,515 B1* | 1/2007 | Wang et al. | 370/392 |
| 2002/0018264 A1* | 2/2002 | Kodialam et al. | 359/128 |
| 2002/0078232 A1* | 6/2002 | Simpson et al. | 709/238 |
| 2002/0131362 A1* | 9/2002 | Callon | 370/216 |
| 2003/0030866 A1* | 2/2003 | Yoo | 359/128 |
| 2004/0018016 A1* | 1/2004 | O'Mahony et al. | 398/43 |

FOREIGN PATENT DOCUMENTS

| | | |
|---|---|---|
| JP | 08-023352 | 1/1996 |
| JP | 09-186718 | 7/1997 |
| JP | 09-223090 | 8/1997 |
| JP | 10-285214 | 10/1998 |
| JP | 11-284633 | 10/1999 |
| JP | 2000-232469 | 8/2000 |
| JP | 2001-230762 | 8/2001 |
| JP | 2001-274751 | 10/2001 |
| JP | 2002-077189 | 3/2002 |
| JP | 2002-330131 | 11/2002 |
| JP | 2003-244198 | 8/2003 |

OTHER PUBLICATIONS

E. Oki et al., "A Heuristic Multi-Layer Optimum Topology Design Scheme Based on Traffic Measurement for IP + Photonic Networks", Proc. of Optical Fiber Communications (OFC) 2002, pp. 104-105, Mar. 2002.

E. Oki et al., "Multi-Layer Traffic Engineering in GMPLS Networks", The Institute of Electronics, Information and Communication Engineers, B-7-118, p. 345, Mar. 2001.

K. Sato et al., "GMPLS-Based Photonic Multilayer Router (Hiraki Router) Architecture: An Overview of Traffic Engineering and Signaling Technogy", IEEE Communications Magazine, vol. 40, No. 3, pp. 96-101, Mar. 2002.

N. Yamanaka et al., "Traffic Engineering and Signaling Technolgies in Photonic-GMPLS-Router Networks", 2002 Workshop on High Performance Swithcing and Routing, pp. 142-146, May 2002.

K. Shiomoto et al., "Dynamic Multi-Layer Traffic Engineering in GMPLS Network", Proc. World Telecommunications Congress 2002, Paris France, Sep. 2002.

E. Oki et al., "Impact of Multimedia Traffic Characeristics on ATM Network Configuration", Journal of Network Systems Management, vol. 6, No. 4, pp. 377-398, 1998.

A. Banerjee et al. "Generalized Multiprotocol Label Swithcing: An Overview of Routing and Management Enhancements", IEEE Communications Magazine pp. 144-150, Jan. 2001.

A. Banerjee et al., Generalized Multiprortocol Label Switching : An Overview of Signaling Enhancements and Recovery Techniques:, IEE Communcations Magazine, pp. 144-151, Jul. 2001.

R. Doverspike et al., "Challengers for MPLS in Optical Network Restoration", IEEE Communications Magazine, pp. 89-96, Feb. 2001.

Shimano Katsuhiro et al., CS2000-66. "Fast restoration scheme for optical paths with control network over optical supervisory channel", IEICE technical report, Sep. 15, 2000, vol. 100, No. 302, pp. 121-124.

Shiomoto Kohei et al., NS2001-191, "Study on photonic IP network architecture", IEICE technical report, Dec. 17, 2001, vol. 101, No. 508, pp. 127-132.

* cited by examiner

FIG. 16A

| OBSTRUCTED FACTOR | SRLG |
|---|---|
| PHOTONIC CROSS CONNECT 22 | #1, #2, #3 |
| PHOTONIC CROSS CONNECT 23 | #3 |
| PHOTONIC CROSS CONNECT 24 | #1 |
| PHOTONIC CROSS CONNECT 25 | #1, #2, #3 |
| PHOTONIC CROSS CONNECT 26 | #2 |
| LINK 80 | #3 |
| LINK 81 | #3 |
| LINK 82 | #1 |
| LINK 83 | #1 |
| LINK 84 | #2 |
| LINK 85 | #2 |

FIG. 16B

| SRLG | RELATED OPTICAL PATHS |
|---|---|
| #1 | $\lambda 1, \lambda 2, \lambda 3$ |
| #2 | $\lambda 4, \lambda 5$ |
| #3 | $\lambda 6$ |

UPPER LAYER NODE, LOWER LAYER NODE, AND NODE CONTROL METHOD

BACKGROUND OF THE INVENTION

1. Field of the Invention

The present invention relates to a multi-layer network which is controlled in a unified manner by photonic cross connects, routers, SDH (Synchronous Digital Hierarchy) devices or the like. In particular, the present invention relates to GMPLS (Generalized Multi Protocol Label Switching).

The present application is based upon patent applications Nos. 2002-060435, 2002-060449, 2002-060473, 2002-060477, 2002-060510, 2002-060513, and 2002-060525 filed in Japan, the contents of which are hereby incorporated herein by reference.

2. Description of the Related Art

In recent years, multi-layer networks which have become prevalent can control the photonic cross connects, routers, SDI devices and the like utilized therein in a unified manner. An example of this kind of multi-layer network is shown in FIG. 27. In the example of FIG. 27, a lower layer network consisting of a plurality of photonic cross connects 60 through 76 and transmission lines is connected between the routers 51 through 58. Network topology information is retained in each of the routers 51 through 58. However, this network topology information does not go so far as to include topology information related to the lower layer network; the lower layer network is treated as a single transmission line. In other words, as shown in FIG. 28, the topology information which is retained in the routers 51 through 58 is topology information between these routers themselves, and the existence of the photonic cross connects which make up the lower layer network is not recognized by the routers.

When any of the nodes in this type of multi-layer network, such as photonic cross connects, routers, SDH devices and the like, has detected an obstruction, there is a protocol that it should emit an LSA (Link State Advertisement) packet to the surrounding nodes, and, when any of the routers receives such an LSA packet, it updates the topology information which it retains itself, and it establishes an alternate route which detours around the point of the obstruction.

With a lower layer network of this type of multi-layer network, when an obstruction occurs, obstruction restoration measures, such as establishing an alternate route to detour around the point of this obstruction or the like, can often be executed quickly. However, since it is not possible to recognize from the routers the fact that this type of obstruction restoration measure has been executed by the lower layer network, when an LSA packet arrives, updating of the topology which they themselves retain is quickly performed, and an alternate route is established.

On the other hand, the lower layer network quickly executes the obstruction restoration measures, and then emits an LSA packet to show that the obstruction restoration has been completed. When the routers receive this LSA packet, for a second time, they perform updating of the topology information which they themselves retain, and they perform route establishment again.

In this manner, when a conventional obstruction restoration control technique is applied in its current form to a multi-layer network, the number of cases in which the routers perform updating of topology information and establish alternate routes which quickly become invalid increases, with the result that an increase of the processing load is entailed. In particular, the processing load required for route calculation becomes great, and bad influences may be apprehended, such as deterioration of the processing speed for other processes which are performed between performing route calculations or the like, so that it is desirable to revise and improve this sort of mode of control in which this type of route calculation ends by being invalid. Accordingly, in a multi-layer network, it is desirable to apply a new obstruction restoration control technique which is different from the conventional obstruction restoration control technique.

Furthermore, for the establishment of an alternate route as described above, the lower layer network performs updating of the topology information which it itself retains, and performs establishment of the alternate route by calculating a routing table according to this new topology information.

In this manner, when a conventional obstruction restoration control technique is applied in its current form to a multi-layer network, the routers frequently rewrite the topology information to new topology information although after an extremely short time period it will be necessary to do so again, which is undesirable; and, furthermore, much undesirable new calculation of routing tables and establishment of alternate routes is performed.

As a result, not only is increased processing load imposed upon the routers although this load will shortly become invalid, but repercussions of confusion and congestion take place upon the network as a whole, since alternate routes which have been established are frequently returned back to the original routes after an extremely short time period, thus causing many attempts to be made again to occupy wavelengths which have just been released. Accordingly, it is desirable not to apply conventional obstruction restoration technique in its current form to a multi-layer network, but rather to apply some novel obstruction restoration control technique which should be more suitable for a multi-layer network.

SUMMARY OF THE INVENTION

The present invention has been conceived of in order to resolve the above described type of problem, and its objective is to propose an upper layer node, a network, a program, and a recording medium, which can present a novel obstruction restoration control technique which is suitable for a multi-layer network, and with which effective exploitation of network resources can be anticipated.

For this, the most principal distinguishing feature of the present invention is that an upper layer node which has detected an obstruction upon the lower layer network defers the updating of its own topology information for a predetermined time period. Thus, the present invention also proposes a protocol when deferring the updating of topology information.

Accordingly, a first aspect of the present invention is an upper layer node which is connected in a lower layer network which comprises a plurality of lower layer nodes which comprise an obstruction restoration section, and transmission lines; and which comprises a section which detects the occurrence of an obstruction upon a transmission line which it accommodates itself; a section which advertises the result of detection by the detection section as obstruction information; a section which retains the topology information for the network; a section which updates the topology information which it retains itself, according to obstruction information which has been advertised, or obstruction information which it has detected itself; and an advertisement transfer section which advertises to other upper layer nodes obstruction information which has been advertised.

Here, the particular feature by which the present invention is distinguished is that the updating section comprises a deferral section which defers the updating of the topology information for a time period T from the time instant that the occurrence of an obstruction has been detected by the detection section.

In this manner, in the upper layer nodes, updating of the topology information is not performed immediately when an obstruction occurs upon the lower layer network, but rather, by deferring for a fixed time period the updating of the topology information for which a quick restoration of the lower layer network is expected, it is made possible to avoid calculation of routes which will become invalid.

A predicted time period information retention section which retains information as to the predicted time period required for obstruction restoration of the lower layer network may be provided; the advertisement section may include a first advertisement section which performs a first advertisement immediately after the occurrence of an obstruction upon the lower layer network has been detected by the detection section, and a second advertisement section which performs a second advertisement when obstruction restoration for the transmission line has not been implemented, even though the predicted time period for restoration which has been retained in the predicted time period information retention section has elapsed from the time instant that the first advertisement has been advertised by the first advertisement section; and the deferral section may include a section which takes the time period from the time instant when the first advertisement is received until the time instant when the second advertisement is received as the time period T.

In other words, at the time point that the obstruction has definitely occurred, the first advertisement is performed, and the other upper layer nodes recognize the occurrence of the obstruction. The other upper layer nodes are able to perform autonomous obstruction avoidance measures at this time point in consideration of the importance of the communication which they themselves are handling. For example, if the importance of the communication which they themselves handle is low, it will be acceptable for them to ignore the first advertisement, and for them only to execute obstruction avoidance measures for the first time at the time point that the second advertisement is performed. Or, if the importance of the communication which they themselves handle is high, it will be acceptable for them quickly to update their topology information and to calculate an alternate route around the obstruction at the time point of the first advertisement. By doing this, it is made possible to avoid calculation of routes which will become invalid.

A priority ranking retention section which retains information regarding restoration priority ranking during obstruction restoration of the transmission line of the lower layer network may be provided, and the advertisement section may include a section which sets the lengths of the time periods from the time instant of the first advertisement to the time instant of the second advertisement, for a plurality of the transmission lines upon which an obstruction has occurred at almost the same moment, individually to be inversely proportional to the restoration priority rankings which are retained by the priority ranking retention section.

In other words, if an obstruction has occurred at almost the same moment upon a plurality of transmission lines, to restore all of the wavelength paths at the same time would be very difficult to implement. Thus, a restoration priority ranking is set for each transmission line, and the restoration is performed in descending order of priority ranking. In this case, it is desirable to set the length of the time period from the time instant of the first advertisement to the time instant of the second advertisement to be inversely proportional to the restoration priority ranking. By doing this, for a transmission line for which a quick restoration can be expected, the time period from the first advertisement until the second advertisement is set to be long, and the updating of the topology information by the other upper layer nodes is deferred, so that during this interval the restoration can be completed. On the other hand, for a transmission line for which a quick restoration cannot be expected, the time period from the first advertisement until the second advertisement is set to be short, and the updating of the topology information by the other upper layer nodes is undertaken promptly, so that an alternate route can be established immediately. By doing this, it is made possible to avoid calculation of routes which will become invalid.

Or, there may be provided a predicted time period information retention section which retains information regarding the predicted time period required for obstruction restoration of the lower layer network; and the advertisement section may include a section which obtains information as to the predicted time period which is required for the restoration by referring to the result of detection by the detection section and to the predicted time period for restoration which is retained by the predicted time period information retention section, and a section which performs an advertisement which includes information of the predicted time period for restoration which has been obtained by the obtaining section; and the deferral section may include a section which sets the predicted time period for restoration which is contained in the advertisement as the time period T.

In other words, since the upper layer node which has detected the obstruction informs the other upper layer nodes of the predicted time period which is required for restoration of the obstruction, it is simply required for the other upper layer nodes to defer updating the topology information according to the information as to the predicted time period for restoration which is included in the advertisement, and it is not necessary for them to make any autonomous decisions. Since it is possible for the upper layer node which has detected the obstruction in the first place to have the clearest view as to the most accurate time period which can be predicted for restoration of the obstruction, accordingly it is possible to make the most suitable setting for the deferral time period in the other upper layer nodes.

The advertisement transfer section may include an advertisement deferral section which defers advertisement to other ones of the upper layer nodes until the deferral time period of the deferral section has elapsed.

In other words, the upper layer node which is directly connected to the lower layer network in which the obstruction has occurred defers the advertisement of the occurrence of the obstruction for the time period T. Since, by doing this, the other upper layer nodes which are not directly connected to the lower layer network in which the obstruction has occurred only receive transfer of the advertisement from the upper layer node which is directly connected to the lower layer network in which the obstruction has occurred after the time period T, as a result, the updating of the topology information is deferred for a total time period 2T. Accordingly, it is possible to provide a difference in deferral time period between the upper layer node which is directly connected to the lower layer network in which the obstruction has occurred, and the other upper layer nodes which are not directly connected to the lower layer network in which the obstruction has occurred. By doing this, even after the upper layer node which is directly connected to the lower layer network in which the obstruction has occurred has updated its topology information after the time period T and has started obstruction avoidance measures such as establishment of an alternate path or the like, the other upper layer nodes defer their updating of the topology information for a further time period T, so that, if during this interval the obstruction upon the lower layer network is restored, it is possible to prevent a further stage of spreading of influence of updates of topology information over the overall network, since returning the topology information to its original form is only necessary for the upper layer node which is directly connected to the lower layer network in which the obstruction has occurred.

Or if, within the network, upper layer nodes which are equipped with a section which defer the updating of their topology information are mixed together with other upper layer nodes which are not thus equipped, then, by those upper layer nodes which are thus equipped with the section which defer the updating of their topology information also being endowed with the function of serving as a deferral section for the advertisement of updates of the topology information to the other upper layer nodes which are not equipped with such deferral section, it is made possible for those upper layer nodes which are not equipped with such a section for deferring the updating of their topology information to behave in the same manner as the upper layer nodes which are equipped with such a section for deferring the updating of their topology information. Due to this, it is possible for even such a network in which upper layer nodes which are equipped with a section which defer the updating of their topology information are mixed together with other upper layer nodes which are not thus equipped to operate as a network according to the present invention.

There may be provided a predicted time period information retention section which retains information regarding the predicted time period required for obstruction restoration of the lower layer network; and the deferral section may include a section which obtains information as to the predicted time period which is required for the restoration by referring to the obstruction information and to the predicted time period for restoration which is retained by the predicted time period information retention section, and a section which takes the predicted time period for restoration which has been obtained by the obtaining section as the time period T.

In other words, in all of the upper layer nodes, the deferral time period for updating of the topology information is set with a clear view of the predicted time period for obstruction restoration.

The advertisement section may include a section which performs an advertisement at fixed intervals while an obstruction is being detected by the detection section; and the deferral section may include a section which takes the time period until the advertisement has been received a number of times which is determined in advance as being the time period T.

In other words, the upper layer node may simply advertise the fact of the occurrence of an obstruction to the other upper layer nodes at fixed intervals, while the other upper layer nodes may simply defer the updating of their topology information for a time period until this advertisement has been received a number of times which is determined in advance, so that no complicated processing is required in the upper layer nodes, so that it is possible to alleviate their processing load. This addresses the call for simplification of the upper layer nodes. At this time, in the other upper layer nodes, it will be acceptable for the number of times that the advertisement is received before they update their own topology information to be changed in the light of the importance of the communication which they themselves handle, and in consideration of various other factors.

There may be provided a section which analyzes the obstruction situation according to the results of detection by the detection section, and a ranking assignment section which, according to the result of the analysis by the obstruction situation analysis section, assigns a ranking which shows the seriousness of the obstruction and which is the higher the lower is the probability of restoration of the obstruction; and the advertisement section may include a conditional advertisement section which performs advertisement of obstructions whose ranking is greater than a predetermined ranking by referring to the results of ranking assignment performed by the ranking assignment section.

In other words, in the case of an obstruction of low ranking for which restoration can be expected within a short time period, it is not initially advertised. By doing this, the occurrence of an obstruction is not initially notified to the other upper layer nodes, so that it is possible to alleviate the processing load upon the upper layer nodes.

There may be provided an obstruction situation analysis section which analyzes the obstruction situation according to the result of detection by the detection section, a ranking assignment section which assigns a ranking which shows the seriousness of the obstruction and which is the higher the lower is the probability of restoration of the obstruction, according to the result of analysis by the obstruction situation analysis section, and a predicted time period information retention section which retains information relating to the predicted time period which is required for obstruction restoration by the lower layer network; and the advertisement section may include a section which emits, for an obstruction of ranking which is less than a predetermined ranking by reference to the results of ranking assignment by the ranking assignment section, a limited advertisement which includes limitation information to the effect that advertisement is being performed limited to those ones of the upper layer nodes which are directly related to the lower layer network which is obstructed, and a section which emits a prohibition removing advertisement to the effect that the limitation is removed, when the obstructed lower layer network has not been restored even after the predicted time period for restoration which is retained by the predicted time period information retention section has elapsed from the emission of the limited advertisement; with there being further provided a section which prevents advertisement to the other ones of the upper layer nodes when the limited advertisement is received, according to its limitation information, until the receipt of the prohibition removing advertisement.

In other words, even if the obstruction is one for which restoration can be expected within a short time period, its advertisement is performed to those ones of the other upper layer nodes which are directly related to this obstruction. However, it is arranged not to transfer this advertisement to the other ones of the upper layer nodes which are not directly related to this obstruction. By doing this, it is possible to avoid the spreading of influence of updates of topology information to the entire network by the advertisement of the occurrence of an obstruction for which restoration may be expected within a short time period. Furthermore, it is also possible for the other upper layer nodes which have received this advertisement to perform obstruction avoidance measures, if contrary to expectations it is not possible to implement obstruction restoration within a short time period; for example, this is beneficial in the case of other ones of the upper layer nodes which are handling communication which is of high importance.

The obstruction situation analysis section may include a section which detects a number of the transmission lines in which an obstruction has occurred at almost the same time, and the ranking assignment section may include a section which assigns a ranking based upon the number. This number detection section may include a table in which the transmission lines in which stoppage may occur are recorded corresponding to the occurrence of obstructions of obstruction factors which are included in various groups into which the obstruction factors are divided, and a section which detects the number of the transmission lines in which an obstruction has occurred at almost the same time by referring to the table.

In other words, when assigning ranking to the seriousness of an obstruction, it is possible to assign this ranking by the number of transmission lines in which the obstruction has occurred at almost the same time. By doing this, a higher ranking is assigned to an obstruction which has occurred in a large number of transmission lines at almost the same time and for which quick restoration cannot be expected, and this shows that it will be necessary to perform obstruction avoidance measures in dependence upon the other upper layer nodes, such as establishing alternate paths to the other upper layer nodes, or the like.

There may be provided a priority ranking retention section which retains information regarding restoration priority ranking during obstruction restoration of the transmission line of the lower layer network, and the obstruction situation analysis section may include a section which obtains information as to the restoration priority ranking which is retained by the priority ranking retention section for the transmission line upon which an obstruction has occurred, with the ranking assignment section including a section which assigns a ranking which shows the seriousness of the obstruction and which is the higher the lower is the probability of restoration of the obstruction, which is inversely proportional to the priority ranking.

In other words, when assigning a ranking to the seriousness of the obstruction, the lower is the priority at which restoration can be expected, the higher is the ranking which is assigned, and this shows the necessity of obstruction avoidance measures in dependence upon the other upper layer nodes, such as establishing alternate paths to the other upper layer nodes, or the like.

The obstruction situation analysis section may include a section which detects the degree of concentration of network resources by referring to the topology information for the lower layer network upon which the obstruction has occurred; and the ranking assignment section may include a section which assigns a ranking which shows the seriousness of the obstruction and which is the higher the lower is the probability of restoration of the obstruction, which is inversely proportional to the degree of concentration.

In other words, when assigning a ranking to the seriousness of the obstruction, since it is difficult to establish an alternate path at a point where the degree of concentration of network resources is low, so that this is a type of point at which it is not possible to expect restoration within a short period of time, accordingly, a high ranking is assigned, and this indicates that it is necessary to perform obstruction avoidance measures in dependence upon the other upper layer nodes, such as establishing alternate paths to the other upper layer nodes, or the like.

The predicted time period information retention section may include a section which retains link state information which is related to the detailed structure of the lower layer network, and a section which calculates the predicted time period for restoration for each of the transmission lines, based upon a capability for alternate path establishment which is attributed to each of the transmission lines, as estimated from the link state information which is retained by the retention section.

For example, the predicted time period calculation section may include a section which, as the capability for alternate path establishment, along with calculating the predicted time period for restoration for a transmission line during duplex operation as being almost zero, also re-recognizes the transmission line, during the occurrence of an obstruction, as being a simplex transmission line; or, alternatively, the predicted time period calculation section may include a section which, as the capability for alternate path establishment, calculates the predicted time period for restoration based upon the presence or absence of alternate paths at both the ends of the obstructed transmission line, and upon the state of vacancy or occupancy of the alternate paths.

Or, the predicted time period information retention section may include a calculation section which calculates the predicted time period for restoration between two of the nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when a simulated obstruction has been generated in the virtual working path.

In other words, normally, it is possible to calculate the predicted time period which is required for obstruction restoration by establishing a virtual working path and a virtual protection path, by generating a simulated obstruction in this virtual working path, and by finding the time period which is required for changing over the path from the virtual working path to the virtual protection path. By establishing the virtual working path and the virtual protection path in the vicinity of the actual working path and the protection path, and by following the actual process of: obstruction detection→obstruction advertisement→changing over to the protection path, it is possible to obtain the predicted time period for restoration of the obstruction with a high accuracy which reflects the actual situation upon the real network.

Or, the predicted time period information retention section may include a calculation section which calculates the predicted time period for restoration between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration.

In other words, normally, by establishing a virtual path and by generating a simulated obstruction in this virtual path, and by executing in simulation the process of: obstruction detection→obstruction advertisement→searching for an alternate path→establishment of the alternate path→changing over to the protection path, it is possible to obtain the predicted time period for restoration of the obstruction with a high accuracy which reflects the actual situation upon the real network.

A second aspect of the present invention is a network, particularly distinguished by the feature that it comprises an upper layer node according to the present invention.

A third aspect of the present invention is a program which, by being installed upon an information processing device, causes the information processing device to implement a function, corresponding to a device which controls the upper layer node, which is connected to a lower layer network which comprises a plurality of lower layer nodes which comprise obstruction restoration functions, and a transmission line, comprising: a function of detecting the occurrence of an obstruction upon a transmission line which it accommodates itself; a function of advertising the result of detection by the detection function as obstruction information; a function of retaining the topology information for the network; a function of updating the topology information which it retains itself, according to obstruction information which has been advertised, or obstruction information which it has detected itself; and an advertisement transfer function of advertising to other upper layer nodes obstruction information which has been advertised.

Here, the particular feature of the present invention is that as the updating function, there is implemented a function of deferring the updating of the topology information for a time period T from the time instant that the occurrence of an obstruction has been detected by the detection function.

There may be implemented a predicted time period information retention function of retaining information as to the predicted time period which is required for restoring the obstruction upon the lower layer network; and, as the advertisement function, a first advertisement function of performing a first advertisement immediately after the occurrence of an obstruction upon the lower layer network has been detected by the detection function, and a second advertisement function of performing a second advertisement when obstruction restoration for the transmission line has not been implemented even though the predicted time period for restoration which was retained by the predicted time period information retention function has elapsed from the time instant that the first advertisement was advertised by the first advertisement function; and, as the deferral function, a function of taking the time period from the time instant that the first advertisement has been received until the time instant that the second advertisement is received as the time period T.

It is possible to implement a priority ranking retention function of retaining information regarding restoration priority ranking during obstruction restoration of the transmission line of the lower layer network, and, as the advertising function, a function of setting the lengths of the time periods from the time instant of the first advertisement to the time instant of the second advertisement, for a plurality of the transmission lines upon which an obstruction has occurred at almost the same moment, individually to be inversely proportional to the restoration priority rankings which are retained by the priority ranking retention function.

It is possible to implement a predicted time period information retention function of retaining information regarding the predicted time period required for obstruction restoration of the lower layer network; to implement, as the advertisement function, a function of obtaining information as to the predicted time period which is required for the restoration by referring to the result of detection by the detection function and to the predicted time period for restoration which is retained by the predicted time period information retention function; to implement a function of performing an advertisement which includes information of the predicted time period for restoration which has been obtained by the obtaining function; and to implement, as the deferral function, a function of setting the predicted time period for restoration which is contained in the advertisement as the time period T.

As the advertisement transfer function, it is possible to implement an advertisement deferral function of deferring advertisement to the other upper layer nodes until the deferral time period of the deferral function has elapsed.

It is possible to implement a predicted time period information retention function of retaining information regarding the predicted time period required for obstruction restoration of the lower layer network; to implement, as the deferral function, a function of obtaining information as to the predicted time period which is required for the restoration by referring to the obstruction information and to the predicted time period for restoration which is retained by the predicted time period information retention function; and to implement a function of taking the predicted time period for restoration which has been obtained by this obtaining function as the time period T.

It is possible, as the advertisement function, to implement a function of performing an advertisement at fixed intervals while an obstruction is being detected by the detection function, and to implement, as the deferral function, a function of taking the time period until the advertisement has been received a number of times which is determined in advance as being the time period T.

It is possible to implement an obstruction situation analysis function of analyzing the obstruction situation according to the results of detection by the detection function, and a ranking assignment function of, according to the result of the analysis by the obstruction situation analysis function, assigning a ranking which shows the seriousness of the obstruction and which is the higher the lower is the probability of restoration of the obstruction; and to implement, as the advertisement function, a conditional advertisement function of performing advertisement of obstructions whose ranking is greater than a predetermined ranking by referring to the results of ranking assignment performed by the ranking assignment function.

It is possible to implement an obstruction situation analysis function of analyzing the obstruction situation according to the result of detection by the detection function, a function of assigning a ranking which shows the seriousness of the obstruction and which is the higher the lower is the probability of restoration of the obstruction, according to the result of analysis by the obstruction situation analysis function, and a predicted time period information retention function of retaining information relating to the predicted time period which is required for obstruction restoration by the lower layer network; to implement, as the advertisement function, a function of emitting, for an obstruction of ranking which is less than a predetermined ranking by reference to the results of ranking assignment by the ranking assignment function, a limited advertisement which includes limitation information to the effect that advertisement is being performed limited to those ones of the upper layer nodes which are directly related to the lower layer network which is obstructed, and a function of emitting a prohibition removing advertisement to the effect that the limitation is removed, when the obstructed lower layer network has not been restored even after the predicted time period for restoration which is retained by the predicted time period information retention function has elapsed from the emission of the limited advertisement; and to implement a function of preventing advertisement to the other ones of the upper layer nodes when the limited advertisement is received, according to its limitation information, until the receipt of the prohibition removing advertisement.

As the obstruction situation analysis function, it is possible to implement a function of detecting a number of the transmission lines in which an obstruction has occurred at almost the same time; and, as the ranking assignment function, it is possible to implement a function of assigning a ranking based upon the number.

As the number detection function, it is possible to implement a function which corresponds to a table in which the transmission lines in which stoppage may occur are recorded corresponding to the occurrence of obstructions of obstruction factors which are included in various groups into which the obstruction factors are divided, and a function of detecting the number of the transmission lines in which an obstruction has occurred at almost the same time by referring to the table.

It is possible to implement a priority ranking retention function of retaining information regarding restoration priority ranking during obstruction restoration of the transmission line of the lower layer network; to implement, as the obstruction situation analysis function, a function of obtaining information as to the restoration priority ranking which is retained by the priority ranking retention function for the transmission line upon which an obstruction has occurred; and, as the ranking assignment function, to implement a function of assigning a ranking which shows the seriousness of the obstruction and which is the higher the lower is the probability of restoration of the obstruction, which is inversely proportional to the priority ranking.

As the obstruction situation analysis function, it is possible to implement a function of detecting the degree of concentration of network resources by referring to the topology information for the lower layer network upon which the obstruction has occurred; and, as the ranking assignment function, it is possible to implement a function of assigning a ranking which shows the seriousness of the obstruction and which is the higher the lower is the probability of restoration of the obstruction, which is inversely proportional to the degree of concentration.

It is possible to implement, as the predicted time period information retention function, a function of retaining link state information which is related to the detailed structure of the lower layer network; and to implement a function of calculating the predicted time period for restoration for each of the transmission lines, based upon a capability for alternate path establishment which is attributed to each of the transmission lines, as estimated from the link state information which is retained by the retention function.

As the function of calculating the predicted time period for restoration, it is possible to implement a function of, as the capability for alternate path establishment, along with calculating the predicted time period for restoration for a transmission line during duplex operation as being almost zero, also re-recognizing the transmission line, during the occurrence of an obstruction, as being a simplex transmission line.

Or, as the function of calculating the predicted time period for restoration, it is possible to implement a function of, as the capability for alternate path establishment, calculating the predicted time period for restoration based upon the presence or absence of alternate paths at both the ends of the obstructed transmission line, and upon the state of vacancy or occupancy of the alternate paths.

As the predicted time period information retention function, it is possible to implement a function of calculating the predicted time period for restoration between two of the nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when a simulated obstruction has been generated in the virtual working path.

Or, as the predicted time period information retention function, it is possible to implement a function of calculating the predicted time period for restoration between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration.

A fourth aspect of the present invention is a recording medium which can be read by the information processing device, upon which the program according to the present invention is recorded. By recording the program of this aspect of the present invention upon a recording medium according to this aspect of the present invention, it is possible to install the program of this aspect of the present invention upon a computer device by using this recording medium. Or, it is possible to install the program of this aspect of the present invention directly upon a computer device via a network from a server upon which the program of this aspect of the present invention is stored.

By doing this, an obstruction restoration control technique is proposed for application to a multi-layer network, which uses an information processing device such as a computer device or the like, with which it is possible to implement upper layer nodes and a network, with which it can be anticipated that effective advantage can be taken of network resources.

Furthermore, with the present invention, there is the particular distinguishing feature that although, when an obstruction has occurred upon the lower layer network, based upon the obstruction information which has been transmitted from the lower layer network, a new routing table is calculated in the upper layer node in order to detour around the obstruction point, in the case of an obstruction for which quick restoration of the lower layer network is anticipated, the version of the routing table before the occurrence of the obstruction was notified is retained (rather than being discarded), and advantage is again taken of this version of the routing table before the occurrence of the obstruction was notified which is retained, based upon notification of obstruction restoration from the lower layer network; so that thereby it is possible to omit re-calculation of the routing table. By doing this, an obstruction restoration control technique is proposed for application to a multi-layer network, with which it can be anticipated that effective advantage can be taken of network resources.

In other words, a fifth aspect of the present invention is a network which comprises a plurality of nodes and a transmission line which is provided between this plurality of nodes, with this plurality of nodes including upper layer nodes and lower layer nodes, and with at least two of the upper layer nodes being connected together by a lower layer network which comprises a plurality of the lower layer nodes and the transmission line, with obstruction restoration section being provided in the lower layer network; with the upper layer node and the lower layer node including a section which detects the occurrence of an obstruction upon a transmission line which they accommodate themselves, and an advertisement section which advertises the result of detection by the detection section as obstruction information; and the upper layer node comprises: a section which retains the topology information for the network; a section which updates the topology information which it retains itself, according to obstruction information which has been advertised, or obstruction information which it has detected itself; and an advertisement transfer section which advertises to other upper layer nodes obstruction information which has been advertised.

Here, the particular feature by which the present invention is distinguished is that there are provided a section which retains a routing table which has been calculated based upon the topology information which has been updated according to the obstruction information, and which also retains a version of the routing table before the obstruction information was advertised, and a section which reverts to the version of the routing table before the obstruction information was advertised which is retained in the retention section, when the obstruction which was recorded in the obstruction information has been restored.

A sixth aspect of the present invention is an upper layer node connected to a lower layer network which includes a plurality of lower layer nodes which include obstruction restoration section, and a transmission line, and which comprises: a section which detects the occurrence of an obstruction upon a transmission line which it accommodates itself; a section which advertises the result of detection by the detection section as obstruction information; a section which retains the topology information for the network; a section which updates the topology information which it retains itself, according to obstruction information which has been advertised, or obstruction information which it has detected itself; and an advertisement transfer section which advertises to other upper layer nodes obstruction information which has been advertised.

Here, the particular feature by which the present invention is distinguished is that there are provided a section which retains a routing table which has been calculated based upon the topology information which has been updated according to the obstruction information, and which also retains a version of the routing table before the obstruction information was advertised; and a section which reverts to the version of the routing table before the obstruction information was advertised which is retained in the retention section, when the obstruction which was recorded in the obstruction information has been restored.

A seventh aspect of the present invention is a program which, by being installed upon an information processing device, implements upon that information processing device a function which corresponds to a device which controls an upper layer node which is connected to a lower layer network which includes a plurality of lower layer nodes which include obstruction restoration section, and a transmission line, and comprising: a function of detecting the occurrence of an obstruction upon a transmission line which it accommodates itself; a function of advertising the result of detection by the detection section as obstruction information; a function of retaining the topology information for the network; a function of updating the topology information which it retains itself, according to obstruction information which has been advertised, or obstruction information which it has detected itself; and a function of advertising to other upper layer nodes obstruction information which has been advertised.

Here, the particular feature by which the present invention is distinguished is that there are implemented a function of retaining a routing table which has been calculated based upon the topology information which has been updated according to the obstruction information, and of also retaining a version of the routing table before the obstruction information was advertised; and a function of reverting to the version of the routing table before the obstruction information was advertised which is retained in the retention section, when the obstruction which was recorded in the obstruction information has been restored.

An eighth aspect of the present invention is a recording medium which can be read by the information processing device, upon which the program according to the present invention is recorded. By recording the program of this aspect of the present invention upon a recording medium according to this aspect of the present invention, it is possible to install the program of this aspect of the present invention upon a computer device by using this recording medium. Or, it is possible to install the program of this aspect of the present invention directly upon a computer device via a network from a server upon which the program of this aspect of the present invention is stored.

By doing this, an obstruction restoration control technique is proposed for application to a multi-layer network, which uses an information processing device such as a computer device or the like, with which it is possible to implement a network and upper layer nodes, with which it can be anticipated that effective advantage can be taken of network resources.

Furthermore, a ninth aspect of the present invention is a network which comprises a plurality of nodes and a transmission line which is provided between this plurality of nodes, with this plurality of nodes including upper layer nodes and lower layer nodes, and with at least two of the upper layer nodes being connected together by a lower layer network which comprises a plurality of the lower layer nodes and the transmission line, and with obstruction restoration section being provided in the lower layer network; with the upper layer node and the lower layer node including a section which detects the occurrence of an obstruction upon a transmission line which they accommodate themselves, and an advertisement section which advertises the result of detection by the detection section as obstruction information; and the upper layer node comprises: a section which retains the topology information for the network; a section which updates the topology information which it retains itself, according to obstruction information which has been advertised, or obstruction information which it has detected itself; an advertisement transfer section which advertises to other upper layer nodes obstruction information which has been advertised; and a section which establishes an alternate path which detours around the transmission line in which an obstruction has occurred, according to the topology information which has been updated by the updating section.

Here, the particular feature by which the present invention is distinguished is that the section for establishing the alternate path includes a section which, along with establishing the alternate path, also retains for a predetermined time period the original establishment of the path according to the version of the topology information before the obstruction information was advertised, and a section which cancels the establishment of the alternate path when the obstruction which was recorded in the obstruction information has been restored within the predetermined time period, while canceling the establishment of the original path when the obstruction which was recorded in the obstruction information has not been restored even though the predetermined time period has elapsed.

In other words, although the establishment of an alternate path is performed in order to avoid the obstruction, with the present invention, there is the particular distinguishing feature that, in expectation of restoration of the obstruction after a short time period, the establishment of the original path is not canceled, but is retained. By doing this, it becomes unnecessary to perform re-calculation of the routing table when the original path is reinstated, so that it is possible to alleviate the processing load upon the routers. Furthermore, it becomes unnecessary to ensure wavelength availability when reinstating the original path, so that it becomes possible to avoid confusion upon the network.

Here, the particular feature by which the present invention is distinguished is that the section which establishes an alternate path includes a section which, along with calculating the alternate path, also retains for a predetermined time period the original establishment of the path according to the version of the topology information before the obstruction information was advertised, and a section which cancels the result of calculation of the alternate path when the obstruction which was recorded in the obstruction information has been restored within the predetermined time period, while canceling the establishment of the original path and actually establishing the alternate path according to the result of the calculation, when the obstruction which was recorded in the obstruction information has not been restored even though the predetermined time period has elapsed.

In other words, with the present invention, the particular distinguishing feature is that, in expectation of restoration of an obstruction after a short time period, the establishment of an alternate path is only calculated and is held in reserve, while the establishment of the original path is not canceled but is retained. By doing this, when returning to the original path, the necessity of performing re-calculation of the routing table is obviated, so that it is possible to alleviate the processing load upon the routers. Furthermore, it becomes unnecessary to ensure wavelength availability when reinstating the original path, so that it becomes possible to avoid confusion upon the network.

Furthermore, to compare the former and the latter cases, in the latter case, since the alternate path is not actually established, if restoration of the obstruction has been performed quickly, network resources are not uselessly occupied even for this brief time period, so that it is possible to take advantage of network resources effectively. However, if restoration of the obstruction has not been implemented, since the alternate path is actually established from the time point that the restoration is understood to be difficult, a longer time period is required until the alternate path is established, as compared with the former case.

A tenth aspect of the present invention is an upper layer node connected to a lower layer network which includes a plurality of lower layer nodes which include obstruction restoration section, and a transmission line, and which comprises: a section which detects the occurrence of an obstruction upon a transmission line which it accommodates itself; a section which advertises the result of detection by the detection section as obstruction information; a section which retains the topology information for the network; a section which updates the topology information which it retains itself, according to obstruction information which has been advertised, or obstruction information which it has detected itself; an advertisement transfer section which advertises to other upper layer nodes obstruction information which has been advertised; and a section which establishes an alternate path to the transmission line in which an obstruction has occurred according to the topology information which has been updated by the updating section.

Here, the particular feature by which the present invention is distinguished is that the section which establishes an alternate path includes a section which, along with establishing the alternate path, also retains for a predetermined time period the original establishment of the path according to the version of the topology information before the obstruction information was advertised, and a section which cancels the establishment of the alternate path when the obstruction which was recorded in the obstruction information has been restored within the predetermined time period, while canceling the establishment of the original path when the obstruction which was recorded in the obstruction information has not been restored even though the predetermined time period has elapsed.

Or, the particular feature by which the present invention is distinguished may be that the section which establishes an alternate path includes a section which, along with calculating the alternate path, also retains for a predetermined time period the original establishment of the path according to the version of the topology information before the obstruction information was advertised, and a section which cancels the result of calculation of the alternate path when the obstruction which was recorded in the obstruction information has been restored within the predetermined time period, while canceling the establishment of the original path and actually establishing the alternate path according to the result of the calculation, when the obstruction which was recorded in the obstruction information has not been restored even though the predetermined time period has elapsed.

An eleventh aspect of the present invention is a program which, by being installed upon an information processing device, implements upon the information processing device a function, corresponding to a device which controls an upper layer node connected to a lower layer network which includes a plurality of lower layer nodes which include obstruction restoration section, and a transmission line, and which includes: a function of detecting the occurrence of an obstruction upon a transmission line which it accommodates itself; a function of advertising the result of detection by the detection section as obstruction information; a function of retaining the topology information for the network; a function of updating the topology information which it retains itself, according to obstruction information which has been advertised, or obstruction information which it has detected itself; an advertisement transfer function of advertising to other upper layer nodes obstruction information which has been advertised; and a function of establishing an alternate path to the transmission line in which an obstruction has occurred according to the topology information which has been updated by the updating section.

Here, the particular feature by which the present invention is distinguished is that, as the function of establishing an alternate path, there are implemented a function of, along with establishing the alternate path, also retaining for a predetermined time period the original establishment of the path according to the version of the topology information before the obstruction information was advertised, and a function of canceling the establishment of the alternate path when the obstruction which was recorded in the obstruction information has been restored within the predetermined time period, while canceling the establishment of the original path when the obstruction which was recorded in the obstruction information has not been restored even though the predetermined time period has elapsed.

Or, the particular feature by which the present invention is distinguished may be that, as the function of establishing an alternate path, there are implemented a function of, along with calculating the alternate path, also retaining for a predetermined time period the original establishment of the path according to the version of the topology information before the obstruction information was advertised, and a function of canceling the result of calculation of the alternate path when the obstruction which was recorded in the obstruction information has been restored within the predetermined time period, while canceling the establishment of the original path and actually establishing the alternate path according to the result of the calculation, when the obstruction which was recorded in the obstruction information has not been restored even though the predetermined time period has elapsed.

A twelfth aspect of the present invention is a recording medium which can be read by the information processing device, upon which the program according to the present invention is recorded. By recording the program of this aspect of the present invention upon a recording medium according to this aspect of the present invention, it is possible to install the program of this aspect of the present invention upon a computer device by using this recording medium. Or, it is possible to install the program of this aspect of the present invention directly upon a computer device via a network from a server upon which the program of this aspect of the present invention is stored.

By doing this, an obstruction restoration control technique is proposed for application to a multi-layer network, which uses an information processing device such as a computer device or the like, with which it is possible to implement a network and upper layer nodes, with which it can be anticipated that effective advantage can be taken of network resources.

In addition, a most important particular distinguishing feature of the present invention is that the upper layer node which has detected the occurrence of an obstruction upon the lower layer network makes a decision as to the possibility of obstruction restoration of the lower layer network based upon link state information for the lower layer network, and defers the updating of its own topology information for a predetermined time period according to the result of this decision. The present invention also proposes a protocol when deferring these updates of the topology information.

A thirteenth aspect of the present invention is an upper layer node connected to a lower layer network which includes a plurality of lower layer nodes which include obstruction restoration section, and a transmission line, and which comprises: a section which detects the occurrence of an obstruction upon a transmission line which it accommodates itself; a section which advertises the result of detection by the detection section as obstruction information; a section which retains the topology information for the network; a section which updates the topology information which it retains itself, according to obstruction information which has been advertised, or obstruction information which it has detected itself; and an advertisement transfer section which advertises to other upper layer nodes obstruction information which has been advertised.

Here, the particular feature by which the present invention is distinguished is that there is provided a section which retains link state information which is related to the detailed structure of the lower layer network, and that the detection section includes a detection section which detects even the detailed obstruction situation upon the lower layer network according to the link state information which is retained by the link state information retention section, while the updating section includes an updating section which updates even the link state information which is retained by the link state information retention section.

In this manner, in the upper layer nodes, updating of the topology information is not performed immediately when an obstruction occurs upon the lower layer network, but rather, by deferring for a fixed time period the updating of the topology information for which a quick restoration of the lower layer network is expected, it is made possible to avoid calculation of routes which will become invalid.

In the upper layer node, it may happen that it detects the occurrence of an obstruction itself, or that the occurrence of an obstruction is detected by advertisement from the lower layer network, and in the background art an obstruction which was detected by an upper layer node was an obstruction at the level of the upper layer network consisting of the routers 1 through 8 shown in FIG. 56. By contrast to this, an obstruction which was detected by advertisement from the lower layer network was an obstruction at the level of the lower layer network consisting of the photonic cross connects 10 through 26 shown in FIG. 55

In other words, an obstruction which is detected by an upper layer node is a serious obstruction such as one in which a stoppage has occurred in almost the entire lower layer network between routers, and it is a type of obstruction for which immediate restoration can hardly be expected. By contrast to this, an obstruction which is detected by advertisement from the lower layer network is a trifling obstruction such as one in which a stoppage has taken place upon only a portion of the lower layer network, and it is a type of obstruction for which it is possible to expect immediate restoration such as by establishment of an alternate path or the like.

Accordingly, while with the background art it was so arranged that the topology information was immediately updated and the routing table was calculated afresh when the occurrence of an obstruction was detected by the upper layer node itself, by contrast, with the present invention, the particular distinguishing feature is that the link state information relating to the detailed structure of the lower layer network is provided in the upper layer node as well, so that even a trifling obstruction for which immediate restoration can be expected is detected by the upper layer node itself, while in the background art it would only have been detected by advertisement from the lower layer network. Thus an obstruction restoration control technique is proposed for application to a multi-layer network, which is implemented as described above, in other words without any dependence upon advertisement from the lower layer network but only by the upper layer node itself, and with which it can be anticipated that effective advantage can be taken of network resources.

Due to this, in the upper layer node, it is desirable to provide a section which makes a decision as to the probability of obstruction restoration by the obstruction restoration section by referring to the link state information which has been updated by the updating section.

Furthermore, it is desirable to provide a section which makes a decision regarding the necessity of establishing an alternate path by referring to the result of the decision by the decision section and to the degree of importance of the communication which is being performed using the lower layer network.

Furthermore, it is desirable to provide a section which informs a predetermined user of the result of decision by the decision section. Or, it is possible to provide a section which informs a predetermined user of the obstruction information and of the establishment situation of alternate paths.

A fourteenth aspect of the present invention is a network which is endowed with the particular distinguishing feature that it comprises an upper layer node according to the present invention.

A fifteenth aspect of the present invention is a program which, by being installed upon an information processing device, implements upon the information processing device a function, corresponding to a device which controls an upper layer node connected to a lower layer network which includes a plurality of lower layer nodes which include obstruction restoration section, and a transmission line, and which includes: a function of detecting the occurrence of an obstruction upon a transmission line which it accommodates itself; a function of advertising the result of detection by the detection function as obstruction information; a function of retaining the topology information for the network; a function of updating the topology information which it retains itself, according to obstruction information which has been advertised, or obstruction information which it has detected itself; and an advertisement transfer function of advertising to other upper layer nodes obstruction information which has been advertised.

Here, the particular feature by which the present invention is distinguished is that there is implemented a function of retaining link state information which is related to the detailed structure of the lower layer network, and that, as the detection function, there is implemented a function of detecting even the detailed obstruction situation upon the lower layer network according to the link state information which is retained by the link state information retention function, while, as the updating function, there is implemented an updating function of updating even the link state information which is retained by the link state information retention function.

It is desirable to implement a function of making a decision as to the probability of obstruction restoration by the obstruction restoration function by referring to the link state information which has been updated by the updating function.

Furthermore, it is desirable to implement a function of making a decision regarding the necessity of establishing an alternate path by referring to the result of the decision by the decision function and to the degree of importance of the communication which is being performed using the lower layer network.

Furthermore, it is also possible to implement a function of informing a predetermined user of the result of decision by the decision function.

Or, it is possible to implement a function of informing a predetermined user of the obstruction information and of the establishment situation of alternate paths.

A sixteenth aspect of the present invention is a recording medium which can be read by the information processing device, upon which the program according to the present invention is recorded. By recording the program of this aspect of the present invention upon a recording medium according to this aspect of the present invention, it is possible to install the program of this aspect of the present invention upon a computer device by using this recording medium. Or, it is possible to install the program of this aspect of the present invention directly upon a computer device via a network from a server upon which the program of this aspect of the present invention is stored.

By doing this, an obstruction restoration control technique is proposed for application to a multi-layer network, which uses an information processing device such as a computer device or the like, with which it is possible to implement upper layer nodes and a network, with which it can be anticipated that effective advantage can be taken of network resources.

Furthermore, one of the objectives of the present invention is, by providing a novel obstruction restoration control technique for application to a multi-layer network, to propose a lower layer node, a network, a program, and a recording medium, with which it can be anticipated that effective advantage can be taken of network resources.

The present invention takes as one of its most principal particular distinguishing features the fact that the lower layer node which transmits an LSA packet defers the transmission of this LSA packet for a predetermined time period. Moreover, the present invention also proposes a protocol when thus deferring the transmission of the LSA packet.

In other words, a seventeenth aspect of the present invention is a lower layer node which is used in a lower layer network which is connected between at least two upper layer nodes; and comprising: a section which performs obstruction restoration for the lower layer network; a section which detects the occurrence of an obstruction upon a transmission line which it accommodates itself; and a section which advertises as obstruction information the result of detection by the detection section; and the particular distinguishing feature of the present invention is that the advertisement section comprises a deferral section which defers the emission of the advertisement for a time period T from the time instant that the occurrence of an obstruction has been detected by the detection section.

In this manner, in the lower layer nodes, the emission of an advertisement to the upper layer nodes is not performed immediately when an obstruction occurs upon the lower layer network, but rather, by deferring for a fixed time period advertisement of an obstruction for which a quick restoration of the lower layer network is expected, it is made possible to avoid calculation of routes which will become invalid.

Or, a seventeenth aspect of the present invention is a lower layer node, which is provided in a lower layer network which is connected between at least two upper layer nodes, and which includes a section which performs obstruction restoration for the lower layer network, a section which detects the occurrence of an obstruction upon a transmission line which it accommodates itself, and a section which advertises as obstruction information the result of detection by the detection section; and the particular distinguishing feature of the present invention is that there is provided a predicted time period information retention section which retains information as to the predicted time period required for obstruction restoration of the lower layer network, and the advertisement section comprises a first advertisement section which performs a first advertisement immediately after the occurrence of an obstruction upon the lower layer network has been detected by the detection section, and a second advertisement section which performs a second advertisement when obstruction restoration for the transmission line has not been implemented, even though the predicted time period for restoration which has been retained in the predicted time period information retention section has elapsed from the time instant that the first advertisement has been advertised by the first advertisement section.

In other words, at the time point that the obstruction has definitely occurred, the first advertisement is performed, and the upper layer nodes recognize the occurrence of the obstruction. The upper layer nodes are able to perform autonomous obstruction avoidance measures at this time point in consideration of the importance of the communication which they themselves are handling. For example, if the importance of the communication which they themselves handle is low, it will be acceptable for them to ignore the first advertisement, and for them only to execute obstruction avoidance measures for the first time at the time point that the second advertisement is performed. Or, if the importance of the communication which they themselves handle is high, it will be acceptable for them quickly to update their topology information and to calculate an alternate path around the obstruction at the time point of the first advertisement. By doing this, it is made possible to avoid calculation of routes which will become invalid.

There may be further included a priority ranking retention section which retains information regarding restoration priority ranking during obstruction restoration of the transmission line of the lower layer network, and the advertisement section may include a section which sets the lengths of the time periods from the time instant of the first advertisement to the time instant of the second advertisement, for a plurality of the transmission lines upon which an obstruction has occurred at almost the same moment, individually to be inversely proportional to the restoration priority rankings which are retained by the priority ranking retention section.

In other words, if an obstruction has occurred at almost the same moment upon a plurality of transmission lines, to restore all of these transmission lines at the same time would be very difficult to implement. Thus, a restoration priority ranking is set for each transmission line, and the restoration is performed in descending order of priority ranking. In this case, it is desirable to set the length of the time period from the time instant of the first advertisement to the time instant of the second advertisement to be inversely proportional to the restoration priority ranking. By doing this, for a transmission line for which quick restoration can be expected, the time period from the first advertisement until the second advertisement is set to be long, and the updating of the topology information by the upper layer nodes is deferred, so that during this interval the restoration can be completed. On the other hand, for a transmission line for which a quick restoration cannot be expected, the time period from the first advertisement until the second advertisement is set to be short, and the updating of the topology information by the upper layer nodes is undertaken promptly, so that an alternate route can be established immediately. By doing this, it is made possible to avoid calculation of routes which will become invalid.

Or, a seventeenth aspect of the present invention is a lower layer node, which is provided in a lower layer network which is connected between at least two upper layer nodes, and which includes a section which performs obstruction restoration for the lower layer network, a section which detects the occurrence of an obstruction upon a transmission line which it accommodates itself, and a section which advertises as obstruction information the result of detection by the detection section; and the particular distinguishing feature of the present invention is that there is provided a predicted time period information retention section which retains information as to the predicted time period required for obstruction restoration of the lower layer network, and the advertisement section includes a section which obtains information as to the predicted time period which is required for the restoration by referring to the result of detection by the detection section and to the predicted time period for restoration which is retained by the predicted time period information retention section, and a section which performs an advertisement which includes information of the predicted time period for restoration which has been obtained by the obtaining section.

In other words, the lower layer node which has detected the obstruction informs the upper layer nodes of the predicted time period which is required for restoration of the obstruction. Due to this, in the upper layer nodes, it is possible for them to defer updating the topology information according to the information as to the predicted time period for restoration which is included in the advertisement.

Or, a seventeenth aspect of the present invention is a lower layer node, which is provided in a lower layer network which is connected between at least two upper layer nodes, and which includes a section which performs obstruction restoration for the lower layer network, a section which detects the occurrence of an obstruction upon a transmission line which it accommodates itself, and a section which advertises as obstruction information the result of detection by the detection section; and the particular distinguishing feature of the present invention is that the advertisement section comprises a section which performs an advertisement at fixed intervals while an obstruction is being detected by the detection section.

In other words, the lower layer node advertises the fact of the occurrence of an obstruction to the upper layer nodes at fixed intervals. The upper layer nodes may, for example, defer the updating of their topology information for a time period until this advertisement has been received a number of times which is determined in advance. Furthermore, in the upper layer nodes, it is possible to vary the relationship between the number of times that the advertisement is received and the time period that they defer updating their own topology information in consideration of the importance of the communication which they themselves handle, and in consideration of various other factors.

Or, a seventeenth aspect of the present invention is a lower layer node, which is provided in a lower layer network which is connected between at least two upper layer nodes, and which includes a section which performs obstruction restoration for the lower layer network, a section which detects the occurrence of an obstruction upon a transmission line which it accommodates itself, and a section which advertises as obstruction information the result of detection by the detection section; and the particular distinguishing feature of the present invention is that there are provided a section which analyzes the obstruction situation according to the results of detection by the detection section, and a ranking assignment section which, according to the result of the analysis by the obstruction situation analysis section, assigns a ranking which shows the seriousness of the obstruction and which is the higher the lower is the probability of restoration of the obstruction; and the advertisement section may include a conditional advertisement section which performs advertisement of obstructions whose ranking is greater than a predetermined ranking by referring to the results of ranking assignment performed by the ranking assignment section.

In other words, in a lower layer node, in the case of an obstruction of low ranking for which restoration can be expected within a short time period, it is not initially advertised. By doing this, the occurrence of an obstruction is not initially notified to the upper layer nodes, so that it is possible to alleviate the processing load upon the upper layer nodes.

Or, a seventeenth aspect of the present invention is a lower layer node, which is provided in a lower layer network which is connected between at least two upper layer nodes, and which includes a section which performs obstruction restoration for the lower layer network, a section which detects the occurrence of an obstruction upon a transmission line which it accommodates itself, and a section which advertises as obstruction information the result of detection by the detection section; and the particular distinguishing feature of the present invention is that there are provided an obstruction situation analysis section which analyzes the obstruction situation according to the result of detection by the detection section, a ranking assignment section which assigns a ranking which shows the seriousness of the obstruction and which is the higher the lower is the probability of restoration of the obstruction, according to the result of analysis by the obstruction situation analysis section, and a predicted time period information retention section which retains information relating to the predicted time period which is required for obstruction restoration by the lower layer network; and the advertisement section may include a section which emits, for an obstruction of ranking which is less than a predetermined ranking by reference to the results of ranking assignment by the ranking assignment section, a limited advertisement which includes limitation information to the effect that advertisement is being performed limited to those ones of the upper layer nodes which are directly related to the lower layer network which is obstructed, and a section which emits a prohibition removing advertisement to the effect that the limitation is removed, when the obstructed lower layer network has not been restored even after the predicted time period for restoration which is retained by the predicted time period information retention section has elapsed from the emission of the limited advertisement.

In other words, even if the obstruction is one for which restoration can be expected within a short time period, its advertisement is performed by the lower layer node to those ones of the upper layer nodes which are directly related to this obstruction. However, it is arranged not to transfer this advertisement to the other ones of the upper layer nodes which are not directly related to this obstruction. By doing this, it is possible to avoid the spreading of influence of updates of topology information to the entire network by the advertisement of the occurrence of an obstruction for which restoration may be expected within a short time period. Furthermore, it is also possible for the upper layer nodes which have received this advertisement to perform obstruction avoidance measures, if contrary to expectations it is not possible to implement obstruction restoration within a short time period; for example, this is beneficial in the case of those ones of the upper layer nodes which are handling communication which is of high importance.

It is desirable for the obstruction situation analysis section to include a section which detects a number of the transmission lines in which an obstruction has occurred at almost the same time, and for the ranking assignment section to include a section which assigns a ranking based upon this number. This number detection section may include, for example, a table in which the transmission lines in which stoppage may occur are recorded corresponding to the occurrence of obstructions of obstruction factors which are included in various groups into which the obstruction factors are divided, and a section which detects the number of the transmission lines in which an obstruction has occurred at almost the same time by referring to the table.

In other words, when assigning ranking to the seriousness of an obstruction, it is possible to assign this ranking by the number of transmission lines in which the obstruction has occurred at almost the same time. By doing this, a higher ranking is assigned to an obstruction which has occurred in a large number of transmission lines at almost the same time and for which quick restoration cannot be expected, and this shows that it will be necessary to perform obstruction avoidance measures in dependence upon the upper layer nodes, such as establishing alternate paths to the upper layer nodes, or the like.

There may be provided a priority ranking retention section which retains information regarding restoration priority ranking during obstruction restoration of the transmission line of the lower layer network, and the obstruction situation analysis section may include a section which obtains information as to the restoration priority ranking which is retained by the priority ranking retention section for the transmission line upon which an obstruction has occurred, with the ranking assignment section including a section which assigns a ranking which shows the seriousness of the obstruction and which is the higher the lower is the probability of restoration of the obstruction, which is inversely proportional to the priority ranking.

In other words, when assigning a ranking to the seriousness of the obstruction, the lower is the priority at which restoration can be expected, the higher is the ranking which is assigned, and this shows the necessity of obstruction avoidance measures in dependence upon the upper layer nodes, such as establishing alternate paths to the upper layer nodes, or the like.

The obstruction situation analysis section may include a section which detects the degree of concentration of network resources by referring to the topology information for the lower layer network upon which the obstruction has occurred; and the ranking assignment section may include a section which assigns a ranking which shows the seriousness of the obstruction and which is the higher the lower is the probability of restoration of the obstruction, which is inversely proportional to the degree of concentration.

In other words, when assigning a ranking to the seriousness of the obstruction, since it is difficult to establish an alternate path at a point where the degree of concentration of network resources is low, so that this is a type of point at which it is not possible to expect restoration within a short period of time, accordingly, a high ranking is assigned, and this indicates that it is necessary to perform obstruction avoidance measures in dependence upon the upper layer nodes, such as establishing alternate paths to the upper layer nodes, or the like.

The predicted time period information retention section may include a section which retains link state information which is related to the detailed structure of the lower layer network, and a section which calculates the predicted time period for restoration for each of the transmission lines, based upon a capability for alternate path establishment which is attributed to each of the transmission lines, as estimated from the link state information which is retained by the retention section. For example, the predicted time period for restoration calculation section may include a section which, as the capability for alternate path establishment, along with calculating the predicted time period for restoration for a transmission line during duplex operation as being almost zero, also re-recognizes the transmission line, during the occurrence of an obstruction, as being a simplex transmission line. Or, alternatively, the predicted time period for restoration calculation section may include a section which, as the capability for alternate path establishment, calculates the predicted time period for restoration based upon the presence or absence of alternate paths at both the ends of the obstructed transmission line, and upon the state of vacancy or occupancy of the alternate paths.

The predicted time period information retention section may include a calculation section which calculates the predicted time period for restoration between two of the nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when a simulated obstruction has been generated in the virtual working path.

In other words, normally, it is possible to calculate the predicted time period for restoration which is required for obstruction restoration by establishing a virtual working path and a virtual protection path, by generating a simulated obstruction in this virtual working path, and by finding the time period which is required for changing over the path from the virtual working path to the virtual protection path. By establishing the virtual working path and the virtual protection path in the vicinity of the actual working path and the protection path, and by following the actual process of: obstruction detection→obstruction advertisement→changing over to the protection path, it is possible to obtain the predicted time period for restoration of the obstruction with a high accuracy which reflects the actual situation upon the real network.

Or, the predicted time period information retention section may include a calculation section which calculates the predicted time period for restoration between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration.

In other words, normally, by establishing a virtual path and by generating a simulated obstruction in this virtual path, and by executing in simulation the process of: obstruction detection→obstruction advertisement→searching for an alternate path→establishment of the alternate path→changing over to the protection path, it is possible to obtain the predicted time period for restoration of the obstruction with a high accuracy which reflects the actual situation upon the real network.

An eighteenth aspect of the present invention is a network, particularly distinguished by the feature that it comprises a lower layer node according to the present invention.

A nineteenth aspect of the present invention is a program which, by being installed upon an information processing device, causes the information processing device to implement a function, corresponding to a device which controls a lower layer node which is provided in a lower layer network which is connected between at least two upper layer nodes, and comprising: an obstruction restoration function for that lower layer network; a function of detecting the occurrence of an obstruction upon a transmission line which it accommodates itself; and a function of advertising the result of detection by the detection function as obstruction information.

Here, the particular feature by which the present invention is distinguished is that, as the advertisement function, there is implemented a function of deferring the emission of the advertisement for a time period T from the time instant that the occurrence of an obstruction has been detected by the detection function.

There may be implemented a predicted time period information retention function of retaining information as to the predicted time period which is required for restoring the obstruction upon the lower layer network; and, as the advertisement function, a first advertisement function of performing a first advertisement immediately after the occurrence of an obstruction upon the lower layer network has been detected by the detection function, and a second advertisement function of performing a second advertisement when obstruction restoration for the transmission line has not been implemented even though the predicted time period for restoration which was retained by the predicted time period information retention function has elapsed from the time instant that the first advertisement was advertised by the first advertisement function.

Or, there may be implemented a priority ranking retention function of retaining information regarding restoration priority ranking during obstruction restoration of the transmission line of the lower layer network, and, as the advertising function, a function of setting the lengths of the time periods from the time instant of the first advertisement to the time instant of the second advertisement, for a plurality of the transmission lines upon which an obstruction has occurred at almost the same moment, individually to be inversely proportional to the restoration priority rankings which are retained by the priority ranking retention function.

Or, there may be implemented a predicted time period information retention function of retaining information regarding the predicted time period required for obstruction restoration of the lower layer network; there may be implemented, as the advertisement function, a function of obtaining information as to the predicted time period which is required for the restoration by referring to the result of detection by the detection function and to the predicted time period for restoration which is retained by the predicted time period information retention function; and there may be implemented a function of performing an advertisement which includes information of the predicted time period for restoration which has been obtained by the obtaining function.

Or, as the advertisement transfer function, there may be implemented a function of performing an advertisement at fixed intervals while an obstruction is being detected by the detection function.

Or, there may be implemented an obstruction situation analysis function of analyzing the obstruction situation according to the results of detection by the detection function, and a ranking assignment function of, according to the result of the analysis by this obstruction situation analysis function, assigning a ranking which shows the seriousness of the obstruction and which is the higher the lower is the probability of restoration of the obstruction; and, as the advertisement function, there may be implemented a conditional advertisement function of performing advertisement of obstructions whose ranking is greater than a predetermined ranking by referring to the results of ranking assignment performed by the ranking assignment function.

Or, there may be implemented an obstruction situation analysis function of analyzing the obstruction situation according to the result of detection by the detection function, a function of assigning a ranking which shows the seriousness of the obstruction and which is the higher the lower is the probability of restoration of the obstruction, according to the result of analysis by this obstruction situation analysis function, and a predicted time period information retention function of retaining information relating to the predicted time period which is required for obstruction restoration by the lower layer network; and there may be implemented, as the advertisement function, a function of emitting, for an obstruction of ranking which is less than a predetermined ranking by reference to the results of ranking assignment by the ranking assignment function, a limited advertisement which includes limitation information to the effect that advertisement is being performed limited to those ones of the upper layer nodes which are directly related to the lower layer network which is obstructed, and a function of emitting a prohibition removing advertisement to the effect that the limitation is removed, when the obstructed lower layer network has not been restored even after the predicted time period for restoration which is retained by the predicted time period information retention function has elapsed from the emission of this limited advertisement.

As the obstruction situation analysis function, it is possible to implement a function of detecting a number of the transmission lines in which an obstruction has occurred at almost the same time; and, as the ranking assignment function, it is possible to implement a function of assigning a ranking based upon the number.

As the number detection function, it is possible to implement a function which corresponds to a table in which the transmission lines in which stoppage may occur are recorded corresponding to the occurrence of obstructions of obstruction factors which are included in various groups into which the obstruction factors are divided, and a function of detecting the number of the transmission lines in which an obstruction has occurred at almost the same time by referring to the table.

It is possible to implement a priority ranking retention function of retaining information regarding restoration priority ranking during obstruction restoration of the transmission line of the lower layer network; to implement, as the obstruction situation analysis function, a function of obtaining information as to the restoration priority ranking which is retained by the priority ranking retention function for the transmission line upon which an obstruction has occurred; and, as the ranking assignment function, to implement a function of assigning a ranking which shows the seriousness of the obstruction and which is the higher the lower is the probability of restoration of the obstruction, which is inversely proportional to the priority ranking.

As the obstruction situation analysis function, it is possible to implement a function of detecting the degree of concentration of network resources by referring to the topology information for the lower layer network upon which the obstruction has occurred; and, as the ranking assignment function, it is possible to implement a function of assigning a ranking which shows the seriousness of the obstruction and which is the higher the lower is the probability of restoration of the obstruction, which is inversely proportional to the degree of concentration.

It is possible to implement, as the predicted time period information retention function, a function of retaining link state information which is related to the detailed structure of the lower layer network; and to implement a function of calculating the predicted time period for restoration for each of the transmission lines, based upon a capability for alternate path establishment which is attributed to each of the transmission lines, as estimated from the link state information which is retained by the retention function.

As the function of calculating the predicted time period for restoration, it is possible to implement a function of, as the capability for alternate path establishment, along with calculating the predicted time period for restoration for a transmission line during duplex operation as being almost zero, also re-recognizing the transmission line, during the occurrence of an obstruction, as being a simplex transmission line.

Or, as the function of calculating the predicted time period for restoration, it is possible to implement a function of, as the capability for alternate path establishment, calculating the predicted time period for restoration based upon the presence or absence of alternate paths at both the ends of the obstructed transmission line, and upon the state of vacancy or occupancy of the alternate paths.

As the predicted time period information retention function, it is possible to implement a function of calculating the predicted time period for restoration between two of the nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when a simulated obstruction has been generated in the virtual working path.

Or, as the predicted time period information retention function, it is possible to implement a function of calculating the predicted time period for restoration between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration.

A twentieth aspect of the present invention is a recording medium which can be read by the information processing device, upon which the program according to the present invention is recorded. By recording the program of this aspect of the present invention upon a recording medium according to this aspect of the present invention, it is possible to install the program of this aspect of the present invention upon a computer device by using this recording medium. Or, it is possible to install the program of this aspect of the present invention directly upon a computer device via a network from a server upon which the program of this aspect of the present invention is stored.

By doing this, an obstruction restoration control technique is proposed for application to a multi-layer network, which uses an information processing device such as a computer device or the like, with which it is possible to implement lower layer nodes and a network, with which it can be anticipated that effective advantage can be taken of network resources.

Furthermore, one of the objectives of the present invention is, by providing a novel obstruction restoration control technique for application to a multi-layer network, to propose a network, a node, a program, and a recording medium, with which it can be anticipated that effective advantage can be taken of network resources.

For this, the present invention takes as one of its most principal particular distinguishing features the fact that the upper layer node which has received the LSA packet controls the updating of its own topology information. Moreover, the present invention also proposes a protocol when thus controlling the updating of the topology information.

A twenty-first aspect of the present invention is a network which includes a plurality of lower layer nodes and a transmission line provided between this plurality of nodes; with a plurality of the nodes including an upper layer node and a lower layer node, and with at least two of the upper layer nodes being connected together by a lower layer network which includes a plurality of the lower layer nodes and the transmission line; with obstruction restoration section for the lower layer network being provided in the lower layer node, with the upper layer and lower layer nodes including a section which detects the occurrence of an obstruction upon a transmission line which it accommodates itself, and a section which advertises the result of detection by the detection section as obstruction information; and with the upper layer node including a section which retains the topology information for the network; a section which updates the topology information which it retains itself, according to obstruction information which has been advertised, or obstruction information which it has detected itself; and an advertisement transfer section which advertises to other upper layer nodes obstruction information which has been advertised.

Here, the particular feature by which the present invention is distinguished is that the updating section comprises a deferral section which defers the updating of the topology information for a time period T from the time instant that the obstruction information has been advertised.

In this manner, in the upper layer nodes, updating of the topology information is not performed immediately when an obstruction occurs upon the lower layer network, but rather, by deferring for a fixed time period the updating of the topology information for which a quick restoration of the lower layer network is expected, it is made possible to avoid calculation of routes which will become invalid.

A predicted time period information retention section which retains information as to the predicted time period required for obstruction restoration of the lower layer network may be provided; the advertisement section of at least the lower layer node may include a first advertisement section which performs a first advertisement immediately after the occurrence of an obstruction upon the lower layer network has been detected by the detection section, and a second advertisement section which performs a second advertisement when obstruction restoration for the transmission line has not been implemented, even though the predicted time period for restoration which has been retained in the predicted time period information retention section has elapsed from the time instant that the first advertisement has been advertised by the first advertisement section; and the deferral section may include a section which takes the time period from the time instant when the first advertisement is received until the time instant when the second advertisement is received as the time period T.

In other words, at the time point that the obstruction has definitely occurred, the first advertisement is performed, and the upper layer nodes recognize the occurrence of the obstruction. The upper layer nodes are able to perform autonomous obstruction avoidance measures at this time point in consideration of the importance of the communication which they themselves are handling. For example, if the importance of the communication which they themselves handle is low, it will be acceptable for them to ignore the first advertisement, and for them only to execute obstruction avoidance measures for the first time at the time point that the second advertisement is performed. Or, if the importance of the communication which they themselves handle is high, it will be acceptable for them quickly to update their topology information and to calculate an alternate route around the obstruction at the time point of the first advertisement. By doing this, it is made possible to avoid calculation of routes which will become invalid.

A priority ranking retention section which retains information regarding restoration priority ranking during obstruction restoration of the transmission line of the lower layer network may be provided, and the advertisement section of at least the lower layer node may include a section which sets the lengths of the time periods from the time instant of the first advertisement to the time instant of the second advertisement, for a plurality of the transmission lines upon which an obstruction has occurred at almost the same moment, individually to be inversely proportional to the restoration priority rankings which are retained by the priority ranking retention section.

In other words, if an obstruction has occurred at almost the same moment upon a plurality of transmission lines, to restore all of the wavelength paths at the same time would be very difficult to implement. Thus, a restoration priority ranking is set for each transmission line, and the restoration is performed in descending order of priority ranking. In this case, it is desirable to set the length of the time period from the time instant of the first advertisement to the time instant of the second advertisement to be inversely proportional to the restoration priority ranking. By doing this, for a transmission line for which quick restoration can be expected, the time period from the first advertisement until the second advertisement is set to be long, and the updating of the topology information by the other upper layer nodes is deferred, so that during this interval the restoration can be completed. On the other hand, for a transmission line for which quick restoration cannot be expected, the time period from the first advertisement until the second advertisement is set to be short, and the updating of the topology information by the other upper layer nodes is undertaken promptly, so that an alternate route can be established immediately. By doing this, it is made possible to avoid calculation of routes which will become invalid.

Or, there may be provided a predicted time period information retention section which retains information regarding the predicted time period required for obstruction restoration of the lower layer network; and the advertisement section of at least the lower layer node may include a section which obtains information as to the predicted time period which is required for the restoration by referring to the result of detection by the detection section and to the predicted time period for restoration which is retained by the predicted time period information retention section, and a section which performs an advertisement which includes information of the predicted time period for restoration which has been obtained by the obtaining section; and the deferral section may include a section which sets the predicted time period for restoration which is contained in the advertisement as the time period T.

In other words, since the lower layer node which has detected the obstruction informs the upper layer nodes of the predicted time period which is required for restoration of the obstruction, it is simply required for them to defer updating the topology information according to the information as to the predicted time period for restoration which is included in the advertisement, and it is not necessary for them to make any autonomous decisions. Since it is possible for the lower layer node which has detected the obstruction in the first place to have the clearest view as to the most accurate time period which can be predicted for restoration of the obstruction, accordingly it is possible to make the most suitable setting for the deferral time period in the upper layer nodes by following this lead.

The advertisement transfer section may include an advertisement deferral section which defers advertisement to other ones of the upper layer nodes until the deferral time period of the deferral section has elapsed.

In other words, the upper layer node which is directly connected to the lower layer network in which the obstruction has occurred receives the advertisement immediately after the occurrence of the obstruction, and defers this advertisement for the time period T. Since, by doing this, the upper layer nodes which are not directly connected to the lower layer network in which the obstruction has occurred only receive transfer of the advertisement from the upper layer node which is directly connected to the lower layer network in which the obstruction has occurred after the time period T, as a result, the updating of the topology information is deferred for a total time period 2T. Accordingly, it is possible to provide a difference in deferral time period between the upper layer node which is directly connected to the lower layer network in which the obstruction has occurred, and the other upper layer nodes which are not directly connected to the lower layer network in which the obstruction has occurred. By doing this, even after the upper layer node which is directly connected to the lower layer network in which the obstruction has occurred has updated its topology information after the time period T and has started obstruction avoidance measures such as establishment of an alternate path or the like, the other upper layer nodes defer their updating of the topology information for a further time period T, so that, if during this interval the obstruction upon the lower layer network is restored, it is possible to prevent a further stage of spreading of influence of updates of topology information over the entire network, since returning the topology information to its original form is only necessary for the upper layer node which is directly connected to the lower layer network in which the obstruction has occurred.

Or if, within the network, upper layer nodes which are equipped with section which defer the updating of their topology information are mixed together with other upper layer nodes which are not thus equipped, then, by those upper layer nodes which are thus equipped with section which defer the updating of their topology information also being endowed with the function of serving as deferral section for the advertisement of updates of the topology information to the other upper layer nodes which are not equipped with such deferral section, it is made possible for those upper layer nodes which are not equipped with such section for deferring the updating of their topology information to behave in the same manner as the upper layer nodes which are equipped with such section for deferring the updating of their topology information. Due to this, it is possible for even such a network in which upper layer nodes which are equipped with section which defer the updating of their topology information are mixed together with other upper layer nodes which are not thus equipped to operate as a network according to the present invention.

There may be provided a predicted time period information retention section which retains information regarding the predicted time period required for obstruction restoration of the lower layer network; and the deferral section may include a section which obtains information as to the predicted time period which is required for the restoration by referring to the obstruction information and to the predicted time period for restoration which is retained by the predicted time period information retention section, and a section which takes the predicted time period for restoration which has been obtained by the obtaining section as the time period T.

In other words, the lower layer node may simply advertise the occurrence of an obstruction to the upper layer node; and the upper layer node, which has a clear view of the predicted time period for obstruction restoration, sets the deferral time period for updating of the topology information. By doing this, the requirement for complicated processing from the lower layer nodes is obviated, so that it is possible to alleviate the processing load upon the lower layer nodes. This answers the demand for simplification of the lower layer nodes.

The advertisement section of at least the lower layer node may include a section which performs an advertisement at fixed intervals while an obstruction is being detected by the detection section; and the deferral section may include a section which takes the time period until the advertisement has been received a number of times which is determined in advance as being the time period T.

In other words, simply, the lower layer node may just advertise the fact of the occurrence of an obstruction to the other upper layer nodes at fixed intervals, while the upper layer nodes may just defer the updating of their topology information for a time period until this advertisement has been received a number of times which is determined in advance, so that no complicated processing is required in the upper layer nodes or in the lower layer nodes, so that it is possible to alleviate their processing load. This addresses the call for simplification of the upper layer nodes and of the lower layer nodes. At this time, in the upper layer nodes, it will be acceptable for the number of times that the advertisement is received before they update their own topology information to be suitably changed in the light of the importance of the communication which they themselves handle, and in consideration of various other factors.

There may be provided a section which analyzes the obstruction situation according to the results of detection by the detection section, and a ranking assignment section which, according to the result of the analysis by the obstruction situation analysis section, assigns a ranking which shows the seriousness of the obstruction and which is the higher the lower is the probability of restoration of the obstruction; and the advertisement section of at least the lower layer node may include a conditional advertisement section which performs advertisement of obstructions whose ranking is greater than a predetermined ranking by referring to the results of ranking assignment performed by the ranking assignment section.

In other words, in the case of an obstruction of low ranking for which restoration can be expected within a short time period, it is not initially advertised. By doing this, the occurrence of an obstruction is not initially notified to the upper layer nodes, so that it is possible to alleviate the processing load upon the upper layer nodes.

There may be provided an obstruction situation analysis section which analyzes the obstruction situation according to the result of detection by the detection section, a ranking assignment section which assigns a ranking which shows the seriousness of the obstruction and which is the higher the lower is the probability of restoration of the obstruction, according to the result of analysis by the obstruction situation analysis section, and a predicted time period information retention section which retains information relating to the predicted time period which is required for obstruction restoration by the lower layer network; and the advertisement section of at least the lower layer node may include a section which emits, for an obstruction of ranking which is less than a predetermined ranking by reference to the results of ranking assignment by the ranking assignment section, a limited advertisement which includes limitation information to the effect that advertisement is being performed limited to those ones of the upper layer nodes which are directly related to the lower layer network which is obstructed, and a section which emits a prohibition removing advertisement to the effect that the limitation is removed, when the obstructed lower layer network has not been restored even after the predicted time period for restoration which is retained by the predicted time period information retention section has elapsed from the emission of the limited advertisement; with the upper layer node further including a section which prevents advertisement to the other ones of the upper layer nodes when the limited advertisement is received, according to its limitation information, until the receipt of the prohibition removing advertisement.

In other words, even if the obstruction is one for which restoration can be expected within a short time period, its advertisement is performed to those ones of the upper layer nodes which are directly related to this obstruction. However, it is arranged not to transfer this advertisement to the other ones of the upper layer nodes which are not directly related to this obstruction. By doing this, it is possible to avoid the spreading of influence of updates of topology information to the entire network by the advertisement of the occurrence of an obstruction for which restoration may be expected within a short time period. Furthermore, it is also possible for the upper layer nodes which have received this advertisement to perform obstruction avoidance measures, if contrary to expectations it is not possible to implement obstruction restoration within a short time period; for example, this is beneficial in the case of ones of the upper layer nodes which are handling communication which is of high importance.

The obstruction situation analysis section may include a section which detects a number of the transmission lines in which an obstruction has occurred at almost the same time, and the ranking assignment section may include a section which assigns a ranking based upon the number. This number detection section may include a table in which the transmission lines in which stoppage may occur are recorded corresponding to the occurrence of obstructions of obstruction factors which are included in various groups into which the obstruction factors are divided, and a section which detects the number of the transmission lines in which an obstruction has occurred at almost the same time by referring to the table.

In other words, when assigning ranking to the seriousness of an obstruction, it is possible to assign this ranking by the number of transmission lines in which the obstruction has occurred at almost the same time. By doing this, a higher ranking is assigned to an obstruction which has occurred in a large number of transmission lines at almost the same time and for which quick restoration cannot be expected, and this shows that it will be necessary to perform obstruction avoidance measures in dependence upon the upper layer nodes, such as establishing alternate paths to the other nodes, or the like.

There may be provided a priority ranking retention section which retains information regarding restoration priority ranking during obstruction restoration of the transmission line of the lower layer network, and the obstruction situation analysis section may include a section which obtains information as to the restoration priority ranking which is retained by the priority ranking retention section for the transmission line upon which an obstruction has occurred, with the ranking assignment section including a section which assigns a ranking which shows the seriousness of the obstruction and which is the higher the lower is the probability of restoration of the obstruction, which is inversely proportional to the priority ranking.

In other words, when assigning a ranking to the seriousness of the obstruction, the lower is the priority at which restoration can be expected, the higher is the ranking which is assigned, and this shows the necessity of obstruction avoidance measures in dependence upon the upper layer nodes, such as establishing alternate paths to the upper layer nodes, or the like.

The obstruction situation analysis section may include a section which detects the degree of concentration of network resources by referring to the link state information for the lower layer network upon which the obstruction has occurred; and the ranking assignment section may include a section which assigns a ranking which shows the seriousness of the obstruction and which is the higher the lower is the probability of restoration of the obstruction, which is inversely proportional to the degree of concentration.

In other words, when assigning a ranking to the seriousness of the obstruction, since it is difficult to establish an alternate path at a point where the degree of concentration of network resources is low, so that this is a type of point at which it is not possible to expect restoration within a short period of time, accordingly, a high ranking is assigned, and this indicates that it is necessary to perform obstruction avoidance measures in dependence upon the upper layer nodes, such as establishing alternate paths to the upper layer nodes, or the like.

The predicted time period information retention section may include a section which retains link state information which is related to the detailed structure of the lower layer network, and a section which calculates the predicted time period for restoration for each of the transmission lines, based upon a capability for alternate path establishment which is attributed to each of the transmission lines, as estimated from the link state information which is retained by the retention section.

For example, the predicted time period for restoration calculation section may include a section which, as the capability for alternate path establishment, along with calculating the predicted time period for restoration for a transmission line during duplex operation as being almost zero, also re-recognizes the transmission line, during the occurrence of an obstruction, as being a simplex transmission line; or, alternatively, the predicted time period for restoration calculation section may include a section which, as the capability for alternate path establishment, calculates the predicted time period for restoration based upon the presence or absence of alternate paths at both the ends of the obstructed transmission line, and upon the state of vacancy or occupancy of the alternate paths.

Or, the predicted time period information retention section may include a calculation section which calculates the predicted time period for restoration between two of the nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when a simulated obstruction has been generated in the virtual working path.

In other words, normally, it is possible to calculate the predicted time period for restoration which is required for obstruction restoration by establishing a virtual working path and a virtual protection path, by generating a simulated obstruction in this virtual working path, and by finding the time period which is required for changing over the path from the virtual working path to the virtual protection path. By establishing the virtual working path and the virtual protection path in the vicinity of the actual working path and the protection path, and by following the actual process of: obstruction detection→obstruction advertisement→changing over to the protection path, it is possible to obtain the predicted time period for restoration of the obstruction with a high accuracy which reflects the actual situation upon the real network.

Or, the predicted time period information retention section may include a calculation section which calculates the predicted time period for restoration between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration.

In other words, normally, by establishing a virtual path and by generating a simulated obstruction in this virtual path, and by executing in simulation the process of: obstruction detection→obstruction advertisement→searching for an alternate path→establishment of the alternate path→changing over to the protection path, it is possible to obtain the predicted time period for restoration of the obstruction with a high accuracy which reflects the actual situation upon the real network.

A twenty-second aspect of the present invention is a node which is applied in a network which includes a plurality of lower layer nodes and a transmission line provided between this plurality of nodes; with a plurality of the nodes including an upper layer node and a lower layer node, and with at least two of the upper layer nodes being connected together by a lower layer network which includes a plurality of the lower layer nodes and the transmission line; with obstruction restoration section for the lower layer network being provided in the lower layer node, with the upper layer and lower layer nodes including a section which detects the occurrence of an obstruction upon a transmission line which it accommodates itself, and a section which advertises the result of detection by the detection section as obstruction information; and with the upper layer node including a section which retains the topology information for the network; a section which updates the topology information which it retains itself, according to obstruction information which has been advertised, or obstruction information which it has detected itself; and an advertisement transfer section which advertises to other upper layer nodes obstruction information which has been advertised.

Here, the particular feature by which the present invention is distinguished is that the updating section comprises a deferral section which defers the updating of the topology information for a time period T from the time instant that the occurrence of an obstruction has been detected by the detection section.

A predicted time period information retention section which retains information as to the predicted time period required for obstruction restoration of the lower layer network may be provided; the advertisement section of at least the lower layer node may include a first advertisement section which performs a first advertisement immediately after the occurrence of an obstruction upon the lower layer network has been detected by the detection section, and a second advertisement section which performs a second advertisement when obstruction restoration for the lower layer network has not been implemented, even though the predicted time period for restoration which has been retained in the predicted time period information retention section has elapsed from the time instant that the first advertisement has been advertised by the first advertisement section; and the deferral section may include a section which takes the time period from the time instant when the first advertisement is received until the time instant when the second advertisement is received as the time period T.

A priority ranking retention section which retains information regarding restoration priority ranking during obstruction restoration of the transmission line of the lower layer network may be provided, and the advertisement section of at least the lower layer node may include a section which sets the lengths of the time periods from the time instant of the first advertisement to the time instant of the second advertisement, for a plurality of the transmission lines upon which an obstruction has occurred at almost the same moment, individually to be inversely proportional to the restoration priority rankings which are retained by the priority ranking retention section.

Or, there may be provided a predicted time period information retention section which retains information regarding the predicted time period required for obstruction restoration of the lower layer network; and the advertisement section of at least the lower layer node may include a section which obtains information as to the predicted time period which is required for the restoration by referring to the result of detection by the detection section and to the predicted time period for restoration which is retained by the predicted time period information retention section, and a section which performs an advertisement which includes information of the predicted time period for restoration which has been obtained by the obtaining section; and the deferral section may include a section which sets the predicted time period for restoration which is contained in the advertisement as the time period T.

The advertisement transfer section may include an advertisement deferral section which defers advertisement to other ones of the upper layer nodes until the deferral time period of the deferral section has elapsed.

There may be provided a predicted time period information retention section which retains information regarding the predicted time period required for obstruction restoration of the lower layer network; and the deferral section may include a section which obtains information as to the predicted time period which is required for the restoration by referring to the obstruction information and to the predicted time period for restoration which is retained by the predicted time period information retention section, and a section which takes the predicted time period which has been obtained by the obtaining section as the time period T.

The advertisement section of at least the lower layer node may include a section which performs an advertisement at fixed intervals while an obstruction is being detected by the detection section; and, as the deferral section, there may be included a section which takes the time period until the advertisement has been received a number of times which is determined in advance as being the time period T.

There may be provided a section which analyzes the obstruction situation according to the results of detection by the detection section, and a ranking assignment section which, according to the result of the analysis by the obstruction situation analysis section, assigns a ranking which shows the seriousness of the obstruction and which is the higher the lower is the probability of restoration of the obstruction; and the advertisement section of at least the lower layer node may include a conditional advertisement section which performs advertisement of obstructions whose ranking is greater than a predetermined ranking by referring to the results of ranking assignment performed by the ranking assignment section.

There may be provided an obstruction situation analysis section which analyzes the obstruction situation according to the result of detection by the detection section, a ranking assignment section which assigns a ranking which shows the seriousness of the obstruction and which is the higher the lower is the probability of restoration of the obstruction, according to the result of analysis by the obstruction situation analysis section, and a predicted time period information retention section which retains information relating to the predicted time period for restoration which is required for obstruction restoration by the lower layer network; and the advertisement section of at least the lower layer node may include a section which emits, for an obstruction of ranking which is less than a predetermined ranking by reference to the results of ranking assignment by the ranking assignment section, a limited advertisement which includes limitation information to the effect that advertisement is being performed limited to those ones of the upper layer nodes which are directly related to the lower layer network which is obstructed, and a section which emits a prohibition removing advertisement to the effect that the limitation is removed, when the obstructed lower layer network has not been restored even after the predicted time period for restoration which is retained by the predicted time period information retention section has elapsed from the emission of the limited advertisement; with there being further provided, as the upper layer node, a section which prevents advertisement to the other ones of the upper layer nodes when the limited advertisement is received, according to its limitation information, until the receipt of the prohibition removing advertisement.

The obstruction situation analysis section may include a section which detects a number of the transmission lines in which an obstruction has occurred at almost the same time, and the ranking assignment section may include a section which assigns a ranking based upon the number.

This number detection section may include a table in which the transmission lines in which stoppage may occur are recorded corresponding to the occurrence of obstructions of obstruction factors which are included in various groups into which the obstruction factors are divided, and a section which detects the number of the transmission lines in which an obstruction has occurred at almost the same time by referring to the table.

There may be provided a priority ranking retention section which retains information regarding restoration priority ranking during obstruction restoration of the transmission line of the lower layer network, and the obstruction situation analysis section may include a section which obtains information as to the restoration priority ranking which is retained by the priority ranking retention section for the transmission line upon which an obstruction has occurred, with the ranking assignment section including a section which assigns a ranking which shows the seriousness of the obstruction and which is the higher the lower is the probability of restoration of the obstruction, which is inversely proportional to the priority ranking.

The obstruction situation analysis section may include a section which detects the degree of concentration of network resources by referring to the topology information for the lower layer network upon which the obstruction has occurred; and the ranking assignment section may include a section which assigns a ranking which shows the seriousness of the obstruction and which is the higher the lower is the probability of restoration of the obstruction, which is inversely proportional to the degree of concentration.

The predicted time period information retention section may include a section which retains link state information which is related to the detailed structure of the lower layer network, and a section which calculates the predicted time period for restoration for each of the transmission lines, based upon a capability for alternate path establishment which is attributed to each of the transmission lines, as estimated from the link state information which is retained by the retention section.

The predicted time period for restoration calculation section may include a section which, as the capability for alternate path establishment, along with calculating the predicted time period for restoration for a transmission line during duplex operation as being almost zero, also re-recognizes the transmission line, during the occurrence of an obstruction, as being a simplex transmission line;

Or, the predicted time period for restoration calculation section may include a section which, as the capability for alternate path establishment, calculates the predicted time period for restoration based upon the presence or absence of alternate paths at both the ends of the obstructed transmission line, and upon the state of vacancy or occupancy of the alternate paths.

Or, the predicted time period information retention section may include a calculation section which calculates the predicted time period for restoration between two of the nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when a simulated obstruction has been generated in the virtual working path.

Or, the predicted time period information retention section may include a calculation section which calculates the predicted time period for restoration between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration.

A twenty-third aspect of the present invention is a program which, by being installed upon an information processing device, causes the information processing device to implement a function, corresponding to a control device for a node which is applied in a network which includes a plurality of lower layer nodes and a transmission line provided between this plurality of nodes; with a plurality of the nodes including an upper layer node and a lower layer node, and with at least two of the upper layer nodes being connected together by a lower layer network which includes a plurality of the lower layer nodes and the transmission line; with an obstruction restoration function for the lower layer network being provided in the lower layer node, with the upper layer and lower layer nodes including a function of detecting the occurrence of an obstruction upon a transmission line which it accommodates itself, and a function of advertising the result of detection by the detection function as obstruction information; and with the upper layer node being endowed with a function of retaining the topology information for the network; a function of updating the topology information which it retains itself, according to obstruction information which has been advertised, or obstruction information which it has detected itself; and an advertisement transfer function of advertising to other upper layer nodes obstruction information which has been advertised.

Here, the particular feature by which the present invention is distinguished is that, as the updating function, there is implemented a function of deferring the updating of the topology information for a time period T from the time instant that the obstruction information has been advertised.

There may be implemented a predicted time period information retention function of retaining information as to the predicted time period for restoration which is required for restoring the obstruction upon the lower layer network; and, as the advertisement function of at least the lower layer node, a first advertisement function of performing a first advertisement immediately after the occurrence of an obstruction upon the lower layer network has been detected by the detection function, and a second advertisement function of performing a second advertisement when obstruction restoration for the lower layer network has not been implemented even though the predicted time period for restoration which was retained by the predicted time period information retention function has elapsed from the time instant that the first advertisement was advertised by the first advertisement function; and, as the deferral function, a function may be implemented of taking the time period from the time instant that the first advertisement has been received until the time instant that the second advertisement is received as the time period T.

It is possible to implement a priority ranking retention function of retaining information regarding restoration priority ranking during obstruction restoration of the transmission line of the lower layer network, and, as the advertising function of at least the lower layer node, a function of setting the lengths of the time periods from the time instant of the first advertisement to the time instant of the second advertisement, for a plurality of the transmission lines upon which an obstruction has occurred at almost the same moment, individually to be inversely proportional to the restoration priority rankings which are retained by the priority ranking retention function.

It is possible to implement a predicted time period information retention function of retaining information regarding the predicted time period required for obstruction restoration of the lower layer network; to implement, as the advertisement function of at least the lower layer node, a function of obtaining information as to the predicted time period which is required for the restoration by referring to the result of detection by the detection function and to the predicted time period for restoration which is retained by the predicted time period information retention function; to implement a function of performing an advertisement which includes information of the predicted time period for restoration which has been obtained by this obtaining function; and to implement, as the deferral function, a function of setting the predicted time period for restoration which is contained in the advertisement as the time period T.

As the advertisement transfer function, it is possible to implement an advertisement deferral function of deferring advertisement to the other upper layer nodes until the deferral time period of the deferral function has elapsed.

It is possible to implement a predicted time period information retention function of retaining information regarding the predicted time period required for obstruction restoration of the lower layer network; to implement, as the deferral function, a function of obtaining information as to the predicted time period which is required for the restoration by referring to the obstruction information and to the predicted time period for restoration which is retained by the predicted time period information retention function; and to implement a function of taking the predicted time period for restoration which has been obtained by this obtaining function as the time period T.

It is possible, as the advertisement function of at least the lower layer node, to implement a function of performing an advertisement at fixed intervals while an obstruction is being detected by the detection function, and to implement, as the deferral function, a function of taking the time period until the advertisement has been received a number of times which is determined in advance as being the time period T.

It is possible to implement an obstruction situation analysis function of analyzing the obstruction situation according to the results of detection by the detection function, and a ranking assignment function of, according to the result of the analysis by the obstruction situation analysis function, assigning a ranking which shows the seriousness of the obstruction and which is the higher the lower is the probability of restoration of the obstruction; and to implement, as the advertisement function of at least the lower layer node, a conditional advertisement function of performing advertisement of obstructions whose ranking is greater than a predetermined ranking by referring to the results of ranking assignment performed by the ranking assignment function.

It is possible to implement an obstruction situation analysis function of analyzing the obstruction situation according to the result of detection by the detection function, a function of assigning a ranking which shows the seriousness of the obstruction and which is the higher the lower is the probability of restoration of the obstruction, according to the result of analysis by the obstruction situation analysis function, and a predicted time period information retention function of retaining information relating to the predicted time period which is required for obstruction restoration by the lower layer network; to implement, as the advertisement function of at least the lower layer node, a function of emitting, for an obstruction of ranking which is less than a predetermined ranking by reference to the results of ranking assignment by the ranking assignment function, a limited advertisement which includes limitation information to the effect that advertisement is being performed limited to those ones of the upper layer nodes which are directly related to the lower layer network which is obstructed, and a function of emitting a prohibition removing advertisement to the effect that the limitation is removed, when the obstructed lower layer network has not been restored even after the predicted time period for restoration which is retained by the predicted time period information retention function has elapsed from the emission of the limited advertisement; and to implement a function of preventing advertisement to the other ones of the upper layer nodes when the limited advertisement is received, according to its limitation information, until the receipt of the prohibition removing advertisement.

As the obstruction situation analysis function, it is possible to implement a function of detecting a number of the transmission lines in which an obstruction has occurred at almost the same time; and, as the ranking assignment function, it is possible to implement a function of assigning a ranking based upon the number.

As the number detection function, it is possible to implement a function which corresponds to a table in which the transmission lines in which stoppage may occur are recorded corresponding to the occurrence of obstructions of obstruction factors which are included in various groups into which the obstruction factors are divided, and a function of detecting the number of the transmission lines in which an obstruction has occurred at almost the same time by referring to the table.

It is possible to implement a priority ranking retention function of retaining information regarding restoration priority ranking during obstruction restoration of the transmission line of the lower layer network; to implement, as the obstruction situation analysis function, a function of obtaining information as to the restoration priority ranking which is retained by the priority ranking retention function for the transmission line upon which an obstruction has occurred; and, as the ranking assignment function, to implement a function of assigning a ranking which shows the seriousness of the obstruction and which is the higher the lower is the probability of restoration of the obstruction, which is inversely proportional to the priority ranking.

As the obstruction situation analysis function, it is possible to implement a function of detecting the degree of concentration of network resources by referring to the topology information for the lower layer network upon which the obstruction has occurred; and, as the ranking assignment function, it is possible to implement a function of assigning a ranking which shows the seriousness of the obstruction and which is the higher the lower is the probability of restoration of the obstruction, which is inversely proportional to the degree of concentration.

It is possible to implement, as the predicted time period information retention function, a function of retaining link state information which is related to the detailed structure of the lower layer network; and to implement a function of calculating the predicted time period for restoration for each of the transmission lines, based upon a capability for alternate path establishment which is attributed to each of the transmission lines, as estimated from the link state information which is retained by the retention function.

As the function of calculating the predicted time period for restoration, it is possible to implement a function of, as the capability for alternate path establishment, along with calculating the predicted time period for restoration for a transmission line during duplex operation as being almost zero, also re-recognizing the transmission line, during the occurrence of an obstruction, as being a simplex transmission line.

Or, as the function of calculating the predicted time period for restoration, it is possible to implement a function of, as the capability for alternate path establishment, calculating the predicted time period for restoration based upon the presence or absence of alternate paths at both the ends of the obstructed transmission line, and upon the state of vacancy or occupancy of the alternate paths.

As the predicted time period information retention function, it is possible to implement a function of calculating the predicted time period for restoration between two of the nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when a simulated obstruction has been generated in the virtual working path.

Or, as the predicted time period information retention function, it is possible to implement a function of calculating the predicted time period for restoration between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration.

A twenty-fourth aspect of the present invention is a recording medium which can be read by the information processing device, upon which the program according to the present invention is recorded. By recording the program of this aspect of the present invention upon a recording medium according to this aspect of the present invention, it is possible to install the program of this aspect of the present invention upon a computer device by using this recording medium. Or, it is possible to install the program of this aspect of the present invention directly upon a computer device via a network from a server upon which the program of this aspect of the present invention is stored.

By doing this, an obstruction restoration control technique is proposed for application to a multi-layer network, which uses an information processing device such as a computer device or the like, with which it is possible to implement a network and nodes, with which it can be anticipated that effective advantage can be taken of network resources.

Furthermore, another of the objectives of the present invention is, by providing a novel obstruction restoration control technique for application to a multi-layer network, to propose an advertisement control device, a network, a program, and a recording medium, with which it can be anticipated that effective advantage can be taken of network resources.

For this, the most principal distinguishing feature with which the present invention is endowed is that there is provided, between a lower layer network and an upper layer node, an advertisement control device which controls the transfer to the upper layer node of obstruction information which has been advertised by the lower layer node. The present invention also proposes a protocol when controlling the transfer of obstruction information.

A twenty-fifth aspect of the present invention is an advertisement control device provided to a network comprising a plurality of nodes, and a transmission line which is provided between the plurality of nodes, with the plurality of nodes including an upper layer node and a lower layer node, and at least two of the upper layer nodes being connected together by a lower layer network which comprises a plurality of the lower layer nodes and the transmission line, an obstruction restoration section for the lower layer network being provided to the lower layer node; the upper layer node and the lower layer node comprising a section which detects the occurrence of an obstruction upon a transmission line which it accommodates itself, and a section which advertises the result of detection by the detection section as obstruction information; the upper layer node comprising a section which retains the topology information for the network, a section which updates the topology information which it retains itself, according to obstruction information which has been advertised, or obstruction information which it has detected itself, and an advertisement transfer section which advertises to other ones of the upper layer nodes obstruction information which has been advertised; with this advertisement control device being provided between the lower layer network and the upper layer node, and having the particular distinguishing feature that it further includes a section which receives the obstruction information which has been advertised by the advertisement section of the lower layer node and which defers for a time period T the advertisement of the obstruction information to the upper layer node.

By doing this, an advertisement is not emitted to the upper layer node immediately when an obstruction occurs upon the lower layer network, but rather advertisement is deferred for a fixed time period, for an obstruction for which quick restoration of the lower layer network can be expected within a short time period. By doing this, it is made possible to avoid calculation of routes which will become invalid. In this manner, according to the present invention, merely by newly adding an advertisement control device to a network which already exists, and without changing or updating any nodes which are already in existence, an obstruction restoration control technique is proposed for application to a multi-layer network, with which it can be anticipated that effective advantage can be taken of network resources.

It is desirable for this section which defers for a time period T to include: a predicted time period information retention section which retains information regarding the predicted time period required for obstruction restoration of the lower layer network; a section which obtains information as to the predicted time period which is required for the restoration by referring to the obstruction information and to the predicted time period for restoration which is retained by the predicted time period information retention section; and a section which takes the predicted time period for restoration which has been obtained by the obtaining section as the time period T. In this manner, it is possible to obtain the most suitable value for the time period T.

Or, a twenty-fifth aspect of the present invention is an advertisement control device for a network comprising a plurality of nodes, and a transmission line which is provided between the plurality of nodes, with the plurality of nodes including an upper layer node and a lower layer node, and at least two of the upper layer nodes being connected together by a lower layer network which comprises a plurality of the lower layer nodes and the transmission line, an obstruction restoration section for the lower layer network being provided to the lower layer node; the upper layer node and the lower layer node comprising a section which detects the occurrence of an obstruction upon a transmission line which it accommodates itself, and a section which advertises the result of detection by the detection section as obstruction information; the upper layer node comprising a section which retains the topology information for the network, a section which updates the topology information which it retains itself, according to obstruction information which has been advertised, or obstruction information which it has detected itself, and an advertisement transfer section which advertises to other ones of the upper layer nodes obstruction information which has been advertised; and this advertisement control device being provided between the lower layer network and the upper layer node, and having the particular distinguishing feature that it further includes an obstruction situation analysis section which analyzes the obstruction situation according to the obstruction information, and a section which processes the contents of the advertisement according to the result of analysis by the analysis section.

By doing this, and by merely newly adding an advertisement control device to a network which already exists, and without changing or updating any nodes which are already in existence, an obstruction restoration control technique is proposed for application to a multi-layer network, which uses an information processing device such as a computer device or the like, with which it can be anticipated that effective advantage can be taken of network resources.

It is desirable for the processing section to include a ranking assignment section which, according to the result of the analysis by the analysis section, assigns a ranking which shows the seriousness of the obstruction and which is the higher the lower is the probability of restoration of the obstruction, and a conditional advertisement section which performs advertisement of obstructions whose ranking is greater than a predetermined ranking by referring to the results of rank assignment performed by the ranking assignment section.

In other words, in the case of an obstruction of low ranking for which restoration can be expected within a short time period, its advertisement is not initially performed. By doing this, the occurrence of an obstruction is not initially notified to the upper layer nodes, so that it is possible to alleviate the processing load upon the upper layer nodes.

It is desirable for the processing section to include a predicted time period information retention section which retains information relating to the predicted time period which is required for obstruction restoration by the lower layer network; a ranking assignment section which assigns a ranking which shows the seriousness of the obstruction and which is the higher the lower is the probability of restoration of the obstruction, according to the result of analysis by the obstruction situation analysis section; a section which emits, for an obstruction of ranking which is less than a predetermined ranking by reference to the results of ranking assignment by the ranking assignment section, a limited advertisement which includes limitation information to the effect that advertisement is being performed limited to those ones of the upper layer nodes which are directly related to the lower layer network which is obstructed; and a section which emits a prohibition removing advertisement to the effect that the limitation is removed, when the obstructed lower layer network has not been restored even after the predicted time period for restoration which is retained by the predicted time period information retention section has elapsed from the emission of the limited advertisement; and for the upper layer node to include a section which prevents advertisement to the other ones of the upper layer nodes when the limited advertisement is received, according to its limitation information, until the receipt of the prohibition removing advertisement.

In other words, even for an obstruction for which restoration may be expected within a short time period, advertisement of this obstruction is directly performed to an upper layer node. However, the advertisement is not transferred to the other upper layer nodes which are not directly related to this obstruction. By doing this, and by advertising even the occurrence of an obstruction for which restoration may be expected within a short time period, it is possible to avoid influence of updates of topology information spreading over the entire network. Furthermore, if contrary to expectations it is not possible to implement obstruction restoration within a short time period, it is possible for the upper layer nodes which have received this advertisement to perform obstruction avoidance measures, and, for example, this may be beneficial for those of the upper layer nodes which are handling communication which is of high importance.

In this case, it is necessary to provide, on the side of the upper layer node as well, a section which prevents advertisement to the other ones of the upper layer nodes when the limited advertisement is received, according to its limitation information, until the receipt of the prohibition removing advertisement.

The processing section may include a section which generates command information for the upper layer node according to the result of analysis by the analysis section, and a section which emits to the upper layer node an advertisement which includes the command information which has been generated by the production section; and the upper layer node may include a section which executes the processing which has been commanded according to the command information which is included in the advertisement.

By doing this, the upper layer node is able to execute processing according to commands from the advertisement control device other than the previously described advertisement prohibition and prohibition removing. For example, if a new obstruction countermeasures manual has been produced, it is possible to execute obstruction countermeasures across the entire network according to this new manual, by installing the obstruction countermeasures manual in the advertisement control device.

It is desirable for the predicted time period information retention section to include a section which retains link state information which is related to the detailed structure of the lower layer network, and a section which calculates the predicted time period for restoration for each of the transmission lines, based upon a capability for alternate path establishment which is attributed to each of the transmission lines, as estimated from the link state information which is retained by the retention section.

For example, the predicted time period for restoration calculation section may include a section which, as the capability for alternate path establishment, along with calculating the predicted time period for restoration for a transmission line during duplex operation as being almost zero, also re-recognizes the transmission line, during the occurrence of an obstruction, as being a simplex transmission line; or, the predicted time period for restoration calculation section may include a section which, as the capability for alternate path establishment, calculates the predicted time period for restoration based upon the presence or absence of alternate paths at both the ends of the obstructed transmission line, and upon the state of vacancy or occupancy of the alternate paths.

Or, the predicted time period information retention section may include a calculation section which calculates the predicted time period for restoration between two of the nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when a simulated obstruction has been generated in the virtual working path.

In other words, normally, it is possible to calculate the predicted time period which is required for obstruction restoration by establishing a virtual working path and a virtual protection path, by generating a simulated obstruction in this virtual working path, and by finding the time period which is required for changing over the path from the virtual working path to the virtual protection path. By establishing the virtual working path and the virtual protection path in the vicinity of the actual working path and the protection path, and by following the actual process of: obstruction detection→obstruction advertisement→changing over to the protection path, it is possible to obtain the predicted time period for restoration of the obstruction with a high accuracy which reflects the actual situation upon the real network.

Or, the predicted time period information retention section may include a calculation section which calculates the predicted time period for restoration between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration.

In other words, normally, by establishing a virtual path and by generating a simulated obstruction in this virtual path, and by executing in simulation the process of: obstruction detection→obstruction advertisement→searching for an alternate path→establishment of the alternate path→changing over to the protection path, it is possible to obtain the predicted time period for restoration of the obstruction with a high accuracy which reflects the actual situation upon the real network.

A twenty-sixth aspect of the present invention is a network with the particular distinguishing feature that it comprises an advertisement control device according to the present invention.

A twenty-seventh aspect of the present invention is a program which, by being installed upon an information processing device, causes the information processing device to implement a function, corresponding to a device which is utilized in a network comprising a plurality of nodes, and a transmission line which is provided between the plurality of nodes, with the plurality of nodes including an upper layer node and a lower layer node, and at least two of the upper layer nodes being connected together by a lower layer network which comprises a plurality of the lower layer nodes and the transmission line; the lower layer node being endowed with a function of obstruction restoration for the lower layer network; the upper layer node and the lower layer node being endowed with a function of detecting the occurrence of an obstruction upon a transmission line which it accommodates itself, and with a function of advertising the result of detection by the detection function as obstruction information; the upper layer node being endowed with a function of retaining the topology information for the network, a function of updating the topology information which it retains itself, according to obstruction information which has been advertised, or obstruction information which it has detected itself, and an advertisement transfer function of advertising to other ones of the upper layer nodes obstruction information which has been advertised.

Here, the particular feature by which the present invention is distinguished is that, as a function which corresponds to a device which is provided between the lower layer network and the upper layer node, a function is implemented of deferring the advertisement of the obstruction information to the upper layer node for a time period T from the receipt of the obstruction information which has been advertised by the advertisement function of the lower layer node.

It is desirable, as the function of deferring for the time period, to implement a predicted time period information retention function of retaining information regarding the predicted time period required for obstruction restoration of the lower layer network, a function of obtaining information as to the predicted time period which is required for the restoration by referring to the obstruction information and to the predicted time period for restoration which is retained by the predicted time period information retention function, and a function of taking the predicted time period for restoration which has been obtained by the obtaining function as the time period T.

Or, a twenty-seventh aspect of the present invention is a program which, by being installed upon an information processing device, causes the information processing device to implement a function, corresponding to a device which is utilized in a network comprising a plurality of nodes, and a transmission line which is provided between the plurality of nodes, with the plurality of nodes including an upper layer node and a lower layer node, and at least two of the upper layer nodes being connected together by a lower layer network which comprises a plurality of the lower layer nodes and the transmission line; the lower layer node being endowed with a function of obstruction restoration for the lower layer network; the upper layer node and the lower layer node being endowed with a function of detecting the occurrence of an obstruction upon a transmission line which it accommodates itself, and with a function of advertising the result of detection by the detection function as obstruction information; the upper layer node being endowed with a function of retaining the topology information for the network, a function of updating the topology information which it retains itself, according to obstruction information which has been advertised, or obstruction information which it has detected itself, and an advertisement transfer function of advertising to other ones of the upper layer nodes obstruction information which has been advertised.

Here, the particular feature by which the present invention is distinguished is that there is implemented, as a function which corresponds to a device which is provided between the lower layer network and the upper layer node, an obstruction situation analysis function of analyzing the obstruction situation according to the obstruction information, and a function of processing the contents of the advertisement according to the result of the analysis by this obstruction situation analysis function.

As the processing function, it is possible to implement a ranking assignment function of, according to the result of the analysis by the obstruction situation analysis function, assigning a ranking which shows the seriousness of the obstruction and which is the higher the lower is the probability of restoration of the obstruction, and a conditional advertisement function of performing advertisement of obstructions whose ranking is greater than a predetermined ranking by referring to the results of ranking assignment performed by the ranking assignment function.

Or, as the processing function, it is possible to implement: a predicted time period information retention function of retaining information relating to the predicted time period which is required for obstruction restoration by the lower layer network; a function of assigning a ranking which shows the seriousness of the obstruction and which is the higher the lower is the probability of restoration of the obstruction, according to the result of analysis by this obstruction situation analysis function; a function of emitting, for an obstruction of ranking which is less than a predetermined ranking by reference to the results of ranking assignment by this ranking assignment function, a limited advertisement which includes limitation information to the effect that advertisement is being performed limited to those ones of the upper layer nodes which are directly related to the lower layer network which is obstructed, and a function of emitting a prohibition removing advertisement to the effect that the limitation is removed, when the obstructed lower layer network has not been restored even after the predicted time period for restoration which is retained by the predicted time period information retention function has elapsed from the emission of the limited advertisement; and, as a function of the upper layer node, it is possible to implement a function of preventing advertisement to the other ones of the upper layer nodes when the limited advertisement is received, according to its limitation information, until the receipt of the prohibition removing advertisement.

Or, as the processing function, it is possible to implement a function of producing command information for the upper layer node according to the result of analysis by the analysis function, and a function of emitting to the upper layer node an advertisement which includes the command information which has been made by the producing function; and, as a function of the upper layer node, it is possible to implement a function of executing the processing which has been commanded according to the command information which is included in the advertisement.

It is desirable to implement, as the predicted time period information retention function, a function of retaining link state information which is related to the detailed structure of the lower layer network; and to implement a function of calculating the predicted time period for restoration for each of the transmission lines, based upon a capability for alternate path establishment which is attributed to each of the transmission lines, as estimated from the link state information which is retained by the retention function.

It is desirable, as the function of calculating the predicted time period for restoration, to implement a function of, as the capability for alternate path establishment, along with calculating the predicted time period for restoration for a transmission line during duplex operation as being almost zero, also re-recognizing the transmission line, during the occurrence of an obstruction, as being a simplex transmission line.

Or, as the function of calculating the predicted time period for restoration, it is possible to implement a function of, as the capability for alternate path establishment, calculating the predicted time period for restoration based upon the presence or absence of alternate paths at both the ends of the obstructed transmission line, and upon the state of vacancy or occupancy of the alternate paths.

Or, as the predicted time period restoration information retention function, it is possible to implement a function of calculating the predicted time period for restoration between two of the nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when a simulated obstruction has been generated in the virtual working path.

Or, as the predicted time period information retention function, it is possible to implement a function of calculating the predicted time period for restoration between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration.

A twenty-eighth aspect of the present invention is a recording medium which can be read by the information processing device, upon which the program according to the present invention is recorded. By recording the program of this aspect of the present invention upon a recording medium according to this aspect of the present invention, it is possible to install the program of this aspect of the present invention upon a computer device by using this recording medium. Or, it is possible to install the program of this aspect of the present invention directly upon a computer device via a network from a server upon which the program of this aspect of the present invention is stored.

By doing this, an obstruction restoration control technique is proposed for application to a multi-layer network, which uses an information processing device such as a computer device or the like, with which it is possible to implement a network, with which it can be anticipated that effective advantage can be taken of network resources.

BRIEF DESCRIPTION OF THE DRAWINGS

FIGS. 16A and 16B are diagrams showing an SRLG (Shared Risk Link Group).

DETAILED DESCRIPTION OF THE PREFERRED EMBODIMENTS

First, the first through the sixteenth preferred embodiments of the present invention will be explained.

The First Preferred Embodiment

Figure 1:
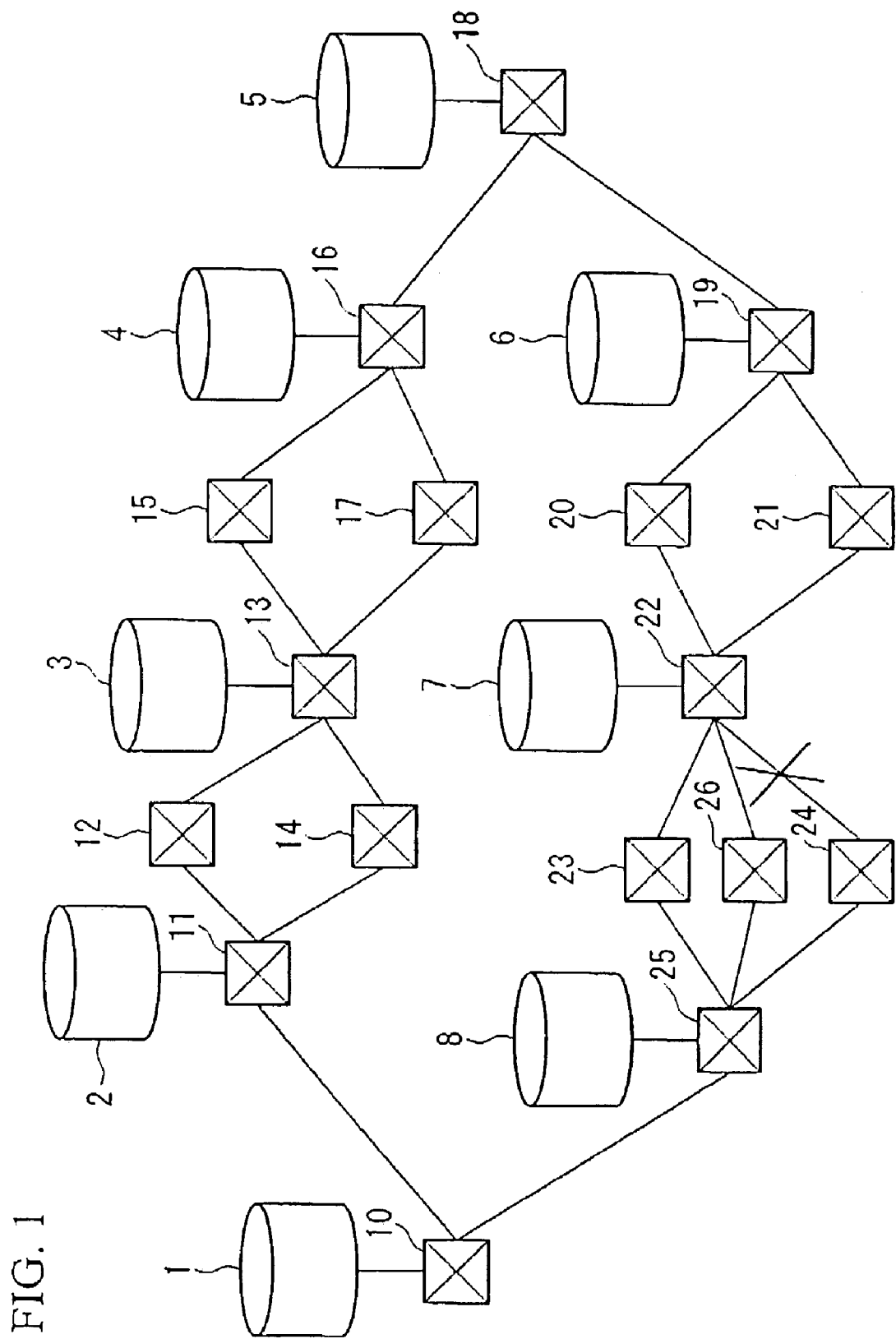
FIG. 1 is a conceptual view of a network according to any of the first through the sixteenth preferred embodiments of the present invention.
Figure 2:
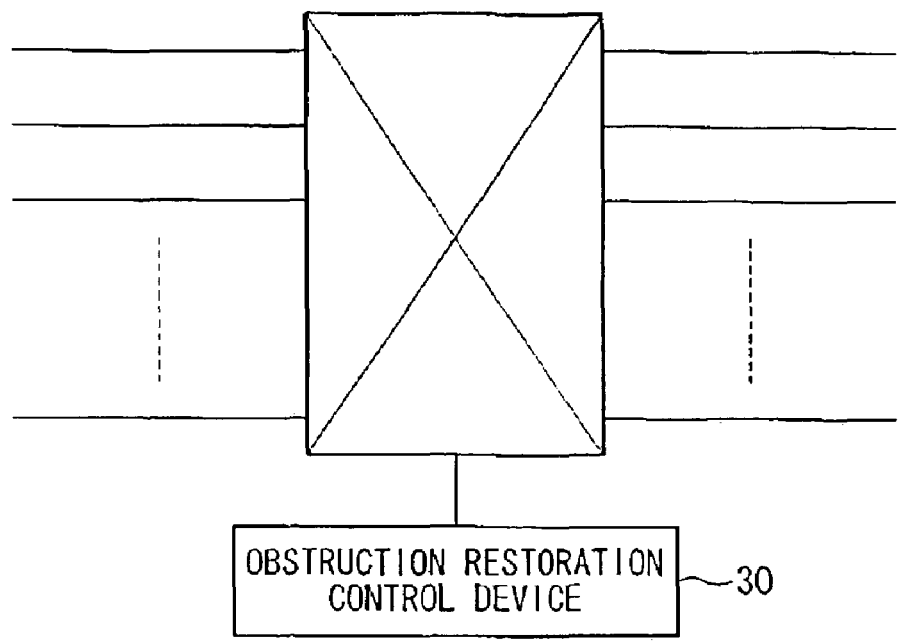
FIG. 2 is a structural diagram of a photonic cross connect incorporated in any of these first through the sixteenth preferred embodiments of the present invention.
Figure 3:
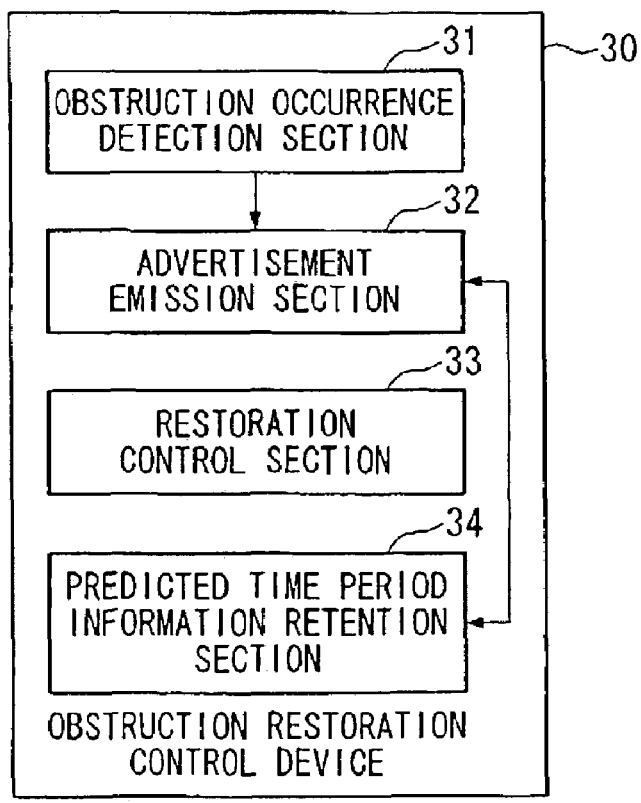
FIG. 3 is a block structural diagram of an obstruction restoration control device incorporated in the first preferred embodiment of the present invention.
Figure 4:
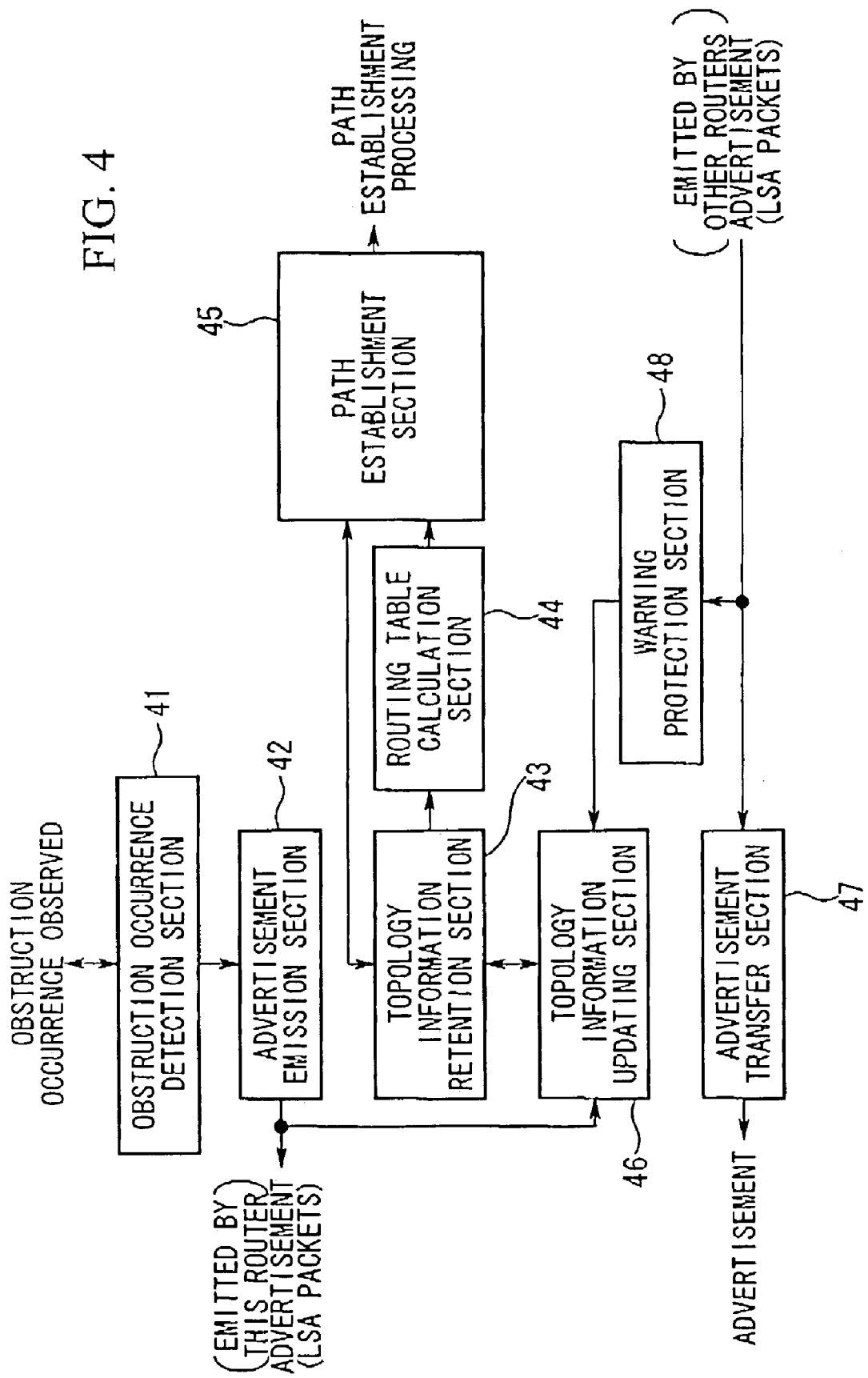
FIG. 4 is a block structural diagram of a router incorporated in the first preferred embodiment of the present invention.

The first preferred embodiment of the present invention will be explained with reference to FIG. 1 through FIG. 4. FIG. 1 is a conceptual view of a network according to this preferred embodiment. FIG. 2 is a structural diagram of a photonic cross connect incorporated in this preferred embodiment. FIG. 3 is a block structural diagram of an obstruction restoration control device incorporated in this preferred embodiment. And FIG. 4 is a block structural diagram of a router of this preferred embodiment.

This first preferred embodiment is a network, comprising a plurality of nodes and transmission lines provided between these nodes; among this plurality of nodes, routers 1 through 8 are upper layer nodes and photonic cross connects 10 through 26 are lower layer nodes; at least two of these routers 1 through 8 are connected together by a lower layer network which includes a plurality of the photonic cross connects and transmission lines between them; in this lower layer network, an obstruction restoration control device 30 is provided to each of the photonic cross connects 10 through 26 for jointly performing obstruction restoration; and the obstruction restoration control devices 30 of the routers 1 through 8 and the photonic cross connects 10 through 26 comprise respective obstruction occurrence detection sections 31, 41 which detect the occurrence of obstruction in the transmission lines which they accommodate themselves, and advertisement emission sections 32, 42 which advertise the results of this detection by these obstruction occurrence detection sections 31, 41 as obstruction information; and each of the routers 1 through 8 upon the network comprises a topology information retention section 43 which retains the topology information for the network, a topology information updating section 46 which updates the topology information which this router itself retains according to obstruction information which has been advertised or obstruction information which this router itself has detected, and an advertisement transfer section 47 which advertises obstruction information which has been advertised to the other ones of the routers 1 through 8.

Here, the particular distinguishing feature of this first preferred embodiment of the present invention consists of the fact that a warning protection section 48 is provided which defers updating of the topology information by the topology information updating section 46 for a time period T from the time instant that the occurrence of an obstruction has been detected.

Figure 55:
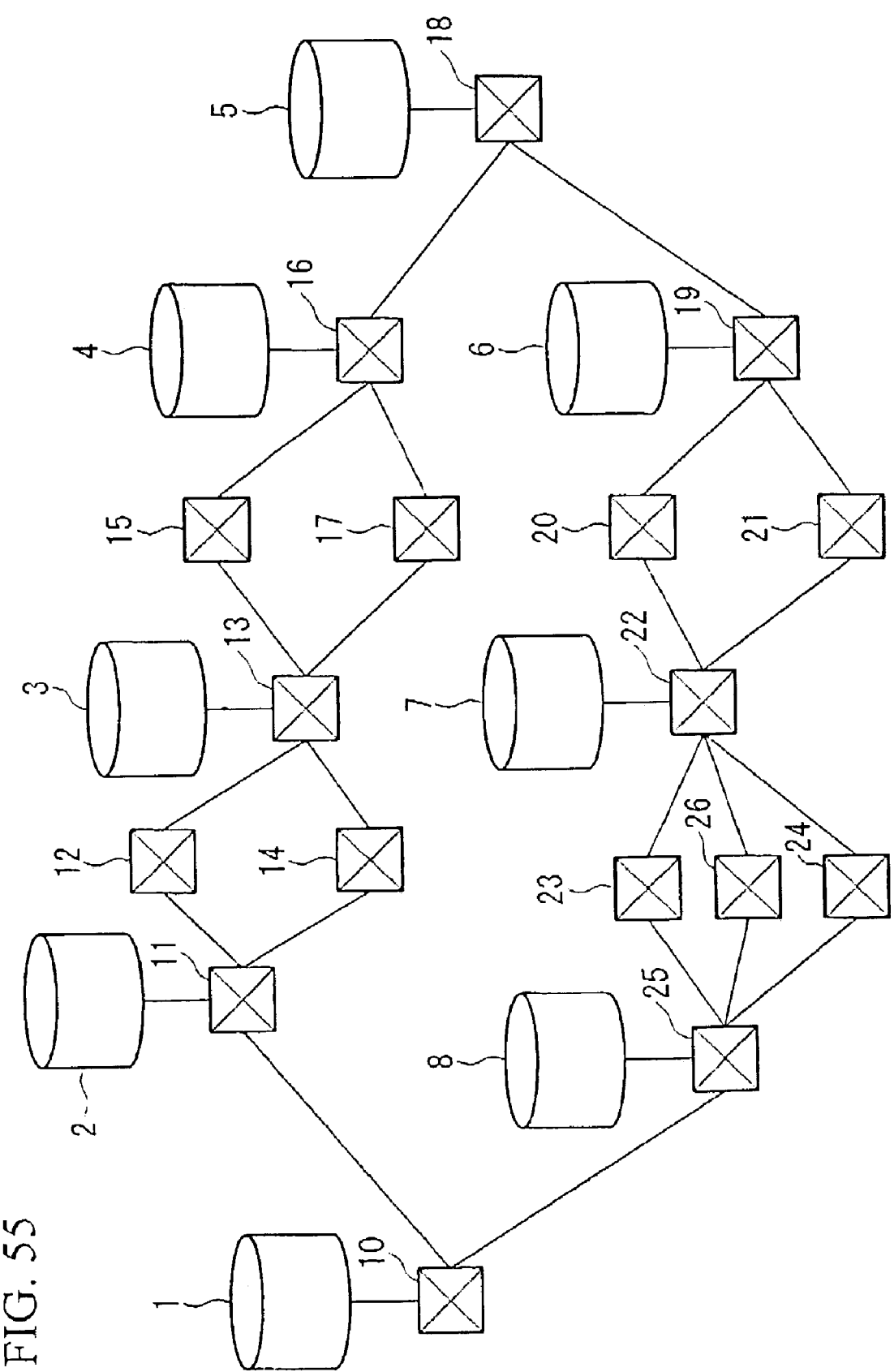
FIG. 55 is a diagram showing an example of a multi-layer network.
Figure 56:
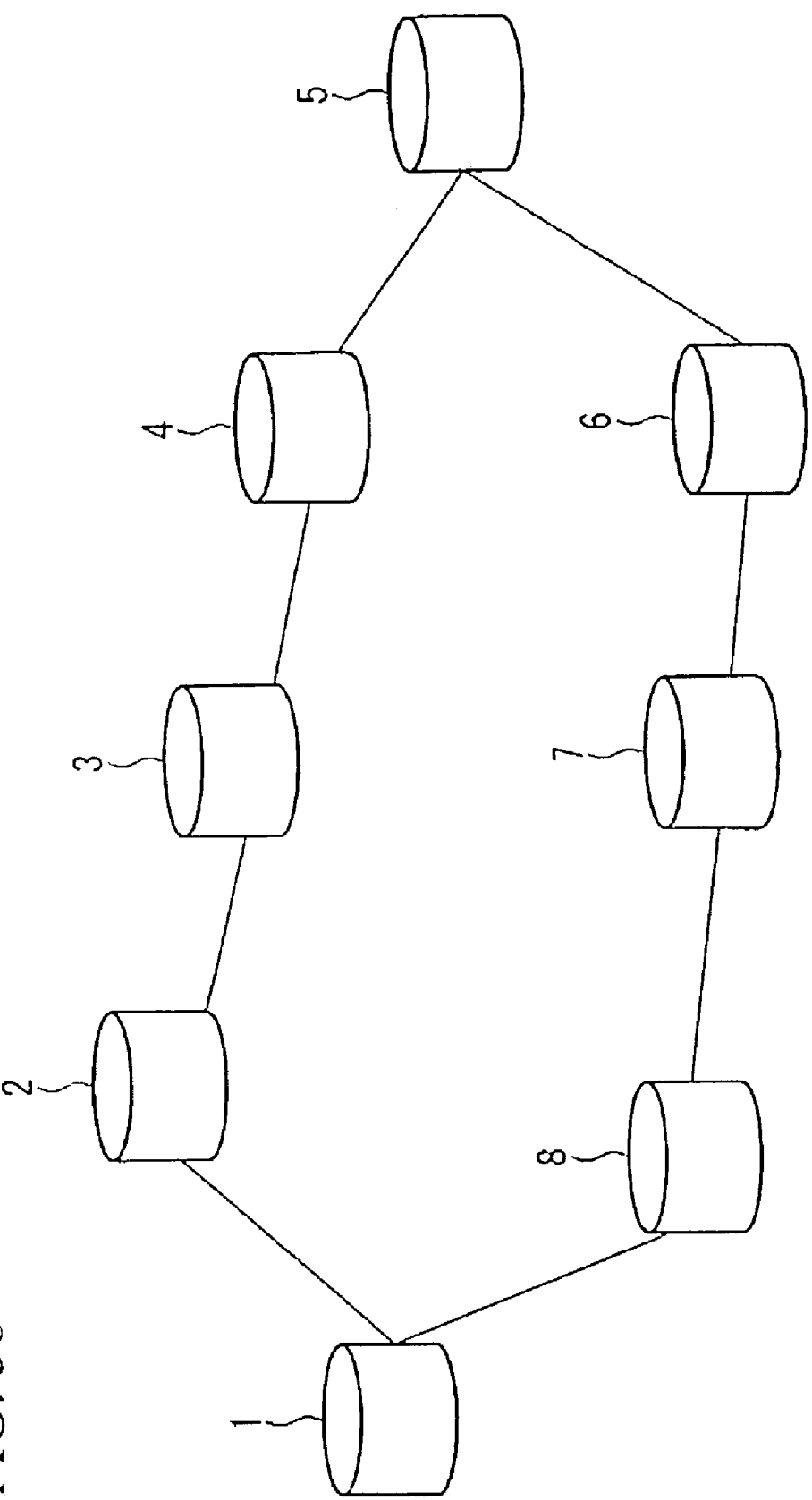
FIG. 56 is a diagram showing topology information which is retained by a router.

In each of the routers 1 through 8, it may happen that the router itself detects the occurrence of an obstruction by the obstruction occurrence detection section 41, or it may happen that the occurrence of the obstruction is detected by advertisement from the lower layer network; but an obstruction which is detected by the obstruction occurrence detection section 41 is an obstruction at the level of the upper layer network which includes the routers 1 through 8 shown in FIG. 56. By contrast to this, an obstruction which is detected by advertisement from the lower layer network is an obstruction at the level of the lower layer network which includes the photonic cross connects 10 through 26 shown in FIG. 55.

In other words, an obstruction which is detected by an obstruction occurrence detection section 41 is a serious obstruction such as one in which a stoppage has occurred in almost the entire lower layer network between routers, and it is a type of obstruction for which immediate restoration can hardly be expected. By contrast to this, an obstruction which is detected by advertisement from the lower layer network is a trifling obstruction such as one in which a stoppage has taken place upon only a portion of the lower layer network, and it is a type of obstruction for which it is possible to expect immediate restoration such as by establishment of an alternate path or the like.

In this first preferred embodiment of the present invention, the explanation is performed by taking as an object the occurrence of an obstruction at the level of the lower layer network, for which an immediate restoration can be expected.

It should be understood that although, with this description of the first preferred embodiment of the present invention, the explanation is made in terms of the detection of the occurrence of an obstruction by advertisement from the lower layer network, apart from this, it would also be possible to detect the occurrence of an obstruction upon the lower layer network by error lookout by keep alive signals for the links, or the K1/K2 byte defined in an SDH, or the like, being emitted from the routers 1 through 8 themselves as well, and it would be possible to explain this first preferred embodiment in the same manner even using a method such as this for detecting the occurrence of a fault, instead of advertising by means of an LSA packet such as is explained in this description of the first preferred embodiment.

In the obstruction restoration control device 30, there is provided a predicted time period information retention section 34 which retains information relating to the predicted time period which is required for obstruction restoration of the lower layer network, and the advertisement emission section 32 of the obstruction restoration control device 30 obtains the information of the predicted time period required for the restoration by referring to the result of detection by the obstruction occurrence detection section 31 and to the predicted time period for restoration which has been retained in the predicted time period information retention section 34, and makes an advertisement which includes this information of the predicted time period for restoration which has been obtained. The warning protection sections 48 of the routers 1 through 8 take the predicted time period for restoration which is included in the advertisement as the time period T. It should be understood that, in the figure which is shown as the structural diagram of the network, the obstruction restoration control device 30 has been omitted.

The Second Preferred Embodiment

Figure 5:
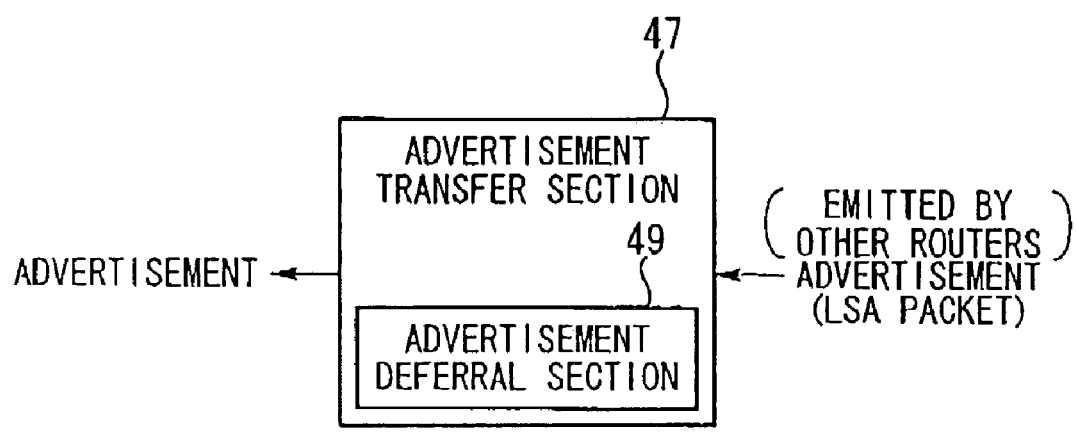
FIG. 5 is a block structural diagram of an advertisement transfer section incorporated in the second preferred embodiment of the present invention.

The second preferred embodiment of the present invention will now be explained with reference to FIG. 5. FIG. 5 is a block structural diagram of an advertisement transfer section of this second preferred embodiment.

In this second preferred embodiment of the present invention, the advertisement transfer section 47 of each of the routers 1 through 8 comprises an advertisement deferral section 49 which defers advertisement to the other routers until the deferral time period of the warning protection section 48 has elapsed.

According to this second preferred embodiment of the present invention, the upper layer nodes 7 and 8 which are directly connected to the lower layer network in which an obstruction has occurred receive advertisement immediately after the occurrence of an obstruction, but they defer updating their topology information for the time period T. By contrast to this, the upper layer nodes 1 through 6 which are not directly connected to the lower layer network in which the obstruction has occurred receive advertisement transferred from the upper layer nodes 7 and 8 only after the time period T has elapsed, and as a result, their updating of their topology information is deferred by a total time period of 2T. Accordingly, it is possible to provide a difference in deferral time period between the upper layer nodes 7 and 8 to which the lower layer network in which the obstruction has occurred is directly connected, and the other upper layer nodes 1 through 6. In this manner, the upper layer nodes 7 and 8 which are directly connected to the lower layer network in which the obstruction has occurred update their topology information after the time period T, and, even after obstruction avoidance measures such as establishing an alternate path or the like have started, the other upper layer nodes 1 through 6 defer the updating of their topology information by a further time period T; and if, during this time period, the lower layer network is able to restore the obstruction, since the requirement to return the topology information to its original state is limited to the upper layer nodes 7 and 8 which are directly connected to the lower layer network in which the obstruction occurred, it is possible to provide a further stage of prevention of spreading of the influence of updates of topology information over the entire network.

Or, according to this second preferred embodiment of the present invention, if both routers which do comprise warning protection sections 48 and routers which do not are present in the network together, then, by the routers which do comprise warning protection sections 48 also comprising advertisement deferral sections 49 which defer advertisement to the other routers which do not comprise warning protection sections 48, the routers which do not comprise warning protection sections 48 also come to be able to behave in the same manner as the routers which do comprise warning protection sections 48. Due to this, it is possible for a network in which both routers which do comprise warning protection sections 48 and routers which do not are mixed together to operate as a network according to the present embodiment.

The Third Preferred Embodiment

Figure 6:
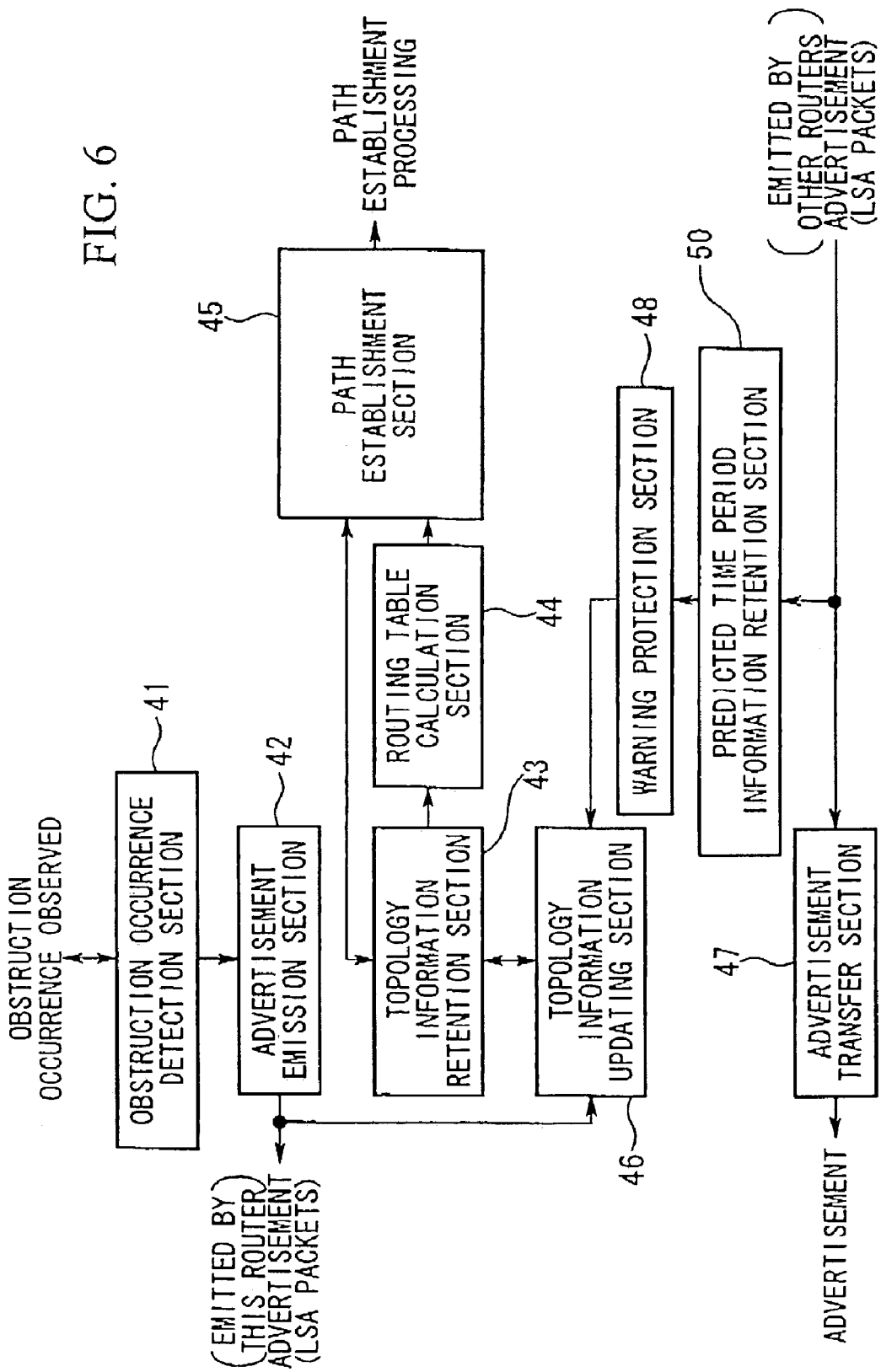
FIG. 6 is a block structural diagram of a router incorporated in the third preferred embodiment of the present invention.
Figure 7:
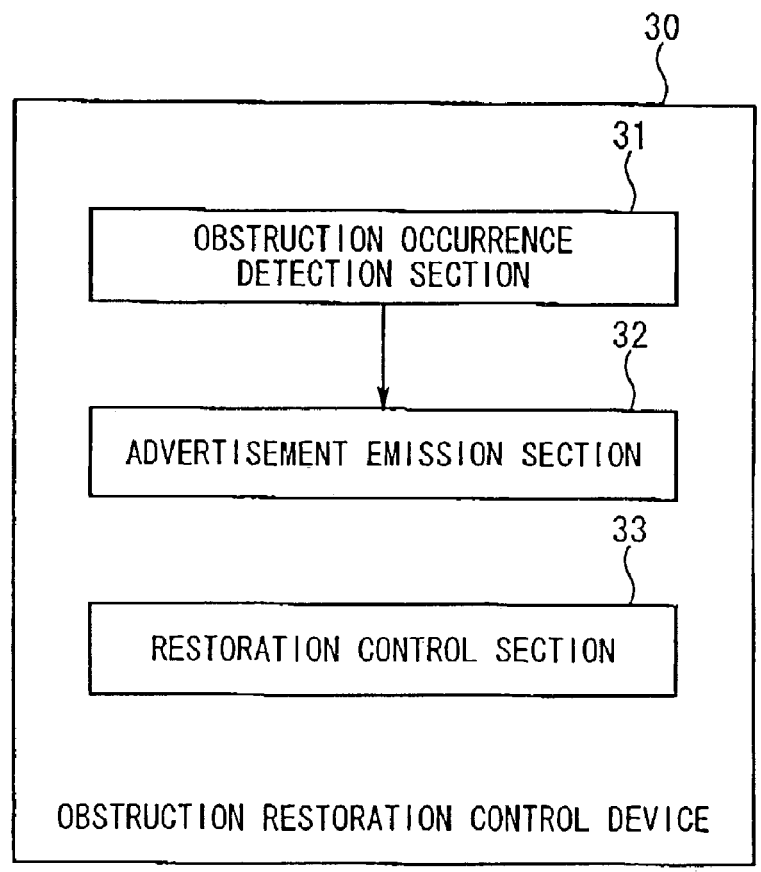
FIG. 7 is a block structural diagram of an obstruction restoration control device incorporated in the third preferred embodiment of the present invention.

The third preferred embodiment of the present invention will now be explained with reference to FIGS. 6 and 7. FIG. 6 is a block structural diagram of a router incorporated in this third preferred embodiment. And FIG. 7 is a block structural diagram of an obstruction restoration control device incorporated in this third preferred embodiment of the present invention.

In this third preferred embodiment, each of the routers 1 through 8 comprises a predicted time period information retention section 50 which retains information of the predicted time period which is required for obstruction restoration by the lower layer network. The warning protection section 48 obtains information about the predicted time period which is required for the restoration by referring to the obstruction information and to the predicted time period for restoration which is retained by the predicted time period information retention section 50, and takes the predicted time period for restoration which has been obtained as being the time period T. Accordingly, as shown in FIG. 7, the obstruction restoration control devices 30 which are provided to the photonic cross connects 10 through 26 are not required to incorporate any predicted time period information retention sections.

The Fourth Preferred Embodiment

Figure 8:
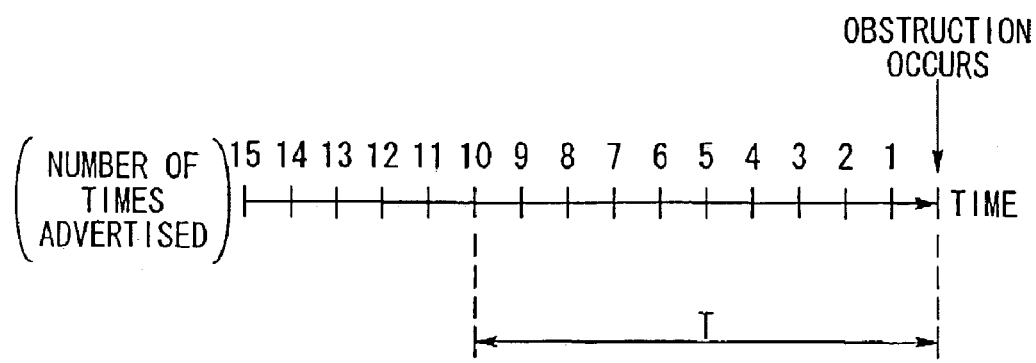
FIG. 8 is a diagram for explanation of a deferral time period determination method of the fourth preferred embodiment of the present invention.

The fourth preferred embodiment of the present invention will now be explained with reference to FIG. 8. FIG. 8 is a diagram for explanation of a deferral time period determination method of this fourth preferred embodiment.

In this fourth preferred embodiment of the present invention, the advertisement emission sections 32 in the obstruction restoration control devices 30 of the photonic cross connects 10 through 26 perform advertisement at a fixed period during the detection of an obstruction by the obstruction occurrence detection sections 31. The warning protection sections 48 of the routers 1 through 8 take the time period T as being the time period until this advertisement has been received a number of times which is determined in advance.

According to this fourth preferred embodiment of the present invention, it is not necessary for the actual contents of the advertisement which is emitted by the advertisement emission section 32 of the obstruction restoration control device 30 to be complicated, since it will suffice for the advertisement which is performed at a fixed period simply to include information to the effect that an obstruction has occurred; and accordingly it is possible to alleviate the processing load upon the advertisement emission sections 32.

As a structure for the routers 1 through 8, the structure shown in FIG. 6 will be adequate, with the alteration that, instead of the time period T being set by the predicted time period information retention section 50, this time period T should be changed into the number of times that an advertisement is received.

The Fifth Preferred Embodiment

Figure 9:
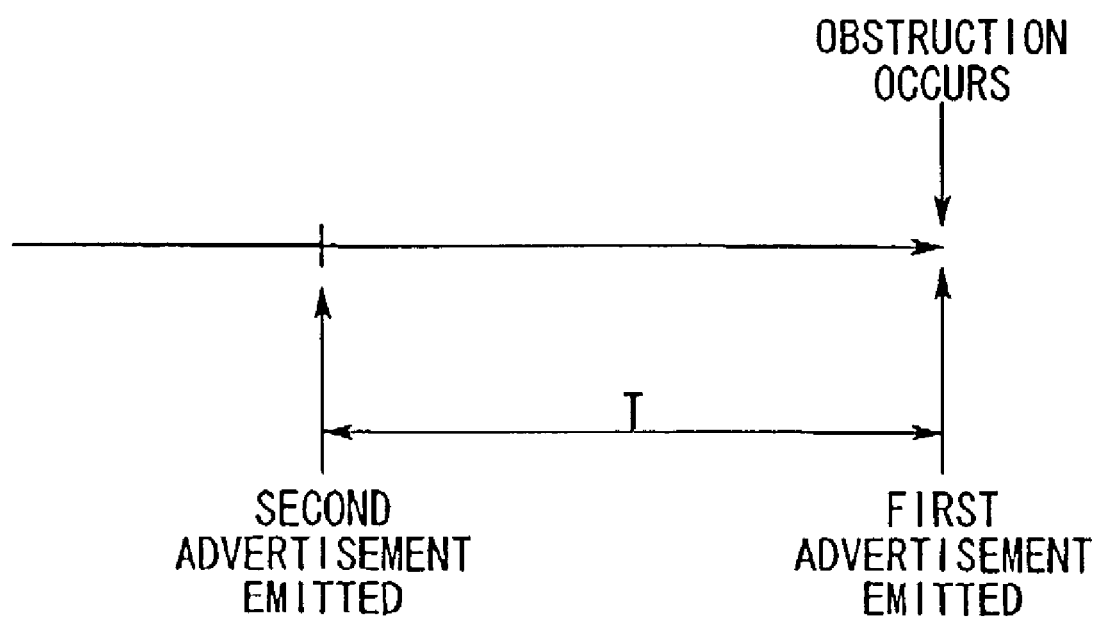
FIG. 9 is a diagram for explanation of a deferral time period determination method of the fifth preferred embodiment of the present invention.

The network according to the fifth preferred embodiment of the present invention will now be explained with reference to FIG. 9. FIG. 9 is a diagram for explanation of a deferral time period determination method of this fifth preferred embodiment.

In this fifth preferred embodiment, as shown in FIG. 3, the obstruction restoration control devices 30 which are provided to the photonic cross connects 10 through 26 are each provided with a predicted time period information retention section 34. The advertisement emission section 32 performs a first advertisement immediately after the detection of the occurrence of an obstruction of the lower layer network by the obstruction occurrence detection section 31, and it performs a second advertisement if and when obstruction restoration for the lower layer network has not been implemented even though the predicted time period for restoration which has been retained in the predicted time period information retention section 34 has elapsed from the time instant that this first advertisement has been performed.

The warning protection sections 48 of the routers 1 through 8 take the time period from the time instant that the first advertisement is received until the time instant that the second advertisement is received as being the time period T.

The Sixth Preferred Embodiment

Figure 10:
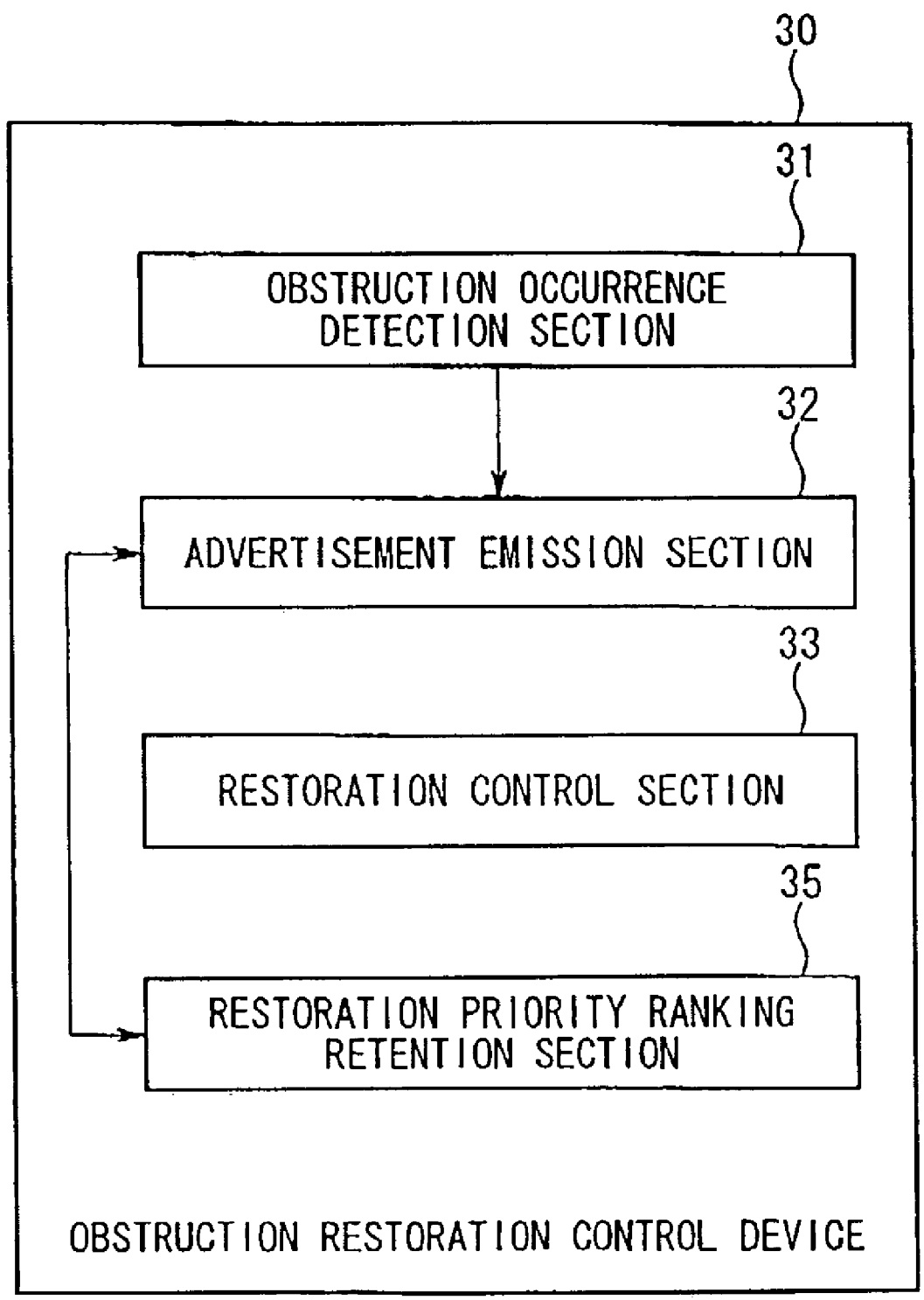
FIG. 10 is a block structural diagram of an obstruction restoration control device incorporated in the sixth preferred embodiment of the present invention.

The network according to the sixth preferred embodiment of the present invention will now be explained with reference to FIGS. 10 and 11. FIG. 10 is a block structural diagram of an obstruction restoration control device incorporated in this sixth preferred embodiment. And FIG. 11 is a diagram for explanation of a deferral time period determination method of this sixth preferred embodiment.

In this sixth preferred embodiment of the present invention, as shown in FIG. 10, the obstruction restoration control devices 30 of the photonic cross connects 10 through 26 comprise restoration priority ranking retention sections 35 which retain information regarding the restoration priority rankings when performing obstruction restoration for the transmission lines in the lower layer network.

Figure 11:
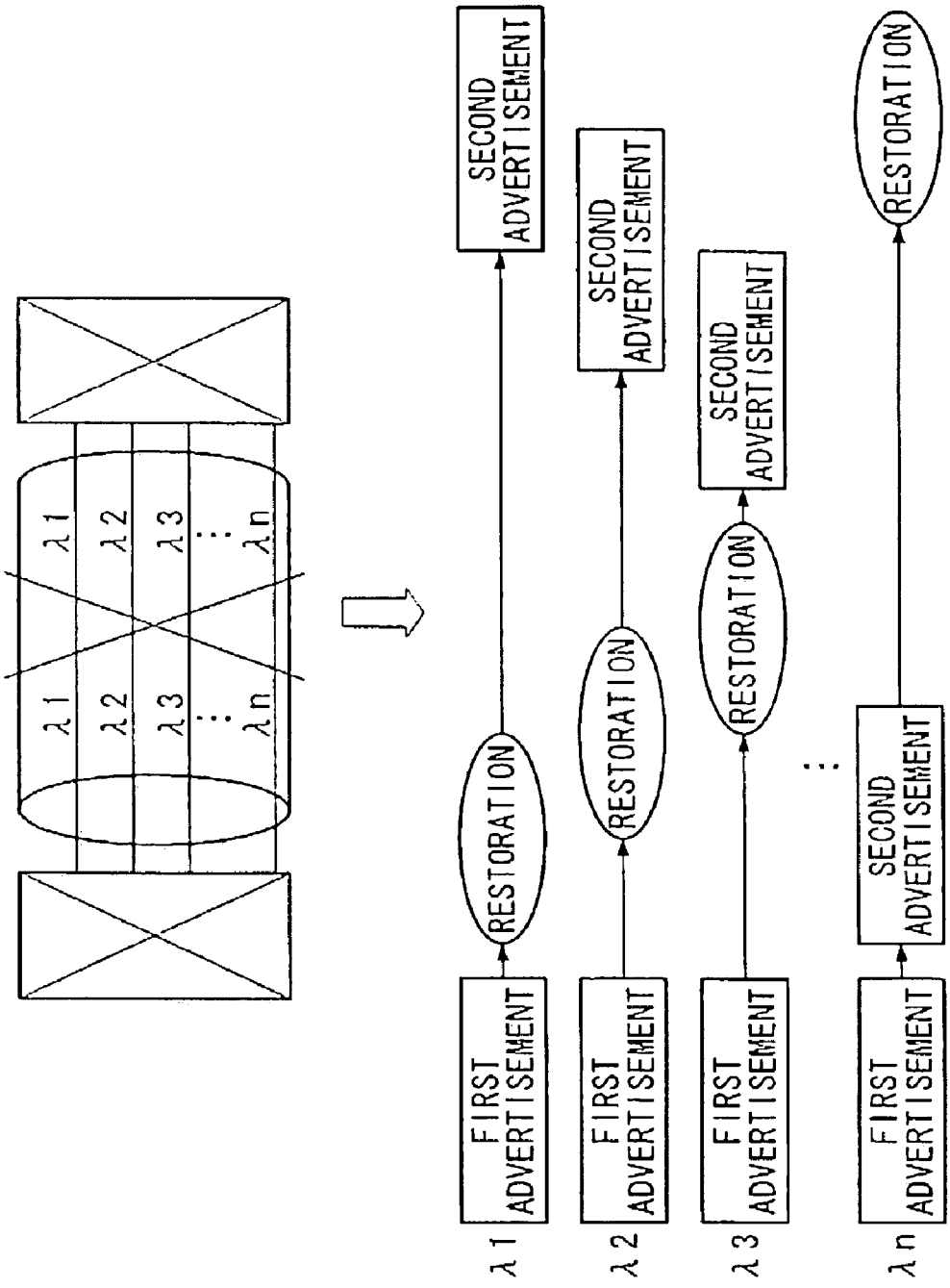
FIG. 11 is a diagram for explanation of a deferral time period determination method of the sixth preferred embodiment of the present invention.

As shown for example in FIG. 11, when the transmission line is a wavelength division multiplexed transmission line, a large number of wavelength paths may be blocked at the same time by the occurrence of an obstruction in the transmission line. In this sort of case, to restore all of the wavelength paths at the same time would be very difficult to implement, so that a priority ranking is set for the restoration to be performed in a specified order. Generally, the more important are the contents of the communication which is being handled, the higher is the priority ranking set to be. The restoration priority ranking retention section 35 retains in advance the restoration priority ranking information for the performance of obstruction restoration.

Under these type of conditions, in this sixth preferred embodiment of the present invention, the advertisement emission section 32 of the obstruction restoration control device 30, for a plurality of wavelength paths upon which obstruction has occurred at almost the same moment, sets the individual values for the length of the time period from the time instant of the first advertisement to the time instant of the second advertisement by making them to be inversely proportional to the restoration priority rankings which are retained by the restoration priority ranking retention section 35.

In other words, as shown in FIG. 11, for a wavelength path $\lambda 1$ of the highest priority ranking for which quick restoration can be expected, the time period from the first advertisement until the second advertisement is set to be long, based upon the prediction that restoration of the lower layer network will be completed immediately, and probably will not even take as long as required for the routers 1 through 8 to establish an alternate path. In the example shown in FIG. 11, the restoration is completed before the appointed time instant for emission of the second advertisement, and accordingly this second advertisement is not actually emitted.

On the other hand, for a wavelength path $\lambda n$ of the lowest priority ranking for which a quick restoration cannot be expected, the time period from the first advertisement until the second advertisement is set to be short, based upon the prediction that obstruction avoidance measures by the routers 1 through 8 will probably prove to be necessary. By doing this, obstruction avoidance measures, such as establishing an alternate path or the like, are taken by the routers 1 through 8 immediately.

The Seventh Preferred Embodiment

Figure 12:
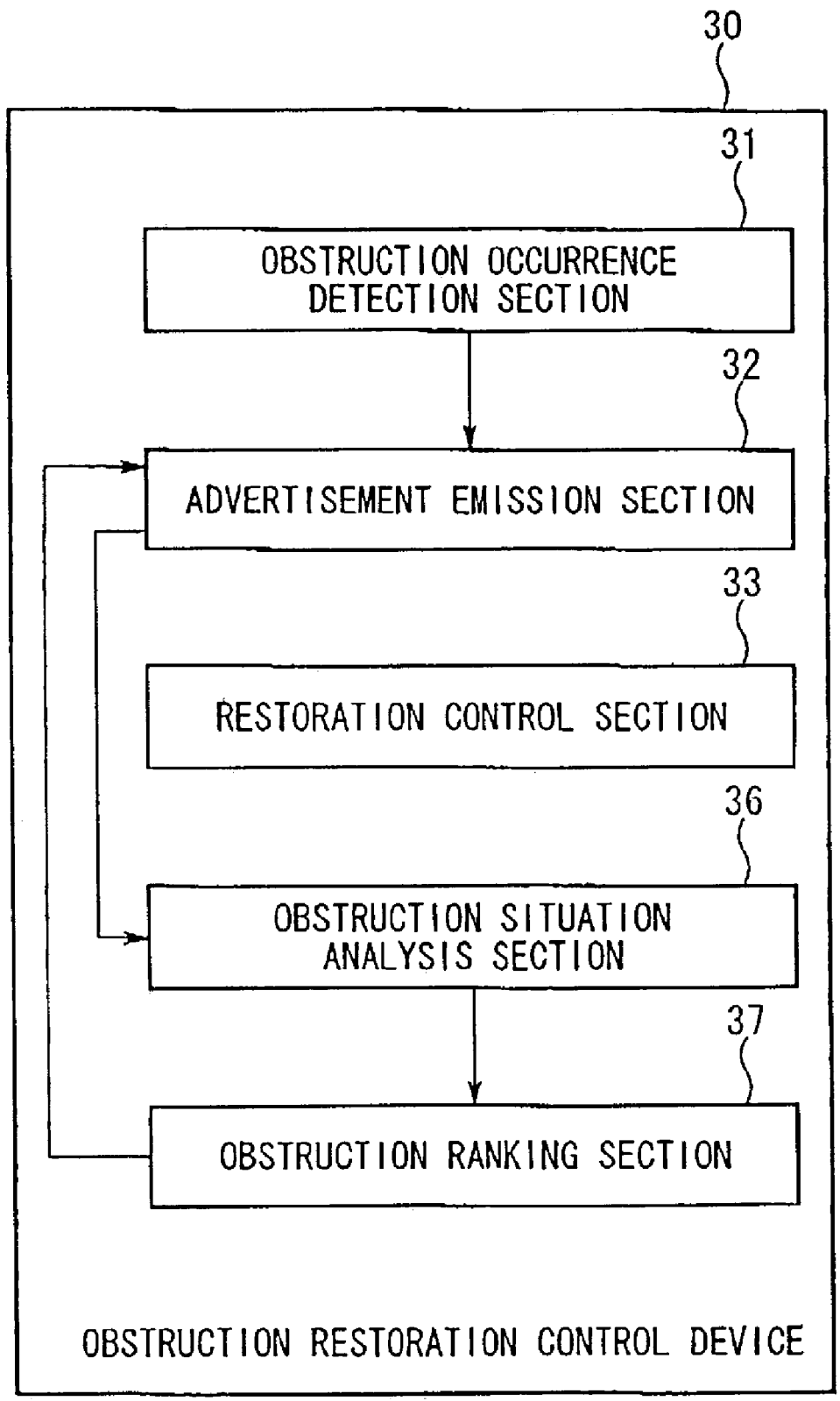
FIG. 12 is a block structural diagram of an obstruction restoration control device incorporated in the seventh preferred embodiment of the present invention.

The seventh preferred embodiment of the present invention will now be explained with reference to FIG. 12. FIG. 12 is a block structural diagram of an obstruction restoration control device incorporated in this seventh preferred embodiment.

In this seventh preferred embodiment, there are provided an obstruction situation analysis section 36 which analyzes the situation of obstructions according to the results of detection by the obstruction occurrence detection section 31, and a obstruction ranking section 37 which assigns a ranking to the seriousness of the obstruction, according to the result of the analysis by this obstruction situation analysis section 36, with a higher ranking indicating that the obstruction is a more serious one for which the possibility of restoration is low; and the advertisement emission section 32 performs advertisement of obstructions whose ranking is greater than a predetermined ranking by referring to the results of ranking assignment performed by the obstruction ranking section 37.

In other words, with this seventh preferred embodiment of the present invention, advertisement is not performed initially for an obstruction of low ranking for which restoration can be expected within a very short time period. By doing this, it is possible to alleviate the processing load upon the routers 1 through 8.

The Eighth Preferred Embodiment

Figure 13:
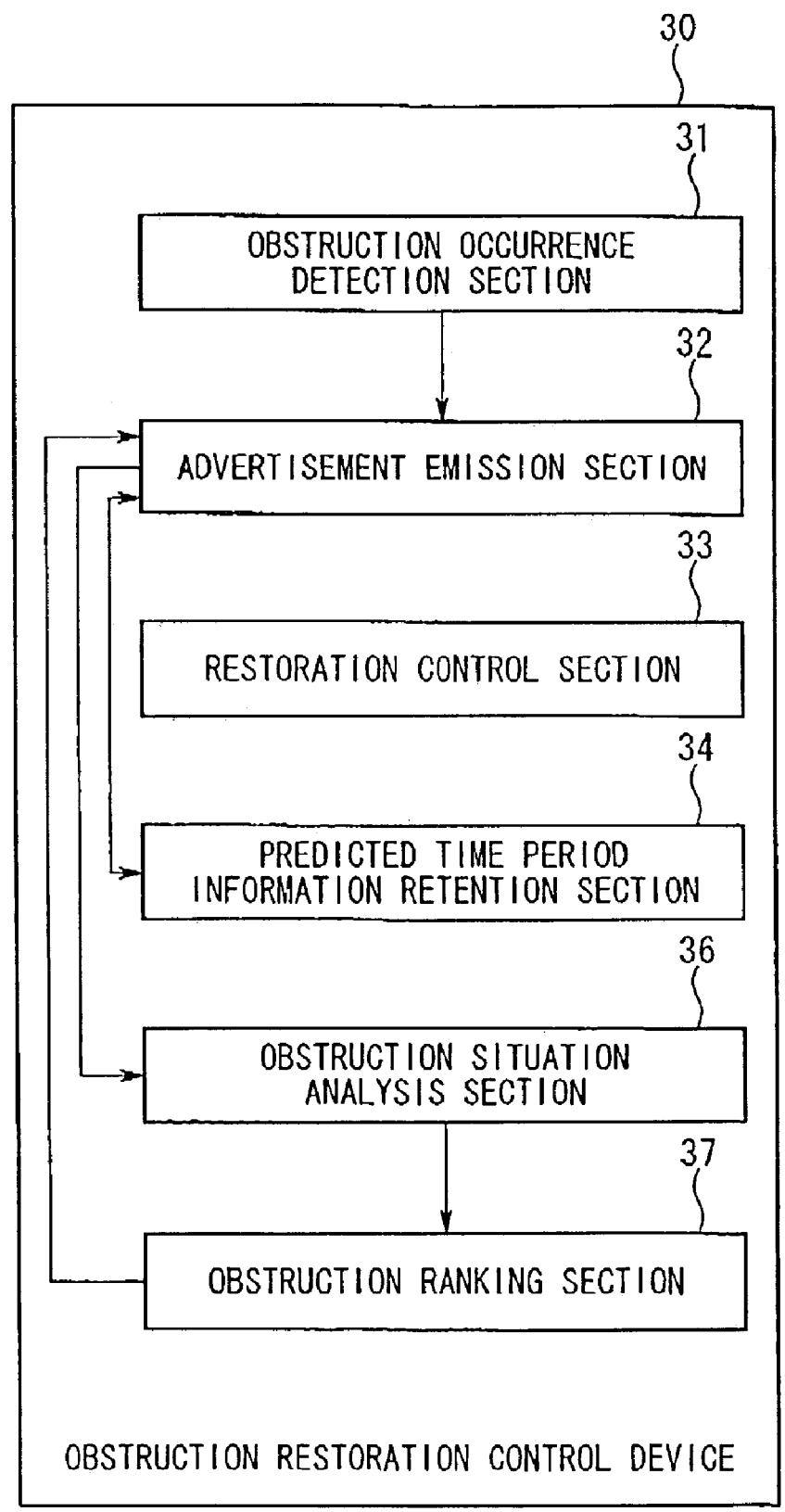
FIG. 13 is a block structural diagram of an obstruction restoration control device incorporated in the eighth preferred embodiment of the present invention.

The eighth preferred embodiment of the present invention will now be explained with reference to FIGS. 13 and 14A through 14C. FIG. 13 is a block structural diagram of an obstruction restoration control device incorporated in this eighth preferred embodiment of the present invention. And FIGS. 14A through 14C are diagrams showing the contents of an LSA packet which is used in the network according to this eighth preferred embodiment.

In this eighth preferred embodiment of the present invention, as shown in FIG. 13, there are provided to the obstruction restoration control device 30 an obstruction situation analysis section 36 which analyzes the obstruction situation according to the results of detection by the obstruction occurrence detection section 31, an obstruction ranking section 37 which assigns a ranking which shows the seriousness of an obstruction according to the analysis result of this obstruction information analysis section 36, with an obstruction whose ranking is high being one for which the probability of restoration is low, and a predicted time period information retention section 34 which retains information relating to the predicted time period for restoration which is required for obstruction restoration by the lower layer network; and the advertisement emission section 32 refers to the results of ranking allocation by the obstruction ranking section 37 and, for an obstruction of ranking which is less than the predetermined ranking, emits a limited advertisement which includes limitation information to the effect that advertisement is being performed limited to the routers 7 and 8 which are directly related to the lower layer network which is obstructed. Furthermore, if the obstructed transmission line has not been restored even after the predicted time period for restoration which is retained by the predicted time period information retention section 34 has elapsed from the emission of this limited advertisement, a prohibition removing advertisement is emitted to the effect that the limitation is removed.

When the advertisement transfer sections 47 of the routers 7 and 8 receive the limited advertisement, according to its limitation information, they prevent advertisement to the other routers 1 through 6 until the receipt of the prohibition removing advertisement.

Figure 14:
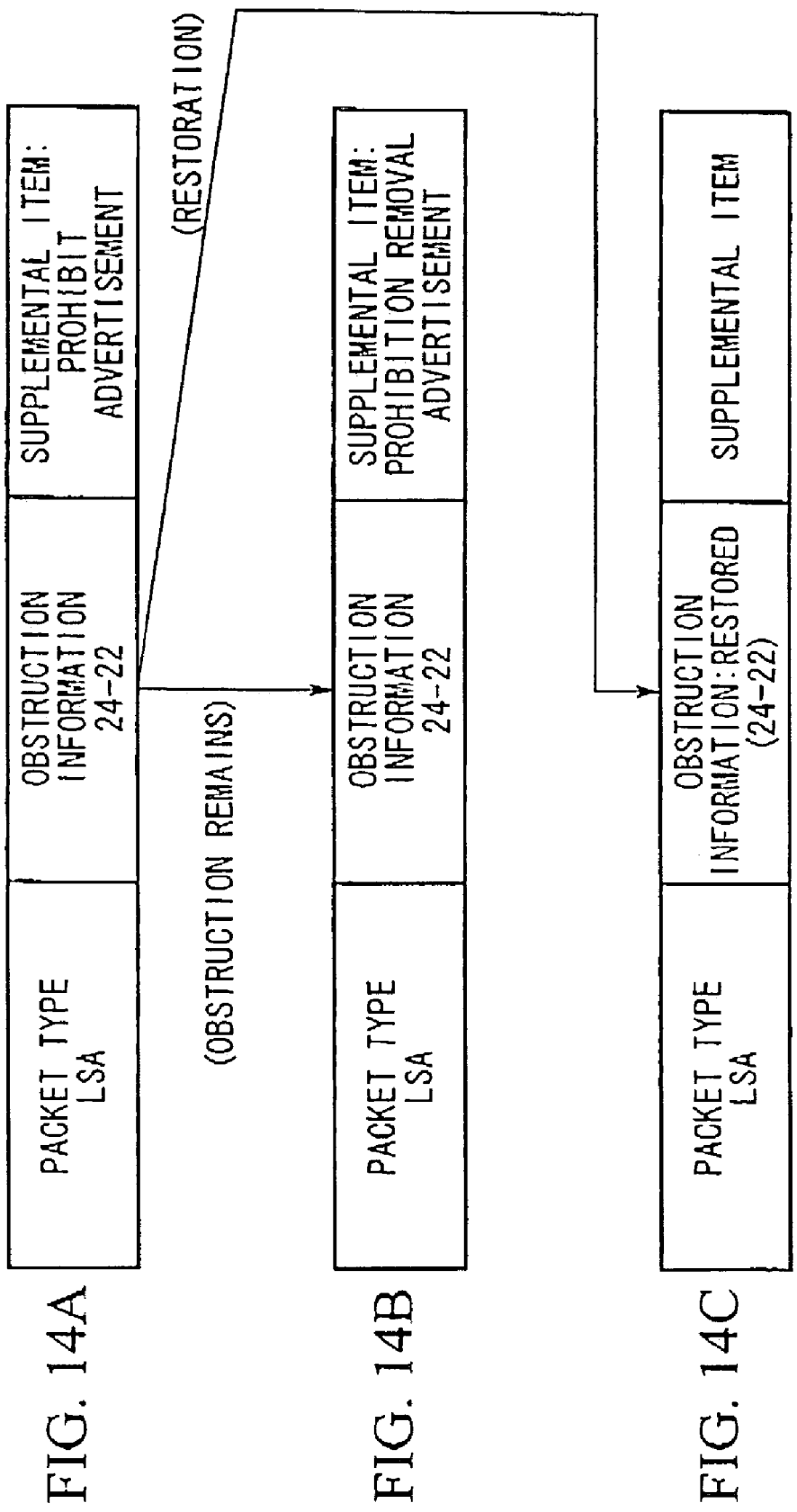
FIGS. 14A through 14C are diagrams showing the contents of an LSA packet which is used in the network according to the eighth preferred embodiment of the present invention.

In other words, as shown in FIG. 14A, "LSA" may be written into a limited advertisement as a packet type identifier, and "24-22" which identifies the point of the obstruction may be written as obstruction information, and "prohibit advertisement" may be written as a supplemental item. When the advertisement transfer sections 47 of the routers 7 and 8 which are in the advertisement standby state receive this LSA packet, according to "prohibit advertisement" which is written in its supplemental item field, they prevent its advertisement to the other routers 1 through 6, and transit into the advertisement transfer standby state.

In the advertisement emission section 32 of the obstruction restoration control device 30, if the restoration has not been completed even though the predicted time period for restoration of the obstruction which has been obtained by referring to the predicted time period information retention section 34 has elapsed from the emission of the limited advertisement shown in FIG. 14A, then, as shown in FIG. 14B, an LSA packet is emitted with "remove advertisement prohibition" written into its supplemental item field. When the advertisement transfer sections 47 of the routers 7 and 8 receive this LSA packet, according to "remove advertisement prohibition" which is written in its supplemental item field, they transfer this advertisement to the other routers 1 through 6, and transit into the advertisement transfer state.

Or, in the advertisement emission section 32 of the obstruction restoration control device 30, if the restoration has been completed before the predicted time period for restoration of the obstruction which has been obtained by referring to the predicted time period information retention section 34 has elapsed from the emission of the limited advertisement shown in FIG. 14A, then, as shown in FIG. 14C, an LSA packet is emitted with "restored" written into its supplemental item. When the advertisement transfer sections 47 of the routers 7 and 8 receive this LSA packet, according to "restored" which is written in its supplemental item, they cancel the advertisement transfer standby state and revert to the advertisement standby state.

The Ninth Preferred Embodiment

Figure 15:
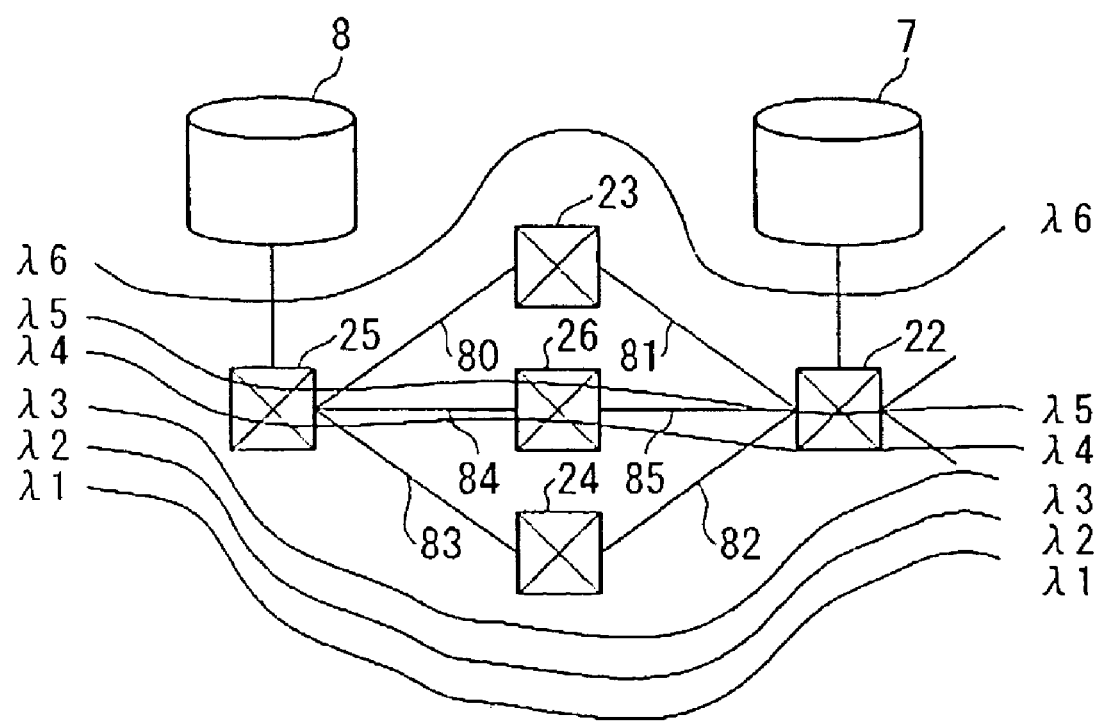
FIG. 15 is a diagram showing a portion of a network for explaining the ninth preferred embodiment of the present invention.

The ninth preferred embodiment of the present invention will now be explained with reference to FIGS. 15 and 16A through 16B. FIG. 15 is a diagram showing a portion of a network for explaining this ninth preferred embodiment of the present invention. And FIGS. 16A through 16B are diagrams showing an SRLG (Shared Risk Link Group).

In this ninth preferred embodiment of the present invention, the obstruction situation analysis section 36 of the obstruction restoration control device 30 detects the number of transmission lines in which an obstruction has occurred at almost the same time, and the obstruction ranking section 37 assigns a ranking based upon this number.

When detecting the number of transmission lines in which an obstruction has occurred at almost the same time, as shown in FIGS. 16A and 16B, the obstruction factors are divided into groups, and a table is provided in which are recorded the transmission lines in which stoppage may occur corresponding to the occurrence of obstruction in the obstruction factors which are included in the various groups, and the number of transmission lines in which an obstruction has occurred at almost the same time is detected by referring to this table.

In other words, an SRLG means a set of objects which, when an obstruction has occurred in a single obstruction factor, receive an influence therefrom at the same time, and, in this example showing the ninth preferred embodiment of the present invention, the photonic cross connects 22 through 26 and the links 80 through 85 constitute obstruction factors, while the objects which, when an obstruction has occurred in these, receive an influence therefrom, are the six optical paths upon the wavelengths λ1 through λ6.

Since, when an obstruction has occurred in any of the photonic cross connects 22, 24, or 25 or in either of the links 82 or 83, its influence is experienced by the three optical paths upon the wavelengths λ1 through λ3, these are grouped into a first group #1. Furthermore, since, when an obstruction has occurred in any of the photonic cross connects 22, 26, or 25 or in either of the links 84 or 85, its influence is experienced by the two optical paths upon the wavelengths λ4 and λ5, these are grouped into a second group #2. Furthermore since, when an obstruction has occurred in any of the photonic cross connects 22, 23, or 25 or in either of the links 80 or 81, its influence is experienced by the single optical path upon the wavelength λ6, this constitutes a third group #3. The tables shown in FIGS. 16A and 16B are ones which have been formed from these correspondence relationships.

The tables shown in FIGS. 16A and 16B are provided in the obstruction situation analysis section 36, and, upon an obstruction factor being identified from the obstruction information which is written into an LSA packet, it is possible to find out the number of optical paths which will receive an influence corresponding to the occurrence of an obstruction of this obstruction factor by referring to this table. In the obstruction ranking section 37, a ranking is allocated to the degree of importance of the obstruction, according to this number. In this ninth preferred embodiment of the present invention, since there are three groups #1, #2, and #3, a ranking "H" is assigned to the occurrence of an obstruction in the obstruction factors which are included in the group #1, a ranking "M" is assigned to the occurrence of an obstruction in the obstruction factors which are included in the group #2, and a ranking "L" is assigned to the occurrence of an obstruction in the single obstruction factor which is included in the group #3.

The Tenth Preferred Embodiment

Figure 17:
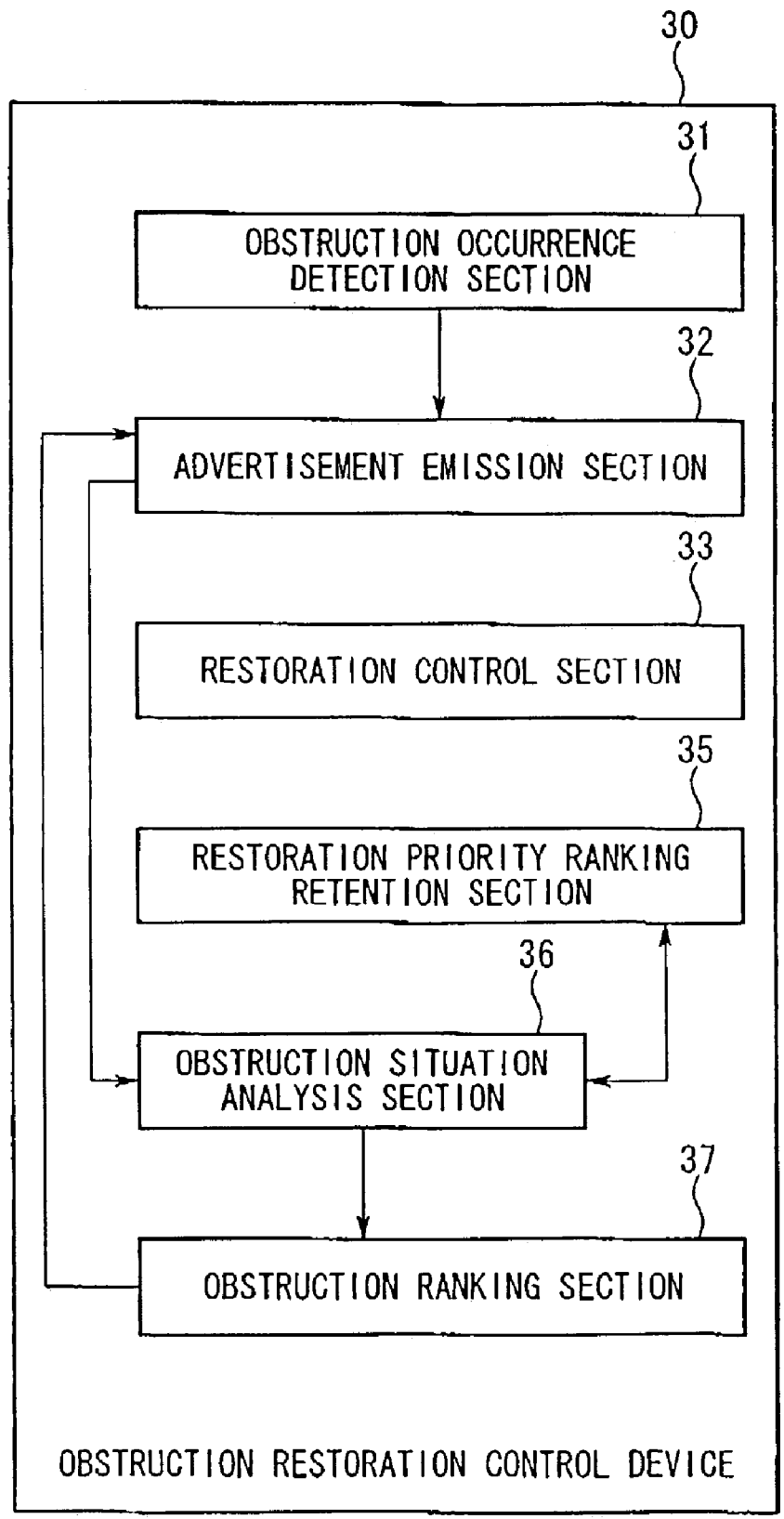
FIG. 17 is a block structural diagram of an obstruction restoration control device incorporated in the tenth preferred embodiment of the present invention.

The tenth preferred embodiment of the present invention will now be explained with reference to FIG. 17. FIG. 17 is a block structural diagram of an obstruction restoration control device incorporated in this tenth preferred embodiment.

In this tenth preferred embodiment of the present invention, as shown in FIG. 17, a restoration priority ranking retention section 35, which retains information as to the restoration priority rankings when performing obstruction restoration of transmission lines upon the lower layer network, is provided to the obstruction restoration control device 30; the obstruction situation analysis section 36 obtains information which is retained by the restoration priority ranking retention section 35 as to the restoration priority ranking for the transmission line in which an obstruction has occurred; and the obstruction ranking section 37 assigns a ranking to indicate the seriousness of the obstruction, the value of which is inversely proportional to the restoration priority ranking, and which is thus the greater, the lower is the probability of restoration of the obstruction.

In other words, as explained with regard to the sixth preferred embodiment and FIG. 11, for a plurality of transmission lines in which obstruction has occurred almost the same time, a priority ranking is provided for their restoration, and the lowest ranking is assigned to the transmission line for which restoration is anticipated the most quickly after the occurrence of the obstruction, while the highest ranking is assigned to the transmission line for which restoration is anticipated last after the occurrence of the obstruction.

The Eleventh Preferred Embodiment

Figure 18:
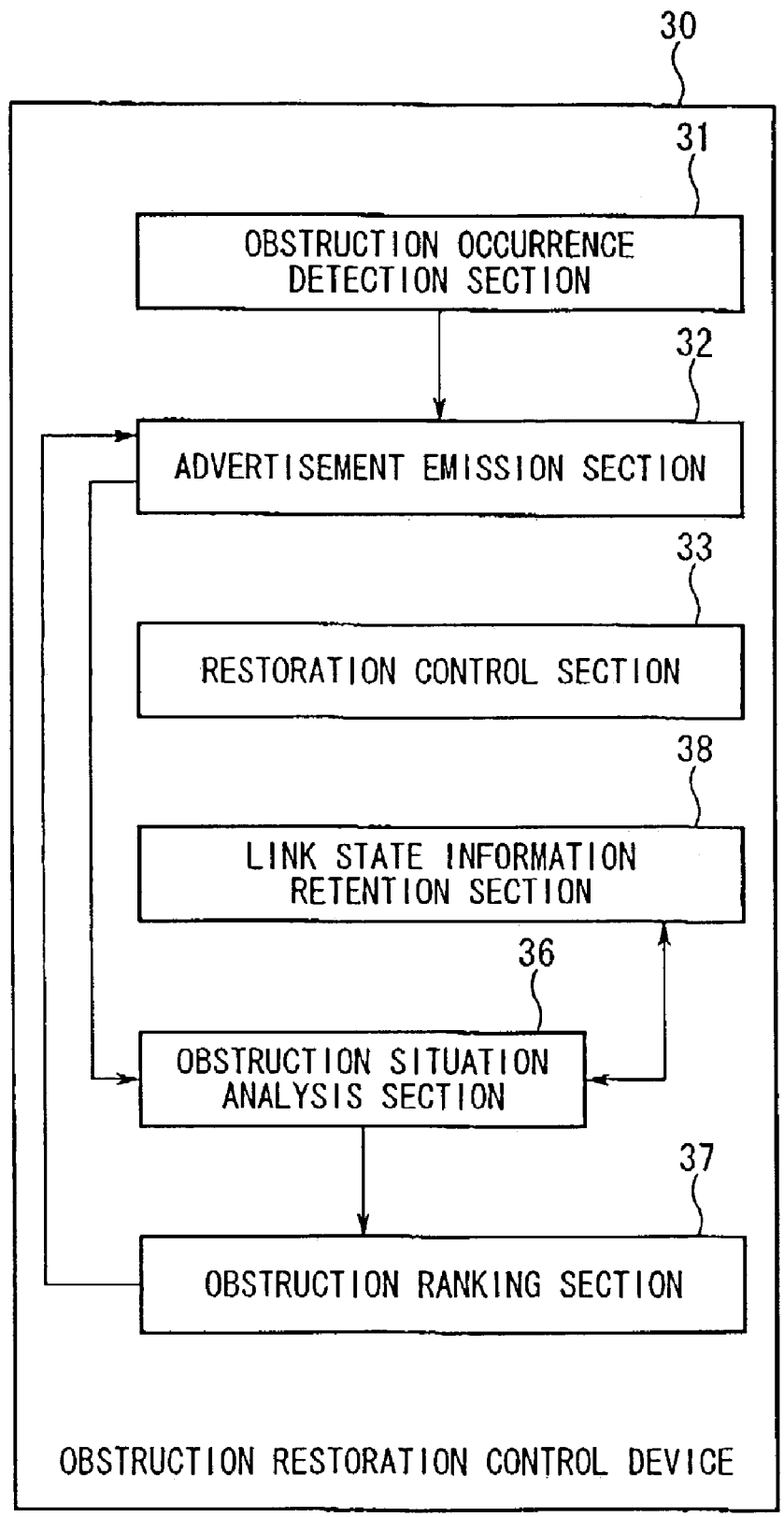
FIG. 18 is a block structural diagram of an obstruction restoration control device incorporated in the eleventh preferred embodiment of the present invention.

The network according to the eleventh preferred embodiment of the present invention will now be explained with reference to FIGS. 18 and 19. FIG. 18 is a block structural diagram of an obstruction restoration control device incorporated in this eleventh preferred embodiment of the present invention. And FIG. 19 is a diagram for explanation of a ranking assignment method in this eleventh preferred embodiment.

In this eleventh preferred embodiment of the present invention, as shown in FIG. 18, a link state information retention section 38 which retains the link state information related to the detailed structure of the lower layer network is provided to the obstruction restoration control device 30. This link state information retention section 38, as shown in FIG. 19, retains small scale topology information which is limited to the lower layer network to which this node itself belongs.

Figure 19:
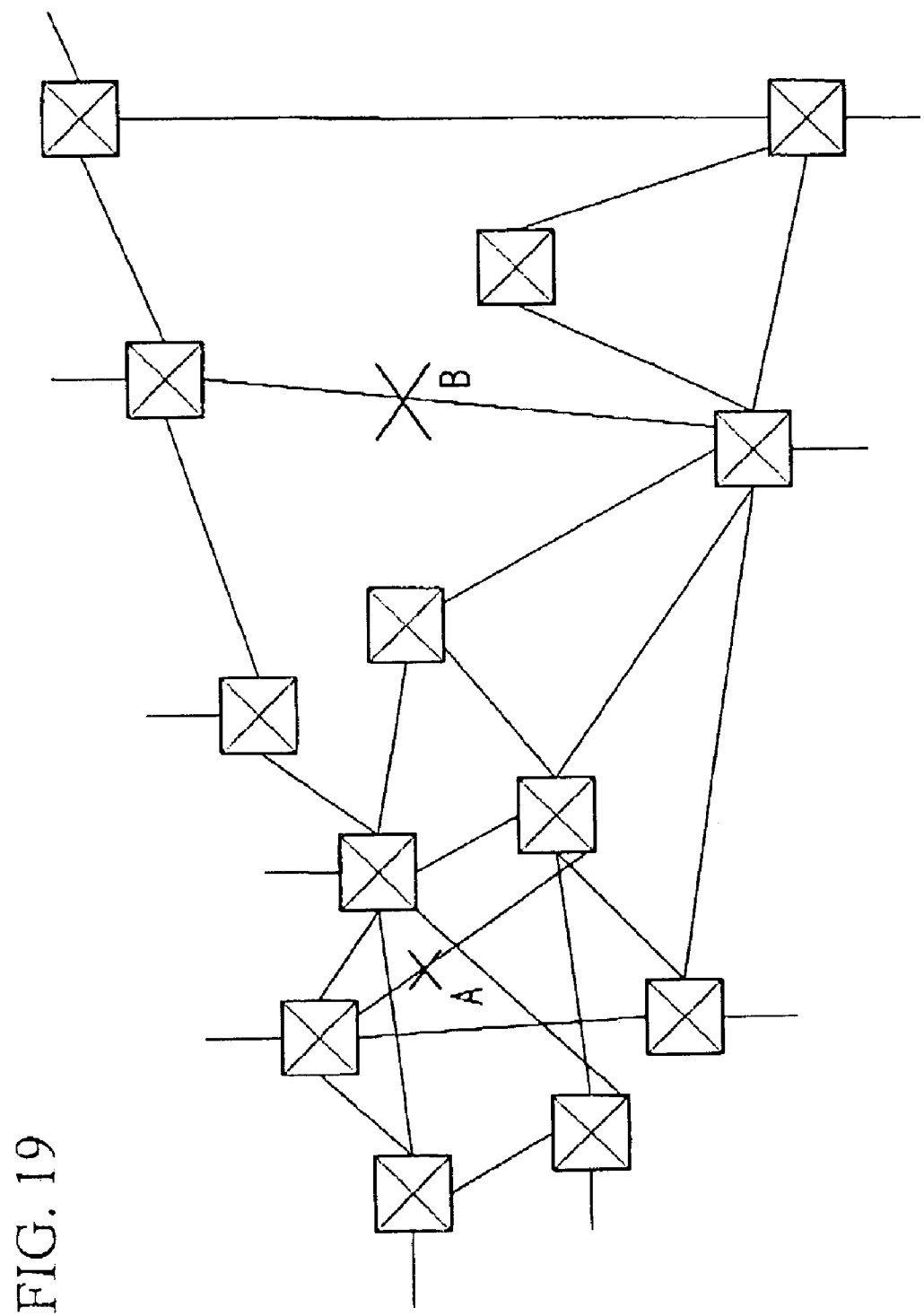
FIG. 19 is a diagram for explanation of a ranking assignment method in the eleventh preferred embodiment of the present invention.

And the obstruction situation analysis section 36 detects the degree of concentration of network resources by referring to the link state information which is related to the detailed structure of the lower layer network upon which the obstruction shown in FIG. 19 has occurred. In the example shown in FIG. 19, when the points of obstruction A and B are compared, the degree of concentration of network resources is higher at A than at B. The obstruction ranking section 37 assigns a ranking to indicate the seriousness of the obstruction, the value of which is inversely proportional to the degree of concentration, and which is thus the greater, the lower is the probability of restoration for the obstruction.

In other words, at a point at which network resources are concentrated, it is easy to establish an alternate path, so that it is possible to anticipate restoration within a short period of time; but, at a point at which network resources are sparse, it is difficult to establish an alternate path, so that it is not possible to anticipate restoration within a short period of time. Accordingly, the value of the ranking which is assigned is inversely proportional to the degree of concentration of network resources.

The Twelfth Preferred Embodiment

Figure 20:
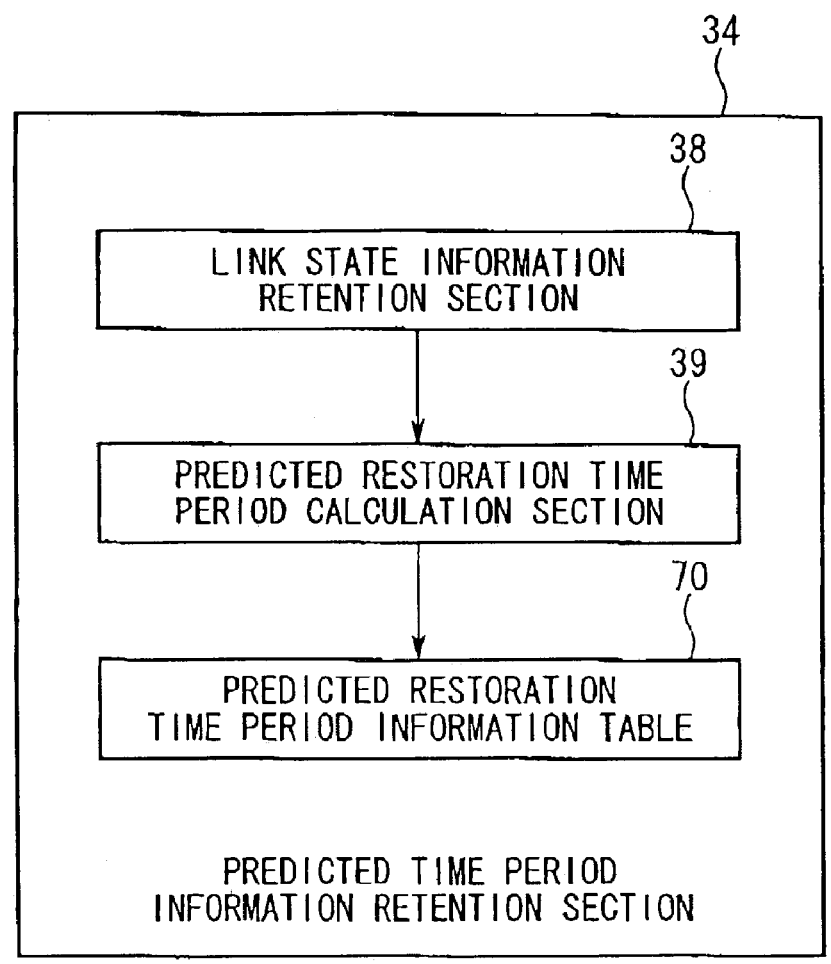
FIG. 20 is a block structural diagram of a predicted time period information retention section of the twelfth preferred embodiment of the present invention.
Figure 21:
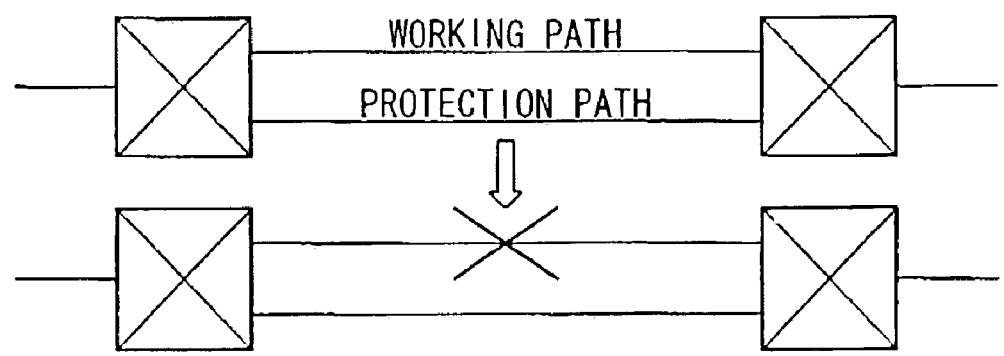
FIG. 21 is a diagram showing a transmission line during duplex operation in the twelfth preferred embodiment of the present invention.
Figure 22:
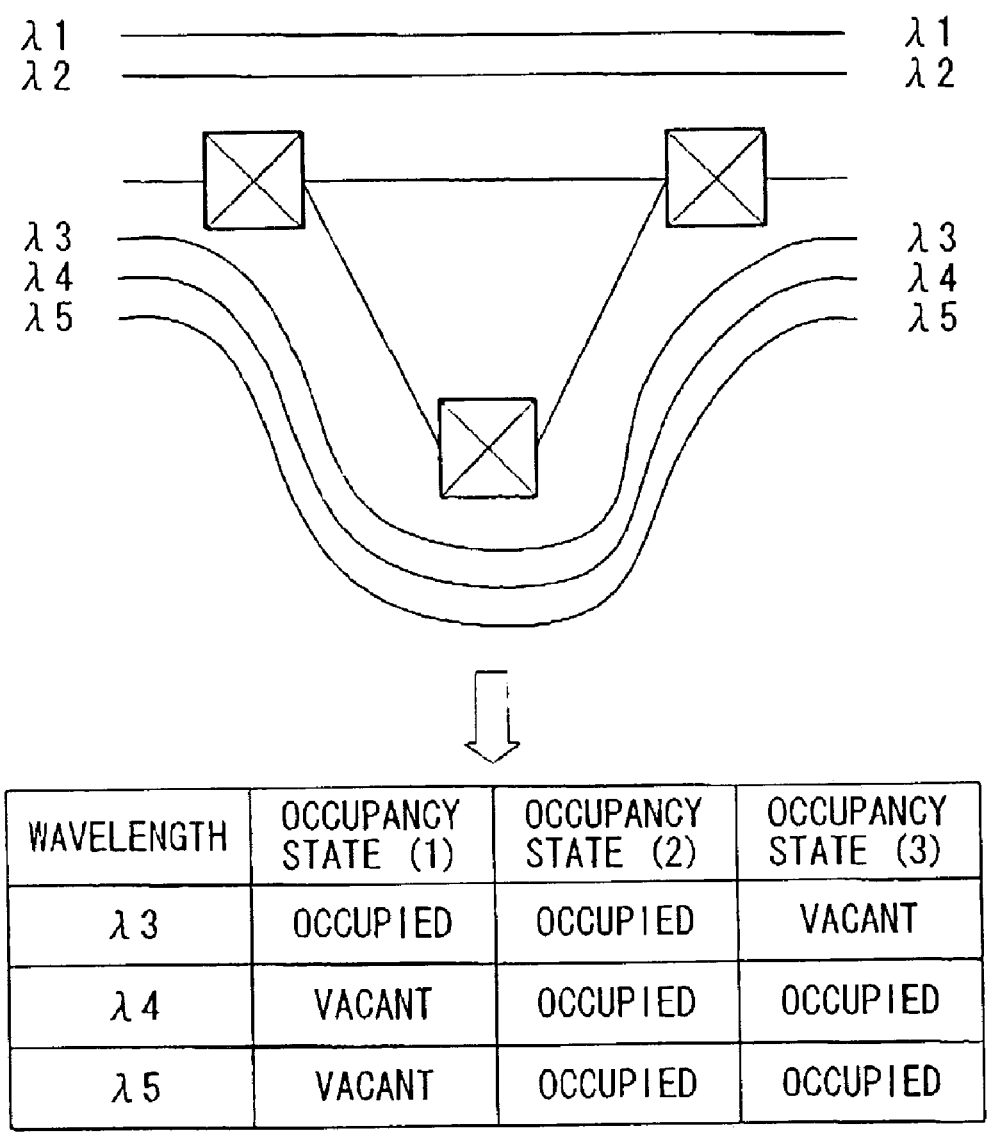
FIG. 22 is a diagram showing a transmission line which has an alternate path in the twelfth preferred embodiment of the present invention.

The twelfth preferred embodiment of the present invention will now be explained with reference to FIGS. 20 through 22. This twelfth preferred embodiment relates to a method for setting the predicted time period for restoration over which the predicted time period information retention section 34 performs its retention. FIG. 20 is a block structural diagram of a predicted time period information retention section of this twelfth preferred embodiment of the present invention. FIG. 21 is a diagram showing a transmission line during duplex operation. And FIG. 22 is a diagram showing a transmission line which has an alternate path.

The predicted time period information retention section 34 of this twelfth preferred embodiment comprises a link state information retention section 38 which retains the link state information related to the detailed structure of the lower layer network, and a predicted restoration time period calculation section 39 which calculates a predicted time period for restoration for each of the transmission lines, based upon the capability for alternate path establishment which can be attributed to each transmission line of the lower layer network, as estimated from the link state information which is retained by this link state information retention section 38. Furthermore, the result of calculation by this predicted restoration time period calculation section 39 is recorded in a predicted restoration time period information table 70.

As the capability for alternate path establishment, along with the predicted restoration time period calculation section 39 calculating the predicted time period for restoration for transmission lines during duplex operation as being almost zero, as shown in FIG. 21, also, during the occurrence of an obstruction, it again recognizes the transmission lines as being simplex transmission lines. In other words, as shown in FIG. 21, when transmitting the same data by duplex operation using a working path and a protection path, the predicted time period for restoration when an obstruction occurs upon either of these paths may be considered as being zero. However, since if an obstruction has occurred upon either one of these paths it ceases to be a duplex operation transmission line, in this type of case, a re-calculation is performed for the predicted time period for restoration as a simplex transmission line.

Or, as the capability for alternate path establishment, the predicted restoration time period calculation section 39 may calculate the predicted time period for restoration based upon the presence or absence of alternate paths at both the ends of the transmission line which is the object of the calculation, and upon the state of vacancy or occupancy of the alternate paths. In other-words, in the example shown in FIG. 22, when the transmission line which is the object of the calculation is a transmission line which is spread over the optical paths upon the wavelengths $\lambda 1$ and $\lambda 2$, first, the presence or absence of alternate paths for it is investigated, and then the states of occupancy of the wavelengths for these alternate paths are investigated.

In the example shown in FIG. 22, alternate paths do exist, and, in the state of occupancy (1), the optical paths upon the wavelengths $\lambda 4$ and $\lambda 5$ are vacant. Accordingly, the predicted time period for restoration in this case is the time period required for switching over the photonic cross connect. In the state of occupancy (2), although two vacant wavelengths are required, all of the wavelengths are occupied. Furthermore, in the state of occupancy (3), only the wavelength $\lambda 3$ is vacant. In this type of case, the predicted time period for restoration is calculated based upon the probability of occurrence of two vacant wavelengths, which is based upon statistical data from the past. It should be understood that if, in FIG. 21, an obstruction occurs upon either the working path or the protection path, the same method may be employed as when re-calculating the predicted time period for restoration as a simplex transmission line.

The Thirteenth Preferred Embodiment

Figure 23:
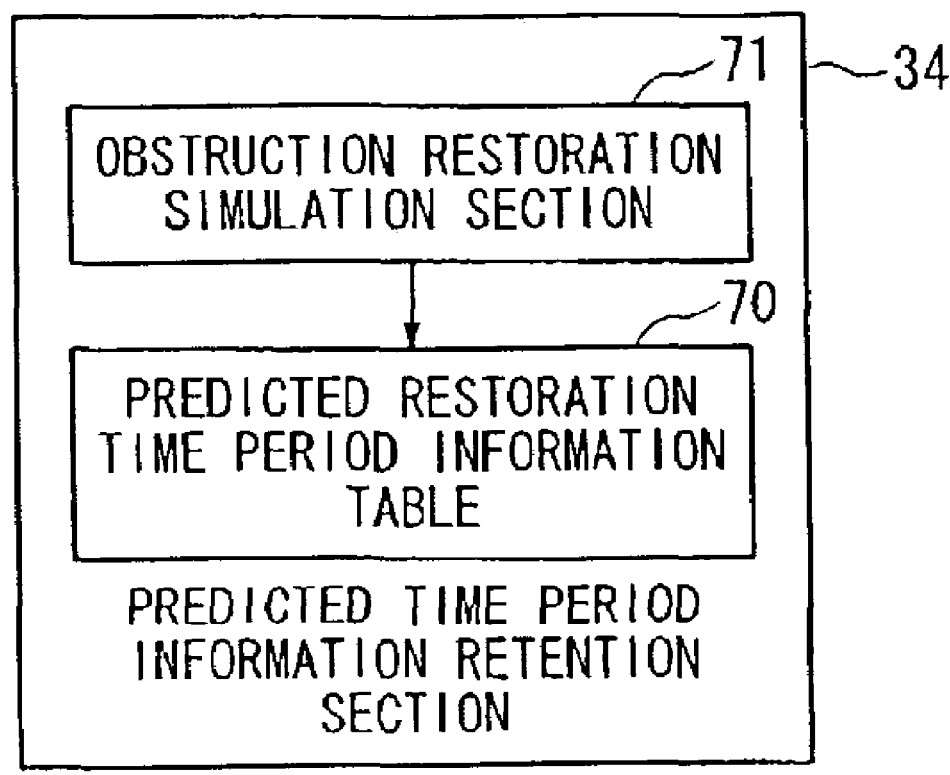
FIG. 23 is a block structural diagram of a predicted time period information retention section of the thirteenth preferred embodiment of the present invention.
Figure 24:
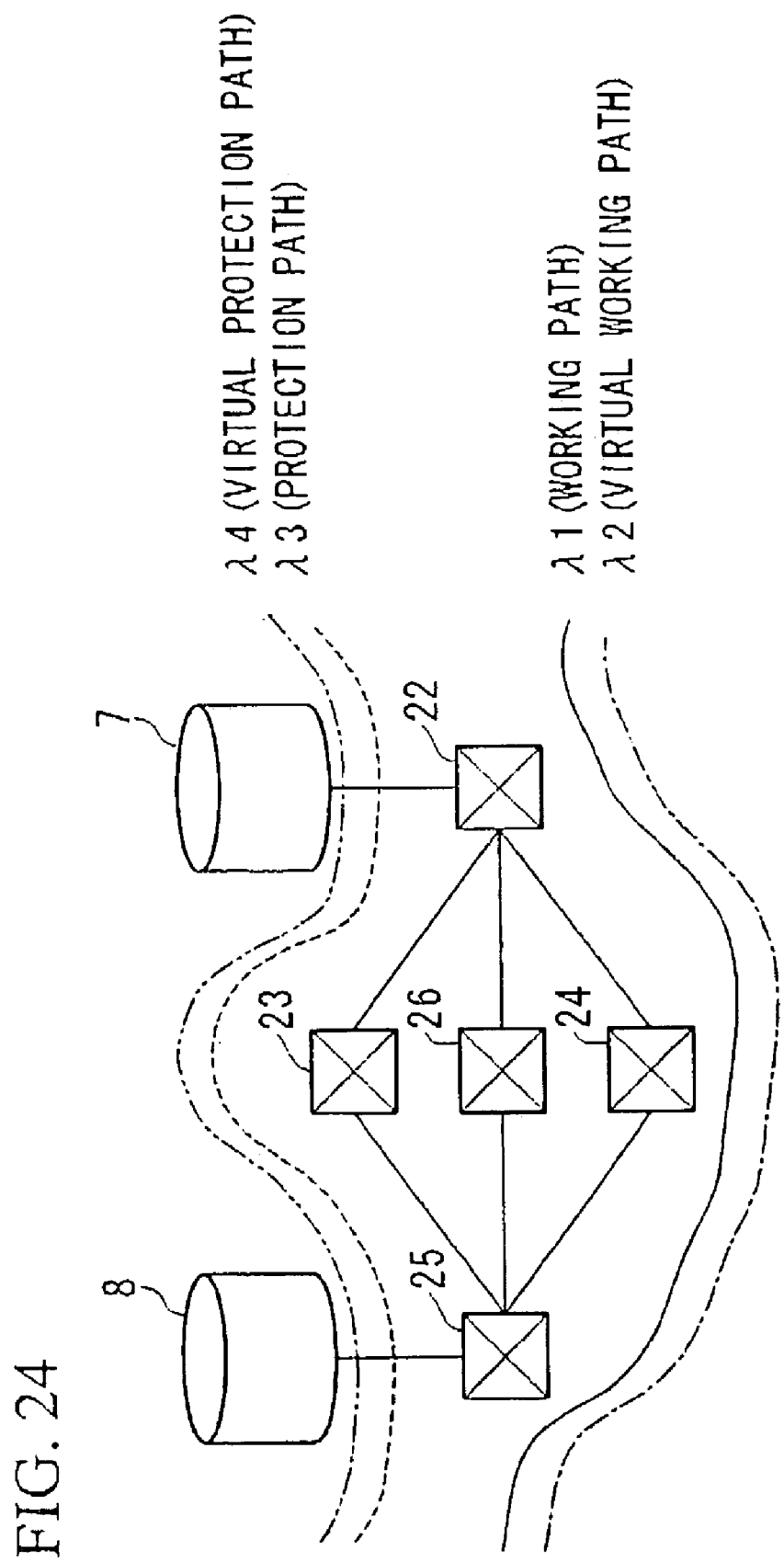
FIG. 24 is a diagram for explanation of a method for calculating a predicted restoration time period in the thirteenth and the fourteenth preferred embodiments of the present invention.

The thirteenth preferred embodiment of the present invention will now be explained with reference to FIGS. 23 and 24. FIG. 23 is a block structural diagram of a predicted time period information retention section of this thirteenth preferred embodiment of the present invention. And FIG. 24 is a diagram for explanation of a method for calculating a predicted restoration time period in this thirteenth preferred embodiment. This thirteenth preferred embodiment relates to a method for setting the predicted time period for restoration over which the predicted time period information retention section 34 performs its retention.

In this thirteenth preferred embodiment of the present invention, the predicted time period information retention section 34 comprises an obstruction restoration simulation section 71 which calculates the predicted time period for restoration between the two photonic cross connects 22 and 25 between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when, in simulation, an obstruction has been generated in this virtual working path. Furthermore, the result of this calculation by the obstruction restoration simulation section 71 is recorded in the predicted restoration time period information table 70.

In other words, in the example of FIG. 24, an optical path of wavelength $\lambda 1$ is established as the working path between the photonic cross connects 22 and 25. Furthermore, an optical path of wavelength $\lambda 3$ is established as the protection path between them. Under this type of condition, in order to calculate the predicted time period for restoration, the obstruction restoration simulation section 71 sets a vacant wavelength $\lambda 2$ of the same link as the link over which the working path is established as being a virtual working path, and also sets a vacant wavelength $\lambda 4$ of the same link as the link over which the protection path extends as being a virtual protection path.

Having in this manner established a virtual working path and a virtual protection path, a simulated obstruction is generated in the virtual working path. As a procedure for generating such a simulated obstruction, for example, an LSA packet may be emitted in which is written simulated obstruction information from one of the photonic cross connects 22, 24, or 25. By doing this, it is possible to obtain the predicted time period for restoration by measuring the time period over which the changeover from the virtual working path to the virtual protection path is actually performed by cooperation of the photonic cross connects 22, 23, 24, and 25.

The Fourteenth Preferred Embodiment

Figure 25:
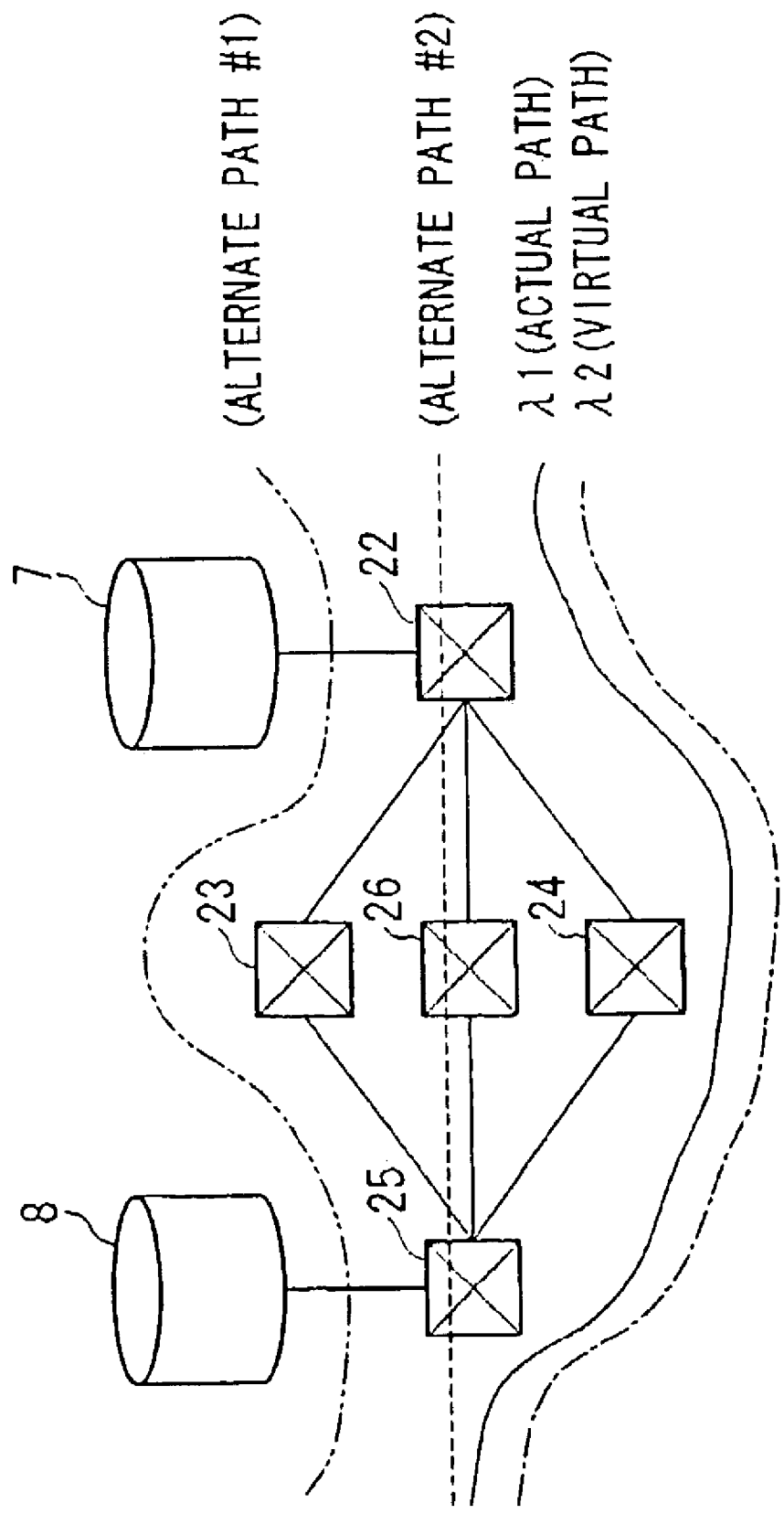
FIG. 25 is a diagram for explanation of a method for calculating a predicted restoration time period in the fourteenth preferred embodiment of the present invention.

The fourteenth preferred embodiment of the present invention will now be explained with reference to FIGS. 23 and 25. FIG. 23 is a block structural diagram of a predicted time period information retention section of this fourteenth preferred embodiment of the present invention, and is common with the thirteenth preferred embodiment. And FIG. 25 is a diagram for explanation of a method for calculating a predicted restoration time period in this fourteenth preferred embodiment. This fourteenth preferred embodiment relates to a method of setting the predicted time period for restoration which is retained by the predicted time period information retention section 34.

In this fourteenth preferred embodiment of the present invention, the predicted time period information retention section 34 comprises an obstruction restoration simulation section 71 which calculates the predicted time period for restoration between the two photonic cross connects 22 and 25 between which a path is already established, by taking a path which occupies a vacant band in the vicinity of the path (the actual path) as a virtual path, by searching for an alternate path for the virtual path when a simulated obstruction has been generated in this virtual path, and by calculating the time period which is required for changing over the path from the virtual path to the alternate path as being the predicted time period for restoration. Furthermore, the result of this calculation by the obstruction restoration simulation section 71 is recorded in the predicted restoration time period information table 70.

In other words, in the example of FIG. 25, an optical path of wavelength $\lambda 1$ is established as the actual path between the photonic cross connects 22 and 25. Under this type of condition, in order to calculate the predicted time period for restoration, the obstruction restoration simulation section 71 sets a vacant wavelength $\lambda 2$ of the same link as the link over which the actual path is established as being the virtual path.

Having in this manner established a virtual path, a simulated obstruction is generated in this virtual path. As a procedure for generating such a simulated obstruction, for example, an LSA packet may be emitted in which is written simulated obstruction information from one of the photonic cross connects 22, 24, or 25. By doing this, the photonic cross connects 22, 23, 24, and 25 cooperate to establish an alternate path upon the simulated occurrence of an obstruction in the virtual path, measure the time period over which the changeover from the virtual path to the alternate path is actually performed, and thus it is possible to obtain the predicted time period for restoration. Thus, in the example shown in FIG. 25, the alternate path #1 taken as the path through the photonic cross connects 22⇌23⇌25 is established; and, further, the alternate path #2 taken as the path through the photonic cross connects 22⇌26⇌25 is established.

The Fifteenth Preferred Embodiment

The obstruction restoration control device 30 and the routers 1 through 8 which are used in network according to the preferred embodiments of the present invention can be implemented by the use of a computer device, which is an information processing device.

As a function which corresponds to the devices which control the routers 1 through 8, by installing upon a computer device a program which implements a function, corresponding to the warning protection section 48, of deferring the updating of the topology information for a time period T from the time instant of detection of an obstruction, it is possible to make that computer device serve as a device which corresponds to a device which controls the routers 1 through 8 of the first preferred embodiment of the present invention.

In other words, by installing upon a computer device a program which implements a function which corresponds to the predicted time period information retention section 34, and which implements, as a function which corresponds to the advertisement emission section 32, a function of obtaining information of the predicted time period for restoration which is required for the restoration by referring to the result of detection of a function which corresponds to the obstruction occurrence detection section 31, and to the predicted time period for restoration which is retained in a function which corresponds to the predicted time period information retention section 34, and a function of performing an advertisement which includes information of the predicted time period for restoration which has been obtained by this obtaining function, it is possible to make that computer device serve as a device which corresponds to the obstruction restoration control device 30 of the first preferred embodiment of the present invention.

In this case, as a function which corresponds to the warning protection sections 48 of the routers 1 through 8, by installing upon a computer device a program which implements a function of taking the predicted time period for restoration which is included in the advertisement as the time period T, it is possible to make that computer device serve as a device which corresponds to a device which controls the routers 1 through 8 of the first preferred embodiment of the present invention.

Or, as a function which corresponds to the advertisement transfer sections 47 of the routers 1 through 8, by installing upon a computer device a program which implements an advertisement deferral function, which corresponds to the warning protection section 48, of deferring advertisement to other routers until a deferral time period has elapsed, it is possible to make that computer device serve as a device which corresponds to a device which controls the routers 1 through 8 of the second preferred embodiment of the present invention.

Or, by installing upon a computer device a program which implements a function corresponding to the predicted time period information retention sections 50 of the routers 1 through 8, and, as a function which corresponds to the warning protection sections 48, a function of obtaining information of the predicted time period for restoration which is required for the restoration by referring to the obstruction information and to the predicted time period for restoration which is retained by the function which corresponds to the predicted time period information retention section 50, and a function of taking the predicted time period for restoration which has been obtained by the obtaining function as the time period T, it is possible to make that computer device serve as a device which corresponds to a device which controls the routers 1 through 8 of the third preferred embodiment of the present invention.

Or, as a function which corresponds to the advertisement emission section 32 of the obstruction restoration control device 30, by installing upon a computer device a program which implements a function of performing advertisements at fixed intervals during the detection of an obstruction by a function which corresponds to the obstruction occurrence detection section 31, it is possible to make that computer device serve as a device which corresponds to the obstruction restoration control device 30 of the fourth preferred embodiment of the present invention.

In this case, as a function which corresponds to the warning protection sections 48 of the routers 1 through 8, by installing upon a computer device a program which implements a function of taking the time period until advertisement has been received a number of times which is determined in advance as the time period T, it is possible to make that computer device serve as a device which corresponds to a device which controls the routers 1 through 8 of the fourth preferred embodiment of the present invention.

Or, by installing upon a computer device a program which implements a function which corresponds to the predicted time period information retention section 34, and, as a function which corresponds to the advertisement emission section 32, a first advertisement function of performing a first advertisement immediately after the occurrence of an obstruction upon the lower layer network has been detected by a function which corresponds to the obstruction occurrence detection section 31, and a second advertisement function of performing a second advertisement when obstruction restoration for the lower layer network has not been implemented even though the predicted time period for restoration which was retained by the function which corresponds to the predicted time period information retention section 34 has elapsed from the time instant that the first advertisement was advertised by the first advertisement function, it is possible to make that computer device serve as a device which corresponds to the obstruction restoration control device 30 of the fifth preferred embodiment of the present invention.

In this case, as a function which corresponds to the warning protection section 48, by installing upon a computer device a program which implements a function of taking the time period from the time instant that the first advertisement is received until the time instant that the second advertisement is received as the time period T, it is possible to make that computer device serve as a device which corresponds to a device which controls the routers 1 through 8 of this fifth preferred embodiment of the present invention.

Or, by installing upon a computer device a program which implements a function which corresponds to the restoration priority ranking retention section 35, and, as a function which corresponds to the advertisement emission section 32, a function, for a plurality of transmission lines in which obstructions have occurred at almost the same time, of setting the respective lengths of the time periods from their first advertisement time instants to their second advertisement time instants by making them inversely proportional to their restoration priority rankings which are retained by the function which corresponds to the restoration priority ranking retention section 35, it is possible to make that computer device serve as a device which corresponds to the obstruction restoration control device 30 of the sixth preferred embodiment of the present invention.

Or, by implementing upon a computer device a function corresponding to the obstruction situation analysis section 36 of analyzing the obstruction situation according to the results of detection by a function which corresponds to the obstruction occurrence detection section 31, and a function, corresponding to the obstruction ranking section 37, of assigning a ranking which shows the degree of seriousness of the obstruction and is higher the lower is the probability of restoration from the obstruction, according to the results of analysis by this function which corresponds to the obstruction situation analysis section 36, and by installing a program which implements, as a function which corresponds to the advertisement emission section 32, an appended condition advertisement function of performing advertisement for obstructions whose ranking is greater than a predetermined ranking by referring to the results of assigning ranking by the function which corresponds to the obstruction ranking section 37, it is possible to make that computer device serve as a device which corresponds to the obstruction restoration control device 30 of the seventh preferred embodiment of the present invention.

Or, by implementing upon a computer device a function corresponding to the obstruction situation analysis section 36 of analyzing the obstruction situation according to the results of detection by a function which corresponds to the obstruction occurrence detection section 31, a function corresponding to the obstruction ranking section 37 of assigning a ranking which shows the degree of seriousness of the obstruction and is higher the lower is the probability of restoration from the obstruction, according to the results of analysis by this function which corresponds to the obstruction situation analysis section 36, and a function, corresponding to the predicted time period information retention section 34, of retaining information relating to the predicted time period for restoration which is required for obstruction restoration by the lower layer network, and by installing a program which implements, as a function which corresponds to the advertisement emission section 32, a function of, for an obstruction of ranking which is less than a predetermined ranking by referring to the results of assigning ranking by the function which corresponds to the obstruction ranking section 37, emitting a limited advertisement which includes limitation information to the effect that advertisement is being performed limited only to the routers which are directly related to the lower layer network which is thus obstructed, and a function of emitting a prohibition removing advertisement to the effect that the limitation prohibition has been removed when the obstructed transmission line has not been restored even after the predetermined time period which is retained in the function which corresponds to the predicted time period information retention section 34 has elapsed from this limited advertisement, it is possible to make that computer device serve as a device which corresponds to the obstruction restoration control device of the eighth preferred embodiment of the present invention.

In this case, by installing upon the computer device, as a function which corresponds to the routers 1 through 8, a program which implements a function, corresponding to the advertisement deferral section 49, of, when the limited advertisement is received, and until the prohibition removing advertisement is received, preventing advertisement to the other routers according to its limitation information, it is possible to make that computer device serve as a device which corresponds to the devices which control the routers 1 through 8 of the eighth preferred embodiment of the present invention.

Or, by implementing upon a computer device, as a function corresponding to the obstruction situation analysis section 36, a function of detecting a number of the transmission lines in which obstruction has occurred at almost the same time, and by installing upon the computer device a program which implements, as a function which corresponds to the obstruction ranking section 37, a function of assigning a ranking based upon this number, it is possible to make that computer device serve as a device which corresponds to the obstruction restoration control device 30 of the ninth preferred embodiment of the present invention.

In this case, the program of this preferred embodiment may implement, as the function of detecting the number, a table which, by separating the obstruction factors into groups, records the transmission line in which a stoppage occurs corresponding to the group to which belongs the obstruction factor of the occurrence of the obstruction, and a function of detecting the number of transmission lines in which an obstruction has occurred at almost the same time by referring to this table.

Or, by implementing upon a computer device a function corresponding to the restoration priority ranking retention section 35, and, as a function corresponding to the obstruction situation analysis section 36, a function of obtaining the information relating to the restoration priority ranking which is retained by the function which corresponds to the restoration priority ranking retention section 35 for the transmission line in which an obstruction has occurred, and by installing upon the computer device a program which implements, as a function which corresponds to the obstruction ranking section 37, a function of assigning a ranking showing the degree of seriousness of the obstruction which is higher the lower is the probability of restoration from the obstruction and is inversely proportional to the priority ranking, it is possible to make that computer device serve as a device which corresponds to the obstruction restoration control device 30 of the tenth preferred embodiment of the present invention.

Or, by implementing upon a computer device, as a function corresponding to the obstruction situation analysis section 36, a function of detecting the degree of concentration of network resources by referring to the link state information relating to the detailed structure of the lower layer network in which the obstruction has occurred, and by installing upon the computer device a program which implements, as a function which corresponds to the obstruction ranking section 37, a function of assigning a ranking showing the degree of seriousness of the obstruction which is higher the lower is the probability of restoration from the obstruction and is inversely proportional to the degree of concentration, it is possible to make that computer device serve as a device which corresponds to the obstruction restoration control device 30 of the eleventh preferred embodiment of the present invention.

Or, by installing upon a computer device a program which implements, as a function which corresponds to the predicted time period information retention section 34, a function which corresponds to the link state information retention section 38 of retaining the link state information which is related to the detailed structure of the lower layer network, and a function of calculating the predicted time period for restoration for each transmission line based upon the capability for alternate path establishment which each the transmission line of the lower layer network possesses as estimated from the link state information which is retained by this function which corresponds to the link state information retention section 38, it is possible to make that computer device execute the method for establishing the predicted time period for restoration of the twelfth preferred embodiment of the present invention.

In more detail, as the function for calculating the predicted time period for restoration, as this capability for alternate path establishment, there may be implemented a function of, along with calculating the predicted time period for restoration for a transmission line during duplex operation as being almost zero, also re-recognizing the transmission line during the occurrence of an obstruction as a simplex transmission line. Or, as the function for calculating the predicted time period for restoration, as this capability for alternate path establishment, there may be implemented a function of calculating a predicted time period for restoration based upon the presence or absence of alternate paths at both ends of the transmission line which is the object of calculation, and upon the situation with regard to vacancy or occupancy of the alternate paths.

Or, by implementing upon a computer device a program which implements, as a function which corresponds to the predicted time period information retention section 34, a function of calculating the predicted time period for restoration between two photonic cross connects which are set as a working path and a protection path, by setting paths which have vacant bands in the vicinity of the working path and the protection path respectively as a virtual working path and a virtual protection path, and by, when a simulated obstruction is generated in this virtual working path, calculating the time period which is required for changing over from the virtual working path to the virtual protection path as being the predicted time period for restoration, it is possible to make that computer device execute the method for establishing the predicted time period for restoration of the thirteenth preferred embodiment of the present invention.

Or, by implementing upon a computer device a program which implements, as a function which corresponds to the predicted time period information retention section 34, a function of calculating the predicted time period for restoration between two photonic cross connects which are already set as a path, by setting a path which has a vacant band in the vicinity of the path as a virtual path, and by, when a simulated obstruction is generated in this virtual path, searching out an alternate path for the virtual path, and calculating the time period which is required for the path to be changed over from the virtual path to the alternate path as being the predicted time period for restoration, it is possible to make that computer device execute the method for establishing the predicted time period for restoration of the fourteenth preferred embodiment of the present invention.

By recording the program of any one of the above preferred embodiments upon a recording medium according to this preferred embodiment, it is possible to install the program of any one of the above preferred embodiments upon a computer device by using this recording medium. Or, it is possible to install the program of any one of the above preferred embodiments directly upon a computer device via a network from a server upon which the program of any one of the above preferred embodiments is stored.

By doing this, an obstruction restoration control technique using a computer device is proposed for application to a multi-layer network, with which it is possible to implement routers 1 through 8 and a network, and with which it can be anticipated that effective advantage can be taken of network resources.

The Sixteenth Preferred Embodiment

Figure 26:
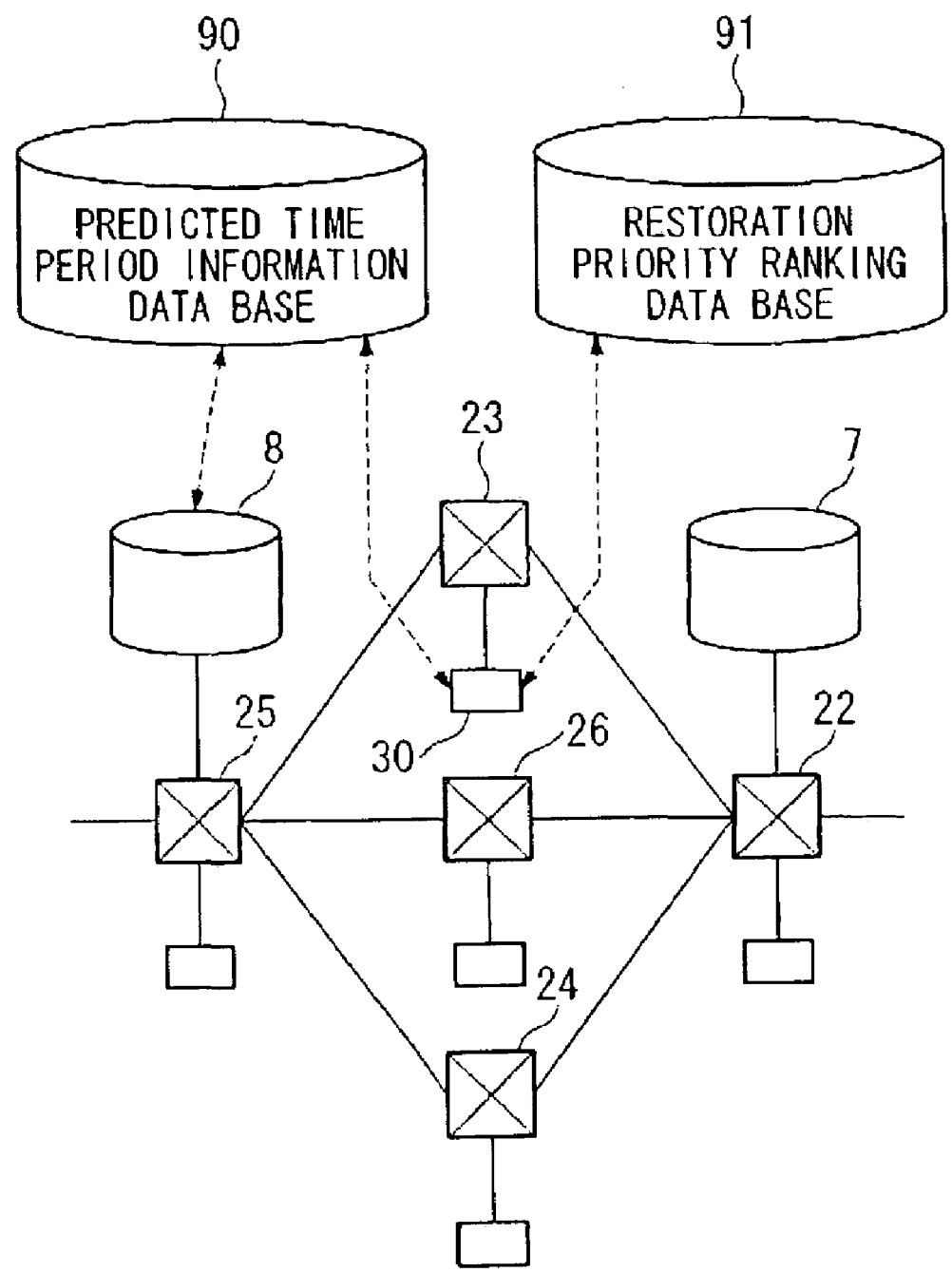
FIG. 26 is a diagram showing a predicted time period information data base and a restoration priority ranking data base in the sixteenth preferred embodiment of the present invention.
Figure 27:
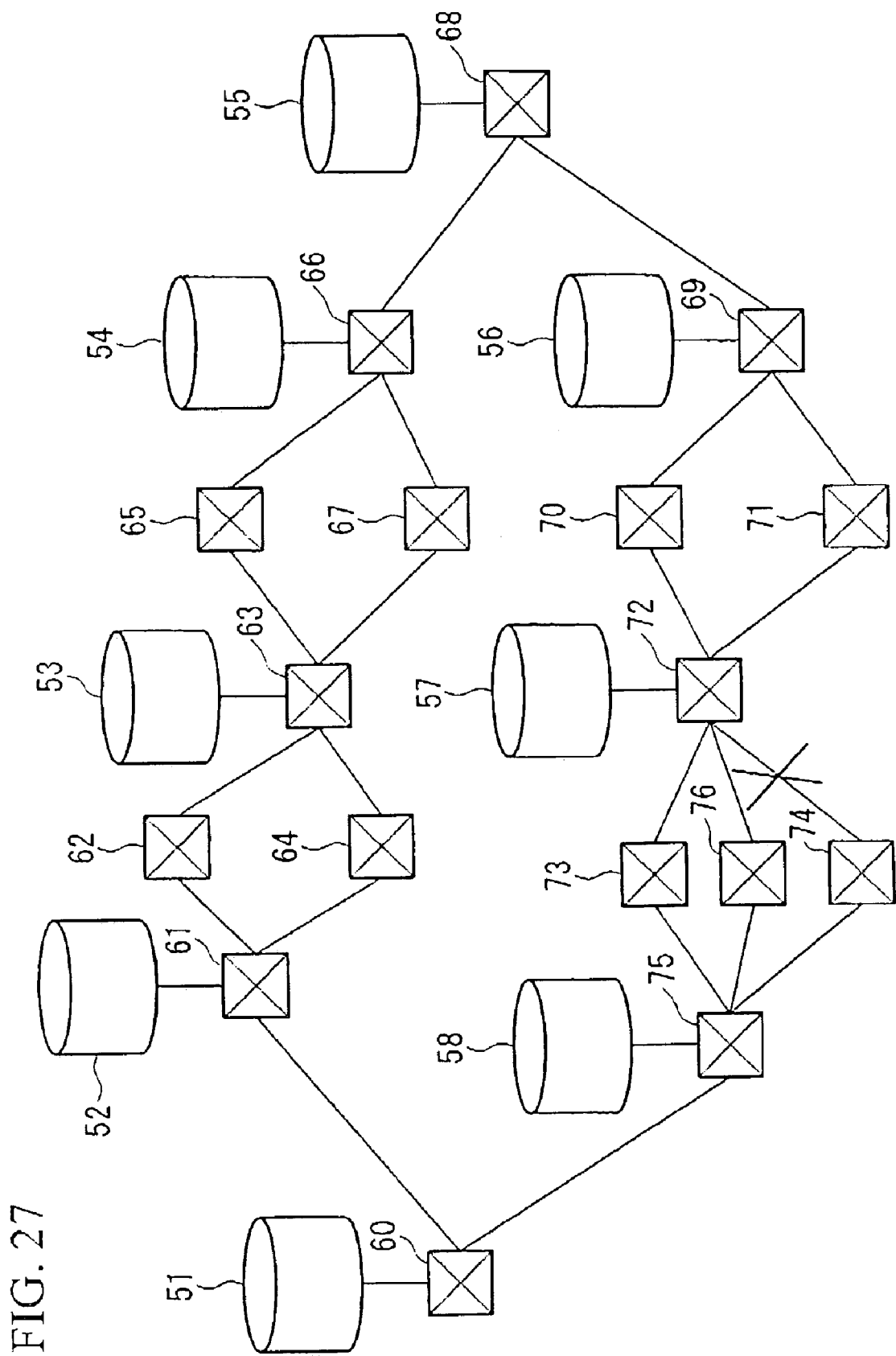
FIG. 27 is a diagram showing an example of a multi-layer network.
Figure 28:
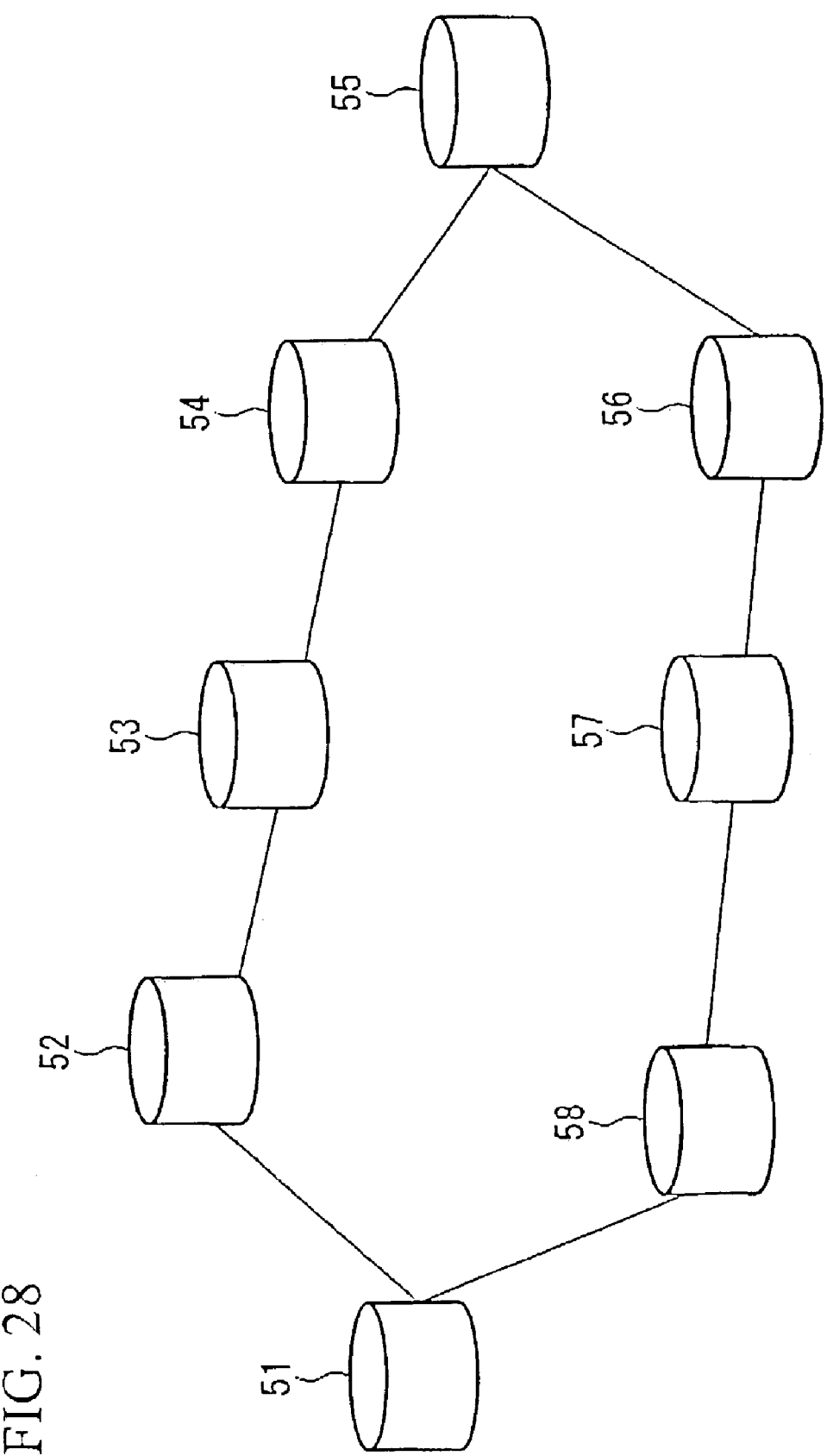
FIG. 28 is a diagram showing topology information that is retained by a router.

The sixteenth preferred embodiment of the present invention will now be explained with reference to FIG. 26. FIG. 26 is a diagram showing a predicted restoration time period information data base and a restoration priority ranking data base in this sixteenth preferred embodiment.

In the first through the fourteenth preferred embodiments of the present invention, the explanation was made in terms of the predicted time period information retention section 34 and the restoration priority ranking retention section 35 being provided to the obstruction restoration control device 30, and in terms of the predicted time period information retention sections 50 being provided to the routers 1 through 8; but, in this sixteenth preferred embodiment of the present invention, as shown in FIG. 26, these are provided as, respectively, a predicted time period information data base 90 and a restoration priority ranking data base 91 in separate and independent nodes upon the network, and the obstruction restoration control device 30 and the routers 1 through 8 are so constituted as to obtain the various items of information which they require, and which are stored in these data bases, by accessing the data bases.

The Seventeenth Preferred Embodiment

The seventeenth preferred embodiment of the router and of the optical path network of the present invention will now be explained with reference to FIGS. 1, 2, 3, and 29. FIG. 1 is a view showing the optical path network of this seventeenth preferred embodiment. FIG. 2 is a diagram showing a photonic cross connect and an obstruction restoration control device of this seventeenth preferred embodiment. FIG. 3 is a block structural diagram of an obstruction restoration control device of this seventeenth preferred embodiment of the present invention. And FIG. 29 is a block structural diagram of a router of this seventeenth preferred embodiment.

Figure 29:
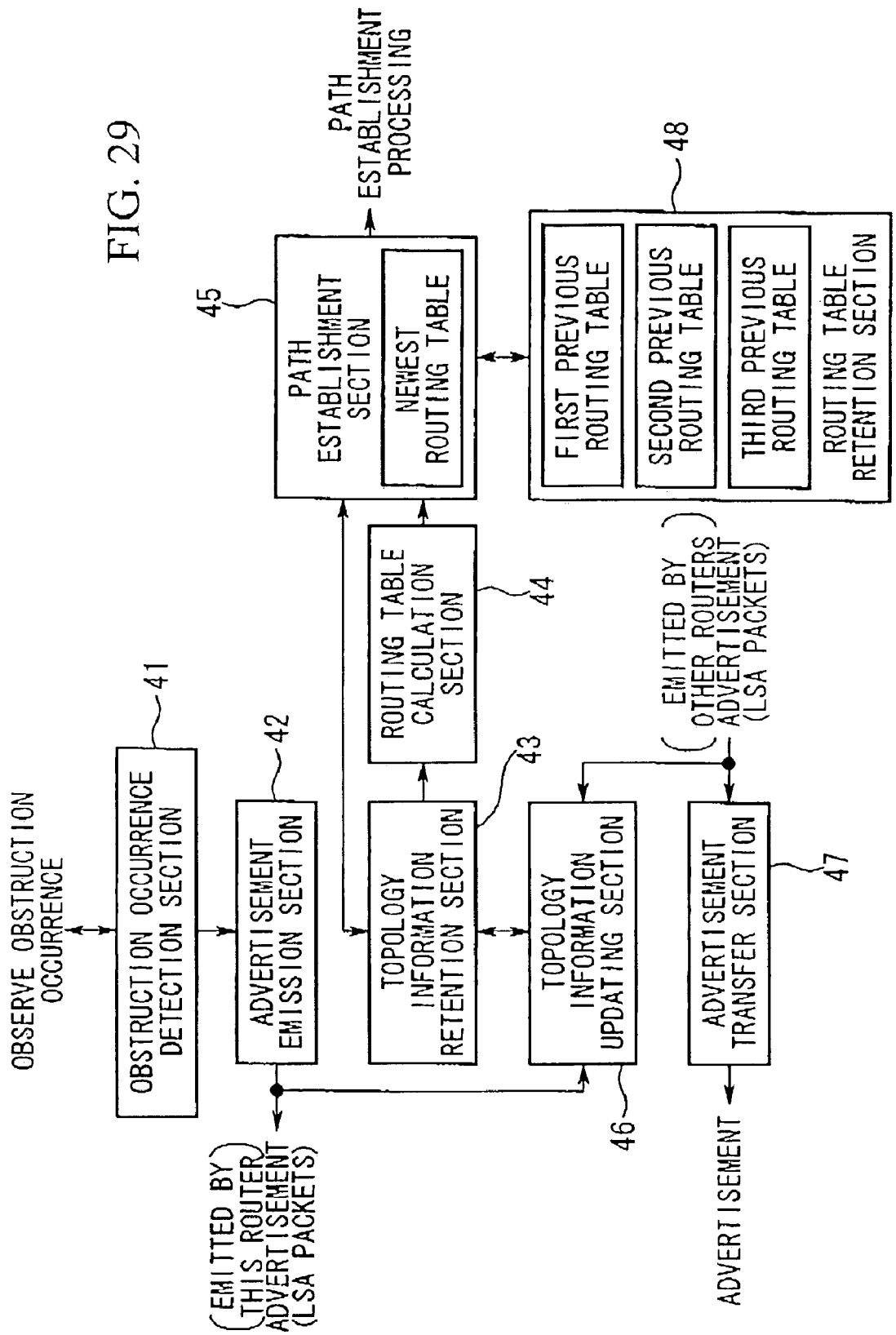
FIG. 29 is a block structural diagram of a router of a seventeenth preferred embodiment of the present invention.

This seventeenth preferred embodiment of the present invention, as shown in FIG. 1, is a network comprising a plurality of nodes and transmission lines which are provided between this plurality of nodes, with the plurality of nodes including routers 1 through 8 which are upper layer nodes and photonic cross connects 10 through 26 which are lower layer nodes, and with at least two of these routers being connected together by a lower layer network which is made up from a plurality of the photonic cross connects and a transmission line; and, as shown in FIG. 2, in this lower layer network, a plurality of obstruction restoration control devices 30 are provided to each of the photonic cross connects 10 through 26 for cooperating to perform obstruction restoration; with, as shown in FIG. 3 and FIG. 29, the obstruction restoration control devices 30 of the routers 1 through 8 and the photonic cross connects 10 through 26 comprising respective obstruction occurrence detection sections 31, 41 which detect the occurrence of an obstruction upon transmission lines which they accommodate themselves, and advertisement emission sections 32, 42 which advertise as obstruction information the results of detection by these obstruction occurrence detection sections 31, 41; and with each of the routers 1 through 8 comprising a topology information retention section 43 which retains topology information for the network, a topology information updating section 46 which updates the topology information which it retains itself according to obstruction information which has been advertised or obstruction information which it has detected itself, and an advertisement transfer section 47 which advertises obstruction information which has been advertised to the other routers 1 through 8.

Here, the particular feature by which this seventeenth preferred embodiment of the present invention is distinguished is that there are provided a routing table retention section 48 which, along with the routing table which has been calculated based upon the topology information which has been updated according to the obstruction information, also retains the routing table before the obstruction information is advertised, and a path establishment section 45 which, when the obstruction which was recorded in the obstruction information has been restored, causes reversion to the routing table before the obstruction information was advertised which is retained in the routing table retention section 48.

Although in each of the routers 1 through 8 it may either happen that the occurrence of an obstruction is detected by its own obstruction occurrence detection section 41, or that the occurrence of an obstruction is detected by advertisement from the lower layer network, an obstruction which is detected by the obstruction occurrence detection section 41 is an obstruction upon the upper layer network level which consists of the routers 1 through 8 shown in FIG. 56. By contrast to this, an obstruction which has been detected by advertisement from the lower layer network is an obstruction upon the lower layer network level which consists of the photonic cross connects 10 through 26 shown in FIG. 55.

In other words, an obstruction which is detected by the obstruction occurrence detection section 41 is a serious obstruction such as one in which almost the entire lower layer network between routers has stopped, and it is a type of obstruction for which immediate restoration can hardly be expected. By contrast to this, an obstruction which has been detected by advertisement from the lower layer network is a trifling obstruction such as one in which only a portion of the lower layer network has stopped, and it is a type of obstruction for which immediate restoration by establishment of an alternate path or the like can be anticipated.

In this seventeenth preferred embodiment of the present invention, the explanation will be provided in terms of the occurrence of an obstruction at the lower layer network level, for which an immediate restoration can be anticipated.

It should be understood that although, with this seventeenth preferred embodiment, the explanation will be provided in terms of the detection of the occurrence of an obstruction by advertisement from the lower layer network, apart from this, it would also be possible to detect the occurrence of an obstruction upon the lower layer network by error lookout for keep alive signals for the links, or the K1/K2 byte defined in an SDH, or the like, emitted from the routers 1 through 8 themselves as well, and it would be possible to explain this preferred embodiment in the same manner even using a method such as this for detecting the occurrence of an obstruction, instead of advertising by means of an LSA packet such as is explained in the description of this preferred embodiment.

Figure 30:
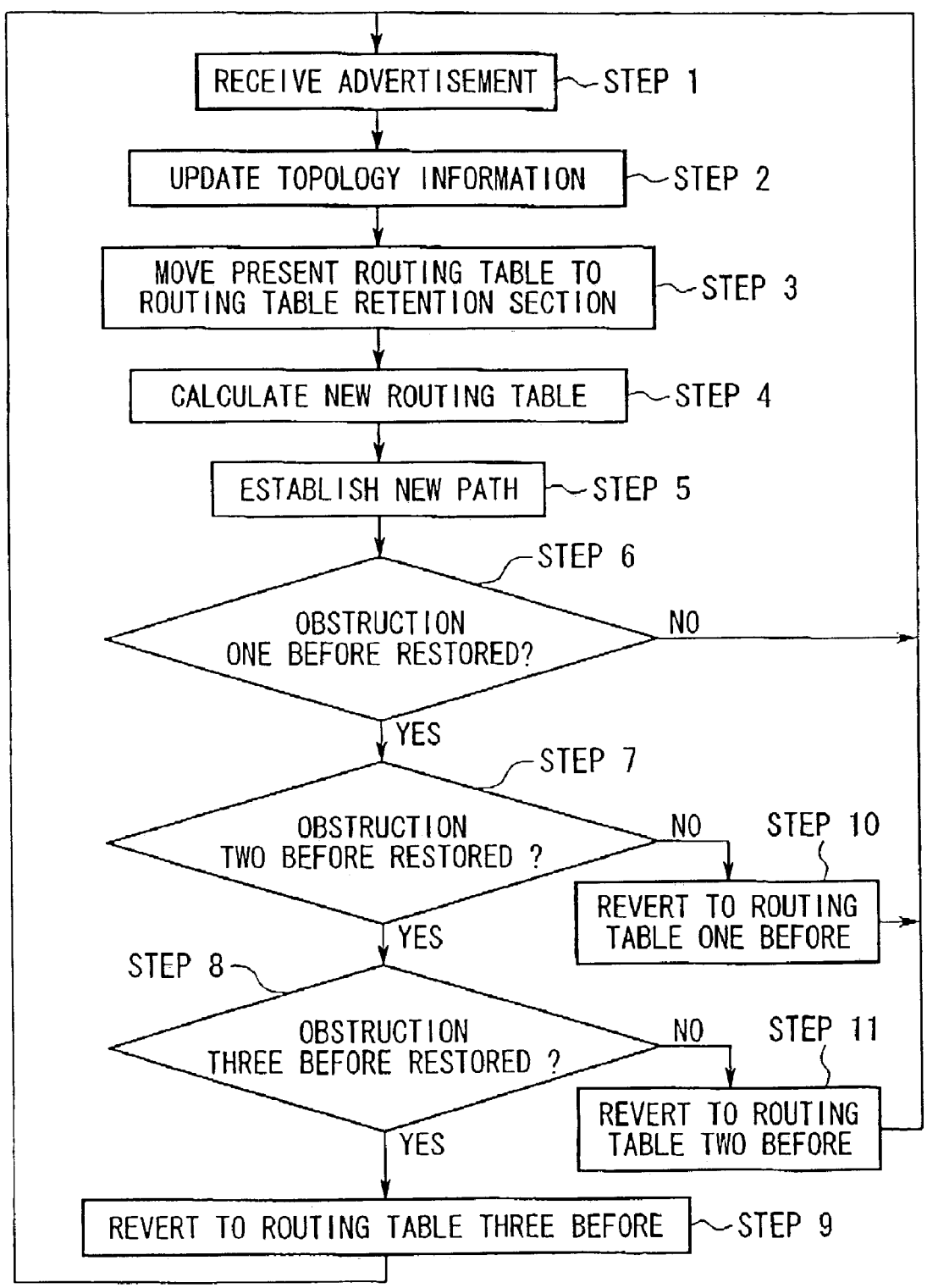
FIG. 30 is a flow chart showing the operation of this router of the seventeenth preferred embodiment of the present invention.

Next, the operation of the router according to this seventeenth preferred embodiment of the present invention will be explained with reference to FIG. 30. FIG. 30 is a flow chart showing the operation of this router according to this seventeenth preferred embodiment. In the example shown in FIG. 1, an obstruction is supposed to have occurred in the transmission line between the photonic cross connect 22 and the photonic cross connect 24. Due to this, advertisements including relevant obstruction information are emitted from the advertisement emission sections 32 of the obstruction restoration control devices 30 of the photonic cross connects 22 and 24.

In the topology information updating sections 46 of the routers 7 and 8, as shown in FIG. 30, the advertisement is received (in the step 1), and updating of the topology information is performed (in the step 2). The updated topology information is stored in the topology information retention section 43. The topology information retention section 43 is observed by the path establishment section 45, and, when such updating of the topology information is detected, first, the present routing table is moved to the routing table retention section 48 (in the step 3). During this time, calculation of a new routing table is performed by the routing table calculation section 44 based upon the updated topology information (in the step 4). The new routing table is stored in the path establishment section 45, and this path establishment section 45 performs establishment of the new path (in the step 5). At this time, if a new advertisement arrives to the effect that the obstruction one before has been restored (in the step 6), then the routing table one before is reverted to in the path establishment section 45 (in the step 10). Or if, in addition to the obstruction one before, the obstruction two before has also been restored (in the step 7), then the routing table two before is reverted to in the path establishment section 45 (in the step 11). Or if, in addition to the obstruction one before and the obstruction two before, the obstruction three before has also been restored (in the step 8), then the routing table three before is reverted to in the path establishment section 45 (in the step 9). In this preferred embodiment of the present invention, the routing table retention section 48 retains the three previous routing tables only, but it would also be possible, as an alternative, further to retain routing tables which were yet older.

The routers 1 through 8 of this preferred embodiment may be implemented using computer devices, which are information processing devices. In other words, by installing upon a computer device a program which is one which implements a function corresponding to a device which controls the routers 1 through 8, and which implements a function, corresponding to the routing table retention section 48, of, along with calculating a routing table based upon topology information which has been updated according to the obstruction information, also retaining the routing table before the obstruction information was advertised, and a function, corresponding to the path establishment section 45, of reverting to the routing table before the obstruction information was advertised which is retained in the routing table retention section 48 when the obstruction which is recorded in the obstruction information has been restored, it is possible to make that computer device serve as a device which corresponds to a device which controls the routers 1 through 8 of this seventeenth preferred embodiment of the present invention.

By recording the program of the seventeenth preferred embodiment of the present invention upon a recording medium according to this seventeenth preferred embodiment, it is possible to install the program of this seventeenth preferred embodiment upon a computer device by using this recording medium. Or, it is possible to install the program of this seventeenth preferred embodiment directly upon a computer device via a network from a server upon which the program of this seventeenth preferred embodiment is stored.

By doing this, an obstruction restoration control technique using a computer device is proposed for application to a multi-layer network, with which it is possible to implement routers 1 through 8 and an optical path network, with which it can be anticipated that effective advantage can be taken of network resources.

Figure 31:
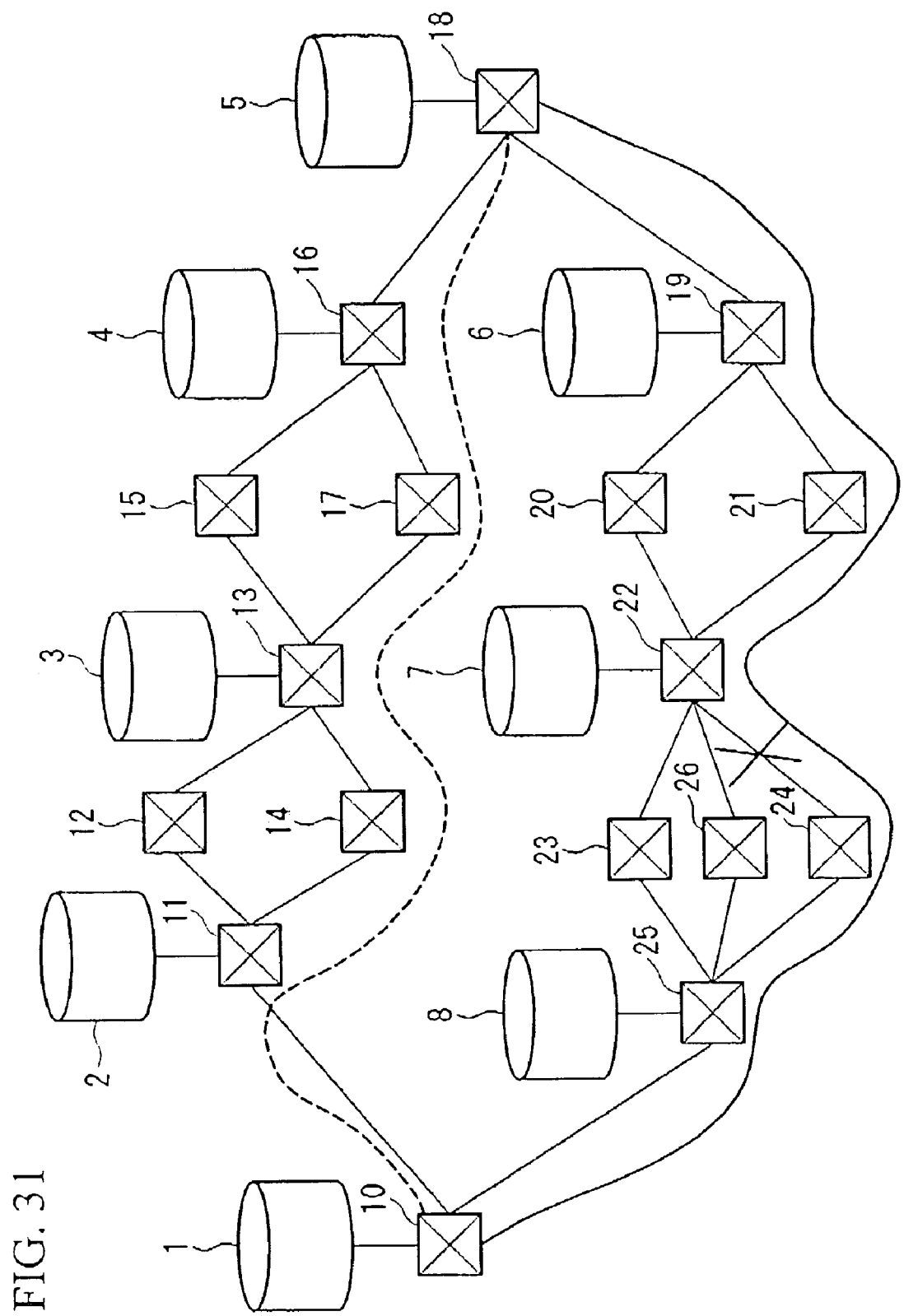
FIG. 31 is a conceptual view of a network for explanation of the eighteenth through the twentieth preferred embodiments of the present invention.
Figure 32:
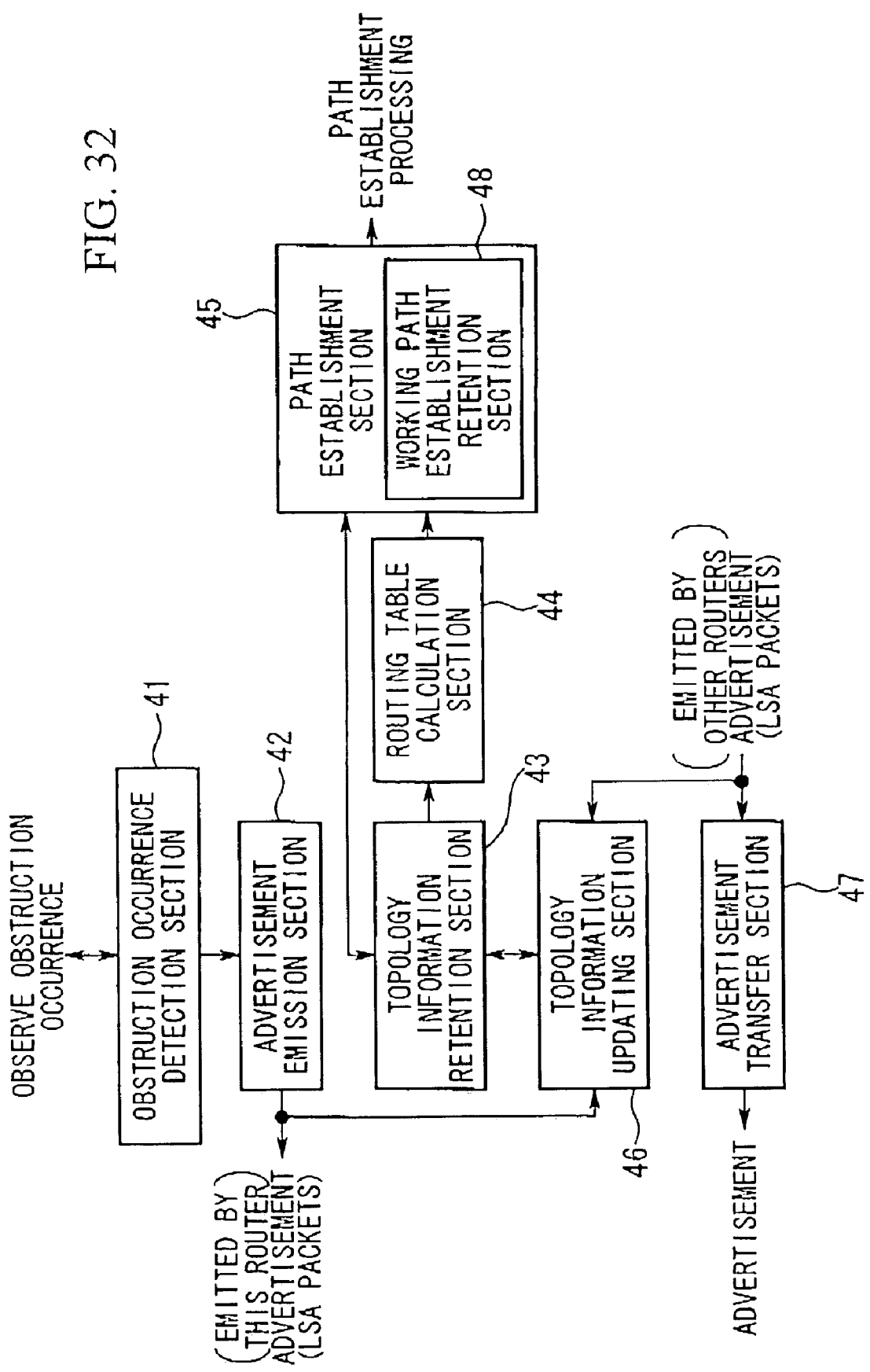
FIG. 32 is a block structural diagram of a router of the eighteenth preferred embodiment of the present invention.
Figure 33:
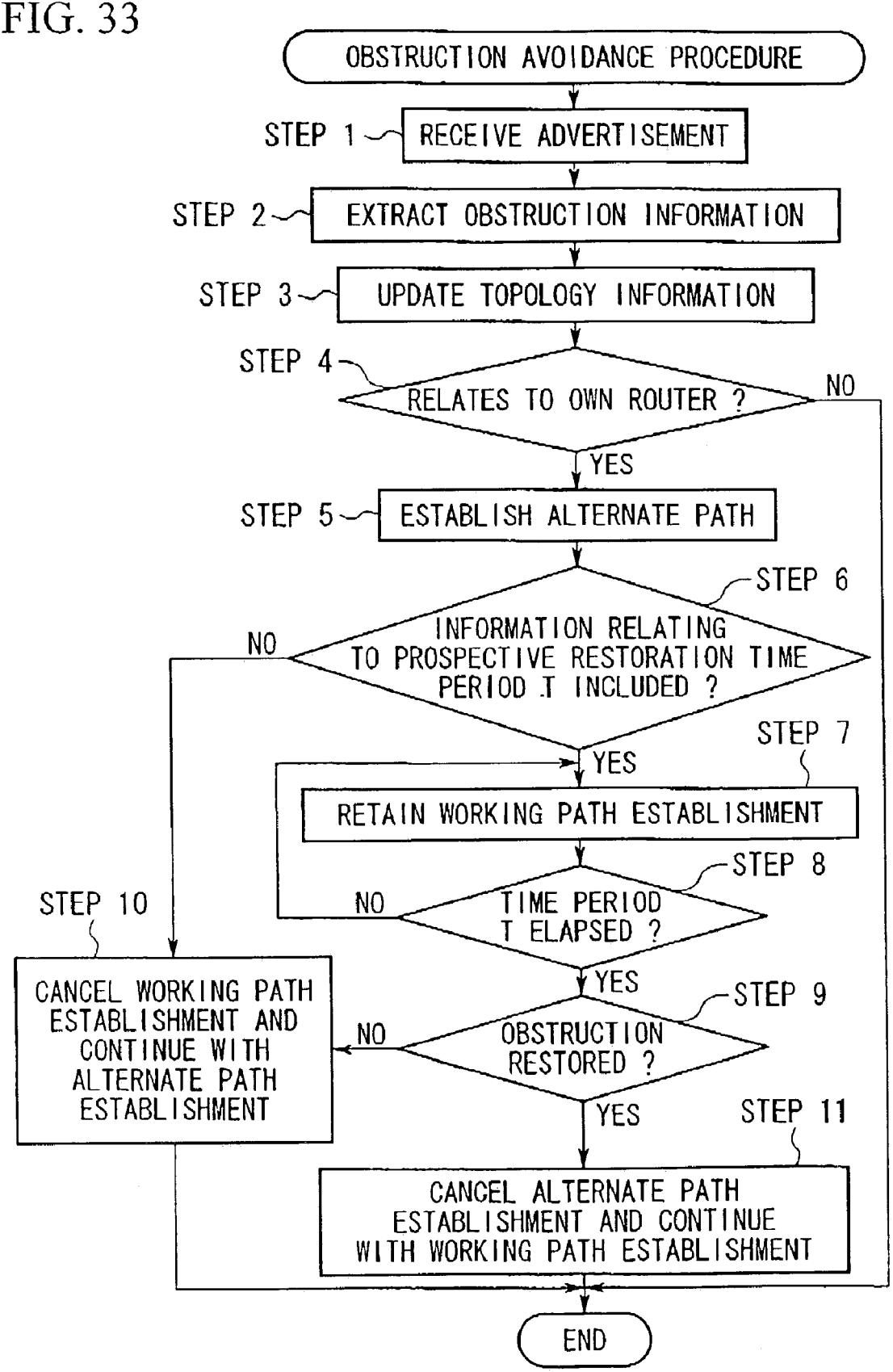
FIG. 33 is a flow chart showing the operation of an obstruction avoidance procedure in the eighteenth preferred embodiment of the present invention.
Figure 34:
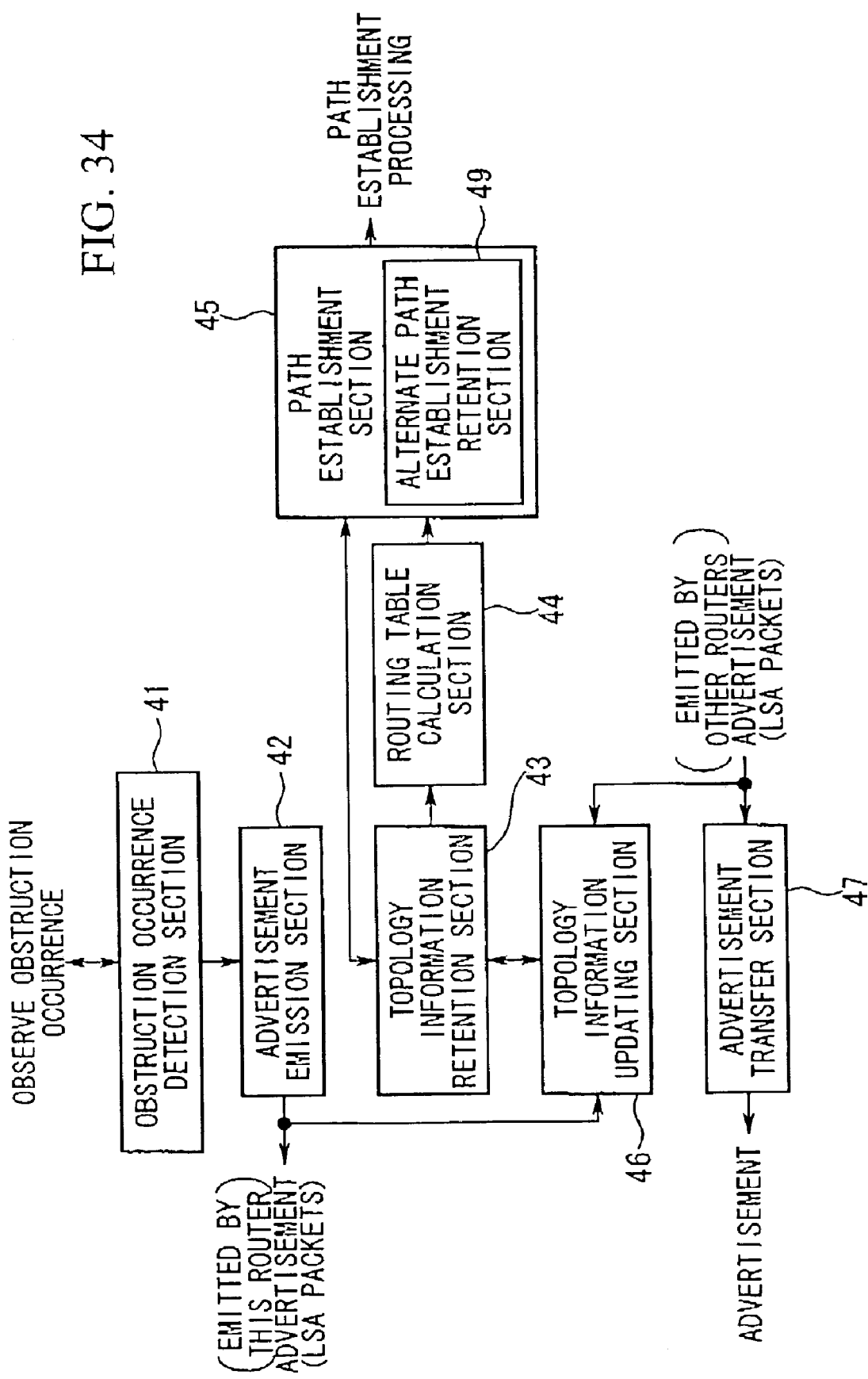
FIG. 34 is a block structural diagram of a router which is a nineteenth preferred embodiment of the present invention.
Figure 35:
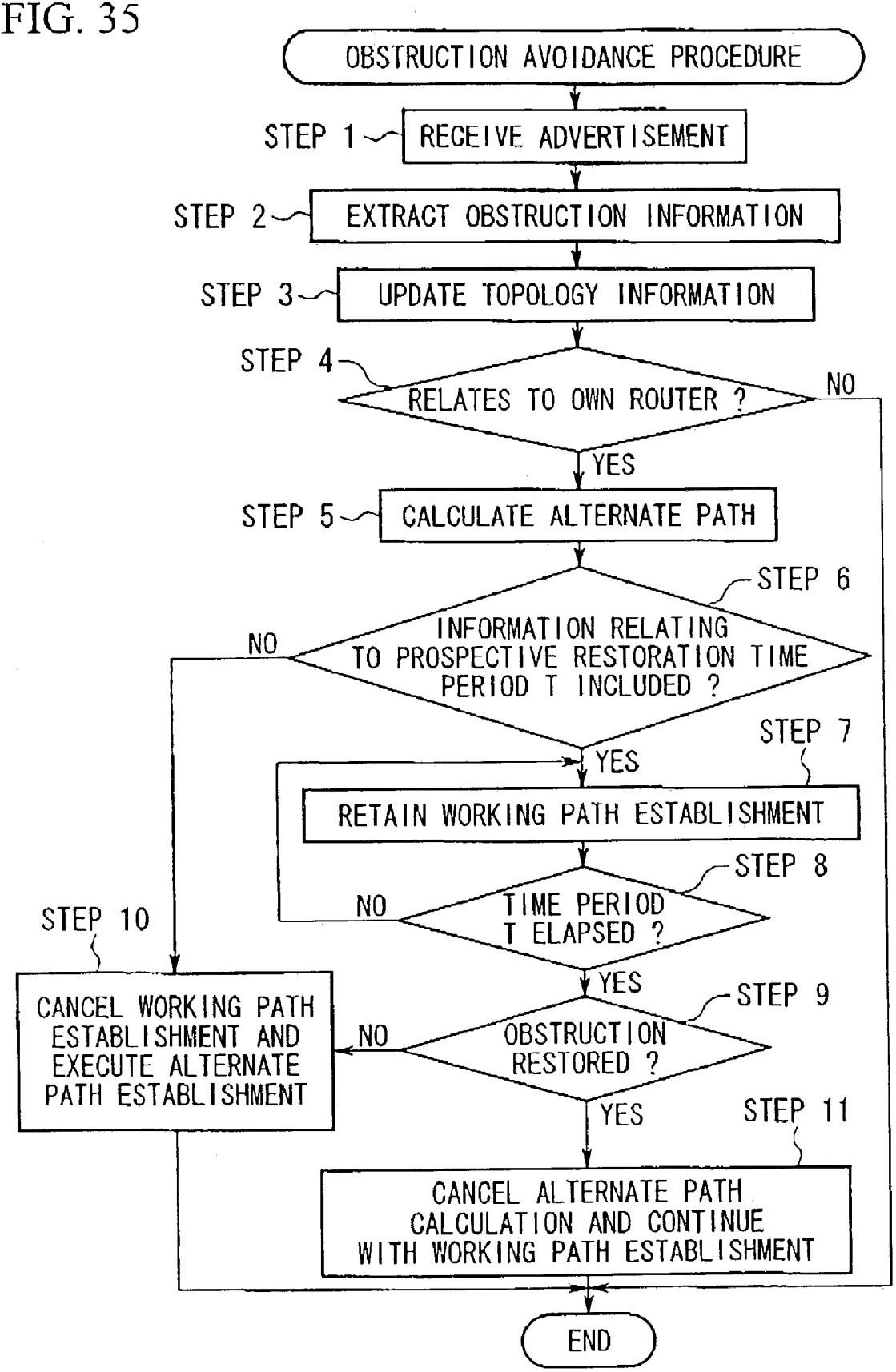
FIG. 35 is a flow chart showing the operation of an obstruction avoidance procedure in the nineteenth preferred embodiment of the present invention.

The networks of the eighteenth, nineteenth, and twentieth preferred embodiment of the present invention will now be explained with reference to FIGS. 31, 2, 7, and 32. FIG. 31 is a conceptual view of a network for explanation of the eighteenth through the twentieth preferred embodiments of the present invention. FIG. 2 is a structural diagram of a photonic cross connect incorporated in these eighteenth, nineteenth, and twentieth preferred embodiments of the present invention. FIG. 7 is a block structural diagram of an obstruction restoration control device incorporated in these eighteenth, nineteenth, and twentieth preferred embodiments of the present invention. FIG. 32 is a block structural diagram of a router of the eighteenth preferred embodiment of the present invention. FIG. 33 is a flow chart showing the operation of an obstruction avoidance procedure in the eighteenth preferred embodiment of the present invention. FIG. 34 is a block structural diagram of a router which is a nineteenth preferred embodiment of the present invention. And FIG. 35 is a flow chart showing the operation of an obstruction avoidance procedure in the nineteenth preferred embodiment of the present invention.

The Eighteenth Preferred Embodiment

This eighteenth preferred embodiment of the present invention is a network comprising a plurality of nodes and transmission lines which are provided between this plurality of nodes, with the plurality of nodes including routers 1 through 8 which are upper layer nodes and photonic cross connects 10 through 26 which are lower layer nodes, and with at least two of these routers being connected together by a lower layer network which is made up from a plurality of the photonic cross connects and transmission lines; and, in this lower layer network, a plurality of obstruction restoration control devices 30 are provided to each of the photonic cross connects 10 through 26 for cooperating to perform obstruction restoration; with the obstruction restoration control devices 30 of the routers 1 through 8 and the photonic cross connects 10 through 26 comprising obstruction occurrence detection sections 31, 41 which detect the occurrence of an obstruction upon the transmission lines which they accommodate themselves, and advertisement emission sections 32, 42 which advertise as obstruction information the results of detection by these obstruction occurrence detection sections 31, 41; and with each of the routers 1 through 8 comprising a topology information retention section 43 which retains topology information for the network, a topology information updating section 46 which updates the topology information which it retains itself according to obstruction information which has been advertised or obstruction information which it has detected itself, an advertisement transfer section 47 which advertises obstruction information which has been advertised to the other ones of the routers 1 through 8, and a routing table calculation section 44 and a path establishment section 45 which establish an alternate path which detours around the transmission line upon which the obstruction has occurred, according to the topology information which has been updated by the topology information updating section 46.

Here, the particular feature by which this eighteenth preferred embodiment of the present invention is distinguished is that the path establishment section 45, along with establishing an alternate path, also retains the establishment of the original path according to the previous topology information before the advertisement of the obstruction information for a predetermined time period in a working path establishment retention section 48, and cancels the establishment of the alternate path when the obstruction which was recorded in the obstruction information has been restored within the predetermined time period, while it cancels the establishment of the original path when the obstruction which was recorded in the obstruction information has not been restored, even though the predetermined time period has elapsed.

Although in each of the routers 1 through 8 it may either happen that the occurrence of an obstruction is detected by its own obstruction occurrence detection section 41, or that the occurrence of an obstruction is detected by advertisement from the lower layer network, an obstruction which is detected by the obstruction occurrence detection section 41 is an obstruction upon the upper layer network level which consists of the routers 1 through 8 shown in FIG. 56. By contrast to this, an obstruction which has been detected by advertisement from the lower layer network is an obstruction upon the lower layer network level which consists of the photonic cross connects 10 through 26 shown in FIG. 55.

In other words, an obstruction which is detected by the obstruction occurrence detection section 41 is a serious obstruction such as one in which almost the entire lower layer network between routers has stopped, and it is a type of obstruction for which immediate restoration can hardly be expected. By contrast to this, an obstruction which has been detected by advertisement from the lower layer network is a trifling obstruction such as one in which only a portion of the lower layer network has stopped, and it is a type of obstruction for which immediate restoration by establishment of an alternate path or the like can be anticipated.

In this eighteenth preferred embodiment of the present invention, the explanation will be provided in terms of the occurrence of an obstruction at the lower layer network level, for which an immediate restoration can be anticipated.

It should be understood that although, with this preferred embodiment of the present invention, the explanation will be provided in terms of the detection of the occurrence of an obstruction by advertisement from the lower layer network, apart from this, it would also be possible to detect the occurrence of an obstruction upon the lower layer network by error lookout for keep alive signals for the links, or the K1/K2 byte defined in an SDH, or the like, emitted from the routers 1 through 8 themselves as well, and it would be possible to explain this preferred embodiment in the same manner even using a method such as this for detecting the occurrence of an obstruction, instead of advertising by means of an LSA packet such as is explained in this preferred embodiment.

In the following, this eighteenth preferred embodiment of the present invention will be explained in greater detail.

In FIG. 31, the solid line shows the working path, while the broken line shows the alternate path. In FIG. 31, it is supposed that an obstruction has occurred between the photonic cross connects 22 and 24. When the obstruction detection section 31 of the obstruction restoration control device 30 of the photonic cross connects 22 and 24 detects the occurrence of this obstruction, the advertisement emission section 32 immediately emits an LSA packet as an advertisement which includes the information relating to this obstruction. In parallel with this, a procedure which is determined in advance for restoring this obstruction is executed by the restoration control section 33 of each of the photonic cross connects which make up the lower layer network. In other words, the path through the photonic cross connects 25⇌24⇌22 is detoured by the path through the photonic cross connects 25⇌23⇌22 or by the path through the photonic cross connects 25⇌26⇌22. By doing this, the obstruction is restored within a short time period. It should be understood that a prospective time period T for obstruction restoration is included in the advertisement.

The operation of the router 1 in this type of circumstances will be explained with reference to FIG. 32 and FIG. 33. When the topology information updating section 46 shown in FIG. 32 receives the advertisement by LSA packet (in the step 1 of FIG. 33), it extracts the obstruction information which is included in this advertisement (in the step 2), and immediately updates the topology information which is retained in the topology information retention section 43 (in the step 3). By referring to the topology information retention section 43, the path establishment section 45 makes a decision as to whether or not the topology information which has been updated is related to the establishment of its own working path (in the step 4). As shown in FIG. 31, the working path which is shown by the solid line is established between the router 1 and the router 5, and so, in this example, it is perceived that the obstruction is one which is related to the working path. Due to this, the path establishment section 45 establishes the alternate path (in the step 5).

Here, it is investigated whether or not information about a prospective time period T for restoration is included in the obstruction information which has been extracted from the LSA packet (in the step 6). If no such information is included, the establishment of the working path is immediately canceled and the establishment of the alternate path is continued (in the step 10); while on the other hand, if such information is included, then the establishment of the working path is retained (in the step 7). At the time point at which it has been retained for the time period T (in the step 8), if the obstruction has been restored (in the step 9), the establishment of the alternate path is canceled and the establishment of the working path is continued (in the step 11). Furthermore, at the time point at which it has been retained for the time period T (in the step 8), if the obstruction has not been restored (in the step 9), the establishment of the working path is canceled and the establishment of the alternate path is continued (in the step 10).

The Nineteenth Preferred Embodiment

The particular distinguishing feature of this nineteenth preferred embodiment of the present invention, as shown in FIG. 34, is that the path establishment section 45, along with calculating an alternate path and retaining the result of this calculation in an alternate path calculation retention section 49, also retains the establishment of the original path according to the previous topology information before the advertisement of the obstruction information for a predetermined time period, and cancels the result of calculation of the alternate path when the obstruction which was recorded in the obstruction information has been restored within the predetermined time period, while, when the obstruction which was recorded in the obstruction information has not been restored even though the predetermined time period has elapsed, it cancels the establishment of the original path and actually establishes the alternate path according to the result of the calculation.

In the following, this nineteenth preferred embodiment of the present invention will be explained in greater detail.

In FIG. 31, the solid line shows the working path, while the broken line shows the alternate path. In FIG. 31, it is supposed that an obstruction has occurred between the photonic cross connects 22 and 24. When the obstruction occurrence detection section 31 of the obstruction restoration control device 30 of the photonic cross connects 22 and 24 detects the occurrence of this obstruction, the advertisement emission section 32 immediately emits an LSA packet as an advertisement which includes the information relating to this obstruction. In parallel with this, a procedure which is determined in advance for restoring this obstruction is executed by the restoration control section 33 of each of the photonic cross connects 22 through 26 which make up the lower layer network. In other words, the path through the photonic cross connects 25⇌24⇌22 is detoured by the path through the photonic cross connects 25⇌23⇌22 or by the path through the photonic cross connects 25⇌26⇌22. By doing this, the obstruction is restored within a short time period. It should be understood that a prospective time period T for obstruction restoration is included in the advertisement.

The operation of the router 1 in this type of circumstances will be explained with reference to FIG. 34 and FIG. 35. When the topology information updating section 46 shown in FIG. 34 receives the advertisement by LSA packet (in the step 1 of FIG. 35), it extracts the obstruction information which is included in this advertisement (in the step 2), and immediately updates the topology information which is retained in the topology information retention section 43 (in the step 3). By referring to the topology information retention section 43, the path establishment section 45 makes a decision as to whether or not the topology information which has been updated is related to the establishment of its own working path (in the step 4). As shown in FIG. 31, the working path which is shown by the solid line is established between the router 1 and the router 5, and so, in this example, it is perceived that the obstruction is one which is related to the working path. Due to this, the path establishment section 45 calculates the alternate path (in the step 5).

Here, it is investigated whether or not information about a prospective time period T for restoration is included in the obstruction information which has been extracted from the LSA packet (in the step 6). If no such information is included, the establishment of the working path is immediately canceled and the establishment of the alternate path is executed (in the step 10); while on the other hand, if such information is included, then the establishment of the working path is retained (in the step 7). At the time point at which it has been retained for the time period T (in the step 8), if the obstruction has been restored (in the step 9), the calculation of the alternate path is canceled and the establishment of the working path is continued (in the step 11). Furthermore, at the time point at which it has been retained for the time period T (in the step 8), if the obstruction has not been restored (in the step 9), the establishment of the working path is canceled and the establishment of the alternate path is executed (in the step 10).

The Twentieth Preferred Embodiment

This twentieth preferred embodiment of the present invention is one in which the routers 1 through 8, which constitute upper layer nodes which are required for implementing the network of this preferred embodiment, are implemented using computer devices, which are information processing devices.

In other words, by installing upon a computer device a program which implements a function corresponding to the devices which control the routers 1 through 8, which are connected to a lower layer network which is made up of a plurality of photonic cross connects which are provided with an obstruction restoration control device 30 and transmission lines, and which are provided with: a function, corresponding to the obstruction occurrence detection section 41, of detecting the occurrence of an obstruction upon the transmission line which it accommodates itself; a function, corresponding to the advertisement emission section 42, of advertising the result of detection by this detection function as obstruction information; a function, corresponding to the topology information retention section 43, of retaining the topology information of the network; a function, corresponding to the topology information updating section 46, of updating the topology information which it retains itself, according to obstruction information which has been advertised or obstruction information which it has detected itself; an advertisement transfer function, corresponding to the advertisement transfer section 47, of advertising obstruction information which has been advertised to the other routers; and a function, corresponding to the routing table calculation section 44 and to the path establishment section 45, of establishing an alternate path to the transmission line in which an obstruction has occurred according to the topology information which has been updated by the updating function; it is possible to make that computer device serve as a device which corresponds to the devices which control the routers 1 through 8 of this twentieth preferred embodiment of the present invention, As a particular distinguishing feature of the program of this preferred embodiment of the present invention, there may be implemented, as a function for establishing the alternate path which corresponds to the routing table calculation section 44 and the path establishment section 45 shown in FIG. 32, a function of, along with establishing an alternate path, also retaining the establishment of the original path according to the previous topology information before the advertisement of the obstruction information for a predetermined time period in the working path establishment retention section 48, and canceling the establishment of the alternate path when the obstruction which was recorded in the obstruction information has been restored within the predetermined time period, while canceling the establishment of the original path when the obstruction which was recorded in the obstruction information has not been restored, even though the predetermined time period has elapsed.

Or, as a function for establishing the alternate path which corresponds to the routing table calculation section 44 and the path establishment section 45 shown in FIG. 34, there may be implemented a function of, along with calculating the alternate path and retaining the result of this calculation in the alternate path calculation retention section 49, also retaining the establishment of the original path according to the previous topology information before the advertisement of the obstruction information for a predetermined time period, and canceling the result of calculating the alternate path when the obstruction which was recorded in the obstruction information has been restored within the predetermined time period, while, when the obstruction which was recorded in the obstruction information has not been restored even though the predetermined time period has elapsed, canceling the establishment of the original path and actually establishing the alternate path according to the result of the calculation.

By recording the program of this twentieth preferred embodiment upon a recording medium according to this twentieth preferred embodiment, it is possible to install the program of this twentieth preferred embodiment upon a computer device by using this recording medium. Or, it is possible to install the program of this twentieth preferred embodiment directly upon a computer device via a network from a server upon which the program of this twentieth preferred embodiment is stored.

By doing this, an obstruction restoration control technique using a computer device is proposed for application to a multi-layer network, with which it is possible to implement routers 1 through 8 and a network, with which it can be anticipated that effective advantage can be taken of network resources.

The Twenty-First Preferred Embodiment

Figure 36:
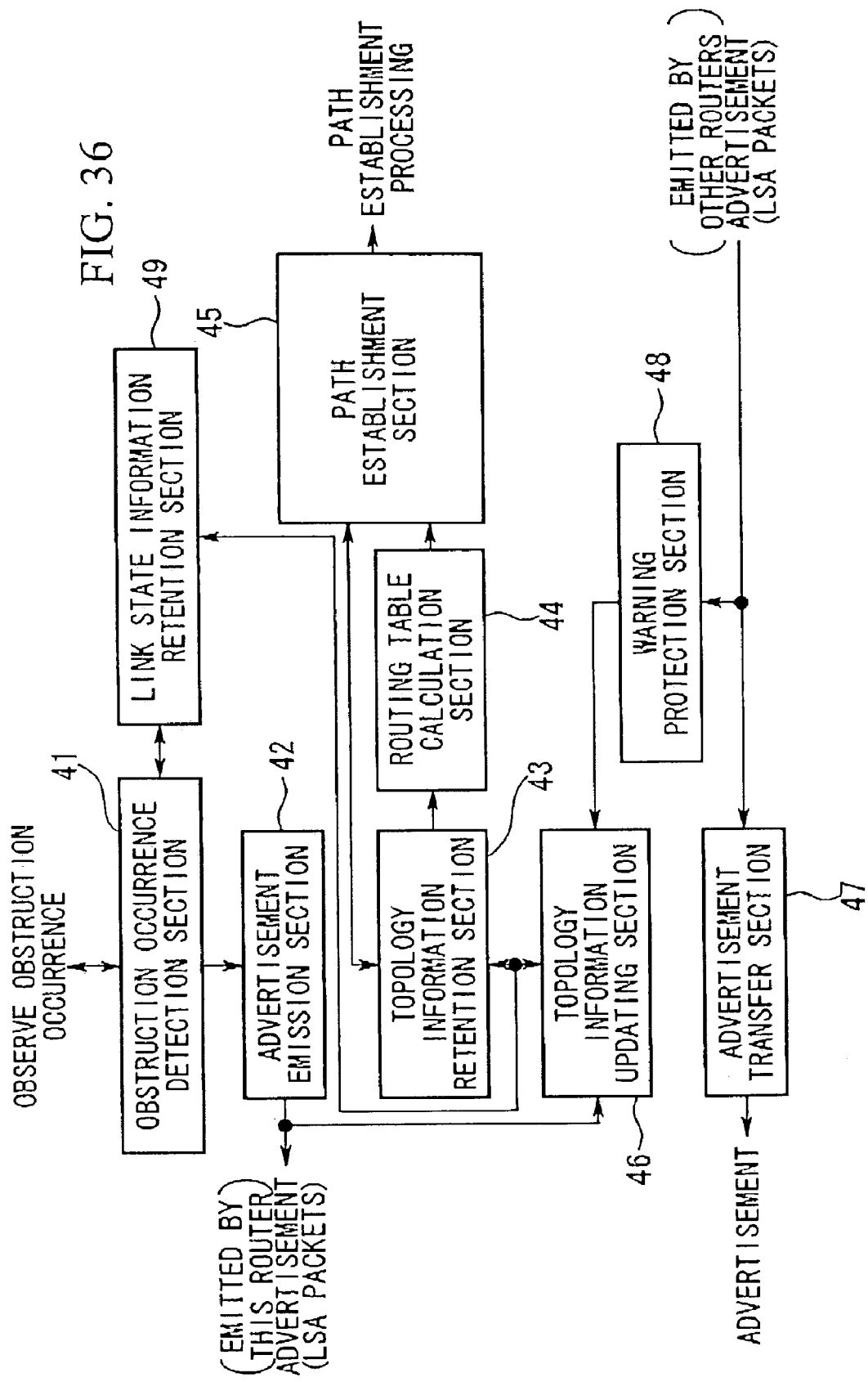
FIG. 36 is a block structural diagram of a router of the twenty-first preferred embodiment of the present invention.
Figure 37:
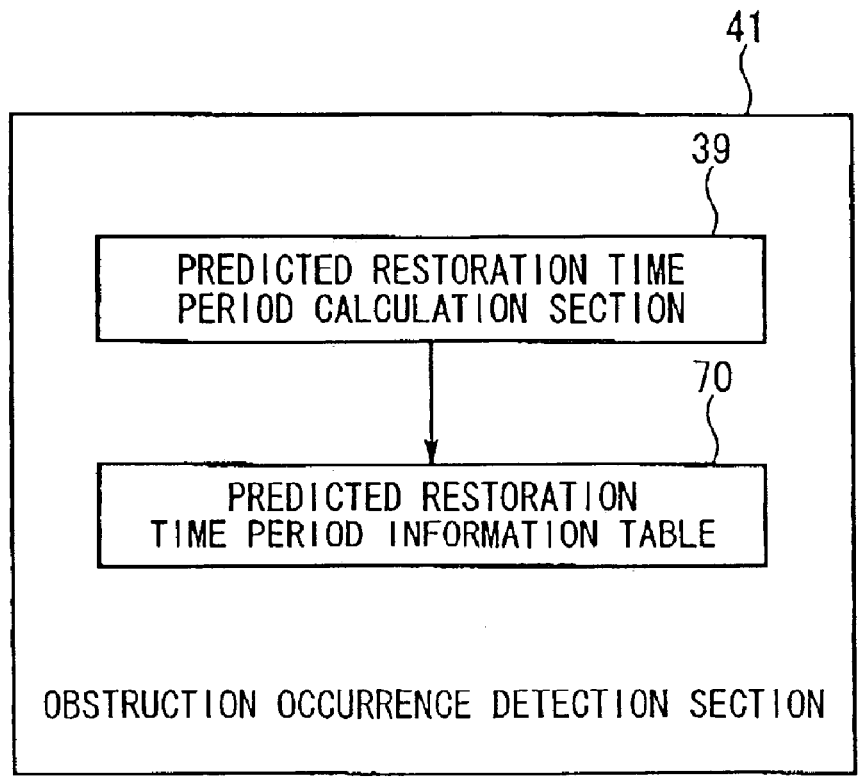
FIG. 37 is a block structural diagram of an obstruction occurrence detection section of this twenty-first preferred embodiment of the present invention.

The network and the upper layer node of the twenty-first preferred embodiment of the present invention will now be explained with reference to FIGS. 1, 2, 7, 36, 19, 37, 21, and 22. FIG. 1 is a conceptual view of the network of this twenty-first preferred embodiment. FIG. 2 is a structural diagram of a photonic cross connect incorporated in this twenty-first preferred embodiment of the present invention. FIG. 7 is a block structural diagram of an obstruction restoration control device incorporated in this twenty-first preferred embodiment of the present invention. FIG. 36 is a block structural diagram of a router of this twenty-first preferred embodiment of the present invention. FIG. 19 is a diagram showing an example of link state information. FIG. 37 is a block structural diagram of an obstruction occurrence detection section of this twenty-first preferred embodiment of the present invention. FIG. 21 is a diagram showing a transmission line during duplex operation. FIG. 22 is a diagram showing a transmission line which has an alternate path. FIG. 55 is a diagram showing an example of a multi-layer network. And FIG. 56 is a diagram showing topology information that is retained by a router.

This twenty-first preferred embodiment of the present invention, as shown in FIGS. 1 and 2, includes a router 1 through 8, connected to a lower layer network which is made up of a plurality of photonic cross connects 10 through 26 which are provided with obstruction restoration control devices 30 and transmission lines, and comprising, as shown in FIG. 36, an obstruction occurrence detection section 41 which detects the occurrence of obstructions upon the transmission lines which it accommodates itself, an advertisement emission section 42 which advertises the results of detection by this obstruction occurrence detection section 41 as obstruction information, a topology information retention section 43 which retains topology information for the network, a topology information updating section 46 which updates the topology information which it retains itself according to obstruction information which has been advertised or obstruction information which it itself retains, and an advertisement transfer section 47 which advertises obstruction information which has been advertised to other ones of these upper layer nodes.

Here, the particular feature by which this preferred embodiment of the present invention is distinguished is that there is provided a link state information retention section 49 which retains link state information related to the detailed structure of the lower layer network, and the obstruction occurrence detection section 41 also detects the detailed obstruction situation upon the lower layer network according to the link state information which is retained by the link state information retention section 49, while the topology information updating section 46 also updates the link state information which is retained by the link state information retention section 49.

In each of the routers 1 through 8, it may happen that the router itself detects the occurrence of an obstruction by the obstruction occurrence detection section 41, or it may happen that the occurrence of the obstruction is detected by advertisement from the lower layer network; but an obstruction which is detected by the obstruction occurrence detection section 41 is an obstruction at the level of the upper layer network which consists of the routers 1 through 8 shown in FIG. 56; while an obstruction which has been detected by advertisement from the lower layer network is an obstruction at the level of the lower layer network which consists of the photonic cross connects 10 through 26 shown in FIG. 55.

In other words, an obstruction which is detected by an obstruction occurrence detection section 41 of the routers 1 through 8 is a serious obstruction such as one in which a stoppage has occurred in almost the entire lower layer network between routers, and it is a type of obstruction for which immediate restoration can hardly be expected. By contrast to this, an obstruction which has been detected by the obstruction occurrence detection section 31 of the obstruction restoration control device 30, or has been detected by advertisement from the advertisement emission section 32, is a trifling obstruction such as one in which a stoppage has taken place upon only a portion of the lower layer network, and it is a type of obstruction for which it is possible to expect immediate restoration such as by establishment of an alternate path or the like.

Accordingly, although in the past it was arranged, when the occurrence of an obstruction was detected, to perform updating of the topology information immediately, and to recalculate the routing table immediately, by contrast, with this preferred embodiment of the present invention, the particular distinguishing feature is that, by providing link state information which relates to the detailed structure of the lower layer network in the routers 1 through 8 as well, even trifling obstructions for which immediate restoration can be expected (which in the background art were only detected by advertisement from the lower layer network) are detected by the routers 1 through 8 themselves as well. By doing this, an obstruction restoration control technique is proposed which is suitable to a multi-layer network, and which is performed by the routers 1 through 8 themselves without any dependence upon advertisement from the lower layer network, so that it is possible to anticipate efficient advantage being taken of network resources.

It should be understood that with this twenty-first preferred embodiment of the present invention, the explanation will be provided in terms of the detection of the occurrence of a trifling obstruction from which immediate restoration can be expected. As a method by which the obstruction occurrence detection sections 41 of the routers 1 through 8 may detect an obstruction, it would be possible to perform this detection by error lookout for keep alive signals for the links, or the K1/K2 byte defined in an SDH, or the like, emitted from the routers 1 through 8 themselves.

The obstruction occurrence detection section 41 makes a decision as to the possibility of performing obstruction restoration by the obstruction restoration control device 30, by referring to the link state information which has been updated by the topology information updating section 46. Furthermore, it decides upon the necessity of establishing an alternate path, by referring to the result of this decision and to the degree of importance of the communication which is being performed by utilizing the lower layer network.

To explain the decisions in greater detail, the link state information retention section 49, retains the small scale topology information which is limited to the lower layer network to which it itself is connected, as shown in FIG. 19. The obstruction occurrence detection section 41 detects the degree of concentration of network resources by referring to the link state information which is related to the detailed structure of the lower layer network in which the obstruction shown in FIG. 19 has occurred. To compare the points of obstruction A and B, in the example shown in FIG. 19, the degree of concentration of network resources is greater for A than for B. Due to this, if the point is one at which network resources are concentrated, then it is decided that it is one at which it is easy to establish an alternate path, so that restoration can be expected within a short time period; while on the other hand, if the point is one at which network resources are sparse, then it is decided that it is one at which it is difficult to establish an alternate path, so that restoration cannot be expected within a short time period.

Or, as shown in FIG. 37, the obstruction occurrence detection section 41 may comprise a predicted restoration time period calculation section 39 and a predicted restoration time period information table 70, and, with regard to the capability for alternate path establishment, as shown in FIG. 21, it may calculate the predicted time period for restoration for a transmission line during duplex operation as being almost zero, while also re-recognizing the transmission line during the occurrence of an obstruction as a simplex transmission line. In other words, as shown in FIG. 21, when transmitting the same data by duplex operation using a working path and a protection path, the predicted time period for restoration when an obstruction occurs upon either of these paths may be considered as being zero. However, since if an obstruction has occurred upon either one of these paths it ceases to be a duplex operation transmission line, in this type of case, a re-calculation is performed for the predicted time period for restoration as a simplex transmission line.

Or, as the capability for alternate path establishment, the obstruction occurrence detection section 41 may calculate the predicted time period for restoration based upon the presence or absence of alternate paths at both the ends of the transmission line which is the object of the calculation, and upon the state of vacancy or occupancy of the alternate paths. In other words, in the example shown in FIG. 22, when the transmission line which is the object of the calculation is a transmission line which is spread over the optical paths upon the wavelengths $\lambda 1$ and $\lambda 2$, first, the presence or absence of alternate paths for it is investigated, and then the state of occupancy of the wavelengths for these alternate paths is investigated.

In the example shown in FIG. 22, alternate paths exist, and, in the state of occupancy (1), the optical paths upon the wavelengths $\lambda 4$ and $\lambda 5$ are vacant. Accordingly, the predicted time period for restoration in this case is the time period required for switching over the photonic cross connect. In the state of occupancy (2), although two vacant wavelengths are required, all of the wavelengths are occupied. Furthermore, in the state of occupancy (3), only the wavelength $\lambda 3$ is vacant. In this type of case, the predicted time period for restoration is calculated based upon the probability of occurrence of two vacant wavelengths, which is based upon statistical data from the past. It should be understood that if, in FIG. 21, an obstruction occurs upon either the working path or the protection path, the same method may be employed when re-calculating the predicted time period for restoration as a simplex transmission line.

Furthermore, along with notifying the result of the decision to the other routers, the advertisement emission section 42 communicates it to certain predetermined users. Or, it may notify certain predetermined users of the obstruction information and of the situation with regard to establishment of alternate paths.

The routers 1 through 8 of this twenty-first preferred embodiment of the present invention may be implemented using computer devices, which are information processing devices. In other words, by installing upon a computer device a program which implements a function corresponding to a device which controls the routers 1 through 8 of this preferred embodiment of the present invention, which are connected to a lower layer network which is made up from a plurality of photonic cross connects 10 through 26 which comprise obstruction restoration control devices 30 and transmission lines, and which are endowed with a function, corresponding to the obstruction occurrence detection section 41, of detecting the occurrence of an obstruction upon a transmission line which it accommodates itself, a function, corresponding to the advertisement emission section 42, of advertising the result of detection by this obstruction occurrence detection section 41 as obstruction information, a function, corresponding to the topology information retention section 43, of retaining the topology information of the network, a function, corresponding to the topology information updating section 46, of updating the topology information which it retains itself according to obstruction information which has been advertised or obstruction information which it has detected itself, and a function, corresponding to the advertisement transfer section 47, of advertising to other upper layer nodes obstruction information which has been advertised, and by implementing: a function, which corresponds to the link state information retention section 49, of retaining link state information related to the detailed structure of the lower layer network; as a function which corresponds to the obstruction occurrence detection section 41, a function of going so far as to detect the detailed obstruction situation upon the lower layer network according to the link state information which is retained in the link state information retention section 49; and, as a function which corresponds to the topology information updating section 46, a function of going so far as to update the link state information which is retained by the link state information retention section 49, it is possible to make that computer device serve as a device which corresponds to a device which controls the routers 1 through 8.

As a function which corresponds to the obstruction occurrence detection section 41, there may be implemented a function of deciding as to the possibility of performing obstruction restoration by the obstruction restoration function, by referring to the link state information which has been updated by the topology information updating section 46. Furthermore, there may be implemented a function of deciding upon the necessity of establishing an alternate path, by referring to the result of this decision by this decision function and to the degree of importance of the communication which is being performed by utilizing the lower layer network.

Furthermore, as a function which corresponds to the advertisement emission section 42, there may be implemented a function of notifying the result of the decision by the decision function to certain predetermined users. Or, there may be implemented a function of notifying certain predetermined users of the obstruction information and of the situation with regard to establishment of alternate paths.

By recording the program of this preferred embodiment of the present invention upon a recording medium according to this preferred embodiment, it is possible to install the program of this preferred embodiment upon a computer device by using this recording medium. Or, it is possible to install the program of this preferred embodiment directly upon a computer device via a network from a server upon which the program of this preferred embodiment is stored.

By doing this, an obstruction restoration control technique using a computer device is proposed for application to a multi-layer network, with which it is possible to implement routers 1 through 8 and a network, with which it can be anticipated that effective advantage can be taken of network resources.

In the following, the twenty-second through the thirty-sixth preferred embodiments of the present invention will be explained.

The Twenty-Second Preferred Embodiment

Figure 38:
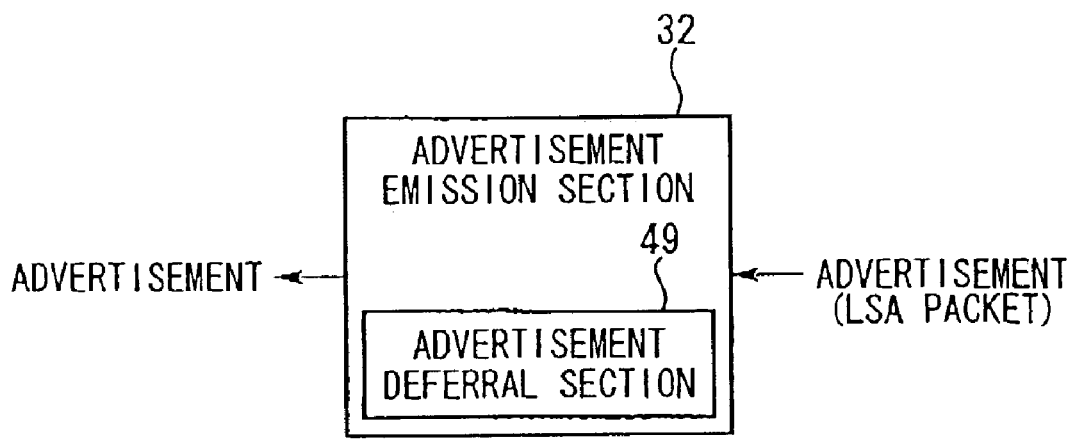
FIG. 38 is a block structural diagram of an advertisement emission section in the twenty-second preferred embodiment of the present invention.
Figure 39:
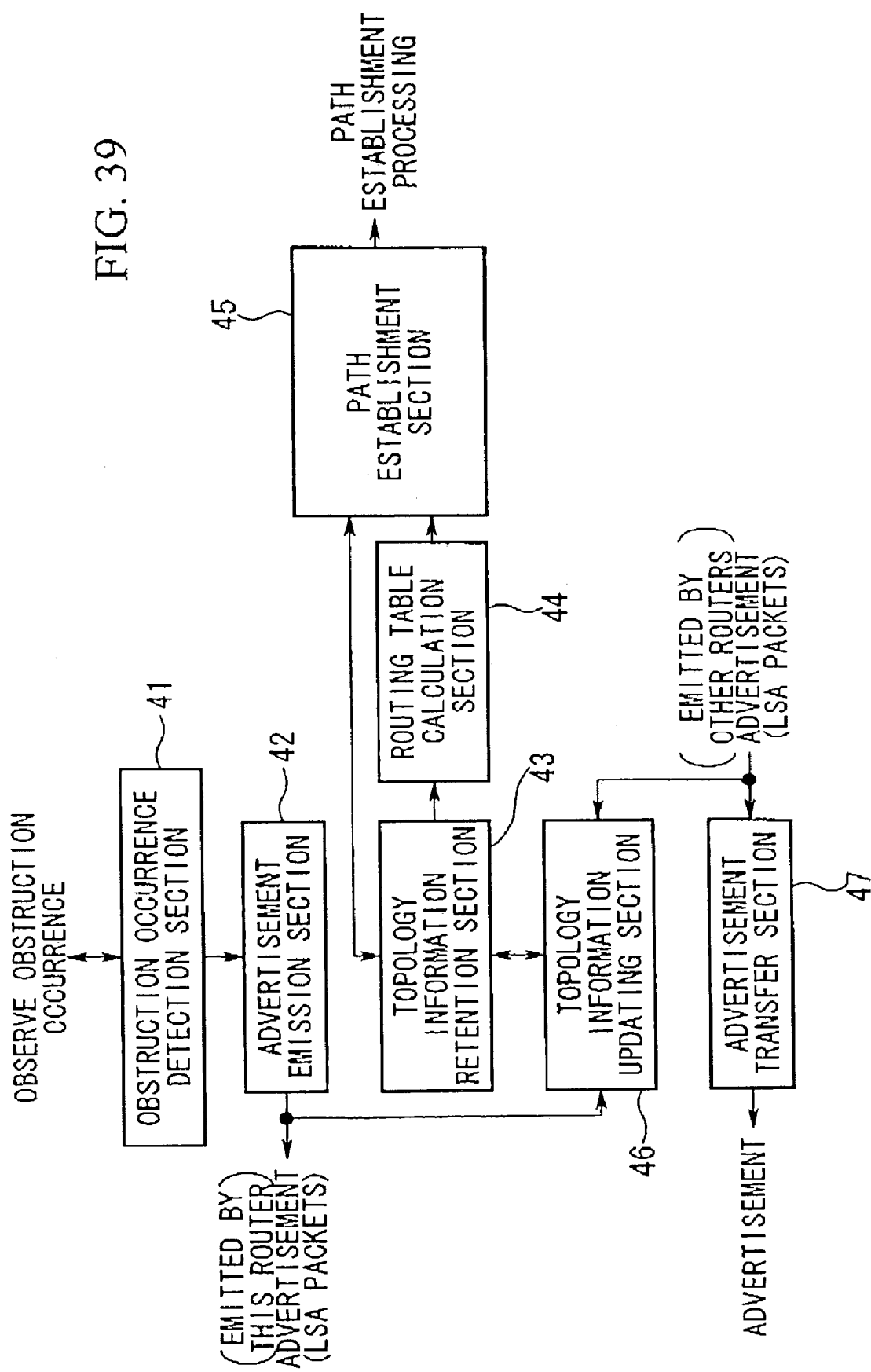
FIG. 39 is a block structural diagram of a router of the twenty-second through the thirty-sixth preferred embodiments of the present invention.

The network according to the twenty-second preferred embodiment of the present invention will now be explained with reference to FIGS. 1, 2, 3, 38, and 39. FIG. 1 is a conceptual view of the network according to this preferred embodiment. FIG. 2 is a structural diagram of a photonic cross connect incorporated in any of these twenty-second through the thirty-sixth preferred embodiments of the present invention. FIG. 3 is a block structural diagram of an obstruction restoration control device incorporated in this twenty-second preferred embodiment of the present invention. FIG. 38 is a block structural diagram of an advertisement emission section in this twenty-second preferred embodiment of the present invention. And FIG. 39 is a block structural diagram of a router according to the twenty-second preferred embodiment of the present invention.

This twenty-second preferred embodiment is a photonic cross connect 10 through 26 which constitutes a lower layer node which is provided to a lower layer network which is connected between at least two routers, and which comprises: an obstruction restoration control device 30 for performing obstruction restoration of this lower layer network; an obstruction occurrence detection section 31 which detects the occurrence of an obstruction upon a transmission line which it accommodates itself; and an advertisement emission section 32 which advertises as obstruction information the results of detection by this obstruction occurrence detection section 31. It should be understood that, in the structural diagram of the network, the obstruction restoration control devices 30 are omitted.

Here, the particular feature by which this twenty-second preferred embodiment of the present invention is distinguished is that, as shown in FIG. 38, the advertisement emission section 32 comprises an advertisement deferral section 49 which defers the emission of the advertisement for a time period T from the time instant that an obstruction has been detected by the obstruction occurrence detection section 31.

In this manner, an advertisement is not emitted to the routers 1 through 8 by the obstruction restoration control devices 30 of the photonic cross connects 10 through 26 immediately when an obstruction upon the lower layer network occurs, but, rather, such advertisement is deferred by a constant time period over which quick restoration of the lower layer network is anticipated; and thereby it is possible to avoid calculation of routes which will become invalid.

When, in the routers 1 through 8, the occurrence of an obstruction is detected by its own obstruction occurrence detection section 41, it may happen that the occurrence of the obstruction is detected by advertisement from the lower layer network; but an obstruction which has been detected by the obstruction occurrence detection section 41 is an obstruction at the level of the upper layer network which consists of the routers 1 through 8 shown in FIG. 56. By contrast to this, an obstruction which has been detected by advertisement from the lower layer network is an obstruction at the level of the lower layer network which consists of the photonic cross connects 10 through 26 shown in FIG. 55.

In other words, an obstruction which is detected by the obstruction occurrence detection section 41 is a serious obstruction such as one in which a stoppage has occurred in almost the entire lower layer network between routers, and it is a type of obstruction for which immediate restoration can hardly be expected. By contrast to this, an obstruction which has been detected by advertisement from the lower layer network is a trifling obstruction such as one in which a stoppage has taken place upon only a portion of the lower layer network, and it is a type of obstruction for which it is possible to expect immediate restoration such as by establishment of an alternate path or the like.

With this preferred embodiment of the present invention, the explanation will be provided in terms of the detection of the occurrence of an obstruction upon the lower layer network level, from which immediate restoration can be expected.

Moreover it should be recorded that although, with this preferred embodiment, the explanation will be provided in terms of the detection of the occurrence of an obstruction by advertisement from the lower layer network, apart from this, it would also be possible to detect the occurrence of an obstruction upon the lower layer network by error lookout for keep alive signals for the links, or the K1/K2 byte defined in an SDH, or the like, emitted from the routers 1 through 8 themselves as well, and it would be possible to explain this preferred embodiment in the same manner even using a method such as this for detecting the occurrence of an obstruction, instead of advertising by means of an LSA packet such as is explained in this description of this preferred embodiment.

In the obstruction restoration control device 30, there is provided a predicted time period information retention section 34 which retains information relating to the time period which it is predicted will be required for obstruction restoration upon the lower layer network, and the advertisement emission section 32 of this obstruction restoration control device 30 obtains the information relating to the predicted time period for restoration which will be required for the restoration by referring to the result of detection by the obstruction occurrence detection section 31 and to the predicted time period for restoration which is retained in the predicted time period information retention section 34, while the advertisement deferral section 49 determines a deferral time period for advertisement, based upon this information relating to the predicted time period for restoration which has thus been obtained.

The routers 1 through 8 shown in FIG. 39 will be explained in a simplified manner. Each of these routers 1 through 8 comprises: a obstruction occurrence detection section 41 which detects the occurrence of an obstruction upon transmission lines which it accommodates itself; an advertisement emission section 42 which advertises as obstruction information the results of detection by this obstruction occurrence detection section 41; a topology information retention section 43 which retains the topology information for the network; a topology information updating section 46 which updates the topology information which it itself retains based upon obstruction information which has been advertised or upon obstruction information which it has detected itself; an advertisement transfer section 47 which advertises to the other routers 1 through 8 the obstruction information which has been advertised; a routing table calculation section 44 which calculates a routing table based upon the topology information which is retained in the topology information retention section 43; and a path establishment section 45 which performs establishment of paths based upon this routing table.

The Twenty-Third Preferred Embodiment

In the twenty-third preferred embodiment of the present invention, the advertisement emission section 32 obtains information about the time period which is predicted to be necessary for the restoration by referring to the result of detection by the obstruction occurrence detection section 31 and to the predicted time period information retention section 34, and the advertisement emission section 32 emits an advertisement which includes the information about the predicted time period for restoration which has been thus obtained.

For example, if a function is provided of deferring the updating of the topology information for a predetermined time period from when the advertisement is received at the routers 1 through 8, then it is possible to defer the updating of the topology information by the routers 1 through 8 for the predicted time period for restoration.

The Twenty-Fourth Preferred Embodiment

The twenty-fourth preferred embodiment of the present invention will now be described with reference to FIG. 8. FIG. 8 is a diagram for explanation of a deferral time period determination method of this twenty-fourth preferred embodiment.

In this twenty-fourth preferred embodiment, the advertisement emission sections 32 in the obstruction restoration control device 30 of the photonic cross connect 10 through 26 performs advertisement at a fixed period during the detection of the obstruction by the obstruction occurrence detection section 31.

For example, if a function is provided of performing the updating of the topology information from when the advertisement is received at the routers 1 through 8 a plurality of times the number of which is determined in advance, then it is possible to defer the updating of the topology information by the routers 1 through 8 for the predetermined time period.

The Twenty-Fifth Preferred Embodiment

The network according to the twenty-fifth preferred embodiment of the present invention will now be described with reference to FIG. 9. FIG. 9 is a diagram for explanation of a deferral time period determination method of this twenty-fifth preferred embodiment of the present invention.

In this twenty-fifth preferred embodiment, the advertisement emission section 32 performs a first advertisement immediately upon detection of the occurrence of an obstruction upon the lower layer network by the obstruction occurrence detection section 31, and it performs a second advertisement if restoration of this obstruction upon the lower layer network has not been implemented, even though the predicted time period for restoration which was retained in the predicted time period information retention section 34 has elapsed from the time instant that this first advertisement was performed.

For example, if a function is provided to the routers 1 through 8 of deferring the updating of the topology information for the time period from the time instant at which the first advertisement has been received until the time instant that the second advertisement is received, then it is possible to defer the updating of the topology information by the routers 1 through 8 for the time period from the first advertisement until the second advertisement.

The Twenty-Sixth Preferred Embodiment

The network of the twenty-sixth preferred embodiment of the present invention will now be described with reference to FIG. 10 and FIG. 11. FIG. 10 is a block structural diagram of an obstruction restoration control device incorporated in this twenty-sixth preferred embodiment of the present invention. And FIG. 11 is a diagram for explanation of a deferral time period determination method of this twenty-sixth preferred embodiment of the present invention.

In this twenty-sixth preferred embodiment of the present invention, as shown in FIG. 10, restoration priority ranking retention sections 35, which retain information relating to the restoration priority rankings when performing restoration of obstructions upon the transmission lines of the lower layer network, are provided to the obstruction restoration control devices 30 of the photonic cross connects 10 through 26.

As shown for example in FIG. 11, when the transmission line is a wavelength division multiplexed transmission line, a large number of wavelength paths may be blocked at the same time by the occurrence of an obstruction in the transmission line. In this sort of case, to restore all of the wavelength paths at the same time would be very difficult to implement, so that a priority ranking is set for the restoration to be performed in a specified order. Generally, the more important are the contents of the communication which is being handled, the higher is the priority ranking set to be. The restoration priority ranking retention section 35 retains in advance the restoration priority ranking information for the performance of obstruction restoration.

Under these type of conditions, in this twenty-sixth preferred embodiment of the present invention, the advertisement emission section 32 of the obstruction restoration control device 30, for a plurality of wavelength paths upon which obstruction has occurred at almost the same moment, sets the individual values for the length of the time period from the time instant of the first advertisement to the time instant of the second advertisement by making them to be inversely proportional to the restoration priority rankings which are retained by the restoration priority ranking retention section 35.

In other words, as shown in FIG. 11, for a wavelength path $\lambda 1$ of the highest priority ranking for which a quick restoration can be expected, the time period from the first advertisement until the second advertisement is set to be long, based upon the prediction that restoration of the lower layer network will be completed immediately, and probably will not even take as long as required for the routers 1 through 8 to set an alternate path. In the example shown in FIG. 11, the restoration is completed before the appointed time instant for emission of the second advertisement, and accordingly this second advertisement is not actually emitted.

On the other hand, for a wavelength path $\lambda n$ of the lowest priority ranking for which a quick restoration cannot be expected, the time period from the first advertisement until the second advertisement is set to be short, based upon the prediction that obstruction avoidance measures by the routers 1 through 8 will probably prove to be necessary. By doing this, obstruction avoidance measures, such as establishing an alternate path or the like, are taken by the routers 1 through 8 immediately.

The Twenty-Seventh Preferred Embodiment

The twenty-seventh preferred embodiment of the present invention will now be described with reference to FIG. 12. FIG. 12 is a block structural diagram of an obstruction restoration control device incorporated in this twenty-seventh preferred embodiment of the present invention.

In this twenty-seventh preferred embodiment of the present invention, there are provided an obstruction situation analysis section 36 which analyzes the situation of obstructions according to the results of detection by the obstruction occurrence detection section 31, and a obstruction ranking section 37 which assigns a ranking to the seriousness of the obstruction, according to the result of the analysis by this obstruction situation analysis section 36, with a higher ranking indicating that the obstruction is a more serious one for which the possibility of restoration is low; and the advertisement emission section 32 performs advertisement of obstructions whose ranking is greater than a predetermined ranking by referring to the results of ranking assignment performed by the obstruction ranking section 37.

In other words, with this twenty-seventh preferred embodiment of the present invention, advertisement is not performed initially for an obstruction of low ranking for which restoration can be expected within a very short time period. By doing this, it is possible to alleviate the processing load upon the routers 1 through 8.

The Twenty-Eighth Preferred Embodiment

The twenty-eighth preferred embodiment of the present invention will now be described with reference to FIG. 13 and FIGS. 14A through 14C. FIG. 13 is a block structural diagram of an obstruction restoration control device incorporated in this twenty-eighth preferred embodiment of the present invention. And FIGS. 14A through 14C are diagrams showing the contents of an LSA packet which is used in the network according to this twenty-eighth preferred embodiment of the present invention.

In this twenty-eighth preferred embodiment of the present invention, as shown in FIG. 13, there are provided to the obstruction restoration control device 30 an obstruction situation analysis section 36 which analyzes the obstruction situation according to the results of detection by the obstruction occurrence detection section 31, an obstruction ranking section 37 which assigns a ranking which shows the seriousness of an obstruction according to the analysis result of this obstruction information analysis section 36, with an obstruction whose ranking is high being one for which the probability of restoration is low, and a predicted time period information retention section 34 which retains information relating to the predicted time period for restoration which is required for obstruction restoration by the lower layer network; and the advertisement emission section 32 refers to the results of ranking allocation by the obstruction ranking section 37 and, for an obstruction of ranking which is less than the predetermined ranking, emits a limited advertisement which includes limitation information to the effect that advertisement is being performed limited to the routers 7 and 8 which are directly related to the lower layer network which is obstructed. Furthermore, if the obstructed transmission line has not been restored even after the predicted time period for restoration which is retained by the predicted time period information retention section 34 has elapsed from the emission of this limited advertisement, a prohibition removal advertisement is emitted to the effect that the limitation is removed.

For example, if the advertisement transfer sections 47 of the routers 7 and 8 are made so that, when they receive the limited advertisement, according to its limitation information, they prevent advertisement to the other routers 1 through 6 until such a prohibition removal advertisement is received, then the routers 1 through 6 are able to defer the updating of the topology information until the prohibition removal advertisement.

In other words, for example, as shown in FIG. 14A, "LSA" may be written into a limited advertisement as a packet type identifier, and "24-22" which identifies the point of the obstruction may be written into the limited advertisement as obstruction information, and "prohibit advertisement" may be written into the limited advertisement as a supplemental item. When the advertisement transfer sections 47 of the routers 7 and 8 which are in the state of awaiting the advertisement receive this LSA packet, according to "prohibit advertisement" which is written in its supplemental item, they prevent its advertisement to the other routers 1 through 6, and transit into the advertisement transfer standby state.

In the advertisement emission section 32 of the obstruction restoration control device 30, if the restoration has not been completed even though the predicted time period for restoration of the obstruction which has been obtained by referring to the predicted time period information retention section 34 has elapsed from the emission of the limited advertisement shown in FIG. 14A, then, as shown in FIG. 14B, an LSA packet is emitted with "remove advertisement prohibition" written into its supplemental item. When the advertisement transfer sections 47 of the routers 7 and 8 receive this LSA packet, according to "remove advertisement prohibition" which is written in its supplemental item, they transfer this advertisement to the other routers 1 through 6, and transit into the advertisement transfer state.

Or, in the advertisement emission section 32 of the obstruction restoration control device 30, if the restoration has been completed before the predicted time period for restoration of the obstruction which has been obtained by referring to the predicted time period information retention section 34 has elapsed from the emission of the limited advertisement shown in FIG. 14A, then, as shown in FIG. 14C, an LSA packet is emitted with "restored" written into the obstruction information. When the advertisement transfer sections 47 of the routers 7 and 8 receive this LSA packet, according to "removed" which is written in its supplemental item, they cancel the advertisement transfer standby state and revert to the advertisement standby state.

The Twenty-Ninth Preferred Embodiment

The twenty-ninth preferred embodiment of the present invention will now be described with reference to FIG. 15 and FIGS. 16A through 16B. FIG. 15 is a diagram showing a portion of a network for explaining this twenty-ninth preferred embodiment of the present invention. And FIGS. 16A through 16B are diagrams showing an SRLG (Shared Risk Link Group).

In this twenty-ninth preferred embodiment of the present invention, the obstruction situation analysis section 36 of the obstruction restoration control device 30 detects the number of transmission lines in which an obstruction has occurred at almost the same time, and the obstruction ranking section 37 assigns a ranking based upon this number.

When detecting the number of transmission lines in which an obstruction has occurred at almost the same time, as shown in FIGS. 16A through 16B, the obstruction factors are divided into groups, and a table is provided in which are recorded the transmission lines in which stoppage may occur corresponding to the occurrence of obstruction in the obstruction factors which are included in the various groups, and the number of transmission lines in which an obstruction has occurred at almost the same time is detected by referring to this table.

In other words, by an SRLG is meant a set of objects which, when an obstruction has occurred in a single obstruction factor, receive an influence therefrom at the same time, and, in this example showing the twenty-ninth preferred embodiment of the present invention, the photonic cross connects 22 through 26 and the links 80 through 85 constitute obstruction factors, while the objects which, when an obstruction has occurred in these, receive an influence therefrom, are the six optical paths upon the wavelengths $\lambda 1$ through $\lambda 6$.

Since, when an obstruction has occurred in any of the photonic cross connects 22, 24, or 25 or in either of the links 82 or 83, its influence is experienced by the three optical paths upon the wavelengths λ1 through λ3, these are grouped into a first group #1. Furthermore, since, when an obstruction has occurred in any of the photonic cross connects 22, 26, or 25 or in either of the links 84 or 85, its influence is experienced by the two optical paths upon the wavelengths λ4 and λ5, these are grouped into a second group #2. Furthermore since, when an obstruction has occurred in any of the photonic cross connects 22, 23, or 25 or in either of the links 80 or 81, its influence is experienced by the single optical path upon the wavelength λ6, this constitutes a third group #3. The tables shown in FIGS. 16A and 16B are ones which have been formed from these correspondence relationships The tables shown in FIGS. 16A and 16B are provided in the obstruction situation analysis section 36, and, upon an obstruction factor being identified from the obstruction information which is written into an LSA packet, it is possible to find out the number of optical paths which will receive an influence corresponding to the occurrence of an obstruction of this obstruction factor by referring to this table. In the obstruction ranking section 37, a ranking is allocated to the degree of importance of the obstruction, according to this number. In this twenty-ninth preferred embodiment of the present invention, since there are three groups #1, #2, and #3, a ranking "H" is assigned to the occurrence of an obstruction in the obstruction factors which are included in the group #1, a ranking "M" is assigned to the occurrence of an obstruction in the obstruction factors which are included in the group #2, and a ranking "L" is assigned to the occurrence of an obstruction in the single obstruction factor which is included in the group #3.

The Thirtieth Preferred Embodiment

The thirtieth preferred embodiment of the present invention will now be described with reference to FIG. 17. FIG. 17 is a block structural diagram of an obstruction restoration control device incorporated in this thirtieth preferred embodiment of the present invention.

In this thirtieth preferred embodiment of the present invention, as shown in FIG. 17, a restoration priority ranking retention section 35, which retains information as to the restoration priority rankings when performing obstruction restoration of transmission lines upon the lower layer network, is provided to the obstruction restoration control device 30; the obstruction situation analysis section 36 obtains information which is retained by the restoration priority ranking retention section 35 as to the restoration priority ranking for the transmission line in which an obstruction has occurred; and the obstruction ranking section 37 assigns a ranking to indicate the seriousness of the obstruction, the value of which is inversely proportional to the restoration priority ranking, and which is thus the greater, the lower is the probability of restoration of the obstruction.

In other words, although this has also been explained with regard to the twenty-sixth preferred embodiment and FIG. 11, for a plurality of transmission lines in which obstruction has occurred almost the same time, a priority ranking is provided for their restoration, and the lowest ranking is assigned to the transmission line for which restoration is anticipated the most quickly after the occurrence of the obstruction, while the highest ranking is assigned to the transmission line for which restoration is anticipated last after the occurrence of the obstruction.

The Thirty-First Preferred Embodiment

The network of the thirty-first preferred embodiment of the present invention will now be described with reference to FIG. 18 and FIG. 19. FIG. 18 is a block structural diagram of an obstruction restoration control device incorporated in this thirty-first preferred embodiment of the present invention. And FIG. 19 is a diagram for explanation of a ranking assignment method in this thirty-first preferred embodiment of the present invention.

In this thirty-first preferred embodiment of the present invention, as shown in FIG. 18, a link state information retention section 38 which retains the link state information related to the detailed structure of the lower layer network is provided to the obstruction restoration control device 30. This link state information retention section 38, as shown in FIG. 19, retains small scale topology information which is limited to the lower layer network to which this node itself belongs.

And the obstruction situation analysis section 36 detects the degree of concentration of network resources by referring to the link state information which is related to the detailed structure of the lower layer network upon which the obstruction shown in FIG. 19 has occurred. In the example shown in FIG. 19, when the points of obstruction A and B are compared, the degree of concentration of network resources is higher at A than at B. The obstruction ranking section 37 assigns a ranking to indicate the seriousness of the obstruction, the value of which is inversely proportional to the degree of concentration, and which is thus the greater, the lower is the probability of restoration for the obstruction.

In other words, at a point at which network resources are concentrated, it is easy to establish an alternate path, so that it is possible to anticipate restoration within a short period of time; but, at a point at which network resources are sparse, it is difficult to establish an alternate path, so that it is not possible to anticipate restoration within a short period of time. Accordingly, the value of the ranking which is assigned is inversely proportional to the degree of concentration of network resources.

The Thirty-Second Preferred Embodiment

The thirty-second preferred embodiment of the present invention will now be described with reference to FIGS. 20 through 22. This thirty-second preferred embodiment relates to a method for setting the predicted time period for restoration which is retained by the predicted time period information retention section 34. FIG. 20 is a block structural diagram of a predicted time period information retention section of this thirty-second preferred embodiment of the present invention. FIG. 21 is a diagram showing a transmission line during duplex operation. And FIG. 22 is a diagram showing a transmission line which has an alternate path.

The predicted time period information retention section 34 of this thirty-second preferred embodiment comprises a link state information retention section 38 which retains the link state information related to the detailed structure of the lower layer network, and a predicted restoration time period calculation section 39 which calculates a predicted time period for restoration for each of the transmission lines, based upon the capability for alternate path establishment which can be attributed to each transmission line of the lower layer network, as estimated from the link state information which is retained by this link state information retention section 38. Furthermore, the result of calculation by this predicted restoration time period calculation section 39 is recorded in a predicted restoration time period information table 70.

As the capability for alternate path establishment, along with the predicted restoration time period calculation section 39 calculating the predicted time period for restoration for transmission lines during duplex operation as being almost zero, as shown in FIG. 21, also, during the occurrence of an obstruction, it again recognizes the transmission lines as being simplex transmission lines. In other words, as shown in FIG. 21, when transmitting the same data by duplex operation using a working path and a protection path, the predicted time period for restoration when an obstruction occurs upon either of these paths may be considered as being zero. However, since if an obstruction has occurred upon either one of these paths it ceases to be a duplex operation transmission line, in this type of case, a re-calculation is performed for the predicted time period for restoration as a simplex transmission line.

Or, as the capability for alternate path establishment, the predicted restoration time period calculation section 39 may calculate the predicted time period for restoration based upon the presence or absence of alternate paths at both the ends of the transmission line which is the object of the calculation, and upon the state of vacancy or occupancy of the alternate paths. In other words, in the example shown in FIG. 22, when the transmission line which is the object of the calculation is a transmission line which is spread over the optical paths upon the wavelengths $\lambda 1$ and $\lambda 2$, first, the presence or absence of alternate paths for it is investigated, and then the states of occupancy of the wavelengths for these alternate paths are investigated.

In the example shown in FIG. 22, alternate paths exist, and, in the state of occupancy (1), the optical paths upon the wavelengths $\lambda 4$ and $\lambda 5$ are vacant. Accordingly, the predicted time period for restoration in this case is the time period required for switching over the photonic cross connect. In the state of occupancy (2), although two vacant wavelengths are required, all of the wavelengths are occupied. Furthermore, in the state of occupancy (3), only the wavelength $\lambda 3$ is vacant. In this type of case, the predicted time period for restoration is calculated based upon the probability of occurrence of two vacant wavelengths, which is based upon statistical data from the past. It should be understood that if, in FIG. 21, an obstruction occurs upon either the working path or the protection path, the same method may be employed when re-calculating the predicted time period for restoration as a simplex transmission line.

The Thirty-Three Preferred Embodiment

The thirty-third preferred embodiment of the present invention will now be described with reference to FIG. 23 and FIG. 24. FIG. 23 is a block structural diagram of a predicted time period information retention section of this thirty-third preferred embodiment of the present invention. And FIG. 24 is a diagram for explanation of a method for calculating a predicted restoration time period in this thirty-third preferred embodiment of the present invention. This thirty-third preferred embodiment relates to a method for setting the predicted time period for restoration which is retained by the predicted time period information retention section 34.

In this thirty-third preferred embodiment of the present invention, the predicted time period information retention section 34 comprises an obstruction restoration simulation section 71 which calculates the predicted time period for restoration between the two photonic cross connects 22 and 25 between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when, in simulation, an obstruction has occurred in this virtual working path. Furthermore, the result of this calculation by the obstruction restoration simulation section 71 is recorded in the predicted restoration time period information table 70.

In other words, in the example of FIG. 24, an optical path of wavelength $\lambda 1$ is established as the working path between the photonic cross connects 22 and 25. Furthermore, an optical path of wavelength $\lambda 3$ is established as the protection path between them. Under this type of condition, in order to calculate the predicted time period for restoration, the obstruction restoration simulation section 71 sets a vacant wavelength $\lambda 2$ of the same link as the link over which the working path is established as being a virtual working path, and also sets a vacant wavelength $\lambda 4$ of the same link as the link over which the protection path is established as being a virtual protection path.

Having in this manner established a virtual working path and a virtual protection path, a simulated obstruction is generated in the virtual working path. As a procedure for generating such a simulated obstruction, for example, an LSA packet may be emitted in which is written simulated obstruction information from one of the photonic cross connects 22, 24, or 25. By doing this, it is possible to obtain the predicted time period for restoration by measuring the time period over which the changeover from the virtual working path to the virtual protection path is actually performed by cooperation of the photonic cross connects 22, 23, 24, and 25.

The Thirty-Fourth Preferred Embodiment

The thirty-fourth preferred embodiment of the present invention will now be described with reference to FIG. 23 and FIG. 25. FIG. 23 is a block structural diagram of a predicted time period information retention section of this thirty-fourth preferred embodiment of the present invention, which is common with the thirty-third preferred embodiment described above. And FIG. 25 is a diagram for explanation of a method for calculating a predicted restoration time period in this thirty-fourth preferred embodiment of the present invention. This thirty-fourth preferred embodiment relates to a method for setting the predicted time period for restoration which is retained by the predicted time period information retention section 34.

In this thirty-fourth preferred embodiment of the present invention, the predicted time period information retention section 34 comprises an obstruction restoration simulation section 71 which calculates the predicted time period for restoration between the two photonic cross connects 22 and 25 between which a path is already established, by taking a path which occupies a vacant band in the vicinity of the path (the actual path) as a virtual path, by searching for an alternate path for the virtual path when a simulated obstruction has been generated in this virtual path, and by calculating the time period which is required for changing over the path from the virtual path to the alternate path as being the predicted time period for restoration. Furthermore, the result of this calculation by the obstruction restoration simulation section 71 is recorded in the predicted restoration time period information table 70.

In other words, in the example of FIG. 25, an optical path of wavelength λ1 is established as the actual path between the photonic cross connects 22 and 25. Under this type of condition, in order to calculate the predicted time period for restoration, the obstruction restoration simulation section 71 sets a vacant wavelength λ2 of the same link as the link over which the actual path is established as being the virtual path.

Having in this manner established a virtual path, a simulated obstruction is generated in this virtual path. As a procedure for generating such a simulated obstruction, for example, an LSA packet may be emitted in which is written simulated obstruction information from one of the photonic cross connects 22, 24, or 25. By doing this, by establishing an alternate path upon the simulated occurrence of an obstruction in the virtual path, it is possible to obtain the predicted time period for restoration by measuring the time period over which the changeover from the virtual path to the alternate path is actually performed by cooperation of the photonic cross connects 22, 24, or 25. Thus, in the example shown in FIG. 25, the path #1 is taken as the alternate path, and the path through the photonic cross connects 22⇆23⇆25 is established; and, further, the path #2 is taken as the alternate path, and the path through the photonic cross connects 22⇆26⇆25 is established.

The Thirty-Fifth Preferred Embodiment

The obstruction restoration control device 30 which is applied to the network of the above preferred embodiments of the present invention may be implemented using a computer device, which is an information processing device. In other words, by installing upon a computer device a program which implements upon that computer a function, provided upon a lower layer network which is connected between at least two routers, corresponding to the obstruction restoration control device 30, and comprising a function, corresponding to the restoration control section 33, of performing obstruction restoration upon this lower layer network, a function, corresponding to the obstruction occurrence detection section 31, of detecting the occurrence of an obstruction upon a transmission line which it accommodates itself, and a function, corresponding to the advertisement emission section 32, of advertising as obstruction information the results of detection by this function which corresponds to the obstruction occurrence detection section 31; and which implements, as a function which corresponds to the advertisement emission section 32, a function of deferring for a time period T the emission of an advertisement from the time instant that an obstruction has been detected by the function which corresponds to the obstruction occurrence detection section 31, it is possible to make that computer device serve as a device which corresponds to the obstruction restoration control device 30 of these preferred embodiments of the present invention.

In more detail, by installing upon a computer device a program which implements upon that computer a function, provided upon a lower layer network which is connected between at least two routers, corresponding to the obstruction restoration control device 30, and, as shown in FIG. 3, comprising a function, corresponding to the restoration control section 33, of performing obstruction restoration upon this lower layer network, a function, corresponding to the obstruction occurrence detection section 31, of detecting the occurrence of an obstruction upon a transmission line which it accommodates itself, and a function, corresponding to the advertisement emission section 32, of advertising as obstruction information the results of detection by this function which corresponds to the obstruction occurrence detection section 31; and which implements a function, corresponding to the predicted time period information retention section 34, of retaining information about the time period which it is predicted will be required for restoration of obstruction of the lower layer network, and, as a function which corresponds to the advertisement emission section 32, a first advertisement function of performing a first advertisement immediately the occurrence of an obstruction upon the lower layer network has been detected by the function which corresponds to the obstruction occurrence detection section 31, and a second advertisement function of performing a second advertisement when restoration of the obstruction upon the transmission line has not been implemented, even though the predicted time period for restoration which was retained by the function which corresponds to the predicted time period information retention section 34 has elapsed from the time instant that the first advertisement by the first advertisement function has been advertised, it is possible to make that computer device serve as a device which corresponds to the obstruction restoration control device 30 of the twenty-second preferred embodiment of the present invention.

Or, by installing upon a computer device a program which implements upon that computer a function, provided upon a lower layer network which is connected between at least two routers, corresponding to the obstruction restoration control device 30, and, as shown in FIG. 10, comprising a function, corresponding to the restoration control section 33, of performing obstruction restoration upon this lower layer network, a function, corresponding to the obstruction occurrence detection section 31, of detecting the occurrence of an obstruction upon a transmission line which it accommodates itself, and a function, corresponding to the advertisement emission section 32, of advertising as obstruction information the results of detection by this function which corresponds to the obstruction occurrence detection section 31; and which implements a function, corresponding to the restoration priority ranking section 35, of retaining information about the restoration priority ranking for when performing obstruction restoration for the transmission line upon the lower layer network, and, as a function which corresponds to the advertisement emission section 32, a function, for a plurality of the transmission lines upon which an obstruction has occurred at almost the same time, of setting the lengths of the time periods from the time instant of the first advertisement to the time instant of the second advertisement to be inversely proportional to the respective restoration priority rankings which are retained by the priority ranking retention function, it is possible to make that computer device serve as a device which corresponds to the obstruction restoration control device 30 of the twenty-sixth preferred embodiment of the present invention.

Or, by installing upon a computer device a program which implements upon that computer a function, provided upon a lower layer network which is connected between at least two routers, corresponding to the obstruction restoration control device 30, and, as shown in FIG. 3, comprising a function, corresponding to the obstruction restoration control device 30, of performing obstruction restoration upon this lower layer network, a function, corresponding to the obstruction occurrence detection section 31, of detecting the occurrence of an obstruction upon a transmission line which it accommodates itself, and a function, corresponding to the advertisement emission section 32, of advertising as obstruction information the results of detection by this function which corresponds to the obstruction occurrence detection section 31; and which implements a function, corresponding to the predicted time period information retention section 34, of retaining information about the time period which it is predicted will be required for performing obstruction restoration for the transmission line upon the lower layer network, and, as a function which corresponds to the advertisement emission section 32, a function of obtaining information about the time period which it is predicted will be required for performing obstruction restoration by referring to the result of detection by the function corresponding to the obstruction occurrence detection section 31, and to the predicted time period for restoration which is retained by the function corresponding to the predicted time period information retention section 34, and a function of performing an advertisement which includes information about the predicted time period for restoration which has been obtained by this obtaining function, it is possible to make that computer device serve as a device which corresponds to the obstruction restoration control device 30 of the twenty-third preferred embodiment of the present invention.

Or, by installing upon a computer device a program which implements upon that computer a function, provided upon a lower layer network which is connected between at least two routers, corresponding to the obstruction restoration control device 30, and comprising a function, corresponding to the restoration control section 33, of performing obstruction restoration upon this lower layer network, a function, corresponding to the obstruction occurrence detection section 31, of detecting the occurrence of an obstruction upon a transmission line which it accommodates itself, and a function, corresponding to the advertisement emission section 32, of advertising as obstruction information the results of detection by this function which corresponds to the obstruction occurrence detection section 31; and which implements, as a function which corresponds to the advertisement emission section 32, a function of performing advertisement at a constant period while an obstruction is being detected by the function corresponding to the obstruction occurrence detection section 31, it is possible to make that computer device serve as a device which corresponds to the obstruction restoration control device 30 of the twenty-fourth preferred embodiment of the present invention.

Or, by installing upon a computer device a program which implements upon that computer a function, provided upon a lower layer network which is connected between at least two routers, corresponding to the obstruction restoration control device 30, and, as shown in FIG. 10, comprising a function, corresponding to the restoration control section 33, of performing obstruction restoration upon this lower layer network, a function, corresponding to the obstruction occurrence detection section 31, of detecting the occurrence of an obstruction upon a transmission line which it accommodates itself, and a function, corresponding to the advertisement emission section 32, of advertising as obstruction information the results of detection by this function which corresponds to the obstruction occurrence detection section 31; and which implements a function, corresponding to the obstruction situation analysis section 36, of analyzing the obstruction situation according to the results of detection by the function which corresponds to the obstruction occurrence detection section 31, and a function, corresponding to the obstruction ranking section 37, of assigning a ranking which shows the seriousness of the obstruction, and is the higher the lower is the probability of restoration of the obstruction, according to the results of analysis by this function which corresponds to the obstruction situation analysis section 36, and, as a function which corresponds to the advertisement emission section 32, an appended condition advertisement function of performing an advertisement for obstructions of ranking higher than a predetermined ranking by referring to the results of ranking assignment by the function corresponding to the obstruction ranking section 37, it is possible to make that computer device serve as a device which corresponds to the obstruction restoration control device 30 of the twenty-seventh preferred embodiment of the present invention.

Or, by installing upon a computer device a program which implements upon that computer a function, provided upon a lower layer network which is connected between at least two routers, corresponding to the obstruction restoration control device 30, and, as shown in FIG. 11, comprising a function, corresponding to the restoration control section 33, of performing obstruction restoration upon this lower layer network, a function, corresponding to the obstruction occurrence detection section 31, of detecting the occurrence of an obstruction upon a transmission line which it accommodates itself, and a function, corresponding to the advertisement emission section 32, of advertising as obstruction information the results of detection by this function which corresponds to the obstruction occurrence detection section 31; and which implements a function, corresponding to the obstruction situation analysis section 36, of analyzing the obstruction situation according to the results of detection by the function which corresponds to the obstruction occurrence detection section 31, a function, corresponding to the obstruction ranking section 37, of assigning a ranking which shows the seriousness of the obstruction, and is the higher the lower is the probability of restoration of the obstruction, according to the results of analysis by this function which corresponds to the obstruction situation analysis section 36, and a function, corresponding to the predicted time period information retention section 34, of retaining information regarding the time period which it is predicted will be required for restoration of obstruction upon the lower layer network, and, as a function which corresponds to the advertisement emission section 32, a function of, for obstructions of ranking higher than a predetermined ranking with reference to the results of ranking assignment by the function corresponding to the obstruction ranking section 37, emitting a limited advertisement which includes limitation information to the effect that advertisement is to be performed limited to the routers which are directly related to the obstruction upon the lower layer network, and a function of emitting a prohibition removing advertisement to the effect that the limitation is removed, when the obstruction upon the lower layer network has not been restored even after the predicted time period for restoration which was retained by the function corresponding to the predicted time period information retention section 34 has elapsed from the emission of this limited advertisement, it is possible to make that computer device serve as a device which corresponds to the obstruction restoration control device 30 of the twenty-eighth preferred embodiment of the present invention.

As a function which corresponds to the obstruction situation analysis section 36, a function may be implemented of detecting the number of the transmission lines in which an obstruction has occurred at almost the same time; and, as a function which corresponds to the obstruction ranking section 37, a function may be implemented of assigning a ranking based upon this number. In this case, as shown in FIG. 16, as the function for detecting the number, there may be implemented a function of dividing the obstruction factors into groups and setting up a table in which is recorded the transmission lines in which stoppage may occur, against the occurrences of obstruction of obstruction factors which belong to each group, and a function of detecting the number of transmission lines upon which an obstruction has occurred at almost the same time by referring to this table.

Or, as shown in FIG. 17, there may be implemented a function which corresponds to the restoration priority ranking retention section 35 of retaining information relating to the restoration priority ranking during obstruction restoration of the transmission lines of the lower layer network, and, as a function which corresponds to the obstruction situation analysis section 36, there may be implemented a function of obtaining the information relating to the restoration priority ranking of the transmission line in which an obstruction has occurred which is retained by the function which corresponds to the restoration priority ranking retention section 35, with a function being implemented, as a function which corresponds to the obstruction ranking section 37, of assigning a ranking which shows the seriousness of the obstruction, and which is inversely proportional to the priority ranking, being the higher, the lower is the probability of restoration.

Or, as shown in FIG. 18 and FIG. 19, as a function which corresponds to the obstruction situation analysis section 36, there may be implemented a function of detecting the degree of concentration of network resources by referring to the topology information for the lower layer network in which the obstruction has occurred which is stored by a function which corresponds to the link state information retention section 38, and, as a function which corresponds to the obstruction ranking section 37, there may be implemented a function of assigning a ranking which shows the seriousness of the obstruction, and which is inversely proportional to the degree of concentration, being the higher, the lower is the probability of restoration.

Or, as a function which corresponds to the predicted time period information retention section 34, as shown in FIG. 20, there may be implemented a function, which corresponds to the link state information retention section 38, retaining link state information which relates to the detailed structure of the lower layer network, and there may be implemented a function, corresponding to the predicted restoration time period calculation section 39, of calculating the predicted time period for restoration for each of the transmission lines, based upon the capability for alternate path establishment which is possessed by each of the transmission lines of the lower layer network, as estimated from the link state information which is retained by this function which corresponds to the link state information retention section 38.

At this time, as a function which corresponds to the predicted restoration time period calculation section 39, as shown in FIG. 21, there may be implemented a function of, as the capability for alternate path establishment, calculating the predicted time period for restoration for a transmission line during duplex operation as being almost zero, while re-recognizing the transmission line during the occurrence of an obstruction as being a transmission line during simplex operation. Or, as shown in FIG. 22, as a function which corresponds to the predicted restoration time period calculation section 39, there may be implemented a function of, as the capability for alternate path establishment, calculating the predicted time period for restoration based upon the presence or absence of alternate paths at both ends of the transmission line in which an obstruction has occurred, and upon the situation with regard to vacancy or occupancy of the alternate paths.

Or, as a function which corresponds to the predicted time period information retention section 34, as shown in FIG. 23 and FIG. 24, there may be implemented a function, corresponding to the obstruction restoration simulation section 71, of calculating the predicted time period for restoration of an obstruction between two nodes for which a working path and a protection path are established, by taking paths which have vacant bands in the vicinity of the working path and the protection path respectively as a virtual working path and a virtual protection path, and by calculating as the predicted time period for restoration the time period which is required for changing over from the virtual working path to the virtual protection path, when a simulated obstruction is generated in this virtual working path.

Or, as a function which corresponds to the predicted time period information retention section 34, as shown in FIG. 23 and FIG. 25, there may be implemented a function, corresponding to the obstruction restoration simulation section 71, of calculating the predicted time period for restoration of an obstruction between two nodes for which a path is already established, by taking a path which has a vacant band in the vicinity of the path as a virtual path, and by calculating as the predicted time period for restoration the time period which is required, when a simulated obstruction is generated in this virtual path, for searching out an alternate path for the virtual path, and for changing over from the virtual path to the alternate path.

By recording the program of this preferred embodiment of the present invention upon a recording medium according to this preferred embodiment, it is possible to install the program of this preferred embodiment upon a computer device by using this recording medium. Or, it is possible to install the program of this preferred embodiment directly upon a computer device via a network from a server upon which the program of this preferred embodiment is stored.

By doing this, an obstruction restoration control technique using a computer device is proposed for application to a multi-layer network, with which it is possible to implement an obstruction restoration control device 30 and a network, with which it can be anticipated that effective advantage can be taken of network resources.

The Thirty-Sixth Preferred Embodiment

The thirty-sixth preferred embodiment of the present invention will now be described with reference to FIG. 26. FIG. 26 is a diagram showing a predicted time period information data base and a restoration priority ranking data base in this thirty-sixth preferred embodiment of the present invention.

In the twenty-second through the thirty-fourth preferred embodiments of the present invention, the explanation was made in terms of the predicted time period information retention section 34 and the restoration priority ranking retention section 35 being provided to the obstruction restoration control device 30; but, in this thirty-sixth preferred embodiment of the present invention, as shown in FIG. 26, these are provided as, respectively, a predicted time period information data base 90 and a restoration priority ranking data base 91 in separate and independent nodes upon the network, and the obstruction restoration control device 30 is so constituted as to obtain the various items of information which it requires, and which are stored in these data bases, by accessing the data bases.

Next, the thirty-seventh through the fifty-second preferred embodiments of the present invention will now be described with reference to FIG. 1 through FIG. 4. FIG. 1 is a conceptual view of a network according to any of these thirty-seventh through fifty second preferred embodiments of the present invention. FIG. 2 is a structural diagram of a photonic cross connect incorporated in any of these thirty-seventh through fifty-second preferred embodiments of the present invention. FIG. 3 is a block structural diagram of an obstruction restoration control device incorporated in the thirty-seventh preferred embodiment of the present invention. And FIG. 4 is a block structural diagram of a router incorporated in the thirty-seventh preferred embodiment of the present invention.

The Thirty-Seventh Preferred Embodiment

This thirty-seventh preferred embodiment is a network which comprises a plurality of nodes and transmission lines established between these nodes; among this plurality of nodes, routers 1 through 8 are upper layer nodes and photonic cross connects 10 through 26 are lower layer nodes; at least two of these routers 1 through 8 are connected together by a lower layer network which includes a plurality of the photonic cross connects and transmission lines between them; in this lower layer network, an obstruction restoration control device 30 is provided to each of the plurality of the photonic cross connects 10 through 26 for jointly performing obstruction restoration; and the obstruction restoration control devices 30 of the routers 1 through 8 and the photonic cross connects 10 through 26 comprise respective obstruction occurrence detection sections 31, 41 which detect the occurrence of obstruction in the transmission lines which they accommodate themselves, and advertisement emission sections 32, 42 which advertise the results of this detection by these obstruction occurrence detection sections 31, 41 as obstruction information; and each of the routers 1 through 8 upon the network comprising a topology information retention section 43 which retains the topology information for the network, a topology information updating section 46 which updates the topology information which this router itself retains according to obstruction information which has been advertised or obstruction information which this router itself has detected, and an advertisement transfer section 47 which advertises obstruction information which has been advertised to the other ones of the routers 1 through 8.

Here, the particular distinguishing feature of this thirty-seventh preferred embodiment of the present invention consists of the fact an warning protection section 48 is provided which defers updating of the topology information by the topology information updating section 46 for a time period T from the time instant that the obstruction information has been advertised.

In each of the routers 1 through 8, it may happen that the router itself detects the occurrence of an obstruction by the obstruction occurrence detection section 41, or it may happen that the occurrence of the obstruction is detected by advertisement from the lower layer network; but an obstruction which is detected by the obstruction occurrence detection section 41 is an obstruction at the level of the upper layer network which consists of the routers 1 through 8 shown in FIG. 56. By contrast to this, an obstruction which is detected by advertisement from the lower layer network is an obstruction at the level of the lower layer network which includes the photonic cross connects 10 through 26 shown in FIG. 55.

In other words, an obstruction which is detected by an obstruction occurrence detection section 41 is a serious obstruction such as one in which a stoppage has occurred in almost the entire lower layer network between routers, and it is a type of obstruction for which immediate restoration can hardly be expected. By contrast to this, an obstruction which is detected by advertisement from the lower layer network is a trifling obstruction such as one in which a stoppage has taken place upon only a portion of the lower layer network, and it is a type of obstruction for which it is possible to expect immediate restoration such as by establishment of an alternate path or the like.

With this preferred embodiment of the present invention, the explanation will be provided in terms of the occurrence of an obstruction at the lower layer network level from which immediate restoration can be expected.

It should be understood that although, with this description of the preferred embodiment of the present invention, the explanation is made in terms of the detection of the occurrence of an obstruction by advertisement from the lower layer network, apart from this, it would also be possible to detect the occurrence of an obstruction upon the lower layer network by error lookout for keep alive signals for the links, or the K1/K2 byte defined in an SDH, or the like, being emitted from the routers 1 through 8 themselves as well, and it would be possible to explain this preferred embodiment in the same manner even using a method such as this for detecting the occurrence of an obstruction, instead of advertising by means of an LSA packet such as is explained in this description of this preferred embodiment.

In the obstruction restoration control device 30, there is provided a predicted time period information retention section 34 which retains information relating to the predicted time period which is required for obstruction restoration of the lower layer network, and the advertisement emission section 32 of the obstruction restoration control device 30 obtains the information of the predicted time period required for the restoration by referring to the result of detection by the obstruction occurrence detection section 31 and to the predicted time period for restoration which has been retained in the predicted time period information retention section 34, and makes an advertisement which includes this information of the predicted time period for restoration which has been obtained. The warning protection sections 48 of the routers 1 through 8 take the predicted time period for restoration which is included in the advertisement as the time period T. It should be understood that, in the figure which is shown as the structural diagram of the network, the obstruction restoration control device 30 has been omitted.

The Thirty-Eighth Preferred Embodiment

The thirty-eighth preferred embodiment of the present invention will now be described with reference to FIG. 5. FIG. 5 is a block structural diagram of an advertisement transfer section incorporated in the thirty-eighth preferred embodiment of the present invention.

In this thirty-eighth preferred embodiment of the present invention, the advertisement transfer section 47 of each of the routers 1 through 8 comprises an advertisement deferral section 49 which defers advertisement to the other routers until the deferral time period of the warning protection section 48 has elapsed.

According to this thirty-eighth preferred embodiment of the present invention, the upper layer nodes 7 and 8 which are directly connected to the lower layer network in which an obstruction has occurred receive advertisement immediately after the occurrence of an obstruction, but they defer updating their topology information for the time period T. By contrast to this, the upper layer nodes 1 through 6 which are not directly connected to the lower layer network in which the obstruction has occurred receive advertisement transferred from the upper layer nodes 7 and 8 only after the time period T has elapsed, and as a result, their updating of their topology information is deferred by a total time period of 2T. Accordingly, it is possible to provide a difference in deferral time period between the upper layer nodes 7 and 8 to which the lower layer network in which the obstruction has occurred is directly connected, and the other upper layer nodes 1 through 6. In this manner, the upper layer nodes 7 and 8 which are directly connected to the lower layer network in which the obstruction has occurred update their topology information after the time period T, and, even after obstruction avoidance measures such as establishing an alternate path or the like have started, the other upper layer nodes 1 through 6 defer the updating of their topology information by a further time period T; and if, during this time period, the lower layer network is able to restore the obstruction, since the requirement to return the topology information to its original state is limited to the upper layer nodes 7 and 8 which are directly connected to the lower layer network in which the obstruction occurred, it is possible to provide a further stage of prevention of spreading of the influence of updates of topology information over the entire network.

Or, according to this thirty-eighth preferred embodiment of the present invention, if both routers which do comprise warning protection sections 48 and routers which do not are present in the network together, then, by the routers which do comprise warning protection sections 48 also comprising advertisement deferral sections 49 which defer advertisement to the other routers which do not comprise warning protection sections 48, the routers which do not comprise warning protection sections 48 also come to be able to behave in the same manner as the routers which do comprise warning protection sections 48. Due to this, it is possible for a network in which both routers which do comprise warning protection sections 48 and routers which do not are mixed together to operate as a network according to the present embodiment.

The Thirty-Ninth Preferred Embodiment

The thirty-ninth preferred embodiment of the present invention will now be described with reference to FIG. 6 and FIG. 7. FIG. 6 is a block structural diagram of a router incorporated in this thirty-ninth preferred embodiment of the present invention. And FIG. 7 is a block structural diagram of an obstruction restoration control device incorporated in this thirty-ninth preferred embodiment of the present invention.

In this thirty-ninth preferred embodiment of the present invention, each of the routers 1 through 8 comprises a predicted time period information retention section 50 which retains information of the predicted time period which is required for obstruction restoration by the lower layer network. The warning protection section 48 obtains information about the predicted time period which is required for the restoration by referring to the obstruction information and to the predicted time period for restoration which is retained by the predicted time period information retention section 50, and takes the predicted time period for restoration which has been obtained as being the time period T. Accordingly, as shown in FIG. 7, the obstruction restoration control devices 30 which are provided to the photonic cross connects 10 through 26 are not required to incorporate any predicted time period information retention sections.

The Fortieth Preferred Embodiment

The fortieth preferred embodiment of the present invention will now be described with reference to FIG. 8. FIG. 8 is a diagram for explanation of a deferral time period determination method of this fortieth preferred embodiment of the present invention.

In this fortieth preferred embodiment of the present invention, the advertisement emission sections 32 in the obstruction restoration control devices 30 of the photonic cross connects 10 through 26 perform advertisement at a fixed period during the detection of an obstruction by the obstruction occurrence detection sections 31. The warning protection sections 48 of the routers 1 through 8 take the time period T as being the time period until this advertisement has been received a number of times which is determined in advance.

According to this fortieth preferred embodiment of the present invention, it is not necessary for the actual contents, of the advertisement which is emitted by the advertisement emission section 32 of the obstruction restoration control device 30 to be complicated, since it will suffice for the advertisement which is performed at a fixed period simply to include information to the effect that an obstruction has occurred; and accordingly it is possible to alleviate the processing load upon the advertisement emission sections 32.

As a structure for the routers 1 through 8, the structure shown in FIG. 6 will be adequate, with the alteration that, instead of the time period T being set by the predicted time period information retention section 50, this time period T should be changed into the number of times that an advertisement is received.

The Forty-First Preferred Embodiment

The network according to the forty-first preferred embodiment of the present invention will now be explained with reference to FIG. 9. FIG. 9 is a diagram for explanation of a deferral time period determination method of this forty-first preferred embodiment of the present invention.

In this forty-first preferred embodiment of the present invention, as shown in FIG. 3, the obstruction restoration control devices 30 which are provided to the photonic cross connects 10 through 26 are each provided with a predicted time period information retention section 34. The advertisement emission section 32 performs a first advertisement immediately after the detection of the occurrence of an obstruction of the lower layer network by the obstruction occurrence detection section 31, and it performs a second advertisement if and when obstruction restoration for the lower layer network has not been implemented even though the predicted time period for restoration which has been retained in the predicted time period information retention section 34 has elapsed from the time instant that this first advertisement has been performed.

The warning protection sections 48 of the routers 1 through 8 take the time period from the time instant that the first advertisement is received until the time instant that the second advertisement is received as being the time period T.

The Forty-Second Preferred Embodiment

The network according to the forty-second preferred embodiment of the present invention will now be explained with reference to FIG. 10 and FIG. 11. FIG. 10 is a block structural diagram of an obstruction restoration control device incorporated in this forty-second preferred embodiment of the present invention. And FIG. 11 is a diagram for explanation of a deferral time period determination method of this forty-second preferred embodiment of the present invention.

In this forty-second preferred embodiment of the present invention, as shown in FIG. 10, the obstruction restoration control devices 30 of the photonic cross connects 10 through 26 comprise restoration priority ranking retention sections 35 which retain information regarding the restoration priority rankings when performing obstruction restoration for the transmission lines in the lower layer network.

As shown for example in FIG. 11, when the transmission line is a wavelength division multiplexed transmission line, a large number of wavelength paths may be blocked at the same time by the occurrence of an obstruction in the transmission line. In this sort of case, to restore all of the wavelength paths at the same time would be very difficult to implement, so that a priority ranking is set for the restoration to be performed in a specified order. Generally, the more important are the contents of the communication which is being handled, the higher is the priority ranking set to be. The restoration priority ranking retention section 35 retains in advance the restoration priority ranking information for the performance of obstruction restoration.

Under these type of conditions, in this forty-second preferred embodiment of the present invention, the advertisement emission section 32 of the obstruction restoration control device 30, for a plurality of wavelength paths upon which obstruction has occurred at almost the same moment, sets the individual values for the length of the time period from the time instant of the first advertisement to the time instant of the second advertisement by making them to be inversely proportional to the restoration priority rankings which are retained by the restoration priority ranking retention section 35.

In other words, as shown in FIG. 11, for a wavelength path λ1 of the highest priority ranking for which quick restoration can be expected, the time period from the first advertisement until the second advertisement is set to be long, based upon the prediction that restoration of the lower layer network will be completed immediately, and probably will not even take as long as required for the routers 1 through 8 to establish an alternate path. In the example shown in FIG. 11, the restoration is completed before the appointed time instant for emission of the second advertisement, and accordingly this second advertisement is not actually emitted.

On the other hand, for a wavelength path λn of the lowest priority ranking for which a quick restoration cannot be expected, the time period from the first advertisement until the second advertisement is set to be short, based upon the prediction that obstruction avoidance measures by the routers 1 through 8 will probably prove to be necessary. By doing this, obstruction avoidance measures, such as establishing an alternate path or the like, are taken by the routers 1 through 8 immediately.

The Forty-Third Preferred Embodiment

The forty-third preferred embodiment of the present invention will now be described with reference to FIG. 12. FIG. 12 is a block structural diagram of an obstruction restoration control device incorporated in this forty-third preferred embodiment of the present invention.

In this forty-third preferred embodiment of the present invention, there are provided an obstruction situation analysis section 36 which analyzes the situation of obstructions according to the results of detection by the obstruction occurrence detection section 31, and a obstruction ranking section 37 which assigns a ranking to the seriousness of the obstruction, according to the result of the analysis by this obstruction situation analysis section 36, with a higher ranking indicating that the obstruction is a more serious one for which the possibility of restoration is low; and the advertisement emission section 32 performs advertisement of obstructions whose ranking is greater than a predetermined ranking by referring to the results of ranking assignment performed by the obstruction ranking section 37.

In other words, with this forty-third preferred embodiment of the present invention, advertisement is not performed initially for an obstruction of low ranking for which restoration can be expected within a very short time period. By doing this, it is possible to alleviate the processing load upon the routers 1 through 8.

The Forty-Fourth Preferred Embodiment

The forty-fourth preferred embodiment of the present invention will now be explained with reference to FIGS. 13 and 14A through 14C. FIG. 13 is a block structural diagram of an obstruction restoration control device incorporated in this forty-fourth preferred embodiment of the present invention. And FIGS. 14A through 14C are diagrams showing the contents of an LSA packet which is used in the network according to this forty-fourth preferred embodiment of the present invention.

In this forty-fourth preferred embodiment of the present invention, as shown in FIG. 13, there are provided to the obstruction restoration control device 30 an obstruction situation analysis section 36 which analyzes the obstruction situation according to the results of detection by the obstruction occurrence detection section 31, an obstruction ranking section 37 which assigns a ranking which shows the seriousness of an obstruction according to the analysis result of this obstruction information analysis section 36, with an obstruction whose ranking is high being one for which the probability of restoration is low, and a predicted time period information retention section 34 which retains information relating to the predicted time period for restoration which is required for obstruction restoration by the lower layer network; and the advertisement emission section 32 refers to the results of ranking allocation by the obstruction ranking section 37 and, for an obstruction of ranking which is less than the predetermined ranking, emits a limited advertisement which includes limitation information to the effect that advertisement is being performed limited to the routers 7 and 8 which are directly related to the lower layer network which is obstructed. Furthermore, if the obstructed transmission line has not been restored even after the predicted time period for restoration which is retained by the predicted time period information retention section 34 has elapsed from the emission of this limited advertisement, a prohibition removing advertisement is emitted to the effect that the limitation is removed.

When the advertisement transfer sections 47 of the routers 7 and 8 receive the limited advertisement, according to its limitation information, they prevent advertisement to the other routers 1 through 6 until the receipt of the prohibition removing advertisement.

In other words, as shown in FIG. 14A, "LSA" may be written into a limited advertisement as a packet type identifier, and "24-22" which identifies the point of the obstruction may be written as obstruction information, and "prohibit advertisement" may be written as a supplemental item. When the advertisement transfer sections 47 of the routers 7 and 8 which are in the advertisement standby state receive this LSA packet, according to "prohibit advertisement" which is written in its supplemental item field, they prevent its advertisement to the other routers 1 through 6, and transit into the advertisement transfer standby state.

In the advertisement emission section 32 of the obstruction restoration control device 30, if the restoration has not been completed even though the predicted time period for restoration of the obstruction which has been obtained by referring to the predicted time period information retention section 34 has elapsed from the emission of the limited advertisement shown in FIG. 14A, then, as shown in FIG. 14B, an LSA packet is emitted with "remove advertisement prohibition" written into its supplemental item field. When the advertisement transfer sections 47 of the routers 7 and 8 receive this LSA packet, according to "remove advertisement prohibition" which is written in its supplemental item field, they transfer this advertisement to the other routers 1 through 6, and transit into the advertisement transfer state.

Or, in the advertisement emission section 32 of the obstruction restoration control device 30, if the restoration has been completed before the predicted time period for restoration of the obstruction which has been obtained by referring to the predicted time period information retention section 34 has elapsed from the emission of the limited advertisement shown in FIG. 14A, then, as shown in FIG. 14C, an LSA packet is emitted with "restored" written into its supplemental item. When the advertisement transfer sections 47 of the routers 7 and 8 receive this LSA packet, according to "restored" which is written in its supplemental item, they cancel the advertisement transfer standby state and revert to the advertisement standby state.

The Forty-Fifth Preferred Embodiment

The forty-fifth preferred embodiment of the present invention will now be explained with reference to FIGS. 15 and 16A through 16B. FIG. 15 is a diagram showing a portion of a network for explaining this forty-fifth preferred embodiment of the present invention. And FIGS. 16A through 16B are diagrams showing an SRLG (Shared Risk Link Group).

In this forty-fifth preferred embodiment of the present invention, the obstruction situation analysis section 36 of the obstruction restoration control device 30 detects the number of transmission lines in which an obstruction has occurred at almost the same time, and the obstruction ranking section 37 assigns a ranking based upon this number.

When detecting the number of transmission lines in which an obstruction has occurred at almost the same time, as shown in FIGS. 16A and 16B, the obstruction factors are divided into groups, and a table is provided in which are recorded the transmission lines in which stoppage may occur corresponding to the occurrence of obstruction in the obstruction factors which are included in the various groups, and the number of transmission lines in which an obstruction has occurred at almost the same time is detected by referring to this table.

In other words, an SRLG means a set of objects which, when an obstruction has occurred in a single obstruction factor, receive an influence therefrom at the same time, and, in this example showing the forty-fifth preferred embodiment of the present invention, the photonic cross connects 22 through 26 and the links 80 through 85 constitute obstruction factors, while the objects which, when an obstruction has occurred in these, receive an influence therefrom, are the six optical paths upon the wavelengths λ1 through λ6.

Since, when an obstruction has occurred in any of the photonic cross connects 22, 24, or 25 or in either of the links 82 or 83, its influence is experienced by the three optical paths upon the wavelengths λ1 through λ3, these are grouped into a first group #1. Furthermore, since, when an obstruction has occurred in any of the photonic cross connects 22, 26, or 25 or in either of the links 84 or 85, its influence is experienced by the two optical paths upon the wavelengths λ4 and λ5, these are grouped into a second group #2. Furthermore since, when an obstruction has occurred in any of the photonic cross connects 22, 23, or 25 or in either of the links 80 or 81, its influence is experienced by the single optical path upon the wavelength λ6, this constitutes a third group #3. The tables shown in FIGS. 16A and 16B are ones which have been formed from these correspondence relationships.

The tables shown in FIGS. 16A and 16B are provided in the obstruction situation analysis section 36, and, upon an obstruction factor being identified from the obstruction information which is written into an LSA packet, it is possible to find out the number of optical paths which will receive an influence corresponding to the occurrence of an obstruction of this obstruction factor by referring to this table. In the obstruction ranking section 37, a ranking is allocated to the degree of importance of the obstruction, according to this number. In this forty-fifth preferred embodiment of the present invention, since there are three groups #1, #2, and #3, a ranking "H" is assigned to the occurrence of an obstruction in the obstruction factors which are included in the group #1, a ranking "M" is assigned to the occurrence of an obstruction in the obstruction factors which are included in the group #2, and a ranking "L" is assigned to the occurrence of an obstruction in the single obstruction factor which is included in the group #3.

The Forty-Sixth Preferred Embodiment

The forty-sixth preferred embodiment of the present invention will now be described with reference to FIG. 17. FIG. 17 is a block structural diagram of an obstruction restoration control device incorporated in this forty-sixth preferred embodiment of the present invention.

In this forty-sixth preferred embodiment of the present invention, as shown in FIG. 17, a restoration priority ranking retention section 35, which retains information as to the restoration priority rankings when performing obstruction restoration of transmission lines upon the lower layer network, is provided to the obstruction restoration control device 30; the obstruction situation analysis section 36 obtains information which is retained by the restoration priority ranking retention section 35 as to the restoration priority ranking for the transmission line in which an obstruction has occurred; and the obstruction ranking section 37 assigns a ranking to indicate the seriousness of the obstruction, the value of which is inversely proportional to the restoration priority ranking, and which is thus the greater, the lower is the probability of restoration of the obstruction.

In other words, as explained with regard to the forty-second preferred embodiment and FIG. 11, for a plurality of transmission lines in which obstruction has occurred almost the same time, a priority ranking is provided for their restoration, and the lowest ranking is assigned to the transmission line for which restoration is anticipated the most quickly after the occurrence of the obstruction, while the highest ranking is assigned to the transmission line for which restoration is anticipated last after the occurrence of the obstruction.

The Forty-Seventh Preferred Embodiment

The network according to the forty-seventh preferred embodiment of the present invention will now be described with reference to FIGS. 18 and 19. FIG. 18 is a block structural diagram of an obstruction restoration control device incorporated in this forty-seventh preferred embodiment of the present invention. And FIG. 19 is a diagram for explanation of a ranking assignment method in this forty-seventh preferred embodiment of the present invention.

In this forty-seventh preferred embodiment of the present invention, as shown in FIG. 18, a link state information retention section 38 which retains the link state information related to the detailed structure of the lower layer network is provided to the obstruction restoration control device 30. This link state information retention section 38, as shown in FIG. 19, retains small scale topology information which is limited to the lower layer network to which this node itself belongs.

And the obstruction situation analysis section 36 detects the degree of concentration of network resources by referring to the link state information which is related to the detailed structure of the lower layer network upon which the obstruction shown in FIG. 19 has occurred. In the example shown in FIG. 19, when the points of obstruction A and B are compared, the degree of concentration of network resources is higher at A than at B. The obstruction ranking section 37 assigns a ranking to indicate the seriousness of the obstruction, the value of which is inversely proportional to the degree of concentration, and which is thus the greater, the lower is the probability of restoration for the obstruction.

In other words, at a point at which network resources are concentrated, it is easy to establish an alternate path, so that it is possible to anticipate restoration within a short period of time; but, at a point at which network resources are sparse, it is difficult to establish an alternate path, so that it is not possible to anticipate restoration within a short period of time. Accordingly, the value of the ranking which is assigned is inversely proportional to the degree of concentration of network resources.

The Forty-Eighth Preferred Embodiment

The forty-eighth preferred embodiment of the present invention will now be explained with reference to FIG. 20 through FIG. 22. This forty-eighth preferred embodiment relates to a method for setting the predicted time period for restoration over which the predicted time period information retention section 34 performs its retention. FIG. 20 is a block structural diagram of a predicted time period information retention section of this forty-eighth preferred embodiment of the present invention. FIG. 21 is a diagram showing a transmission line during duplex operation. And FIG. 22 is a diagram showing a transmission line which has an alternate path.

The predicted time period information retention section 34 of this forty-eighth preferred embodiment comprises a link state information retention section 38 which retains the link state information related to the detailed structure of the lower layer network, and a predicted restoration time period calculation section 39 which calculates a predicted time period for restoration for each of the transmission lines, based upon the capability for alternate path establishment which can be attributed to each transmission line of the lower layer network, as estimated from the link state information which is retained by this link state information retention section 38. Furthermore, the result of calculation by this predicted restoration time period calculation section 39 is recorded in a predicted restoration time period information table 70.

As the capability for alternate path establishment, along with the predicted restoration time period calculation section 39 calculating the predicted time period for restoration for transmission lines during duplex operation as being almost zero, as shown in FIG. 21, also, during the occurrence of an obstruction, it again recognizes the transmission lines as being simplex transmission lines. In other words, as shown in FIG. 21, when transmitting the same data by duplex operation using a working path and a protection path, the predicted time period for restoration when an obstruction occurs upon either of these paths may be considered as being zero. However, since if an obstruction has occurred upon either one of these paths it ceases to be a duplex operation transmission line, in this type of case, a re-calculation is performed for the predicted time period for restoration as a simplex transmission line.

Or, as the capability for alternate path establishment, the predicted restoration time period calculation section 39 may calculate the predicted time period for restoration based upon the presence or absence of alternate paths at both the ends of the transmission line which is the object of the calculation, and upon the state of vacancy or occupancy of the alternate paths. In other words, in the example shown in FIG. 22, when the transmission line which is the object of the calculation is a transmission line which is spread over the optical paths upon the wavelengths $\lambda 1$ and $\lambda 2$, first, the presence or absence of alternate paths for it is investigated, and then the states of occupancy of the wavelengths for these alternate paths are investigated.

In the example shown in FIG. 22, alternate paths do exist, and, in the state of occupancy (1), the optical paths upon the wavelengths $\lambda 4$ and $\lambda 5$ are vacant. Accordingly, the predicted time period for restoration in this case is the time period required for switching over the photonic cross connect. In the state of occupancy (2), although two vacant wavelengths are required, all of the wavelengths are occupied. Furthermore, in the state of occupancy (3), only the wavelength $\lambda 3$ is vacant. In this type of case, the predicted time period for restoration is calculated based upon the probability of occurrence of two vacant wavelengths, which is based upon statistical data from the past. It should be understood that if, in FIG. 21, an obstruction occurs upon either the working path or the protection path, the same method may be employed when re-calculating the predicted time period for restoration as a simplex transmission line.

The Forty-Ninth Preferred Embodiment

The forty-ninth preferred embodiment of the present invention will now be explained with reference to FIGS. 23 and 24. FIG. 23 is a block structural diagram of a predicted time period information retention section of this forty-ninth preferred embodiment of the present invention. And FIG. 24 is a diagram for explanation of a method for calculating a predicted restoration time period in this forty-ninth preferred embodiment of the present invention. This forty-ninth preferred embodiment relates to a method for setting the predicted time period for restoration over which the predicted time period information retention section 34 performs its retention.

In this forty-ninth preferred embodiment of the present invention, the predicted time period information retention section 34 comprises an obstruction restoration simulation section 71 which calculates the predicted time period for restoration between the two photonic cross connects 22 and 25 between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when, in simulation, an obstruction has been generated in this virtual working path. Furthermore, the result of this calculation by the obstruction restoration simulation section 71 is recorded in the predicted restoration time period information table 70.

In other words, in the example of FIG. 24, an optical path of wavelength λ1 is extended as the working path between the photonic cross connects 22 and 25. Furthermore, an optical path of wavelength λ3 extends as the protection path between them. Under this type of condition, in order to calculate the predicted time period for restoration, the obstruction restoration simulation section 71 sets a vacant wavelength λ2 of the same link as the link over which the working path is established as being a virtual working path, and also sets a vacant wavelength λ4 of the same link as the link over which the protection path extends as being a virtual protection path.

Having in this manner established a virtual working path and a virtual protection path, a simulated obstruction is generated in the virtual working path. As a procedure for generating such a simulated obstruction, for example, an LSA packet may be emitted in which is written simulated obstruction information from one of the photonic cross connects 22, 24, or 25. By doing this, it is possible to obtain the predicted time period for restoration by measuring the time period over which the changeover from the virtual working path to the virtual protection path is actually performed by cooperation of the photonic cross connects 22, 23, 24, and 25.

The Fiftieth Preferred Embodiment

The fiftieth preferred embodiment of the present invention will now be explained with reference to FIGS. 23 and 25. FIG. 23 is a block structural diagram of a predicted time period information retention section of this fiftieth preferred embodiment of the present invention, and is common with the forty-ninth preferred embodiment. And FIG. 25 is a diagram for explanation of a method for calculating a predicted restoration time period in this fiftieth preferred embodiment of the present invention. This fiftieth preferred embodiment relates to a method of setting the predicted time period for restoration which is retained by the predicted time period information retention section 34.

In this fiftieth preferred embodiment of the present invention, the predicted time period information retention section 34 comprises an obstruction restoration simulation section 71 which calculates the predicted time period for restoration between the two photonic cross connects 22 and 25 between which a path is already established, by taking a path which occupies a vacant band in the vicinity of the path (the actual path) as a virtual path, by searching for an alternate path for the virtual path when a simulated obstruction has been generated in this virtual path, and by calculating the time period which is required for changing over the path from the virtual path to the alternate path as being the predicted time period for restoration. Furthermore, the result of this calculation by the obstruction restoration simulation section 71 is recorded in the predicted restoration time period information table 70.

In other words, in the example of FIG. 25, an optical path of wavelength λ1 is extended as the actual path between the photonic cross connects 22 and 25. Under this type of condition, in order to calculate the predicted time period for restoration, the obstruction restoration simulation section 71 sets a vacant wavelength λ2 of the same link as the link over which the actual path is established as being the virtual path.

Having in this manner established a virtual path, a simulated obstruction is generated in this virtual path. As a procedure for generating such a simulated obstruction, for example, an LSA packet may be emitted in which is written simulated obstruction information from one of the photonic cross connects 22, 24, or 25. By doing this, the photonic cross connects 22, 23, 24, and 25 cooperate to establish an alternate path upon the simulated occurrence of an obstruction in the virtual path, measures the time period over which the changeover from the virtual path to the alternate path is actually performed, and thus it is possible to obtain the predicted time period for restoration. Thus, in the example shown in FIG. 25, the alternate path #1 taken as the path through the photonic cross connects 22⇆23⇆25 is established; and, further, the path #2 taken as the path through the photonic cross connects 22⇆26⇆25 is established.

The Fifty-First Preferred Embodiment

The routers 1 through 8 or the obstruction restoration control devices 30 which are used in the network according to this preferred embodiment of the present invention can be implemented by the use of a computer device, which is an information processing device.

As a function which corresponds to the devices which control the routers 1 through 8, by installing upon a computer device a program which implements a function, corresponding to the warning protection section 48, of deferring the updating of the topology information for a time period T from the time instant of advertisement of an obstruction information, it is possible to make that computer device serve as a device which corresponds to a device which controls the routers 1 through 8 of the thirty-seventh preferred embodiment of the present invention.

In other words, by installing upon a computer device a program which implements a function which corresponds to the predicted time period information retention section 34, and which implements, as a function which corresponds to the advertisement emission section 32, a function of obtaining information of the predicted time period for restoration which is required for the restoration by referring to the result of detection of a function which corresponds to the obstruction occurrence detection section 31, and to the predicted time period for restoration which is retained in a function which corresponds to the predicted time period information retention section 34, and a function of performing an advertisement which includes information of the predicted time period for restoration which has been obtained by this obtaining function, it is possible to make that computer device serve as a device which corresponds to the obstruction restoration control device 30 of the thirty-seventh preferred embodiment of the present invention.

In this case, as a function which corresponds to the warning protection sections 48 of the routers 1 through 8, by installing upon a computer device a program which implements a function of taking the predicted time period for restoration which is included in the advertisement as the time period T, it is possible to make that computer device serve as a device which corresponds to a device which controls the routers 1 through 8 of the thirty-seventh preferred embodiment of the present invention.

Or, as a function which corresponds to the advertisement transfer sections 47 of the routers 1 through 8, by installing upon a computer device a program which implements an advertisement deferral function, which corresponds to the warning protection section 48, of deferring advertisement to other routers until a deferral time period has elapsed, it is possible to make that computer device serve as a device which corresponds to a device which controls the routers 1 through 8 of the thirty-eighth preferred embodiment of the present invention.

Or, by installing upon a computer device a program which implements a function corresponding to the predicted time period information retention sections 50 of the routers 1 through 8, and, as a function which corresponds to the warning protection sections 48, a function of obtaining information of the predicted time period for restoration which is required for the restoration by referring to the obstruction information and to the predicted time period for restoration which is retained by the function which corresponds to the predicted time period information retention section 50, and a function of taking the predicted time period for restoration which has been obtained by the obtaining function as the time period T, it is possible to make that computer device serve as a device which corresponds to a device which controls the routers 1 through 8 of the thirty-ninth preferred embodiment of the present invention.

Or, as a function which corresponds to the advertisement emission section 32 of the obstruction restoration control device 30, by installing upon a computer device a program which implements a function of performing advertisements at fixed intervals during the detection of an obstruction by a function which corresponds to the obstruction occurrence detection section 31, it is possible to make that computer device serve as a device which corresponds to the obstruction restoration control device 30 of the fortieth preferred embodiment of the present invention.

In this case, as a function which corresponds to the warning protection sections 48 of the routers 1 through 8, by installing upon a computer device a program which implements a function of taking the time period until advertisement has been received a number of times which is determined in advance as the time period T, it is possible to make that computer device serve as a device which corresponds to a device which controls the routers 1 through 8 of the fortieth preferred embodiment of the present invention.

Or, by installing upon a computer device a program which implements a function which corresponds to the predicted time period information retention section 34, and, as a function which corresponds to the advertisement emission section 32, a first advertisement function of performing a first advertisement immediately after the occurrence of an obstruction upon the lower layer network has been detected by a function which corresponds to the obstruction occurrence detection section 31, and a second advertisement function of performing a second advertisement when obstruction restoration for the lower layer network has not been implemented even though the predicted time period for restoration which was retained by the function which corresponds to the predicted time period information retention section 34 has elapsed from the time instant that the first advertisement was advertised by this first advertisement function, it is possible to make that computer device serve as a device which corresponds to the obstruction restoration control device 30 of the forty-first preferred embodiment of the present invention.

In this case, as a function which corresponds to the warning protection section 48, by installing upon a computer device a program which implements a function of taking the time period from the time instant that the first advertisement is received until the time instant that the second advertisement is received as the time period T, it is possible to make that computer device serve as a device which corresponds to a device which controls the routers 1 through 8 of this forty-first preferred embodiment of the present invention.

Or, by installing upon a computer device a program which implements a function which corresponds to the restoration priority ranking retention section 35, and, as a function which corresponds to the advertisement emission section 32, a function, for a plurality of transmission lines in which obstructions have occurred at almost the same time, of setting the respective lengths of the time periods from their first advertisement time instants to their second advertisement time instants by making them inversely proportional to their restoration priority rankings which are retained by the function which corresponds to the restoration priority ranking retention section 35, it is possible to make that computer device serve as a device which corresponds to the obstruction restoration control device 30 of the forty-second preferred embodiment of the present invention.

Or, by implementing upon a computer device a function corresponding to the obstruction situation analysis section 36 of analyzing the obstruction situation according to the results of detection by a function which corresponds to the obstruction occurrence detection section 31, and a function, corresponding to the obstruction ranking section 37, of assigning a ranking which shows the degree of seriousness of the obstruction and is higher the lower is the probability of restoration from the obstruction, according to the results of analysis by this function which corresponds to the obstruction situation analysis section 36, and by installing a program which implements, as a function which corresponds to the advertisement emission section 32, an appended condition advertisement function of performing advertisement for obstructions whose ranking is greater than a predetermined ranking by referring to the results of assigning ranking by the function which corresponds to the obstruction ranking section 37, it is possible to make that computer device serve as a device which corresponds to the obstruction restoration control device 30 of the forty-third preferred embodiment of the present invention.

Or, by implementing upon a computer device a function corresponding to the obstruction situation analysis section 36 of analyzing the obstruction situation according to the results of detection by a function which corresponds to the obstruction occurrence detection section 31, a function corresponding to the obstruction ranking section 37 of assigning a ranking which shows the degree of seriousness of the obstruction and is higher the lower is the probability of restoration from the obstruction, according to the results of analysis by this function which corresponds to the obstruction situation analysis section 36, and a function, corresponding to the predicted time period information retention section 34, of retaining information relating to the predicted time period for restoration which is required for obstruction restoration by the lower layer network, and by installing a program which implements, as a function which corresponds to the advertisement emission section 32, a function of, for an obstruction of ranking which is less than a predetermined ranking by referring to the results of assigning ranking by the function which corresponds to the obstruction ranking section 37, emitting a limited advertisement which includes limitation information to the effect that advertisement is being performed limited only to the routers which are directly related to the lower layer network which is thus obstructed, and a function of emitting a prohibition removing advertisement to the effect that the limitation prohibition has been removed when the obstructed transmission line has not been restored even after the predetermined time period which is retained in the function which corresponds to the predicted time period information retention section 34 has elapsed from this limited advertisement, it is possible to make that computer device serve as a device which corresponds to the obstruction restoration control device of the forty-fourth preferred embodiment of the present invention.

In this case, by installing upon the computer device, as a function which corresponds to the routers 1 through 8, a program which implements a function, corresponding to the advertisement deferral section 49, of, when the limited advertisement is received, and until the prohibition removing advertisement is received, preventing advertisement to the other routers according to its limitation information, it is possible to make that computer device serve as a device which corresponds to the devices which control the routers 1 through 8 of this forty-fourth preferred embodiment of the present invention.

Or, by implementing upon a computer device, as a function corresponding to the obstruction situation analysis section 36, a function of detecting a number of the transmission lines in which obstruction has occurred at almost the same time, and by installing upon the computer device a program which implements, as a function which corresponds to the obstruction ranking section 37, a function of assigning a ranking based upon this number, it is possible to make that computer device serve as a device which corresponds to the obstruction restoration control device 30 of the forty-fifth preferred embodiment of the present invention.

In this case, the program of this preferred embodiment may implement, as the function of detecting the number, a table which, by separating the obstruction factors into groups, records the transmission line in which a stoppage occurs corresponding to the group to which belongs the obstruction factor of the occurrence of the obstruction, and a function of detecting the number of transmission lines in which an obstruction has occurred at almost the same time by referring to this table.

Or, by implementing upon a computer device a function corresponding to the restoration priority ranking retention section 35, and, as a function corresponding to the obstruction situation analysis section 36, a function of obtaining the information relating to the restoration priority ranking which is retained by the function which corresponds to the restoration priority ranking retention section 35 for the transmission line in which an obstruction has occurred, and by installing upon the computer device a program which implements, as a function which corresponds to the obstruction ranking section 37, a function of assigning a ranking showing the degree of seriousness of the obstruction which is higher the lower is the probability of restoration from the obstruction and is inversely proportional to the priority ranking, it is possible to make that computer device serve as a device which corresponds to the obstruction restoration control device 30 of the forty-sixth preferred embodiment of the present invention.

Or, by implementing upon a computer device, as a function corresponding to the obstruction situation analysis section 36, a function of detecting the degree of concentration of network resources by referring to the link state information relating to the detailed structure of the lower layer network in which the obstruction has occurred, and by installing upon the computer device a program which implements, as a function which corresponds to the obstruction ranking section 37, a function of assigning a ranking showing the degree of seriousness of the obstruction which is higher the lower is the probability of restoration from the obstruction and is inversely proportional to the degree of concentration, it is possible to make that computer device serve as a device which corresponds to the obstruction restoration control device 30 of the forty-seventh preferred embodiment of the present invention.

Or, by installing upon a computer device a program which implements, as a function which corresponds to the predicted time period information retention section 34, a function which corresponds to the link state information retention section 38 of retaining the link state information which is related to the detailed structure of the lower layer network, and a function of calculating the predicted time period for restoration for each transmission line based upon the capability for alternate path establishment which each the transmission line of the lower layer network possesses as estimated from the link state information which is retained by this function which corresponds to the link state information retention section 38, it is possible to make that computer device execute the method for establishing the predicted time period for restoration of the forty-eighth preferred embodiment of the present invention.

In more detail, as the function for calculating the predicted time period for restoration, as this capability for alternate path establishment, there may be implemented a function of, along with calculating the predicted time period for restoration for a transmission line during duplex operation as being almost zero, also re-recognizing the transmission line during the occurrence of an obstruction as a simplex transmission line. Or, as the function for calculating the predicted time period for restoration, as this capability for alternate path establishment, there may be implemented a function of calculating a predicted time period for restoration based upon the presence or absence of alternate paths at both ends of the transmission line which is the object of calculation, and upon the situation with regard to vacancy or occupancy of the alternate paths.

Or, by implementing upon a computer device a program which implements, as a function which corresponds to the predicted time period information retention section 34, a function of calculating the predicted time period for restoration between two photonic cross connects which are set as a working path and a protection path, by setting paths which have vacant bands in the vicinity of the working path and the protection path respectively as a virtual working path and a virtual protection path, and by, when a simulated obstruction is generated in this virtual working path, calculating the time period which is required for changing over from the virtual working path to the virtual protection path as being the predicted time period for restoration, it is possible to make that computer device execute the method for establishing the predicted time period for restoration of the forty-ninth preferred embodiment of the present invention.

Or, by implementing upon a computer device a program which implements, as a function which corresponds to the predicted time period information retention section 34, a function of calculating the predicted time period for restoration between two photonic cross connects which are already set as a path, by setting a path which has a vacant band in the vicinity of the path as a virtual path, and by, when a simulated obstruction is generated in this virtual path, searching out an alternate path for the virtual path, and calculating the time period which is required for the path to be changed over from the virtual path to the alternate path as being the predicted time period for restoration, it is possible to make that computer device execute the method for establishing the predicted time period for restoration of the fiftieth preferred embodiment of the present invention.

By recording the program of this preferred embodiment of the present invention upon a recording medium according to this preferred embodiment, it is possible to install the program of this preferred embodiment upon a computer device by using this recording medium. Or, it is possible to install the program of this preferred embodiment directly upon a computer device via a network from a server upon which the program of this preferred embodiment is stored.

By doing this, an obstruction restoration control technique using a computer device is proposed for application to a multi-layer network, with which it is possible to implement a network, routers 1 through 8, and photonic cross connects 10 through 26, with which it can be anticipated that effective advantage can be taken of network resources.

The Fifty-Second Preferred Embodiment

The fifty-second preferred embodiment of the present invention will now be explained with reference to FIG. 26. FIG. 26 is a diagram showing a predicted restoration time period information data base and a restoration priority ranking data base in this fifty-second preferred embodiment of the present invention.

In the thirty-seventh through the fiftieth preferred embodiments of the present invention, the explanation was made in terms of the predicted time period information retention section 34 and the restoration priority ranking retention section 35 being provided to the obstruction restoration control device 30, and in terms of the predicted time period information retention sections 50 being provided to the routers 1 through 8; but, in this fifty-second preferred embodiment of the present invention, as shown in FIG. 26, these are established as, respectively, a predicted time period information data base 90 and a restoration priority ranking data base 91 in separate and independent nodes upon the network, and the obstruction restoration control device 30 and the routers 1 through 8 are so constituted as to obtain the various items of information which they require, and which are stored in these data bases, by accessing the data bases.

Figure 40:
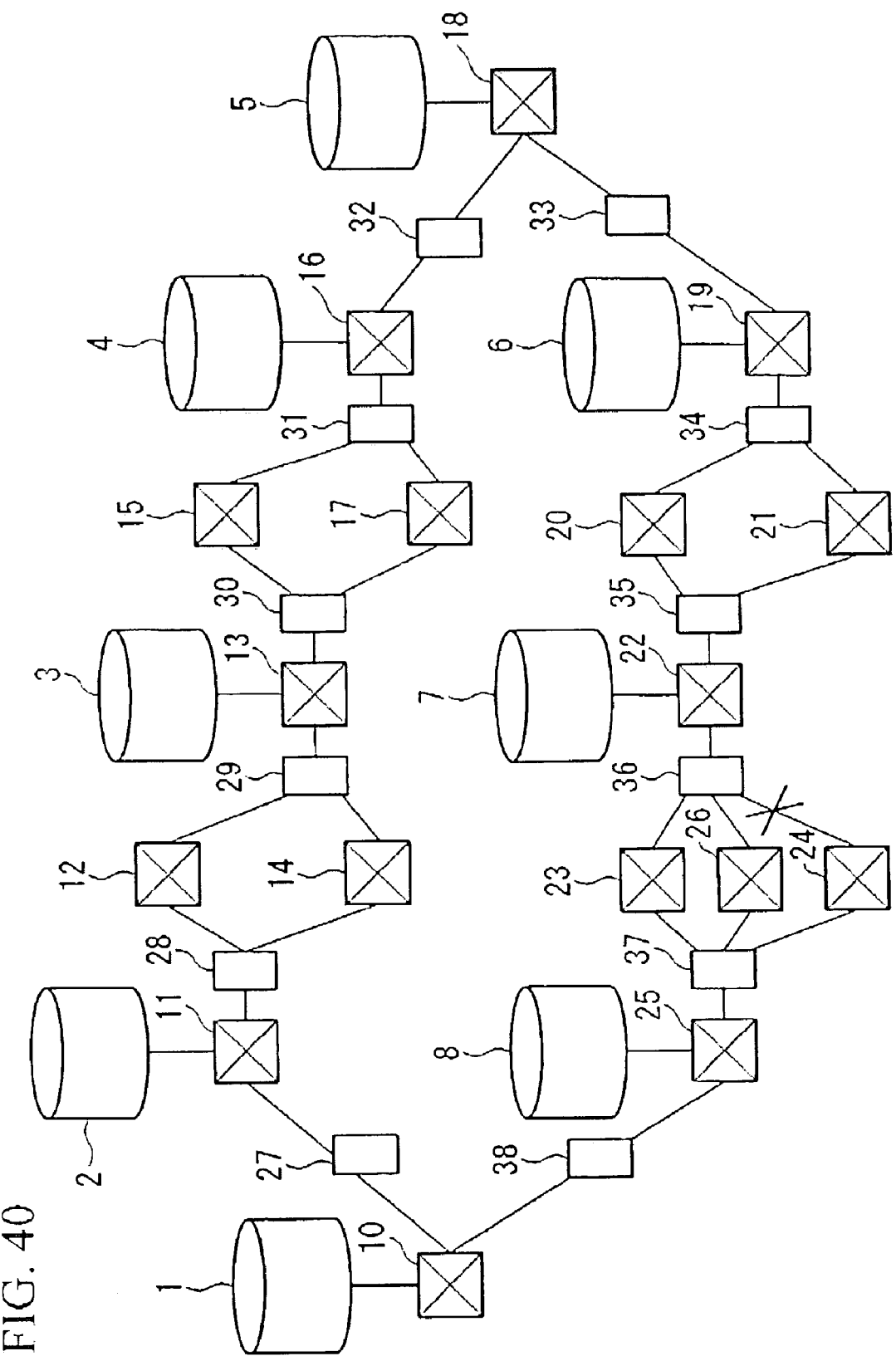
FIG. 40 is a diagram showing the structure of a network of the fifty-third through the sixtieth preferred embodiments of the present invention.
Figure 41:
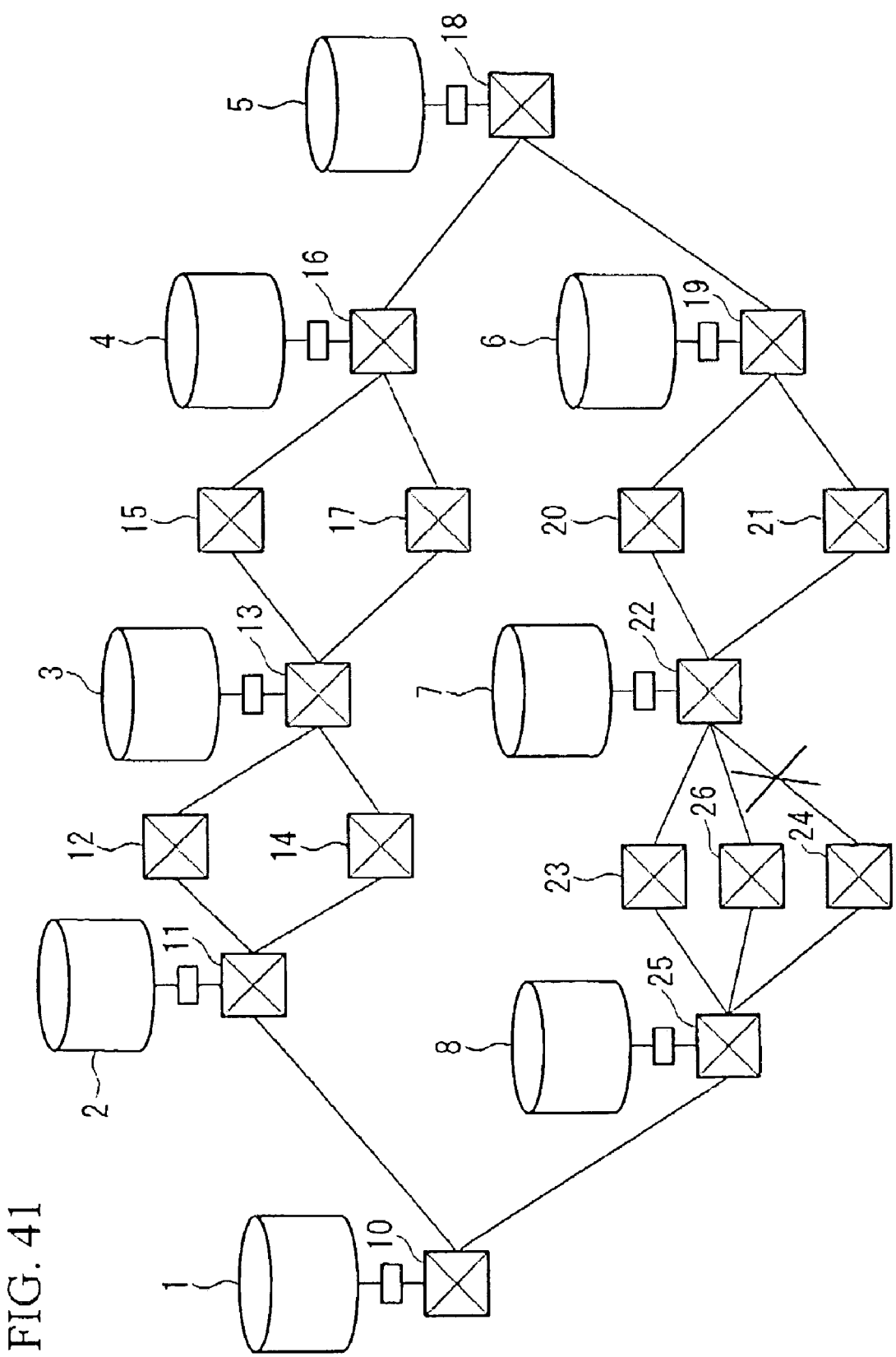
FIG. 41 is another diagram showing the structure of a network of the fifty-third through the sixtieth preferred embodiments of the present invention.
Figure 42:
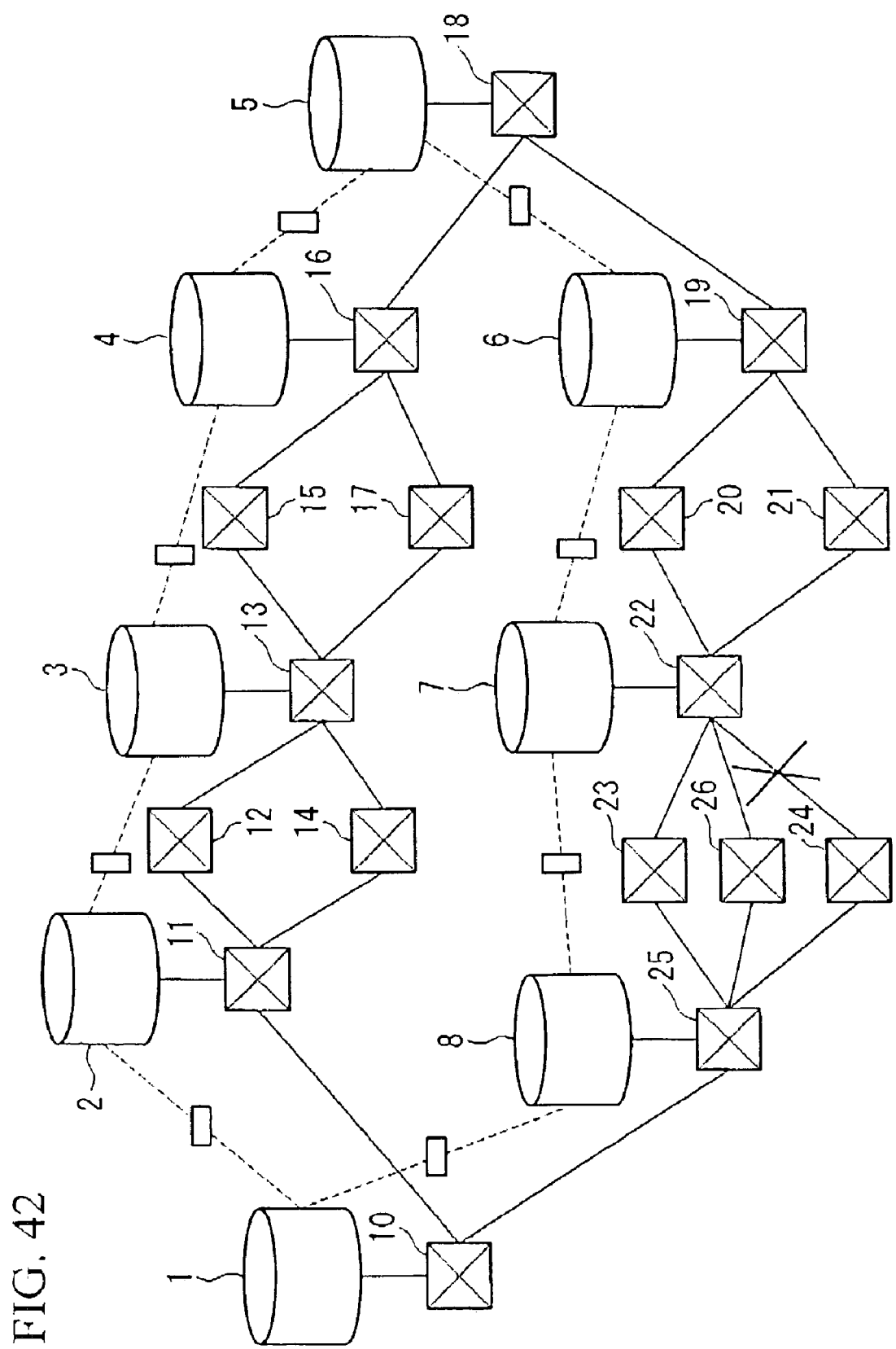
FIG. 42 is yet another diagram showing the structure of a network of the fifty-third through the sixtieth preferred embodiments of the present invention.
Figure 43:
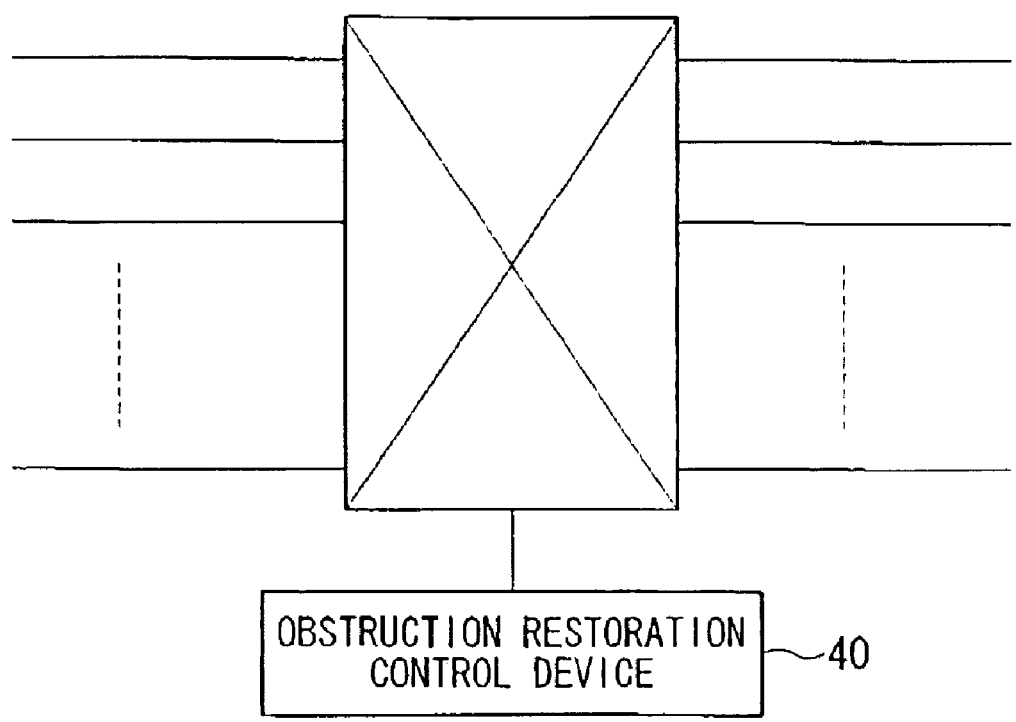
FIG. 43 is a diagram showing the structure of a photonic cross connect incorporated in any of these fifty-third through sixtieth preferred embodiments of the present invention.
Figure 44:
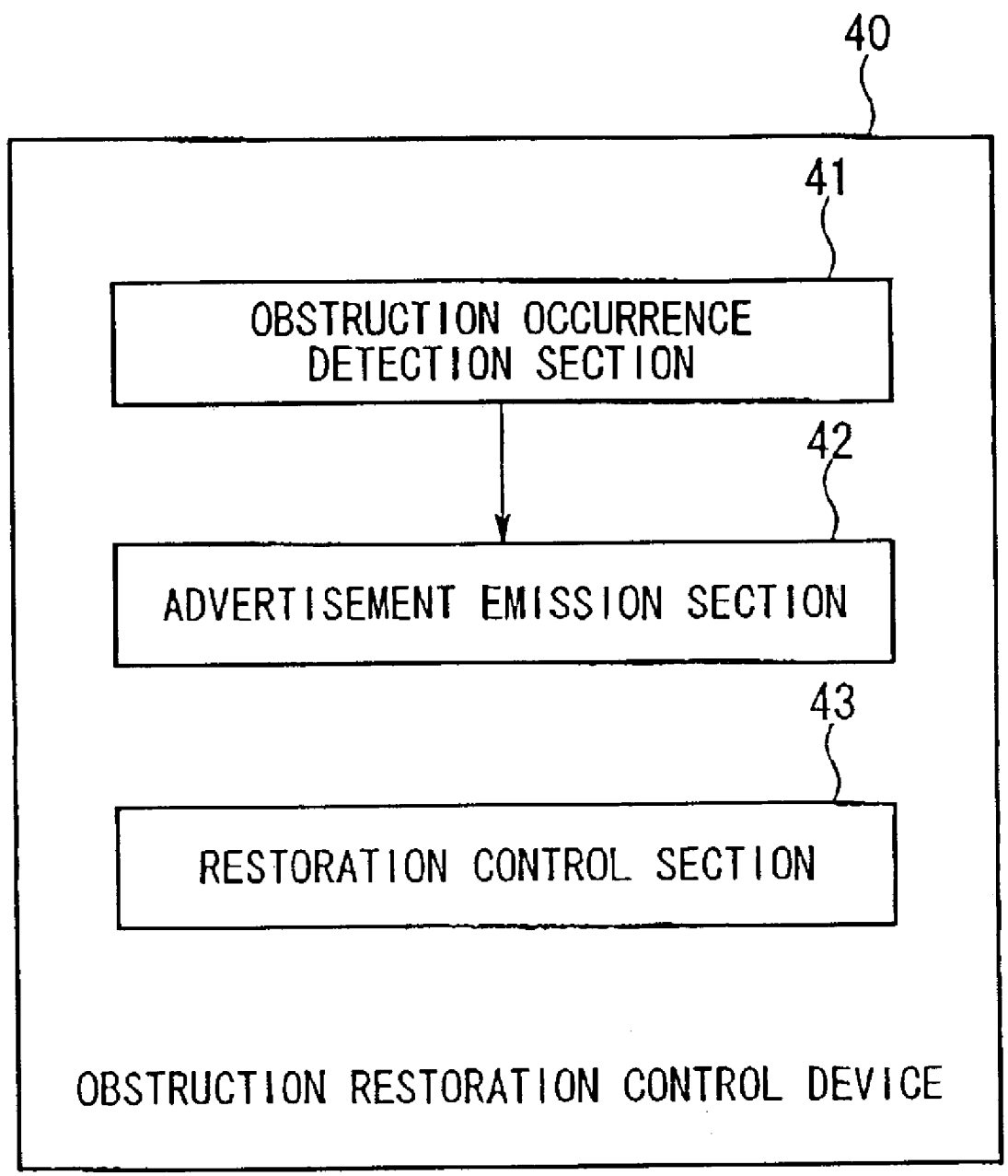
FIG. 44 is a block structural diagram of an obstruction restoration control device incorporated in any of these fifty-third through sixtieth preferred embodiments of the present invention.
Figure 45:
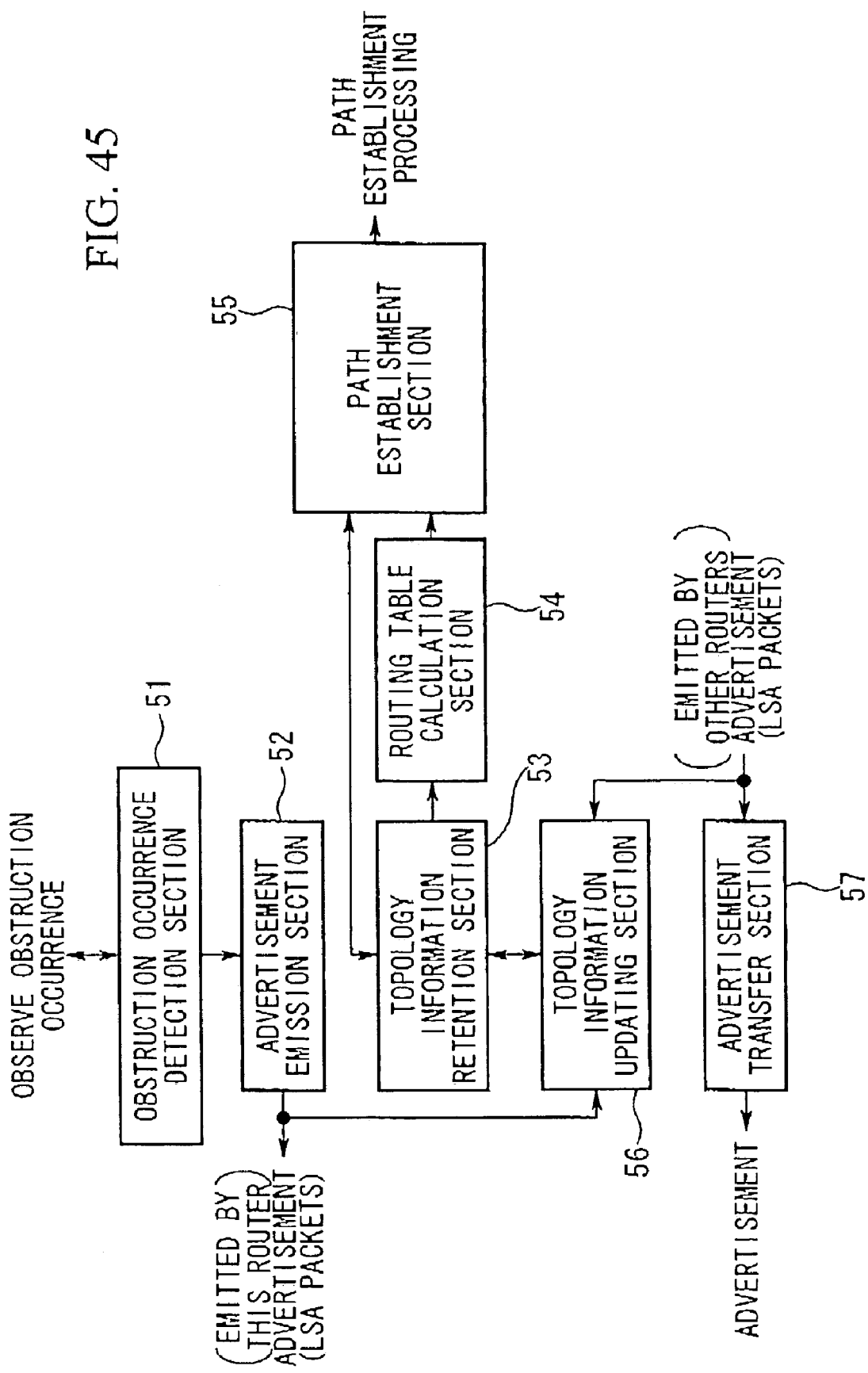
FIG. 45 is a block structural diagram of a router of any of these fifty-third through sixtieth preferred embodiments of the present invention.
Figure 46:
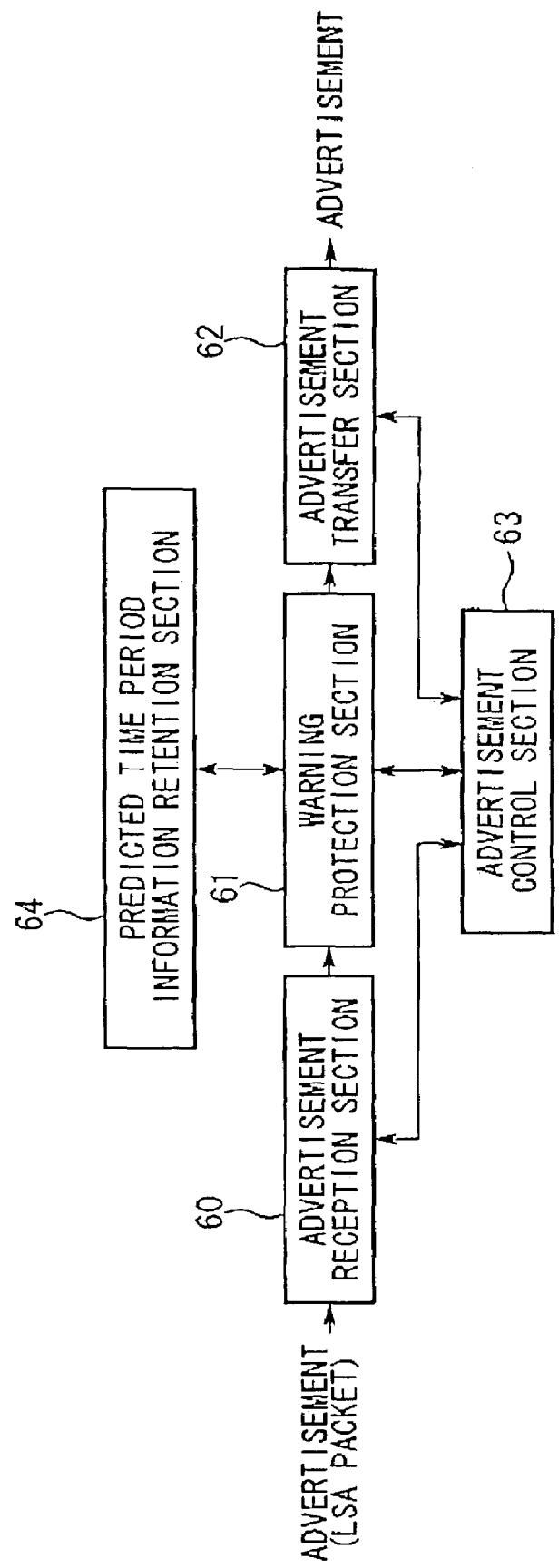
FIG. 46 is a block structural diagram of an advertisement control device of the fifty-third preferred embodiment of the present invention.
Figure 47:
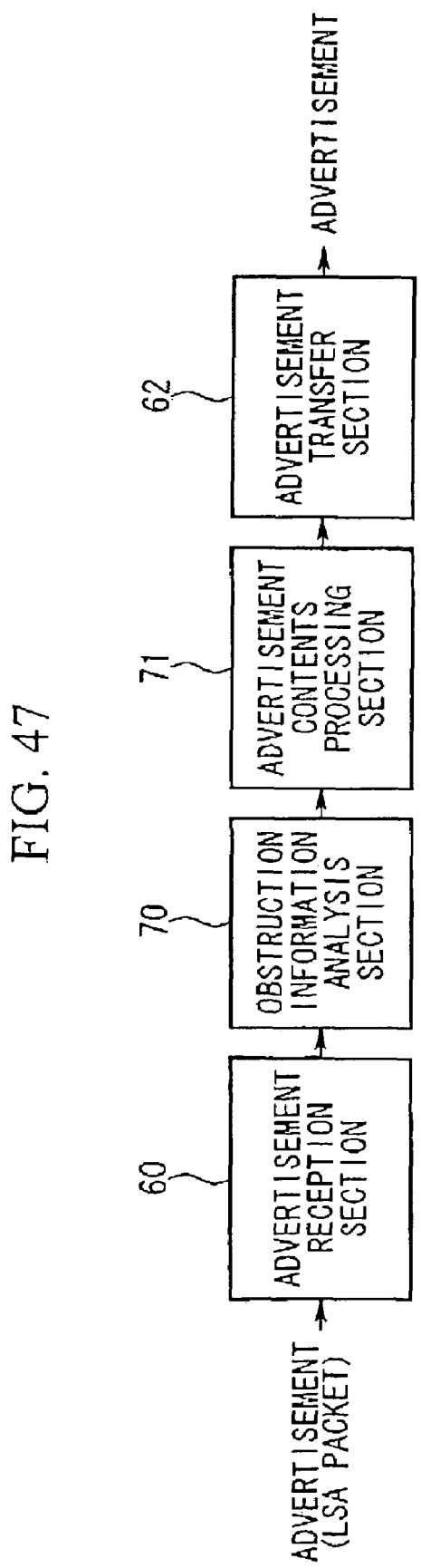
FIG. 47 is a block structural diagram of an advertisement control device of the fifty-fifth preferred embodiment of the present invention.
Figure 48:
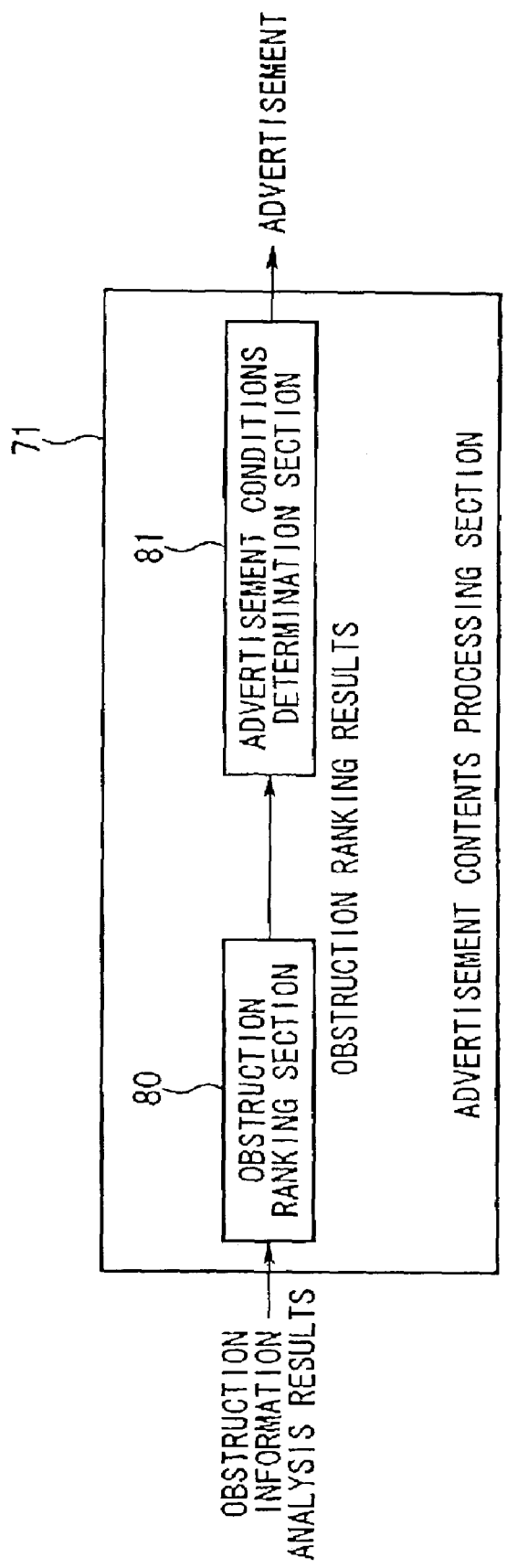
FIG. 48 is a block structural diagram of an advertisement contents processing section of the fifty-fifth preferred embodiment of the present invention.
Figure 49:
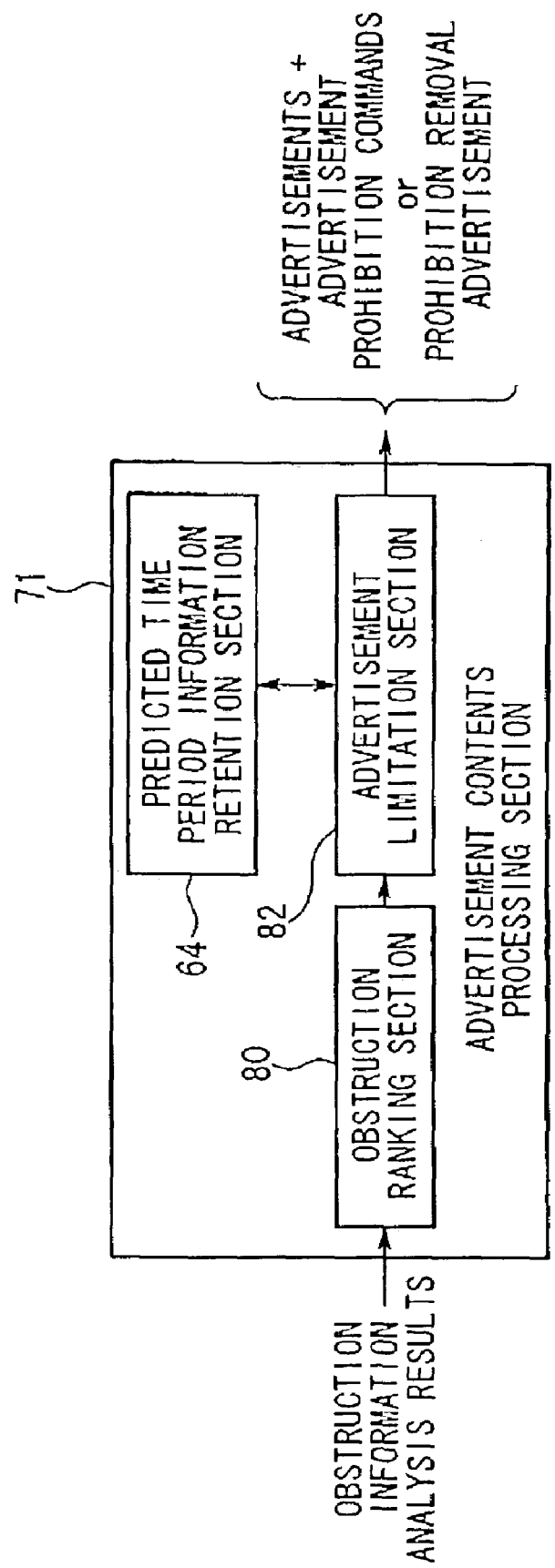
FIG. 49 is a block structural diagram of an advertisement contents processing section of the fifty-sixth preferred embodiment of the present invention.
Figure 50:
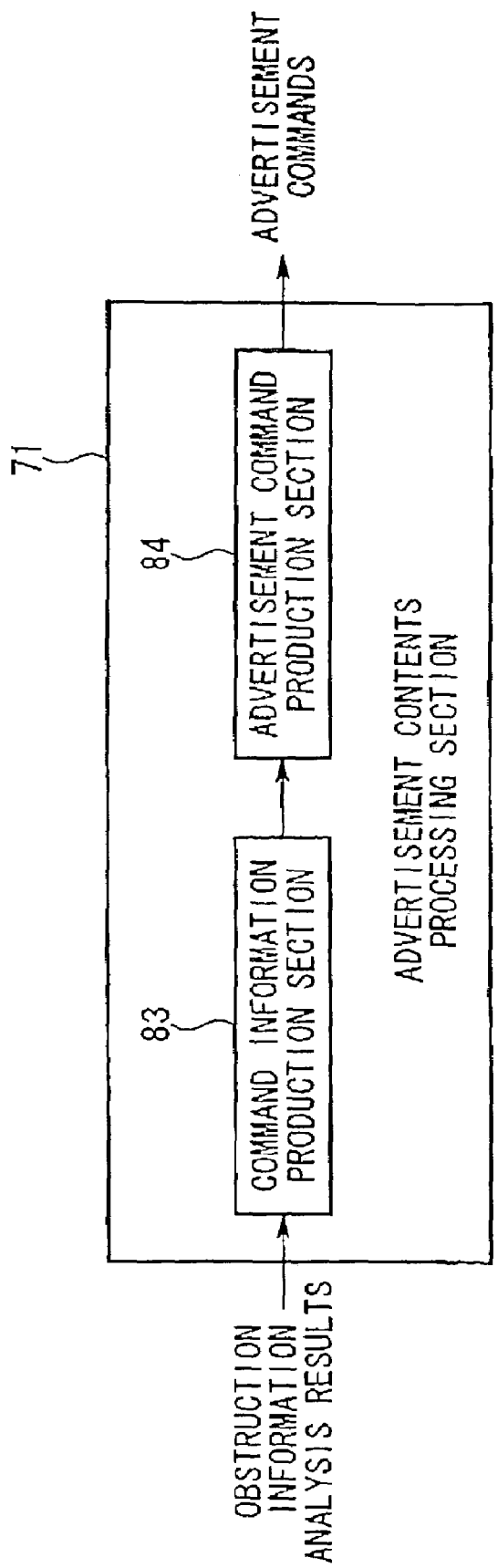
FIG. 50 is a block structural diagram of an advertisement contents processing section of the fifty-seventh preferred embodiment of the present invention.
Figure 51:
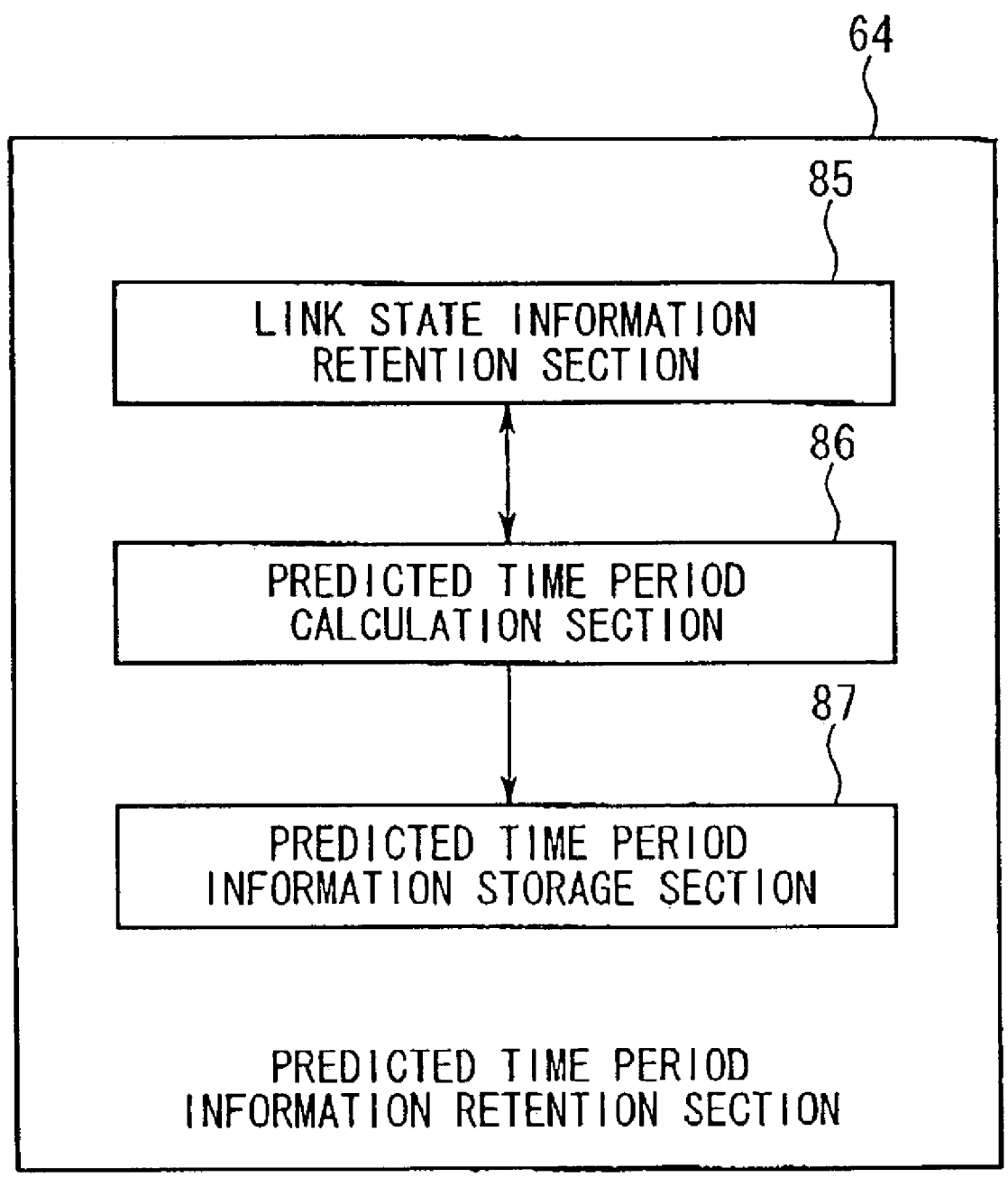
FIG. 51 is a block structural diagram of a predicted time period information retention section of the fifty-eighth preferred embodiment of the present invention.
Figure 52:
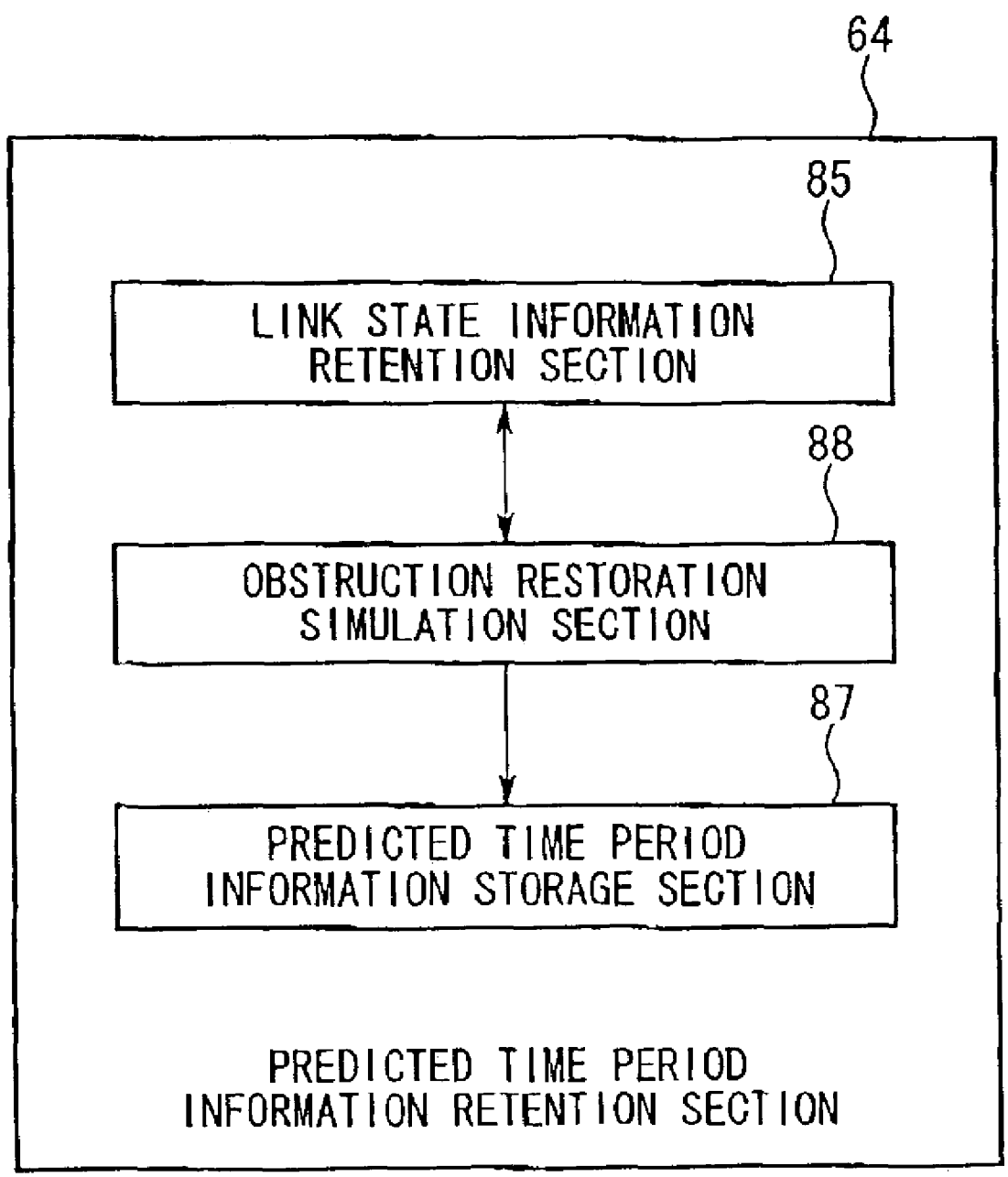
FIG. 52 is a block structural diagram of a predicted time period information retention section of the fifty-ninth preferred embodiment of the present invention.
Figure 53:
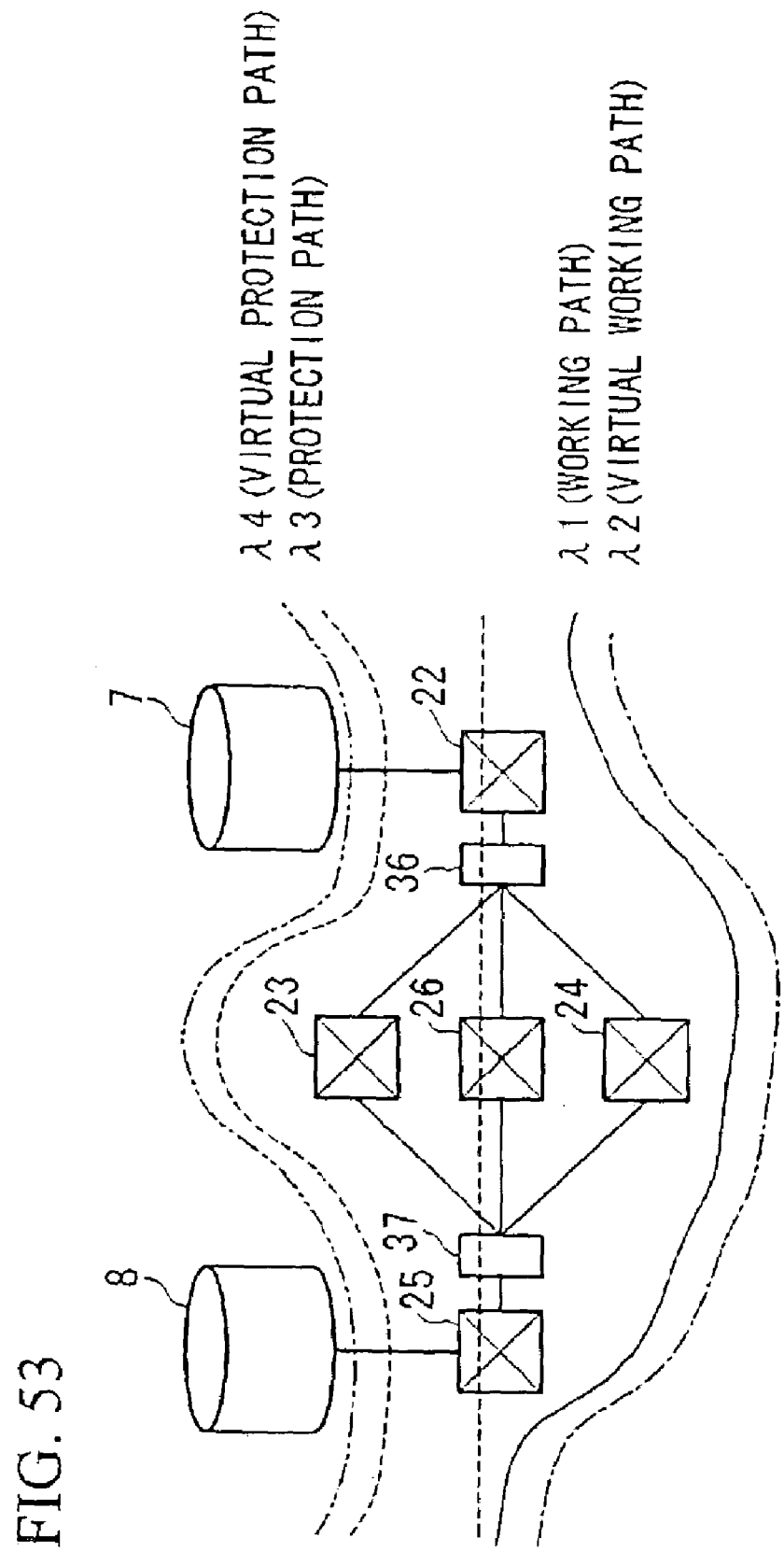
FIG. 53 is a diagram for explanation of obstruction restoration simulation in the fifty-ninth preferred embodiment of the present invention.
Figure 54:
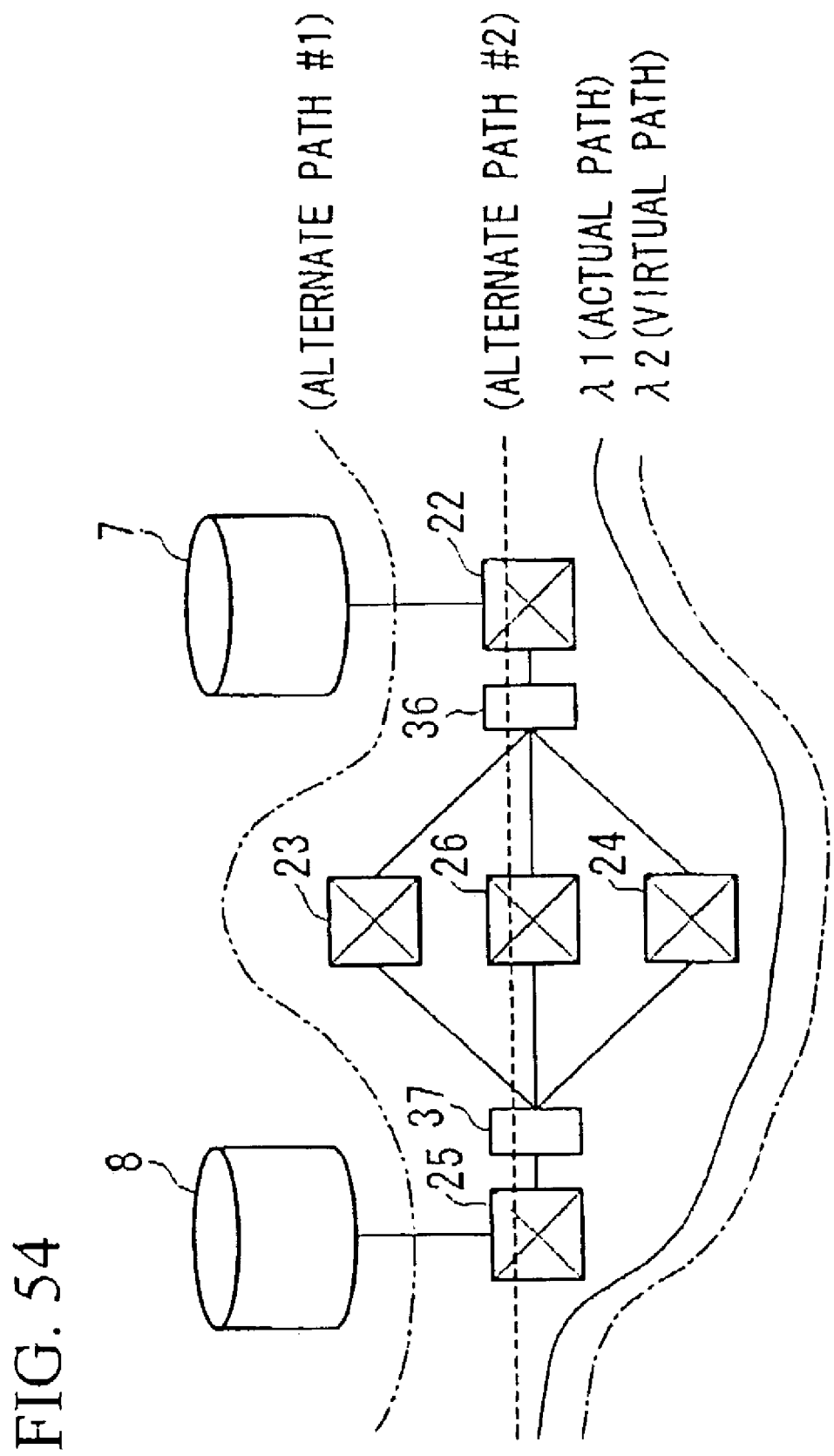
FIG. 54 is another diagram for explanation of obstruction restoration simulation in the sixtieth preferred embodiment of the present invention.

The advertisement control devices of the fifty-third through the sixtieth preferred embodiments of the present invention will now be described with reference to FIGS. 40 through 56 and FIGS. 21 and 22. FIG. 40 through FIG. 42 are diagrams showing the structure of a network of the fifty-third through the sixtieth preferred embodiments of the present invention. FIG. 43 is a diagram showing the structure of a photonic cross connect incorporated in any of these fifty-third through sixtieth preferred embodiments of the present invention. FIG. 44 is a block structural diagram of an obstruction restoration control device incorporated in any of these fifty-third through sixtieth preferred embodiments of the present invention. FIG. 45 is a block structural diagram of a router of any of these fifty-third through sixtieth preferred embodiments of the present invention. FIG. 46 is a block structural diagram of an advertisement control device of the fifty-third preferred embodiment of the present invention. FIG. 47 is a block structural diagram of an advertisement control device of the fifty-fifth preferred embodiment of the present invention. FIG. 48 is a block structural diagram of an advertisement contents processing section of this fifty-fifth preferred embodiment of the present invention. FIG. 49 is a block structural diagram of an advertisement contents processing section of the fifty-sixth preferred embodiment of the present invention. FIG. 50 is a block structural diagram of an advertisement contents processing section of the fifty-seventh preferred embodiment of the present invention. FIG. 51 is a block structural diagram of a predicted time period information retention section of the fifty-eighth preferred embodiment of the present invention. FIG. 21 is a diagram showing a transmission line during duplex operation. FIG. 22 is a diagram showing a transmission line which has an alternate path. FIG. 52 is a block structural diagram of a predicted time period information retention section of the fifty-ninth preferred embodiment of the present invention. And FIGS. 53 and 54 are diagrams for explanation of obstruction restoration simulation in the fifty-ninth and the sixtieth preferred embodiments of the present invention.

The Fifty-Third Preferred Embodiment

The fifty-third preferred embodiment of the present invention will now be explained with reference to FIGS. 41, 43, 44, 45, and 46. This fifty-third preferred embodiment, as shown in FIGS. 40 through 42, is an advertisement control device 27 through 38, provided to a network which comprises a plurality of nodes and transmission lines provided between these nodes; with, among this plurality of nodes, routers 1 through 8 being upper layer nodes and photonic cross connects 10 through 26 being lower layer nodes; and at least two of these routers 1 through 8 being connected together by a lower layer network which consists of a plurality of the photonic cross connects 10 through 26 and transmission lines between them; and, as shown in FIG. 43, these lower layer nodes are provided with a plurality of photonic cross connects which cooperate to restore the obstruction; and obstruction restoration control devices 40 being provided to each of the photonic cross connects 10 through 26 as shown in FIGS. 44 and 45; and the obstruction restoration control devices 40 of the photonic cross connects 10 through 26 comprising obstruction occurrence detection sections 41 and 51 which detect the occurrence of an obstruction upon a transmission line which they accommodate themselves, and advertisement emission sections 42 and 52 which advertise as obstruction information the results of detection by these obstruction occurrence detection sections 41 and 51; and with each of the routers 1 through 8 comprising a topology information retention section 53 which retains the topology information for the network, a topology information updating section 56 which updates the topology information which this router itself retains according to obstruction information which has been advertised or obstruction information which it has itself detected, and an advertisement transfer section 57 which advertises obstruction information which has been advertised to the other ones of the routers 1 through 8; the advertisement control devices 27 through 38 being provided mutually between each of the routers 1 through 8, as shown in FIG. 46, and having as their particular distinguishing feature that they comprise a warning protection section 61 which receives the obstruction information which has been advertised by the advertisement emission sections 42 of the photonic cross connects with an advertisement reception section 60, and defers the advertisement of the obstruction information to the routers 1 through 8 for a time period T. It should be understood that, in the structural diagram of the network, the obstruction restoration control devices 40 are omitted.

Here, as has already been explained, the advertisement control devices 27 through 38 are provided, as shown in FIG. 41, by being inserted between the routers 1 through 8 in the upper layer network of the multi-layer network.

In this FIG. 41, the advertisement control devices 27 through 38 are provided by being inserted between each of the routers 1 through 8 and the photonic cross connects (in the lower layer network) which respectively correspond to these routers.

In the routers 1 through 8, it may happen that they detect the occurrence of an obstruction themselves, or that the occurrence of an obstruction is detected by advertisement from the lower layer network; and an obstruction which has been detected by the obstruction occurrence detection section 41 is an obstruction at the level of the upper layer network consisting of the routers 1 through 8 shown in FIG. 56. By contrast to this, an obstruction which has been detected by advertisement from the lower layer network is an obstruction at the level of the lower layer network consisting of the photonic cross connects 10 through 26 shown in FIG. 55.

In other words, an obstruction which is detected by the obstruction occurrence detection section 41 is a serious obstruction such as one in which a stoppage has occurred in almost the entire lower layer network between routers, and it is a type of obstruction for which immediate restoration can hardly be expected. By contrast to this, an obstruction which is detected by advertisement from the lower layer network is a trifling obstruction such as one in which a stoppage has taken place upon only a portion of the lower layer network, and it is a type of obstruction for which it is possible to expect immediate restoration such as by establishment of an alternate path or the like.

In this preferred embodiment of the present invention, the explanation will be provided in terms of the occurrence of an obstruction at the lower layer network level, from which an immediate restoration can be anticipated.

It should be understood that although, with this preferred embodiment, the explanation will be provided in terms of the detection of the occurrence of an obstruction by advertisement from the lower layer network, apart from this, it would also be possible to detect the occurrence of an obstruction upon the lower layer network by error lookout for keep alive signals for the links, or the K1/K2 byte defined in an SDH, or the like, emitted from the routers 1 through 8 themselves as well, and it would be possible to explain this preferred embodiment in the same manner even using a method such as this for detecting the occurrence of an obstruction, instead of advertising by means of an LSA packet such as is explained in this description of this preferred embodiment.

Each of the advertisement control devices 27 through 38 comprises predicted time period information retention sections 64 which retain information relating to the time period which it is predicted will be required for restoration of an obstruction upon the lower layer network, and the warning protection section 61 obtains information as to the predicted time period for restoration which is required for the restoration of the obstruction by referring to the obstruction information and to the predicted time period for restoration which is retained by the predicted time period information retention section 64, and takes the predicted time period for restoration which has been obtained as the time period T.

Next, the operation of this fifty-third preferred embodiment of the advertisement control device of the present invention will be explained. In FIG. 40, it is supposed that an obstruction has occurred in the transmission line between the photonic cross connects 22 and 24. Accordingly, the explanation will be made with particular reference to the advertisement control devices 36 and 37. When the obstruction occurrence detection section 41 of the photonic cross connect 24 detects the occurrence of this obstruction in the transmission line which is connected to itself, the advertisement emission section 42 emits an LSA packet as an advertisement which includes the information relating to this obstruction.

In the background art, this LSA packet was immediately transferred to all of the routers 1 through 8 over the entire network, and they executed certain necessary procedures such as changing of the topology information or the like; but, with this fifty-third preferred embodiment of the present invention, the LSA packet which is emitted from the advertisement emission section 42 of the photonic cross connect 24 is received by the advertisement reception sections 60 of the advertisement control devices 36 and 37.

This advertisement which has been received by the advertisement reception section 60 is again emitted from the advertisement transfer section 62 to the network after having been deferred for the time period T by the warning protection section 61. Information is retained in the predicted restoration time period information retention section 64 regarding the predicted time period for obstruction restoration for each of the transmission lines, and the warning protection section 61 sets the value of T according to the predicted obstruction restoration time period information which corresponds to the transmission line between the photonic cross connects 22 and 24. However, if during this time period T the obstruction is restored and a new advertisement which conveys the purport that the obstruction has been restored has been received by the advertisement reception section 60, then both the advertisement which previously was deferred and also this new advertisement which conveys the purport that the obstruction has been restored are discarded.

By doing this, there is no requirement for calculation of a new routing table to be performed by the routers 1 through 8 upon the occurrence of an obstruction upon the lower layer network which would be restored within a short period of time, and thus it is possible to eliminate invalid processing load upon these routers.

The Fifty-Fourth Preferred Embodiment

The fifty-fourth preferred embodiment of the present invention will now be described with reference to FIG. 40 through FIG. 42.

A warning from the lower layer network is transmitted just as it is to the upper layer routers 1 through without alteration. And, when the upper layer routers 1 through 8 receive this warning, they immediately mutually transmit LSA packets among one another, to inform one another of the fault upon the lower layer.

The advertisement control devices that are inserted between the routers defer this mutual flow of fault information among the routers (the operation of the to and fro flow of fault information between the routers) for a fixed time period.

In FIG. 40, the advertisement control devices 27 through 38 are provided by being inserted between individual adjacent photonic cross-connectors in the photonic cross connects 10 through 26.

Furthermore, in FIG. 41, the advertisement control devices 27 through 38 are provided by being inserted between each of the routers 1 through 8, and the respective photonic cross connects corresponding to these routers (in the lower layer network). Yet further, in FIG. 42, the advertisement control devices 27 through 38 are directly inserted between the various routers 1 through 8 in the dedicated communication lines such as Ethernet or the like which are used for sending and receiving control signals. Although the way in which the advertisement control devices 27 through 38 are inserted may vary in this manner, they are thus inserted between the various routers in order to perform control such as delaying the advertisement of the obstruction information to the other routers by deferment, and the like.

The Fifty-Fifth Preferred Embodiment

The fifty-fifth preferred embodiment of the present invention will now be described with reference to FIG. 47 and FIG. 48. In this fifty-fifth preferred embodiment, as shown in FIG. 47, the advertisement control devices 27 through 38 comprise obstruction information analysis sections 70 which analyze the obstruction situation according to the obstruction information, and advertisement contents processing sections 71 which process the contents of these advertisements according to the results of the analysis by these obstruction information analysis sections 70.

Furthermore, as shown in FIG. 48, the advertisement contents processing section 71 comprises an obstruction ranking section 80 which, according to the result of the analysis by the obstruction information analysis section 70, assigns a ranking which shows the seriousness of the obstruction and which is the higher the lower is the probability of restoration of the obstruction, and an advertisement conditions determination section 81 which performs advertisement of obstructions whose ranking is greater than a predetermined ranking by referring to the results of ranking assignment performed by this obstruction ranking section 80.

Next, the operation of this fifty-fifth preferred embodiment of the advertisement control device of the present invention will be explained. In FIG. 40, it is supposed that an obstruction has occurred in the transmission line between the photonic cross connects 22 and 24. Accordingly the explanation will be made with particular reference to the advertisement control devices 36 and 37. When the obstruction occurrence detection section 41 of the photonic cross connect 24 detects the occurrence of this obstruction in the transmission line which is connected to itself, the advertisement emission section 42 emits an LSA packet as an advertisement which includes the information relating to this obstruction.

In the background art, this LSA packet was immediately transferred to all of the routers 1 through 8 over the entire network, and these routers 1 through 8 executed certain necessary procedures such as changing of the topology information or the like; but, with this fifty-fifth preferred embodiment of the present invention, the LSA packet which is emitted from the advertisement emission section 42 of the photonic cross connect 24 is received by the advertisement reception sections 60 of the advertisement control devices 36 and 37.

The obstruction information which is included in this advertisement which has been received by the advertisement reception section 60 is analyzed by the obstruction information analysis section 70. As concrete examples of analysis results of obstruction information, there may be offered the number of optical paths which are included in the transmission line in which the obstruction has occurred, or the width of the band which experiences an influence due to the occurrence of an obstruction. The result of this analysis is transmitted to the obstruction ranking section 80 of the advertisement contents processing section 71.

Rankings are determined in advance in the obstruction ranking section 80 according to the scale of the obstructions, and ranking is performed based upon the result of the analysis which has been transmitted. The result of this ranking is transmitted to the advertisement conditions determination section 81.

Whether or not an advertisement should be emitted is determined, according to its ranking, in advance in the advertisement conditions determination section 81, and a decision is performed based upon the ranking of which notification has been received. By doing this, with regard to advertisement of the occurrence of a trifling obstruction, no such advertisement is emitted by the advertisement control devices 36 and 37, so that no calculation of a new routing table is performed in the routers 1 through 8 upon the occurrence of an obstruction in the lower layer network which can be expected to be restored in a short time period, and accordingly it is possible to eliminate processing load which would become invalid.

The Fifty-Sixth Preferred Embodiment

The fifty-sixth preferred embodiment of the present invention will now be described with reference to FIG. 49. In this fifty-sixth preferred embodiment, the advertisement contents processing section 71 comprises a predicted time period information retention section 64 which retains information relating to the predicted time period for restoration which is required for obstruction restoration by the lower layer network, an obstruction ranking section 80 which assigns a ranking which shows the seriousness of the obstruction and which is the higher the lower is the probability of restoration of the obstruction, according to the result of analysis by the obstruction information analysis section 70, and an advertisement limitation section 82 which emits, for an obstruction of ranking which is less than a predetermined ranking by reference to the results of ranking assignment by the ranking assignment section 80, a limited advertisement which includes limitation information to the effect that advertisement is being performed limited to those ones of the upper layer nodes which are directly related to the lower layer network which is obstructed; and this advertisement limitation section 82 emits a prohibition removing advertisement to the effect that the limitation is removed when the obstructed transmission line has not been restored even after the predicted time period for restoration which is retained by the predicted time period information retention section 64 has elapsed from the emission of the limited advertisement.

In this fifty-sixth preferred embodiment of the present invention, the advertisement transfer section 57 of each of the routers 1 through 8 prevents advertisement to the other routers when the limited advertisement is received, according to its limitation information, until the receipt of the prohibition removing advertisement.

In other words, although with the fifty-fifth preferred embodiment of the present invention described above the advertisement control devices 36 and 37 did not advertise the occurrence of a trifling obstruction to the routers 7 and 8, by contrast, with this fifty-sixth preferred embodiment, they advertise the occurrence of even a trifling obstruction to the routers 7 and 8. However, the advertisement transfer section 57 of the router 7 or 8 which has received this advertisement, according to the advertisement prohibition command which has been sent along with the advertisement, does not advertise it to the other routers until the advertisement transfer section 57 subsequently receives the prohibition removing advertisement.

Even during this advertisement prohibited period, each of the routers 7 and 8, according to its own independent decision, may perform obstruction avoidance measures such as updating the topology information and then calculating a new routing table. For example, if the importance of the data which is being handled by the router 7 or 8 is high, without expecting quick restoration of the obstruction in the lower layer network, the router may, upon its own responsibility, take the decision to calculate or to establish an alternate route.

The Fifty-Seventh Preferred Embodiment

The fifty-seventh preferred embodiment of the present invention will now be described with reference to FIG. 50. In this fifty-seventh preferred embodiment, the advertisement contents processing section 71 comprises a command information production section 83 which produces command information for the routers 1 through 8 according to the result of analysis by the obstruction information analysis section 70, and a command advertisement production section 84 which emits to the routers 1 through 8 an advertisement which includes the command information which has been produced by the command information production section 83; and the routers 1 through 8 execute the processing which has been commanded according to the command information which is included in the advertisement.

In other words while, with the fifty-sixth preferred embodiment of the present invention, the advertisement transfer sections 57 of the routers 7 and 8 emitted or did not emit advertisements according to the advertisement prohibition command and the prohibition removing advertisement, by contrast, with this fifty-seventh preferred embodiment, the advertisement control devices 36 and 37 perform advertisement to the routers 1 through 8 immediately after the occurrence of an obstruction, and write commands for the routers 1 through 8 into the advertisement.

As concrete examples of the contents of such a command, if the obstruction is a trifling one for which it is possible to anticipate a quick restoration, the topology information updating section 56 may be commanded not to perform updating of the topology information.

Furthermore, as an example of the detailed contents of such a command, if the obstruction is one for which it is not possible to anticipate a quick restoration, the topology information updating section 56 may be commanded to perform updating of the topology information, and, although due to this the routing table calculation section 54 must calculate a new routing table, the path establishment section 55 may be commanded to defer the establishment of an alternate path until the next establishment command is received. After a predetermined time period has elapsed, if the obstruction has not yet been restored, the command information production section 83 and the command advertisement production section 84 may command the path establishment section 55 actually to establish the alternate path.

By doing this, the advertisement control devices 36 and 37 are able to command the routers 1 through 8 to take flexible measures in order to avoid the obstruction.

The Fifty-Eighth Preferred Embodiment

The fifty-eighth preferred embodiment of the present invention will now be described with reference to FIG. 51. This fifty-eighth preferred embodiment relates to the predicted time period information retention section 64, and, as shown in FIG. 51, the predicted time period information retention section 64 according to the present embodiment comprises a link state information retention section 85 which retains link state information which is related to the detailed structure of the lower layer network, and a predicted time period calculation section 86 which calculates the predicted time period for restoration for each of the transmission lines, based upon a capability for alternate path establishment which is attributed to each of the transmission lines, as estimated from the link state information which is retained by this link state information retention section 85. The predicted time period for restoration for obstruction restoration which has been calculated by the predicted restoration time period calculation section 85 is stored in a predicted time period information storage section 87.

The predicted time period calculation section 86 may, as the capability for alternate path establishment, along with calculating the predicted time period for restoration of a transmission line during duplex operation as being almost zero, also re-recognize the transmission line, during the occurrence of an obstruction, as being a simplex transmission line.

Or, the predicted time period calculation section 86 may, as the capability for alternate path establishment, calculate the predicted time period for restoration based upon the presence or absence of alternate paths at both the ends of the obstructed transmission line, and upon the state of vacancy or occupancy of the alternate paths.

In other words, as shown in FIG. 21, the predicted restoration time period calculation section 39, as the capability for alternate path establishment, not only may calculate the predicted time period for restoration of a transmission line during duplex operation as being almost zero, but also may re-recognize the transmission line, during the occurrence of an obstruction, as being a simplex transmission line.

In other words, as shown in FIG. 21, if the same data is being transmitted by duplex operation using a working path and a protection path, the predicted time period for restoration is taken as being zero, in whichever of these paths the obstruction may have occurred. However, in whichever of these paths the obstruction may have occurred, it can no longer operate as a transmission line for duplex operation, and therefore the predicted time period for restoration is re-calculated by taking the transmission line as being a simplex transmission line.

Or, the predicted time period calculation section 86 may, as the capability for alternate path establishment, calculate the predicted time period for restoration based upon the presence or absence of alternate paths at both the ends of the transmission line which is the object of calculation, and upon the state of vacancy or occupancy of these alternate paths. In other words, as shown by way of example in FIG. 22, when the transmission line which is the object of calculation is a transmission line which is spread over the optical paths upon the wavelengths $\lambda 1$ and $\lambda 2$, first, the presence or absence of alternate paths for it is investigated, and then the states of vacancy or occupancy of the wavelengths for these alternate paths are investigated.

In the example shown in FIG. 22, alternate paths do exist, and, in the state of occupancy (1), the optical paths upon the wavelengths $\lambda 4$ and $\lambda 5$ are vacant. Accordingly, the predicted time period for restoration in this case is the time period required for switching over the photonic cross connect. In the state of occupancy (2), although two vacant wavelengths are required, all of the wavelengths are occupied. Furthermore, in the state of occupancy (3), only the wavelength $\lambda 3$ is vacant. In this type of case, the predicted time period for restoration is calculated based upon the probability of occurrence of two vacant wavelengths, which is based upon statistical data from the past. It should be understood that if, in FIG. 21, an obstruction occurs upon either the working path or the protection path, the same method may be employed as when re-calculating the predicted time period for restoration as a simplex transmission line.

The Fifty-Ninth Preferred Embodiment

The fifty-ninth preferred embodiment of the present invention will now be described with reference to FIG. 52 and FIG. 53. This fifty-ninth preferred embodiment, just like the fifty-eighth preferred embodiment, is a preferred embodiment which is concerned with the predicted time period information retention section 64; and herein, as shown in FIG. 52, the predicted time period information retention section 64 comprises an obstruction restoration simulation section 88 which calculates the predicted time period for restoration of an obstruction between two nodes between which a working path and a protection path are established, by taking paths which occupy vacant bands in the vicinity of the working path and the protection path respectively as a virtual working path and as a virtual protection path, and by taking, as the predicted time period for restoration, the time period which is required for changing over the path from the virtual working path to the virtual protection path, when, in simulation, an obstruction has been generated in this virtual working path. The result of this simulation by the obstruction restoration simulation section 88 is stored in a predicted time period information storage section 87 as predicted obstruction restoration time period information.

In other words, in the example of FIG. 53, an optical path of wavelength $\lambda 1$ is established as the working path between the photonic cross connects 22 and 25. Furthermore, an optical path of wavelength $\lambda 3$ is established as the protection path between them. Under this type of condition, in order to calculate the predicted time period for restoration, the obstruction restoration simulation section 88 sets a vacant wavelength $\lambda 2$ of the same link as the link over which the working path is established as being a virtual working path, and also sets a vacant wavelength $\lambda 4$ of the same link as the link over which the protection path is established as being a virtual protection path.

Having in this manner established a virtual working path and a virtual protection path, a simulated obstruction is generated in the virtual working path. As a procedure for generating such a simulated obstruction, for example, an LSA packet may be emitted in which is written simulated obstruction information from one of the photonic cross connects 22, 24, or 25. By doing this, it is possible to obtain the predicted time period for restoration by measuring the time period over which the changeover from the virtual working path to the virtual protection path is actually performed by cooperation of the photonic cross connects 22, 23, 24, and 25.

The Sixtieth Preferred Embodiment

The sixtieth preferred embodiment of the present invention will now be described with reference to FIG. 52 and FIG. 54. This sixtieth preferred embodiment, just like the fifty-eighth and the fifty-ninth preferred embodiments, is a preferred embodiment which is concerned with the predicted time period information retention section 64; and herein, as shown in FIG. 52, the predicted time period information retention section 64 comprises an obstruction restoration simulation section 88 which calculates the predicted time period for restoration between two nodes between which a path is already established, by taking a path which occupies a vacant band in the vicinity of the path as a virtual path, by searching for an alternate path for the virtual path when a simulated obstruction has been generated in this virtual path, and by calculating the time period which is required for changing over the path from the virtual path to the alternate path as being the predicted time period for restoration. The result of this simulation by the obstruction restoration simulation section 88 is stored in a predicted time period information storage section 87 as predicted time period for restoration for obstruction restoration information.

In other words, as shown in the example of FIG. 54, an optical path of wavelength $\lambda 1$ is established as the actual path between the photonic cross connects 22 and 25. Under this type of condition, in order to calculate the predicted time period for restoration, the obstruction restoration simulation section 88 sets a vacant wavelength $\lambda 2$ of the same link as the link over which the actual path is established as being the virtual path.

Having in this manner established a virtual path, a simulated obstruction is generated in this virtual path. As a procedure for generating such a simulated obstruction, for example, an LSA packet may be emitted in which is written simulated obstruction information from one of the photonic cross connects 22, 24, or 25. By doing this, the photonic cross connects 22, 23, 24, and 25 cooperate to establish an alternate path upon the simulated occurrence of an obstruction in the virtual path, and to measure the time period over which the changeover from the virtual path to the alternate path is actually performed, and thus it is possible to obtain the predicted time period for restoration. In the example shown in FIG. 54, the path #1 is taken as the alternate path, and the path through the photonic cross connects 22⇌23⇌25 is established; and, further, the path #2 is taken as the alternate path, and the path through the photonic cross connects 22⇆26⇆25 is established.

The Sixty-First Preferred Embodiment

The advertisement control devices 27 through 38 and the routers 1 through 8 which are applied to the network of this preferred embodiment of the present invention may be implemented using computer devices, which are information processing devices.

In other words, by installing upon a computer device a program which implements, as a function of the advertisement control devices 27 through 38, a function, corresponding to the warning protection section 61, of receiving obstruction information which has been advertised by the advertisement emission section 42 of the obstruction restoration control device 30 and deferring advertisement to the routers 1 through 8 of the obstruction information, it is possible to make that computer device serve as a device which corresponds to the advertisement control devices 27 through 38 of the fifty-third preferred embodiment of the present invention.

Furthermore, the program of this sixty-first preferred embodiment may implement a function corresponding to the predicted time period information retention section 64; as a function corresponding to the warning protection section 61, a function of obtaining information as to the predicted time period for restoration which is required for the restoration by referring to the obstruction information and to the predicted time period for restoration which is retained by the predicted time period information retention section 64; and a function of taking the predicted time period for restoration which has been obtained by this obtaining function as the time period T.

Furthermore, by installing upon a computer device a program which implements, as a function corresponding to the advertisement control devices 27 through 38, a function which corresponds to the obstruction information analysis section 70 of analyzing the obstruction situation occurring to the obstruction information, and a function which corresponds to the advertisement contents processing section 71 of processing the contents of the advertisement according to the result of analysis by this obstruction information analysis section 70, it is possible to make that computer device serve as a device which corresponds to the advertisement control devices 27 through 38 of the fifty-fourth preferred embodiment of the present invention.

Furthermore, the program of this sixty-first preferred embodiment may implement, as a function corresponding to the advertisement contents processing section 71, a function corresponding to the obstruction ranking section 80, of assigning, according to the result of the analysis by the obstruction information analysis section 70, a ranking which shows the seriousness of the obstruction and which is the higher the lower is the probability of restoration of the obstruction, and a function corresponding to the advertisement conditions determination section 81, of performing advertisement of obstructions whose ranking is greater than a predetermined ranking by referring to the results of ranking assignment performed by this obstruction ranking section 80.

Furthermore, by installing the program of this preferred embodiment upon a computer device, it is possible to implement upon that computer device, as a function corresponding to the advertisement contents processing section 71 of the fifty-sixth preferred embodiment of the present invention, a function, corresponding to the predicted time period information retention section 64, of retaining information relating to the predicted time period for restoration which is required for obstruction restoration by the lower layer network, a function, corresponding to the obstruction ranking section 80, of assigning a ranking which shows the seriousness of the obstruction and which is the higher the lower is the probability of restoration of the obstruction, according to the result of analysis by the obstruction information analysis section 70, and a function, corresponding to the advertisement limitation section 82, of emitting, for an obstruction of ranking which is less than a predetermined ranking by reference to the results of ranking assignment by this obstruction ranking section 80, a limited advertisement which includes limitation information to the effect that advertisement is being performed limited to those ones of the upper layer nodes which are directly related to the lower layer network which is obstructed, and of emitting a prohibition removing advertisement to the effect that the limitation is removed, when the obstructed lower layer network has not been restored even after the predicted time period for restoration which is retained by the predicted time period information retention section 64 has elapsed from the emission of the limited advertisement; and to implement, as a function which corresponds to the advertisement transfer sections 57 of the routers 1 through 8, a function of preventing advertisement to the other ones of the routers when the limited advertisement is received, according to its limitation information, until the receipt of the prohibition removing advertisement.

Furthermore, by installing the program of this preferred embodiment upon a computer device, it is possible to implement upon that computer device, as a function corresponding to the advertisement contents processing section 71 of the fifty-seventh preferred embodiment of the present invention, a function, corresponding to the command information production section 83, of generating command information for the routers 1 through 8 according to the result of analysis by the obstruction information analysis section 70, and a function, corresponding to the command advertisement production section 84, of emitting to the routers 1 through 8 an advertisement which includes the command information which has been made by this command information production section 83; and, as a function which corresponds to the routers 1 through 8, to implement a function of executing the processing which has been commanded according to the command information which is included in the advertisement.

Furthermore, by installing the program of this preferred embodiment upon a computer device, it is possible to implement upon that computer device, as a function corresponding to the predicted time period information retention section 64 of the fifty-eighth preferred embodiment of the present invention, a function, corresponding to the link state information retention section 85, of retaining link state information relating to the detailed structure of the lower layer network, and a function, corresponding to the predicted restoration time period calculation section 86, of calculating the predicted time period for restoration for each of the transmission lines, based upon a capability for alternate path establishment which is attributed to each of the transmission lines, as estimated from the link state information which is retained by the link state information retention section 85.

Furthermore, by installing the program of this preferred embodiment upon a computer device, it is possible to implement upon that computer device, as a function corresponding to the predicted restoration time period calculation section 86, as a capability for alternate path establishment, a function of, along with calculating the predicted time period for restoration of an obstruction for a transmission line during duplex operation as being almost zero, also re-recognizing the transmission line, during the occurrence of an obstruction, as being a simplex transmission line.

Or, by installing the program of this preferred embodiment upon a computer device, it is possible to implement upon that computer device, as a function corresponding to the predicted restoration time period calculation section 86, as a capability for alternate path establishment, a function of calculating the predicted time period for restoration of an obstruction based upon the presence or absence of alternate paths at both the ends of the obstructed transmission line, and upon the state of vacancy or occupancy of the alternate paths.

By installing the program of this preferred embodiment upon a computer device, it is possible to implement upon that computer device, as a function corresponding to the predicted time period information retention section 64 of the fifty-ninth preferred embodiment of the present invention, a function of calculating the predicted time period for restoration of an obstruction between two of the nodes between which a working path and a protection path are established, by taking paths which occupy vacant bands in the vicinity of the working path and the protection path respectively as a virtual working path and as a virtual protection path, and by taking, as the predicted time period for restoration of the obstruction, the time period which is required for changing over the path from the virtual working path to the virtual protection path, when a simulated obstruction has been generated in the virtual working path.

By installing the program of this preferred embodiment upon a computer device, it is possible to implement upon that computer device, as a function corresponding to the predicted time period information retention section 64 of the sixtieth preferred embodiment of the present invention, a function of calculating the predicted time period for restoration of an obstruction between two of the nodes between which a path is already established, by taking a path which occupies a vacant band in the vicinity of the path as a virtual path, by searching for an alternate path for the virtual path when a simulated obstruction has been generated in the virtual path, and by calculating the time period which is required for changing over the path from the virtual path to the alternate path as being the predicted time period for restoration of the obstruction.

By recording the program of this sixty-first preferred embodiment of the present invention upon a recording medium according to this preferred embodiment, it is possible to install the program of this preferred embodiment upon a computer device by using this recording medium. Or, it is possible to install the program of this preferred embodiment directly upon a computer device via a network from a server upon which the program of this preferred embodiment is stored.

By doing this, an obstruction restoration control technique using a computer device is proposed for application to a multi-layer network, with which it is possible to implement an advertisement control device 27 and routers 1 through 8, with which it can be anticipated that effective advantage can be taken of network resources.

What is claimed is:

1. An upper layer node which is used in a multi-layer network which comprises an upper layer network which performs switching and transfer in units of packets, and a lower layer network which accommodates the upper layer network and which comprises optical transmission fines and optical switches; the upper layer node being connected to the lower layer network which comprises a plurality of lower layer nodes which comprise obstruction restoration sections, and transmission lines; and the upper layer node comprising:
   a detection section which detects the occurrence of an obstruction upon a transmission line which the upper layer node accommodates;
   an advertisement section which advertises the result of detection by the detection section as obstruction information;
   a section which retains the topology information for the lower layer network;
   an updating section which updates the topology information which the upper layer node retains, according to obstruction information which has been advertised, or obstruction information which the upper layer node has detected; and
   an advertisement transfer section which advertises to other upper layer nodes obstruction information which has been advertised,
   wherein the updating section comprises a deferral section which defers the updating of the topology information for a time period T from the time instant that the detection section has detected the occurrence of an obstruction.

2. An upper layer node as described in claim 1, further comprising a predicted time period information retention section which retains information as to the predicted time period required for obstruction restoration of the lower layer network, and
   wherein the advertisement section comprises:
   a first advertisement section which performs a first advertisement immediately after the occurrence of an obstruction upon the lower layer network has been detected by the detection section; and
   a second advertisement section which performs a second advertisement when obstruction restoration for the transmission line has not been realized, even though the predicted time period which has been retained in the predicted time period information retention section has elapsed from the time instant that the first advertisement has been advertised by the first advertisement section, and
   wherein the deferral section comprises a section which takes the time period from the time instant when the first advertisement is received until the time instant when the second advertisement is received as the time period T.

3. An upper layer node as described in claim 2, wherein the predicted time period information retention section comprises:
   a retention section which retains link state information relating to the detailed structure of the lower layer network; and
   a predicted time period calculation section which calculates the predicted time period for each of the transmission lines, based upon a capability for alternate path establishment which is attributed to each of the transmission lines, as estimated from the link state information which is retained by the retention section.

4. An upper layer node as described in claim 2, wherein the predicted time period information retention section comprises a section which calculates, as the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

5. An upper layer node as described in claim 2, wherein the predicted time period information retention section comprises a section which calculates, as the predicted time period between two of the nodes between which a path is already established, the time period which is required for changing over from a virtual path to an alternate path, by taking a path which occupies a vacant band in the vicinity of the already established path as a virtual path, and by searching for the alternate path for the virtual path when a simulated obstruction has been generated in the virtual path.

6. An upper layer node as described in claim 2, further comprising a priority ranking retention section which retains information regarding restoration priority rankings during obstruction restoration of the transmission line of the lower layer network, and
wherein the advertisement section comprises a section which sets the lengths of the time periods from the time instant that the first advertisement has been advertised to the time instant that the second advertisement has been advertised, for the transmission lines upon which obstructions have occurred at almost the same moment, individually to be inversely proportional to the restoration priority rankings which are retained by the priority ranking retention section.

7. An upper layer node as described in claim 1, further comprising a predicted time period information retention section which retains information regarding the predicted time period required for obstruction restoration of the lower layer network, and
wherein the advertisement section comprises:
a section which obtains information as to the predicted time period which is required for the obstruction restoration by referring to the result of detection by the detection section and to the predicted time period which is retained by the predicted time period information retention section; and
an obtaining section which performs an advertisement which includes information of the predicted time period which has been obtained by the obtaining section, and
wherein the deferral section comprises a section which sets the predicted time period which is contained in the advertisement as the time period T.

8. An upper layer node as described in claim 7, wherein the predicted time period information retention section comprises:
a retention section which retains link state information relating to the detailed structure of the lower layer network; and
a predicted time period calculation section which calculates the predicted time period for each of the transmission lines, based upon a capability for alternate path establishment which is attributed to each of the transmission lines, as estimated from the link state information which is retained by the retention section.

9. An upper layer node as described in claim 7, wherein the predicted time period information retention section comprises a section which calculates, as the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

10. An upper layer node as described in claim 7, wherein the predicted time period information retention section comprises a section which calculates, as the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

11. An upper layer node as described in claim 1, wherein the advertisement transfer section comprises an advertisement deferral section which defers advertisement to the other upper layer nodes until a deferral time period by the deferral section has elapsed.

12. An upper layer node as described in claim 1, further comprising a predicted time period information retention section which retains information regarding the predicted time period required for obstruction restoration of the lower layer network, and
wherein the deferral section comprises:
an obtaining section which obtains information as to the predicted time period which is required for the obstruction restoration by referring to the obstruction information and to the predicted time period which is retained by the predicted time period information retention section; and
a section which sets the predicted time period which has been obtained by the obtaining section as the time period T.

13. An upper layer node as described in claim 12, wherein the predicted time period information retention section comprises:
a retention section which retains link state information related to the detailed structure of the lower layer network; and
a predicted time period calculation section which calculates the predicted time period for each of the transmission lines, based upon a capability for alternate path establishment which is attributed to each of the transmission lines, as estimated from the link state information which is retained by the retention section.

14. An upper layer node as described in claim 12, wherein the predicted time period information retention section comprises a section which calculates, as the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

15. An upper layer node as described in claim 12, wherein the predicted time period information retention section comprises a section which calculates, as the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

16. An upper layer node as described in claim 1, wherein the advertisement section comprises a section which performs an advertisement at fixed intervals while an obstruction is being detected by the detection section, and
   wherein the deferral section comprises a section which takes the time period until the advertisement has been received a number of times which is determined in advance as being the time period T.

17. An upper layer node as described in claim 1, further comprising:
   an obstruction situation analysis section which analyzes the obstruction situation according to the results of detection by the detection section; and
   a ranking assignment section which, according to the result of the analysis by the obstruction situation analysis section, assigns a ranking which shows the seriousness of the obstruction and which is the higher the lower is the probability of restoration of the obstruction, and
   wherein the advertisement section comprises a conditional advertisement section which performs advertisement of obstructions whose ranking is greater than a predetermined ranking by referring to the results of ranking assignment performed by the ranking assignment section.

18. An upper layer node as described in claim 17, wherein the obstruction situation analysis section comprises a section which detects the degree of concentration of network resources by referring to the topology information for the lower layer network upon which the obstruction has occurred, and
   wherein the ranking assignment section comprises a section which assigns a ranking which shows the seriousness of the obstruction and which is the higher the lower is the probability of restoration of the obstruction, which is inversely proportional to the degree of concentration.

19. An upper layer node as described in claim 13, wherein the predicted time period calculation section comprises a section which, as the capability for alternate path establishment, along with calculating the predicted time period for a transmission line during duplex operation as being almost zero, also re-recognizes the transmission line, during the occurrence of an obstruction, as being a simplex transmission line.

20. An upper layer node as described in claim 13, wherein the predicted time period calculation section comprises a section which, as the capability for alternate path establishment, calculates the predicted time period based upon the presence or absence of alternate paths at both the ends of obstructed transmission line and upon the state of vacancy or occupancy of the alternate paths.

21. An upper layer node as described in claim 17, wherein the obstruction situation analysis section comprises a transmission line number detection section which detects a number of the transmission lines in which obstructions have occurred at almost the same time, and
   wherein the ranking assignment section comprises a section which assigns a ranking based upon the number of the transmission lines in which obstructions have occurred at almost the same time.

22. An upper layer node as described in claim 21, wherein the transmission line number detection section comprises:
   a table in which the transmission lines in which stoppage may occur are recorded corresponding to the occurrence of obstructions of obstruction factors which are included in various groups into which the obstruction factors are divided; and
   a section which detects the number of the transmission lines in which obstructions have occurred at almost the same time by referring to the table.

23. An upper layer node as described in claim 17, further comprising a priority ranking retention section which retains information regarding restoration priority ranking during obstruction restoration of the transmission line of the lower layer network, and
   wherein the obstruction situation analysis section comprises a section which obtains information as to the restoration priority ranking which is retained by the priority ranking retention section for the transmission line upon which an obstruction has occurred, and
   wherein the ranking assignment section comprises a section which assigns a ranking which shows the seriousness of the obstruction and which is the higher the lower is the probability of restoration of the obstruction, which is inversely proportional to the restoration priority ranking.

24. An upper layer node as described in claim 1, further comprising:
   an obstruction situation analysis section which analyzes the obstruction situation according to the result of detection by the detection section;
   a ranking assignment section which assigns a ranking which shows the seriousness of the obstruction and which is the higher the lower is the probability of restoration of the obstruction, according to the result of analysis by the obstruction situation analysis section; and
   a predicted time period information retention section which retains information relating to the predicted time period which is required for obstruction restoration by the lower layer network, and
   wherein the advertisement section comprises:
   a section which emits, for an obstruction of ranking which is less than a predetermined ranking by reference to the results of ranking assignment by the ranking assignment section, a limited advertisement which includes limitation information to the effect that advertisement is being performed limited to those ones of the upper layer nodes which are directly related to the lower layer network which is obstructed; and
   a section which emits a prohibition removing advertisement to the effect that limitation indicated by the limitation information is removed, when the obstructed lower layer network has not been restored even after the predicted time period which is retained by the predicted time period information retention section has elapsed from the emission of the limited advertisement, and
   wherein the upper layer node further comprising a section which prevents advertisement to the other ones of the upper layer nodes when the limited advertisement is received, according to the limitation information, until the receipt of the prohibition removing advertisement.

25. An upper layer node as described in claim 24, wherein the obstruction situation analysis section comprises a transmission line number detection section which detects a number of the transmission lines in which obstructions have occurred at almost the same time, and
   wherein the ranking assignment section comprises a section which assigns a ranking based upon the number of the transmission lines in which obstructions have occurred at almost the same time.

26. An upper layer node as described in claim 25, wherein the transmission line number detection section comprises:
- a table in which the transmission lines in which stoppage may occur are recorded corresponding to the occurrence of obstructions of obstruction factors which are included in various groups into which the obstruction factors are divided; and
- a section which detects the number of the transmission lines in which obstructions have occurred at almost the same time by referring to the table.

27. An upper layer node as described in claim 24, further comprising a priority ranking retention section which retains information regarding restoration priority ranking during obstruction restoration of the transmission line of the lower layer network, and
- wherein the obstruction situation analysis section comprises a section which obtains information as to the restoration priority ranking which is retained by the priority ranking retention section for the transmission line upon which an obstruction has occurred, and
- wherein the ranking assignment section comprises a section which assigns a ranking which shows the seriousness of the obstruction and which is the higher the lower is the probability of restoration of the obstruction, which is inversely proportional to the restoration priority ranking.

28. An upper layer node as described in claim 24, wherein the obstruction situation analysis section comprises a section which detects the degree of concentration of network resources by referring to the topology information for the lower layer network upon which the obstruction has occurred, and
- wherein the ranking assignment section comprises a section which assigns a ranking which shows the seriousness of the obstruction and which is the higher the lower is the probability of restoration of the obstruction, which is inversely proportional to the degree of concentration.

29. An upper layer node as described in claim 24, wherein the predicted time period information retention section comprises:
- a retention section which retains link state information relating to the detailed structure of the lower layer network; and
- a predicted time period calculation section which calculates the predicted time period for each of the transmission lines, based upon a capability for alternate path establishment which is attributed to each of the transmission lines, as estimated from the link state information which is retained by the retention section.

30. An upper layer node as described in claim 29, wherein the predicted time period calculation section comprises a section which, as the capability for alternate path establishment, along with calculating the predicted time period for a transmission line during duplex operation as being almost zero, also re-recognizes the transmission line, during the occurrence of an obstruction, as being a simplex transmission line.

31. An upper layer node as described in claim 29, wherein the predicted time period calculation section comprises a section which, as the capability for alternate path establishment, calculates the predicted time period based upon the presence or absence of alternate paths at both the ends of the obstructed transmission line, and upon the state of vacancy or occupancy of the alternate paths.

32. An upper layer node as described in claim 24, wherein the predicted time period information retention section comprises a section which calculates, as the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

33. An upper layer node as described in claim 24, wherein the predicted time period information retention section comprises a section which calculates, as the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

34. An upper layer node which is used in a multi-layer network which comprises an upper layer network which performs switching and transfer in units of packets, and a lower layer network which accommodates the upper layer network and which comprises optical transmission lines and optical switches; the upper layer node being connected to the lower layer network which comprises a plurality of lower layer nodes which comprise obstruction restoration sections, and transmission lines; and the upper layer node comprising:
- a detection section which detects the occurrence of an obstruction upon a transmission line which the upper layer node accommodates;
- an advertisement section which advertises the result of detection by the detection section as obstruction information;
- a section which retains the topology information for the lower layer network;
- an updating section which updates the topology information which the upper layer node retains, according to obstruction information which has been advertised, or obstruction information which the upper layer node has detected;
- an advertisement transfer section which advertises to other upper layer nodes obstruction information which has been advertised;
- a retention section which retains a routing table which has been calculated based upon the topology information which has been updated according to the obstruction information, and which also retains a version of the routing table before the obstruction information was advertised; and
- a section which reverts to the version of the routing table before the obstruction information was advertised which is retained in the retention section, when the obstruction which was recorded in the obstruction information has been restored.

35. An upper layer node which is used in a multi-layer network which comprises an upper layer network which performs switching and transfer in units of packets, and a lower layer network which accommodates the upper layer network and which comprises optical transmission lines and optical switches; the upper layer node being connected to the lower layer network which comprises a plurality of lower layer nodes which comprise obstruction restoration sections, and transmission lines; and the upper layer node comprising:

a detection section which detects the occurrence of an obstruction upon a transmission line which the upper layer node accommodates;

an advertisement section which advertises the result of detection by the detection section as obstruction information;

a section which retains the topology information for the lower layer network;

an updating section which updates the topology information which the upper layer node retains, according to obstruction information which has been advertised, or obstruction information which the upper layer node has detected;

an advertisement transfer section which advertises to other upper layer nodes obstruction information which has been advertised, and an alternate path establishment section which establishes an alternate path to the transmission line in which an obstruction has occurred according to the topology information which has been updated by the updating section, and wherein the alternate path establishment section comprises:

a section which, along with establishing the alternate path, also retains for a predetermined time period the original establishment of the path according to the version of the topology information before the obstruction information was advertised; and a section which cancels the establishment of the alternate path when the obstruction which was recorded in the obstruction information has been restored within the predetermined time period, while canceling the establishment of the original path when the obstruction which was recorded in the obstruction information has net been restored even though the predetermined time period has elapsed.

36. An upper layer node which is used in a multi-layer network which comprises an upper layer network which performs switching and transfer in units of packets, and a lower layer network which accommodates the upper layer network and which comprises optical transmission lines and optical switches; the upper layer node being connected to the lower layer network which comprises a plurality of lower layer nodes which comprise obstruction restoration sections, and transmission lines; and the upper layer node comprising:

a detection section which detects the occurrence of an obstruction upon a transmission line which the upper layer node accommodates;

an advertisement section which advertises the result of detection by the detection section as obstruction information;

a section which retains the topology information for the lower layer network;

an updating section which updates the topology information which the upper layer node retains, according to obstruction information which has been advertised, or obstruction information which the upper layer node has detected;

an advertisement transfer section which advertises to other upper layer nodes obstruction information which has been advertised, and an alternate path establishment section which establishes an alternate path to the transmission line in which an obstruction has occurred according to the topology information which has been updated by the updating section, and wherein the alternate path establishment section comprises:

a section which, along with calculating the alternate path, also retains for a predetermined time period the original establishment of the path according to the version of the topology information before the obstruction information was advertised; and a section which cancels the result of calculation of the alternate path when the obstruction which was recorded in the obstruction information has been restored within the predetermined time period, while canceling the establishment of the original path and actually establishing the alternate path according to the result of the calculation, when the obstruction which was recorded in the obstruction information has not been restored even though the predetermined time period has elapsed.

37. An upper layer node which is used in a multi-layer network which comprises an upper layer network which performs switching and transfer in units of packets, and a lower layer network which accommodates the upper layer network and which comprises optical transmission lines and optical switches; the upper layer node being connected to the lower layer network which comprises a plurality of lower layer nodes which comprise obstruction restoration sections, and transmission lines; and the upper layer node comprising:

a detection section which detects the occurrence of an obstruction upon a transmission line which the upper layer node accommodates;

an advertisement section which advertises the result of detection by the detection section as obstruction information;

a section which retains the topology information for the lower layer network;

an updating section which updates the topology information which the upper layer node retains, according to obstruction information which has been advertised, or obstruction information which the upper layer node has detected;

an advertisement transfer section which advertises to other upper layer nodes obstruction information which has been advertised, and a link state information retention section which retains link state information relating to the detailed structure of the lower layer network, and wherein the detection section comprises a section which detects even the detailed obstruction situation upon the lower layer network according to the link state information which is retained by the link state information retention section, and wherein the updating section comprises a section which updates even the link state information which is retained by the link state information retention section.

38. An upper layer node as described in claim 37, further comprising a decision section which makes a decision as to the probability of obstruction restoration by the obstruction restoration section by referring to the link state information which has been updated by the updating section.

39. An upper layer node as described in claim 38, further comprising a section which makes a decision regarding the necessity of establishing an alternate path by referring to the result of the decision by the decision section and to the degree of importance of the communication which is being performed using the lower layer network.

40. An upper layer node as described in claim 38, further comprising a section which informs a predetermined user of the result of decision by the decision section.

41. An upper layer node as described in claim 38, further comprising a section which makes a decision regarding the necessity of establishing an alternate path by referring to the probability of obstruction restoration by the obstruction restoration section and to the degree of importance of the communication which is being performed using the lower layer network.

42. An upper layer node as described in claim 38, further comprising a section which informs a predetermined user of the probability of obstruction restoration by the obstruction restoration section.

43. An upper layer node as described in claim 37, further comprising a section which informs a predetermined user of the obstruction information and of the establishment situation of alternate paths.

44. A lower layer node which is used in a multi-layer network which comprises an upper layer network which performs switching and transfer in units of packets, and a lower layer network which accommodates the upper layer network, and which comprises optical transmission lines and optical switches; the lower layer node being provided in a lower layer network which connects between at least two of the upper layer nodes, wherein
the lower layer node comprising:
an obstruction restoration section which performs obstruction restoration for the lower layer network;
a detection section which detects the occurrence of an obstruction upon a transmission line which the lower layer node accommodates; and
an advertisement section which advertises as obstruction information the result of detection by the detection section,
wherein the advertisement section comprises a section which defers the emission of the advertisement for a time period T from the time instant that the occurrence of an obstruction has been detected by the detection section.

45. A lower layer node which is used in a multi-layer network which comprises an upper layer network which performs switching and transfer in units of packets, and a lower layer network which accommodates the upper layer network, and which comprises optical transmission lines and optical switches; the lower layer node being provided in a lower layer network which connects between at least two of the upper layer nodes, wherein
the lower layer node comprising:
an obstruction restoration section which performs obstruction restoration for the lower layer network;
a detection section which detects the occurrence of an obstruction upon a transmission line which the lower layer node accommodates; and
an advertisement section which advertises as obstruction information the result of detection by the detection section; and
a predicted time period information retention section which retains information as to the predicted time period required for obstruction restoration of the lower layer network, and
wherein the advertisement section comprises:
a first advertisement section which performs a first advertisement immediately after the occurrence of an obstruction upon the lower layer network has been detected by the detection section; and
a second advertisement section which performs a second advertisement when obstruction restoration for the transmission line has not been realized, even though the predicted time period which has been retained in the predicted time period information retention section has elapsed from the time instant that the first advertisement has been advertised by the first advertisement section.

46. A lower layer node as described in claim 45, further comprising a priority ranking retention section which retains information regarding restoration priority rankings during obstruction restoration of the transmission line of the lower layer network, and
wherein the advertisement section comprises a section which sets the lengths of the time periods from the time instant that the first advertisement has been advertised to the time instant that the second advertisement has been advertised, for a plurality of the transmission lines upon which obstructions have occurred at almost the same moment, individually to be inversely proportional to the restoration priority rankings which are retained by the priority ranking retention section.

47. A lower layer node as described in claim 45, wherein the predicted time period information retention section comprises:
a retention section which retains link state information relating to the detailed structure of the lower layer network; and
a predicted time period calculation section which calculates the predicted time period for each of the transmission lines, based upon a capability for alternate path establishment which is attributed to each of the transmission lines of the lower layer network, as estimated from the link state information which is retained by the retention section.

48. A lower layer node as described in claim 47, wherein the predicted time period calculation section comprises a section which, as the capability for alternate path establishment, along with calculating the predicted time period for a transmission line during duplex operation as being almost zero, also re-recognizes the transmission line, during the occurrence of an obstruction, as being a simplex transmission line.

49. A lower layer node as described in claim 45, wherein the predicted time period information retention section comprises a section which calculates, as the predicted time period between two of the nodes between which a working path and a protection path are established, the time period which is required for changing over from a virtual working path to a virtual protection path, when a simulated obstruction has been generated in the virtual working path, by taking paths which occupy vacant bands in the vicinity of the working path and the protection path respectively as the virtual working path and as the virtual protection path.

50. A lower layer node as described in claim 45, wherein the predicted time period information retention section comprises a section which calculates, as the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

51. A lower layer node which is used in a multi-layer network which comprises an upper layer network which performs switching and transfer in units of packets, and a lower layer network which accommodates the upper layer network, and which comprises optical transmission lines and optical switches; the lower layer node being provided in a lower layer network which connects between at least two of the upper layer nodes, the lower layer node comprising:
- an obstruction restoration section which performs obstruction restoration for the lower layer network;
- a detection section which detects the occurrence of an obstruction upon a transmission line which the lower layer node accommodates;
- an advertisement section which advertises as obstruction information the result of detection by the detection section, and
- a predicted time period information retention section which retains information as to the predicted time period required for obstruction restoration of the lower layer network, and
- wherein the advertisement section comprises:
- an obtaining section which obtains information as to the predicted time period which is required for the obstruction restoration by referring to the result of detection by the detection section and to the predicted time period which is retained by the predicted time period information retention section; and
- a section which performs an advertisement which includes information of the predicted time period which has been obtained by the obtaining section.

52. A lower layer node as described in claim 51, wherein the predicted time period information retention section comprises:
- a retention section which retains link state information relating to the detailed structure of the lower layer network; and
- a predicted time period calculation section which calculates the predicted time period for each of the transmission lines, based upon a capability for alternate path establishment which is attributed to each of the transmission lines of the lower layer network, as estimated from the link state information which is retained by the retention section.

53. A lower layer node as described in claim 52, wherein the predicted time period calculation section comprises a section which, as the capability for alternate path establishment, along with calculating the predicted time period for a transmission line during duplex operation as being almost zero, also re-recognizes the transmission line, during the occurrence of an obstruction, as being a simplex transmission line.

54. A lower layer node as described in claim 52, wherein the predicted time period calculation section comprises a section which, as the capability for alternate path establishment, calculates the predicted time period based upon the presence or absence of alternate paths at both the ends of the obstructed transmission line, and upon the state of vacancy or occupancy of the alternate paths.

55. A lower layer node as described in claim 51, wherein the predicted time period information retention section comprises a section which calculates, as the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

56. A lower layer node as described in claim 51, wherein the predicted time period information retention section comprises a section which calculates, as the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

57. A lower layer node which is used in a multi-layer network which comprises an upper layer network which performs switching and transfer in units of packets, and a lower layer network which accommodates the upper layer network, and which comprises optical transmission lines and optical switches; the lower layer node being provided in a lower layer network which connects between at least two of the upper layer nodes, the lower layer node comprising:
- an obstruction restoration section which performs obstruction restoration for the lower layer network;
- a detection section which detects the occurrence of an obstruction upon a transmission line which the lower layer node accommodates;
- an advertisement section which advertises as obstruction information the result of detection by the detection section,
- an obstruction situation analysis section which analyzes the obstruction situation according to the results of detection by the detection section; and
- a ranking assignment section which, according to the result of the analysis by the obstruction situation analysis section, assigns a ranking which shows the seriousness of the obstruction and which is the higher the lower is the probability of restoration of the obstruction, and
- wherein the advertisement section comprises a conditional advertisement section which performs advertisement of obstruction whose ranking is greater than a predetermined ranking by referring to the results of ranking assignment performed by the ranking assignment section.

58. A lower later node as described in claim 57, wherein the obstruction situation analysis section comprises a transmission line detection section which detects a number of the transmission lines in which obstructions have occurred at almost the same time, and
- wherein the ranking assignment section comprises a section which assigns a ranking based upon the number of the transmission lines in which obstructions have occurred at almost the some time.

59. A lower later as described in claim 58, wherein the transmission line number detection section comprises:
- a table in which the transmission lines in which stoppage may occur are recorded corresponding to the occurrence of obstructions of obstruction factors which are included in various groups into which the obstruction factors are divided; and
- a section which detects the number of the transmission lines in which obstructions have occurred at almost the same time by referring to the table.

60. A lower layer node as described in claim 57, further comprising a priority ranking retention section which retains information regarding restoration priority ranking during obstruction restoration of the transmission line of the lower layer network, and
- wherein the obstruction situation analysis section comprises a section which obtains information as to the restoration priority ranking which is retained by the priority ranking retention section for the transmission line upon which an obstruction has occurred, and wherein the ranking assignment section comprises a section which assigns a ranking which shows the seriousness of the obstruction and which is the higher the lower is the probability of restoration of the obstruction, which is inversely proportional to the restoration priority ranking.

61. A lower layer node as described in claim 57, wherein the obstruction situation analysis section comprises a section which detects the degree of concentration of network resources by referring to the topology information for the lower layer network upon which the obstruction has occurred, and
wherein the ranking assignment section comprises a section which assigns a ranking which shows the seriousness of the obstruction and which is the higher the lower is the probability of restoration of the obstruction, which is inversely proportional to the degree of concentration.

62. A lower layer node which is used in a multi-layer network which comprises an upper layer network which performs switching and transfer in units of packets, and a lower layer network which accommodates the upper layer network, and which comprises optical transmission lines and optical switches; the lower layer node being provided in a lower aver network which connects between at least two of the upper layer nodes, the lower layer node comprising:
an obstruction restoration section which performs obstruction restoration for the lower layer network;
a detection section which detects the occurrence of an obstruction upon a transmission line which the lower layer node accommodates; and
an advertisement section which advertises as obstruction information the result of detection by the detection section,
an obstruction situation analysis section which analyzes the obstruction situation according to the result of detection by the detection section;
a ranking assignment section which assigns a ranking which shows the seriousness of the obstruction and which is the higher the lower is the probability of restoration of the obstruction, according to the result of analysis by the obstruction situation analysis section; and
a predicted time period information retention section which retains information relating to the predicted time period which is required for obstruction restoration by the lower layer network, and
wherein the advertisement section comprises:
a section which emits, for an obstruction of ranking which is less than a predetermined ranking by reference to the results of ranking assignment by the ranking assignment section, a limited advertisement which includes limitation information to the effect that advertisement is being performed limited to those ones of the upper layer nodes which are directly related to the lower layer network which is obstructed; and
a section which emits a prohibition removing advertisement to the effect that limitation indicated by the limitation information is removed, when the obstructed lower layer network has not been restored even after the predicted time period which is retained by the predicted time period information retention section has elapsed from the emission of the limited advertisement.

63. A lower layer node as described in claim 62, wherein the obstruction situation analysis section comprises a transmission line number detection section which detects a number of the transmission lines in which obstructions have occurred at almost the same time, and
wherein the ranking assignment section comprises a section which assigns a ranking based upon the number of the transmission lines in which obstructions have occurred at almost the same time.

64. A lower layer node as described in claim 63, wherein the transmission line number detection section comprises:
a table in which the transmission lines in which stoppage may occur are recorded corresponding to the occurrence of obstructions of obstruction factors which are included in various groups into which the obstruction factors are divided; and
a section which detects the number of the transmission lines in which obstructions have occurred at almost the same time by referring to the table.

65. A lower layer node as described in claim 62, further comprising a priority ranking retention section which retains information regarding restoration priority ranking during obstruction restoration of the transmission line of the lower layer network, and
wherein the obstruction situation analysis section comprises a section which obtains information as to the restoration priority ranking which is retained by the priority ranking retention section for the transmission line upon which an obstruction has occurred, and
wherein the ranking assignment section comprises a section which assigns a ranking which shows the seriousness of the obstruction and which is the higher the lower is the probability of restoration of the obstruction, which is inversely proportional to the restoration priority ranking.

66. A lower layer node as described in claim 62, wherein the obstruction situation analysis section comprises a section which detects the degree of concentration of network resources by referring to the topology information for the lower layer network upon which the obstruction has occurred, and
wherein the ranking assignment section comprises a section which assigns a ranking which shows the seriousness of the obstruction and which is the higher the lower is the probability of restoration of the obstruction, which is inversely proportional to the degree of concentration.

67. A lower layer node as described in claim 62, wherein the predicted time period information retention section comprises:
a retention section which retains link state information relating to the detailed structure of the lower layer network; and
a predicted time period calculation section which calculates the predicted time period for each of the transmission lines, based upon a capability for alternate path establishment which is attributed to each of the transmission lines of the lower layer network, as estimated from the link state information which is retained by the retention section.

68. A lower layer node as described in claim 67, wherein the predicted time period calculation section comprises a section which, as the capability for alternate path establishment, along with calculating the predicted time period for a transmission line during duplex operation as being almost zero, also re-recognizes the transmission line, during the occurrence of an obstruction, as being a simplex transmission line.

69. A lower layer node as described in claim 67, wherein the predicted time period calculation section comprises a section which, as the capability for alternate path establishment, calculates the predicted time period based upon the presence or absence of alternate paths at both the ends of the obstructed transmission line, and upon the state of vacancy or occupancy of the alternate paths.

70. A lower layer node as described in claim 62, wherein the predicted time period information retention section comprises a calculation section which calculates, as the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

71. A lower layer node as described in claim 62, wherein the predicted time period information retention section comprises a calculation section which calculates, as the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

72. A network control method which is applied to a multi-layer network which comprises: an upper layer network which performs switching and transfer in units of packets; and a lower layer network which accommodates the upper layer network and comprises optical transmission lines and optical switches, the multi-layer network comprises a plurality of nodes and transmission lines disposed between the plurality of nodes, with the plurality of nodes including an upper layer node and a lower layer node, at least two of the upper layer nodes being connected by the lower layer network which comprises: a plurality of lower layer nodes; and the transmission lines, and with the lower layer network being provided with an obstruction restoration process, the network control method comprising:

detecting the upper layer node and the lower layer node detecting the occurrence of an obstruction upon a transmission line which the upper layer node and the lower layer node accommodate;

advertising the result of detection by the detection step as obstruction information;

retaining by the upper layer node the topology information for the lower layer network;

updating by the upper layer node the topology information which the upper layer node retains, according to obstruction information which has been advertised, or obstruction information which the upper layer node has detected;

transferring by the upper layer node to other upper layer nodes obstruction information which has been advertised; and establishing an alternate path which detours around the transmission line in which an obstruction has occurred, according to topology information which has been updated by the updating step, and wherein the alternate path establishment step comprises:
 retaining for a predetermined time period the establishment of the original path according to the version of the topology information before the obstruction information was advertised; and canceling the establishment of the alternate path when the obstruction which was recorded in the obstruction information has been restored within the predetermined time period, while canceling the establishment of the original path when the obstruction which was recorded in the obstruction information has not been restored even though the predetermined time period has elapsed.

73. A network control method which is applied to a multi-layer network which comprises: an upper layer network which performs switching and transfer in units of packets; and a lower layer network which accommodates the upper layer network and comprises optical transmission lines and optical switches, the multi-layer network comprises a plurality of nodes and transmission lines disposed between the plurality of nodes, with the plurality of nodes including an upper layer node and a lower layer node, at least two of the upper layer nodes being connected by the lower layer network which comprises: a plurality of lower layer nodes; and the transmission lines, and with the lower layer network being provided with an obstruction restoration process, the network control method comprising:

detecting the upper layer node and the lower layer node detecting the occurrence of an obstruction upon a transmission line which the upper layer node and the lower layer node accommodate;

advertising the result of detection by the detection step as obstruction information;

retaining by the upper layer node the topology information for the lower layer network;

updating by the upper layer node the topology information which the upper layer node retains, according to obstruction information which has been advertised, or obstruction information which the upper layer node has detected;

transferring by the upper layer node to other upper layer nodes obstruction information which has been advertised; and establishing an alternate path which detours around the transmission line in which an obstruction has occurred, according to topology information which has been updated by the updating step, and wherein the alternate path establishment step comprises:
 retaining for a predetermined time period the establishment of the original path according to the version of the topology information before the obstruction information was advertised; and canceling the result of calculating the alternate path when the obstruction which was recorded in the obstruction information has been restored within the predetermined time period, while canceling the establishment of the original path and actually establishing the alternate path according to the result of the calculation, when the obstruction which was recorded in the obstruction information has not been restored even though the predetermined time period has elapsed.

74. A network control method which is applied to a multi-layer network which comprises: an upper layer network which performs switching and transfer in units of packets; and a lower layer network which accommodates the upper layer network and comprises optical transmission lines and optical switches, the multi-layer network comprises a plurality of nodes and transmission lines disposed between the plurality of nodes, with the plurality of nodes including an upper layer node and a lower layer node, at least two of the upper layer nodes being connected by the lower layer network which comprises: a plurality of lower layer nodes; and the transmission lines, and with the lower layer network being provided with an obstruction restoration process, the network control method comprising:

detecting the occurrence of an obstruction upon a transmission line which the upper layer node and the lower layer node accommodate;

advertising the result of detection by the detection step as obstruction information;

retaining the topology information for the lower layer network;

updating the topology information which the upper layer node retains, according to obstruction information which has been advertised, or obstruction information which the upper layer node has detected;

transferring to other upper layer nodes obstruction information which has been advertised; and a routing table retention step of retaining a routing table which has been calculated based upon the topology information which has been updated according to the obstruction information, and also retaining a version of the routing table before the obstruction information was advertised; and a routing table reversion step of reverting to the version of the routing table before the obstruction information was advertised which is retained by the retention step, when the obstruction which was recorded in the obstruction information has been restored.

75. A network control method which is applied to a multi-layer network which comprises: an upper layer network which performs switching and transfer in units of packets; and a lower layer network which accommodates the upper layer network and comprises optical transmission lines and optical switches, the multi-layer network comprises a plurality of nodes and transmission lines disposed between the plurality of nodes, with the plurality of nodes including an upper layer node and a lower layer node, at least two of the upper layer nodes being connected by the lower layer network which comprises: a plurality of lower layer nodes; and the transmission lines, and with the lower layer network being provided with an obstruction restoration process, the network control method comprising:

detecting the occurrence of an obstruction upon a transmission line which the upper layer node and the lower layer node accommodate;

advertising the result of detection by the detection step as obstruction information;

retaining the topology information for the lower layer network;

updating the topology information which the upper layer node retains, according to obstruction information which has been advertised, or obstruction information which the upper layer node has detected;

transferring to other upper layer nodes obstruction information which has been advertised, wherein the updating step comprises a deferral step of deferring the updating of the topology information for a time period T from the time instant that the obstruction information has been advertised.

76. A network control method as described in claim 75, further comprising retaining information in a predicted restoration time period information retention section as to the predicted time period required for obstruction restoration of the lower layer network, and wherein the advertisement step of at least the lower layer node comprises:

performing a first advertisement immediately after the occurrence of an obstruction upon the lower layer network has been detected by the detection step; and performing a second advertisement when obstruction restoration for the lower layer node has not been realized, even though the predicted time period which has been retained in the predicted restoration time period information retention section has elapsed from the time instant that the first advertisement has been advertised by the first advertisement step, and taking the time period from a first advertisement time instant when the first advertisement is received until a second advertisement time instant when the second advertisement is received as the time period T.

77. A network control method as described in claim 76, further comprising retaining in a priority ranking retention section information regarding restoration priority rankings during obstruction restoration of the transmission line of the lower layer network, and setting the lengths of the time periods from the first advertisement time instant to the second advertisement time instant, for a plurality of the transmission lines upon which obstructions have occurred at almost the same moment, individually to be inversely proportional to the restoration priority rankings which are retained by the priority ranking retention section.

78. A network control method as described in claim 76, comprises:

retaining link state information relating to the detailed structure of the lower layer network in a link state information retention section; and calculating the predicted time period for each of the transmission lines, based upon a capability for alternate path establishment which is attributed to each of the transmission lines of the lower layer network, as estimated from the link state information which is retained by the retention step.

79. A network control method as described in claim 78, calculating the predicted time period for a transmission line during duplex operation as being almost zero, also re-recognizing the transmission line, during the occurrence of an obstruction, as being a simplex transmission line.

80. A network control method as described in claim 78, calculating the predicted time period based upon the presence or absence of alternate paths at both the ends of the transmission line which is the object of the calculation, and upon the state of vacancy or occupancy of the alternate paths.

81. A network control method as described in claim 76, calculating, as the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

82. A network control method as described in claim 76, calculating the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

83. A network control method as described in claim 75, further comprising retaining information regarding the predicted time period required for obstruction restoration of the lower layer network in a predicted restoration time period information retention section, and wherein the advertisement step of at least the lower layer node comprises:

obtaining information as to the predicted time period which is required for the obstruction restoration by referring to the result of detection by the detection step and to the predicted time period which is retained by the predicted restoration time period information retention section; and performing an advertisement which includes information of the predicted time period which has been obtained by the obtaining step, and setting the predicted time period which is contained in the advertisement as the time period T.

84. A network control method as described in claim 83, comprises:

retaining link state information relating to the detailed structure of the lower layer network in a link state information retention section; and calculation step of calculating the predicted time period for each of the transmission lines, based upon a capability for alternate path establishment which is attributed to each of the transmission lines of the lower layer network, as estimated from the link state information which is retained by the retention step.

85. A network control method as described in claim 84, comprising calculating the predicted time period for a transmission line during duplex operation as being almost zero, also re-recognizing the transmission line, during the occurrence of an obstruction, as being a simplex transmission line.

86. A network control method as described in claim 84, comprising calculating the predicted time period based upon the presence or absence of alternate paths at both the ends of the transmission line which is the object of the calculation, and upon the state of vacancy or occupancy of the alternate paths.

87. A network control method as described in claim 83, comprising calculating the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

88. A network control method as described in claim 83, comprising calculating the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

89. A network control method as described in claim 75, comprising deferring advertisement to the other upper layer nodes until a deferral time period set by the deferral step has elapsed.

90. A network control method as described in claim 75, further comprising retaining information regarding the predicted time period required for obstruction restoration of the lower layer network in a predicted restoration time period information retention section, and wherein the deferral step comprises:

obtaining information as to the predicted time period which is required for the obstruction restoration by referring to the obstruction information and to the predicted time period which is retained by the predicted restoration time period information retention section; and taking the predicted time period which has been obtained by the obtaining step as the time period T.

91. A network control method as described in claim 90, comprises:

retaining link state information relating to the detailed structure of the lower layer network in a link state information retention section; and calculating the predicted time period for each of the transmission lines, based upon a capability for alternate path establishment which is attributed to each of the transmission lines of the lower layer network, as estimated from the link state information which is retained by the retention step.

92. A network control method as described in claim 91, calculating the predicted time period for a transmission line during duplex operation as being almost zero, also re-recognizing the transmission line, during the occurrence of an obstruction, as being a simplex transmission line.

93. A network control method as described in claim 91, comprising calculating the predicted time period based upon the presence or absence of alternate paths at both the ends of the transmission line which is the object of the calculation, and upon the state of vacancy or occupancy of the alternate paths.

94. A network control method as described in claim 90, comprising calculating the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

95. A network control method as described in claim 90, comprising calculating the predicted time period between two of the nodes between which a path is already established, the time period which is required for changing over from a virtual path to an alternate path, by taking a path which occupies a vacant band in the vicinity of the already established path as the virtual path, by searching for the alternate path for the virtual path when a simulated obstruction has been generated in the virtual path.

96. A network control method as described in claim 75, comprising performing an advertisement at fixed intervals while an obstruction is being detected by the detection step, and taking the time period until the advertisement has been received a number of times which is determined in advance as being the time period T.

97. A network control method as described in claim 75, further comprising: analyzing the obstruction situation according to the results of detection by the detection step; and assigning a ranking which shows the seriousness of the obstruction and which is the higher the lower is the probability of restoration of the obstruction, and performing advertisement of obstructions whose ranking is greater than a predetermined ranking by referring to the results of ranking assignment performed by the ranking assignment step.

98. A network control method as described in claim 97, further comprising retaining in a restoration priority ranking retention section information regarding restoration priority ranking during obstruction restoration of the transmission lines of the lower layer network, and obtaining information as to the restoration priority ranking which is retained by the priority ranking retention section for the transmission line upon which an obstruction has occurred, and assigning a ranking which shows the seriousness of the obstruction and which is the higher the lower is the probability of restoration of the obstruction, which is inversely proportional to the restoration priority ranking.

99. A network control method as described in claim 97, comprising detecting the degree of concentration of network resources by referring to link state information relating to the detailed structure of the lower layer network upon which the obstruction has occurred, and assigning a ranking which shows the seriousness of the obstruction and which is the higher the lower is the probability of restoration of the obstruction, which is inversely proportional to the degree of concentration.

100. A network control method as described in claim 97, comprising detecting a number of the transmission lines in which obstructions have occurred at almost the same time, and assigning a ranking based upon the number of the transmission lines in which obstructions have occurred at almost the same time.

101. A network control method as described in claim 100, comprises:

recording in a table the transmission lines in which stoppage may occur corresponding to the occurrence of obstructions of obstruction factors which are included in various groups into which the obstruction factors are divided, and detecting the number of the transmission lines in which obstructions have occurred at almost the same time by referring to the table.

102. A network control method as described in claim 75, further comprising:

analyzing the obstruction situation according to the result of detection by the detection step;

assigning a ranking which shows the seriousness of the obstruction and which is the higher the lower is the probability of restoration of the obstruction, according to the result of analysis by the obstruction situation analysis step; and retaining in a predicted restoration time period information retention section information relating to the predicted time period which is required for obstruction restoration by the lower layer network, and wherein comprises:

emitting, for an obstruction of ranking which is less than a predetermined ranking by reference to the results of ranking assignment by the ranking assignment step, a limited advertisement which includes limitation information to the effect that advertisement is being performed limited to those ones of the upper layer nodes which are directly related to the lower layer network which is obstructed; and emitting a prohibition removing advertisement to the effect that the limitation is removed, when the obstructed lower layer network has not been restored even after the predicted time period which is retained by the predicted time period information retention section has elapsed from the emission of the limited advertisement, and preventing advertisement to the other ones of the upper layer nodes when the limited advertisement is received, according to the limitation information, until the receipt of the prohibition removing advertisement.

103. A network control method as described in claim 102, comprising detecting a number of the transmission lines in which obstructions have occurred at almost the same time, and assigning a ranking based upon the number of the transmission lines in which obstructions have occurred at almost the same time.

104. A network control method as described in claim 103, comprises:

recording in a table the transmission lines in which stoppage may occur corresponding to the occurrence of obstructions of obstruction factors which are included in various groups into which the obstruction factors are divided; and detecting the number of the transmission lines in which obstructions have occurred at almost the same time by referring to the table.

105. A network control method as described in claim 102, further comprising retaining in a restoration priority ranking retention section information regarding restoration priority ranking during obstruction restoration of the transmission lines of the lower layer network, and obtaining information as to the restoration priority ranking which is retained by the priority ranking retention section for the transmission line upon which an obstruction has occurred; and assigning a ranking which shows the seriousness of the obstruction and which is the higher the lower is the probability of restoration of the obstruction, which is inversely proportional to the restoration priority ranking.

106. A network control method as described in claim 102, comprising detecting the degree of concentration of network resources by referring to the link state information relating to the detailed structure of the lower layer network upon which the obstruction has occurred, and assigning a ranking which shows the seriousness of the obstruction and which is the higher the lower is the probability of restoration of the obstruction, which is inversely proportional to the degree of concentration.

107. A network control method as described in claim 102, comprises:

retaining in a link state information retention section link state information relating to the detailed structure of the lower layer network; and calculating the predicted time period for each of the transmission lines, based upon a capability for alternate path establishment which is attributed to each of the transmission lines of the lower layer network, as estimated from the link state information which is retained by the retention step.

108. A network control method as described in claim 107, comprising calculating the predicted time period for a transmission line during duplex operation as being almost zero, also re-recognizing the transmission line, during the occurrence of an obstruction, as being a simplex transmission line.

109. A network control method as described in claim 107, comprising calculating the predicted time period based upon the presence or absence of alternate paths at both the ends of the transmission line which is the object of the calculation, and upon the state of vacancy or occupancy of the alternate paths.

110. A network control method as described in claim 102, comprising calculating the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

111. A network control method as described in claim 102, comprising calculating the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

112. A network control method which is applied to a multi-layer network which comprises: an upper layer network which performs switching and transfer in units of packets; and a lower layer network which accommodates the upper layer network and comprises optical transmission lines and optical switches, the multi-layer network comprises a plurality of nodes and transmission lines disposed between the plurality of nodes, with the plurality of nodes including an upper layer node and a lower layer node, at least two of the upper layer nodes being connected by the lower layer network which comprises: a plurality of lower layer nodes; and the transmission lines, and with the lower layer network being provided with an obstruction restoration process, the network control method comprising:
   detecting the occurrence of an obstruction upon a transmission line which the upper layer node and the lower layer node accommodate;
   advertising the result of detection by the detection step as obstruction information;
   retaining the topology information for the lower layer network;
   updating the topology information which the upper layer node retains, according to obstruction information which has been advertised, or obstruction information which the upper layer node has detected;
   transferring to other upper layer nodes obstruction information which has been advertised; and
   a time period T deferral step of a control section, which is provided between the lower layer network and the upper layer node, deferring the advertisement of the obstruction information to the upper layer node for a time period T from the receipt of the obstruction information which has been advertised by the advertisement step of the lower layer node.

113. A network control method as described in claim 112, comprises:
   retaining in a predicted time period information retention section information regarding the predicted time period required for obstruction restoration of the lower layer network;
   obtaining information as to the predicted time period which is required for the obstruction restoration by referring to the obstruction information and to the predicted time period which is retained by the predicted time period information retention section; and
   taking the predicted time period which has been obtained by the obtaining step as the time period T.

114. A network control method as described in claim 113, comprises:
   retaining in a link state information retention section link state information related to the detailed structure of the lower layer network; and
   calculating the predicted time period for each of the transmission lines, based upon a capability for alternate path establishment which is attributed to each of the transmission lines, as estimated from the link state information which is retained in the link state information retention section.

115. A network control method as described in claim 113, comprising calculating the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

116. A network control method as described in claim 113, comprising calculating the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

117. A network control method which is applied to a multi-layer network which comprises: an upper layer network which performs switching and transfer in units of packets; and a lower layer network which accommodates the upper layer network and comprises optical transmission lines and optical switches, the multi-layer network comprises a plurality of nodes and transmission lines disposed between the plurality of nodes, with the plurality of nodes including an upper layer node and a lower layer node, at least two of the upper layer nodes being connected by the lower layer network which comprises: a plurality of lower layer nodes; and the transmission lines, and with the lower layer network being provided with an obstruction restoration process, the network control method comprising:
   detecting the occurrence of an obstruction upon a transmission line which the upper layer node and the lower layer node accommodate;
   advertising the result of detection by the detection step as obstruction information;
   retaining the topology information for the lower layer network;
   updating the topology information which the upper layer node retains, according to obstruction information which has been advertised, or obstruction information which the upper layer node has detected;
   transferring to other upper layer nodes obstruction information which has been advertised; and
   receiving obstruction information which is advertised between the upper layer nodes, and deferring the advertisement of the obstruction information to the other upper layer nodes for a time period T.

118. A network control method as described in claim 117, comprises:
   retaining in a predicted time period information retention section information regarding the predicted time period required for obstruction restoration of the lower layer network;

obtaining information as to the predicted time period which is required for the obstruction restoration by referring to the obstruction information and to the predicted time period which is retained by the predicted time period information retention section; and taking the predicted time period which has been obtained by the obtaining step as the time period T.

119. A network control method as described in claim 118, comprises:

retaining in a link state information retention section link state information relating to the detailed structure of the lower layer network; and calculating the predicted time period for each of the transmission lines, based upon a capability for alternate path establishment which is attributed to each of the transmission lines, as estimated from the link state information which is retained in the link state information retention section.

120. A network control method as described in claim 118, comprising calculating the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

121. A network control method as described in claim 118, comprising calculating the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

122. A network control method which is applied to a multi-layer network which comprises: an upper layer network which performs switching and transfer in units of packets; and a lower layer network which accommodates the upper layer network and comprises optical transmission lines and optical switches, the multi-layer network comprises a plurality of nodes and transmission lines disposed between the plurality of nodes, with the plurality of nodes including an upper layer node and a lower layer node, at least two of the upper layer nodes being connected by the lower layer network which comprises: a plurality of lower layer nodes; and the transmission lines, and with the lower layer network being provided with an obstruction restoration process, the network control method comprising:

detecting the occurrence of an obstruction upon a transmission line which the upper layer node and the lower layer node accommodate;

advertising the result of detection by the detection step as obstruction information;

retaining the topology information for the lower layer network;

updating the topology information which the upper layer node retains, according to obstruction information which has been advertised, or obstruction information which the upper layer node has detected;

transferring to other upper layer nodes obstruction information which has been advertised;

analyzing the obstruction situation according to the obstruction information; and processing the contents of the advertisement according to the result of analysis by the obstruction situation analysis step.

123. A network control method as described in claim 122, comprises:

assigning, according to the result of the analysis by the obstruction situation analysis step, a ranking which shows the seriousness of the obstruction and which is the higher the lower is the probability of restoration of the obstruction; and performing advertisement of obstructions whose ranking is greater than a predetermined ranking by referring to the results of ranking assignment performed by the ranking assignment step.

124. A network control method as described in claim 122, comprises:

retaining in a predicted restoration time period information retention section information relating to the predicted time period which is required for obstruction restoration by the lower layer network;

assigning, according to the result of the analysis by the obstruction situation analysis step, a ranking which shows the seriousness of the obstruction and which is the higher the lower is the probability of restoration of the obstruction;

emitting, for an obstruction of ranking which is less than a predetermined ranking, by reference to the results of ranking assignment by the ranking assignment step, a limited advertisement which includes limitation information to the effect that advertisement is being performed limited to those ones of the upper layer nodes which are directly related to the lower layer network which is obstructed; and emitting a prohibition removing advertisement to the effect that the limitation is removed, when the obstructed lower layer network has not been restored even after the predicted time period which is retained by the predicted restoration time period information retention section has elapsed from the emission of the limited advertisement, and preventing advertisement to the other ones of the upper layer nodes when the limited advertisement is received, according to the limitation information, until the receipt of the prohibition removing advertisement.

125. A network control method as described in claim 124, comprises:

retaining in a link state information retention section link state information relating to the detailed structure of the lower layer network; and calculating the predicted time period for each of the transmission lines, based upon a capability for alternate path establishment which is attributed to each of the transmission lines, as estimated from the link state information which is retained by the link state information retention section.

126. A network control method as described in claim 125, comprising calculating the predicted time period for a transmission line during duplex operation as being almost zero, also re-recognizing the transmission line, during the occurrence of an obstruction, as being a simplex transmission line.

127. A network control method as described in claim 125, comprising calculating the predicted time period based upon the presence or absence of alternate paths at both the ends of the obstructed transmission line, and upon the state of vacancy or occupancy of the alternate paths.

128. A network control method as described in claim 124, comprising calculating the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

129. A network control method as described in claim 124, comprising calculating the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

130. A network control method as described in claim 122, comprises:
   producing command information for the upper layer node according to the result of analysis by the obstruction situation analysis step; and
   emitting to the upper layer node an advertisement which includes the command information which has been produced by the producing step, and
   processing which has been commanded according to the command information which is included in the advertisement.

131. An advertisement control device which is used in a multi-layer network which comprises: an upper layer network which performs switching and transfer in units of packets; and a lower layer network which accommodates the upper layer network and comprises optical transmission lines and optical switches, the multi-layer network further comprising: a plurality of nodes; and transmission lines which are provided between the plurality of nodes, with the plurality of nodes including: an upper layer node; and a lower layer node, at least two of the upper layer nodes being connected by the lower layer network which comprises: a plurality of the lower layer nodes; and the transmission lines, an obstruction restoration section for the lower layer network being provided to the lower layer node, each of the upper layer node and the lower layer node comprising: a detection section which detects the occurrence of an obstruction upon a transmission line which each of the upper layer node and the lower layer node accommodates; and a section which advertises the result of detection by the detection section as obstruction information, the upper layer node comprising: a retention section which retains the topology information for the lower layer network; an updating section which updates the topology information which the upper layer node retains, according to obstruction information which has been advertised, or obstruction information which the upper layer node has detected; and an advertisement transfer section which advertises to other ones of the upper layer nodes obstruction information which has been advertised,
   the advertisement control device being provided between the upper layer nodes and the lower layer node in the multi-layer network, performing transfer control of the obstruction information between the lower layer network and the upper layer nodes, and
   comprising a time period T deferral section which receives the obstruction information which has been advertised by the advertisement section of the lower layer node and which defers for a time period T the advertisement of the obstruction information to the upper layer node.

132. An advertisement control device as described in claim 131, wherein the time period T deferral section comprises:
   a predicted time period information retention section which retains information regarding the predicted time period required for obstruction restoration of the lower layer network;
   an obtaining section which obtains information as to the predicted time period which is required for the obstruction restoration by referring to the obstruction information and to the predicted time period which is retained by the predicted time period information retention section; and
   a section which takes the predicted time period which has been obtained by the obtaining section as the time period T.

133. An advertisement control device as described in claim 132, wherein the predicted time period information retention section comprises:
   a retention section which retains link state information relating to the detailed structure of the lower layer network; and
   a predicted time period calculation section which calculates the predicted time period for each of the transmission lines, based upon a capability for alternate path establishment which is attributed to each of the transmission lines, as estimated from the link state information which is retained by the retention section.

134. An advertisement control device as described in claim 133, wherein the predicted time period calculation section comprises a section which, as the capability for alternate path establishment, along with calculating the predicted time period for a transmission line during duplex operation as being almost zero, also re-recognizes the transmission line, during the occurrence of an obstruction, as being a simplex transmission line.

135. An advertisement control device as described in claim 133, wherein the predicted time period calculation section comprises a section which, as the capability for alternate path establishment, calculates the predicted time period based upon the presence or absence of alternate paths at both the ends of the obstructed transmission line, and upon the state of vacancy or occupancy of the alternate paths.

136. An advertisement control device as described in claim 132, wherein the predicted time period information retention section comprises a section which calculates, as the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

137. An advertisement control device as described in claim 132, wherein the predicted time period information retention section comprises a section which calculates, as the predicted time period between two of the nodes between which a path is already established, the time period which is required for changing over from a virtual path to an alternate path, by taking a path which occupies a vacant band in the vicinity of the already established path as the virtual path, and by searching for the alternate path for the virtual path when a simulated obstruction has been generated in the virtual path.

138. An advertisement control device which is used in a multi-layer network which comprises: an upper layer network which performs switching and transfer in units of packets; and a lower layer network which accommodates the upper layer network and comprises optical transmission lines and optical switches, the multi-layer network further comprising: a plurality of nodes; and transmission lines which are provided between the plurality of nodes, with the plurality of nodes including: an upper layer node; and a lower layer node, at least two of the upper layer nodes being connected by the lower layer network which comprises: a plurality of the lower layer nodes; and the transmission lines, an obstruction restoration section for the lower layer network being provided to the lower layer node, each of the upper layer node and the lower layer node comprising: a detection section which detects the occurrence of an obstruction upon a transmission line which each of the upper layer node and the lower layer node accommodates; and a section which advertises the result of detection by the detection section as obstruction information, the upper layer node comprising: a retention section which retains the topology information for the lower layer network; an updating section which updates the topology information which the upper layer node retains, according to obstruction information which has been advertised, or obstruction information which the upper layer node has detected; and an advertisement transfer section which advertises to other ones of the upper layer nodes obstruction information which has been advertised, the advertisement control device being provided between the upper layer nodes and the lower layer node in the multi-layer network, performing transfer control of the obstruction information between the lower layer network and the upper layer nodes, and comprising:

an obstruction situation analysis section which analyzes the obstruction situation according to the obstruction information; and a processing section which processes the contents of the obstruction information according to the result of analysis by the obstruction situation analysis section.

139. An advertisement control device as described in claim 138, wherein the processing section comprises:

a ranking assignment section which, according to the result of the analysis by the obstruction situation analysis section, assigns a ranking which shows the seriousness of the obstruction and which is the higher the lower is the probability of restoration of the obstruction; and a conditional advertisement section which performs advertisement of obstructions whose ranking is greater than a predetermined ranking by referring to the results of ranking assignment performed by the ranking assignment section.

140. An advertisement control device as described in claim 138, wherein the processing section comprises:

a predicted time period information retention section which retains information relating to the predicted time period which is required for obstruction restoration by the lower layer network;

a ranking assignment section which assigns a ranking which shows the seriousness of the obstruction and which is the higher the lower is the probability of restoration of the obstruction, according to the result of analysis by the obstruction situation analysis section;

a section which emits, for an obstruction of ranking which is less than a predetermined ranking, by reference to the results of ranking assignment by the ranking assignment section, a limited advertisement which includes limitation information to the effect that advertisement is being performed limited to those ones of the upper layer nodes which are directly related to the lower layer network which is obstructed; and a section which emits a prohibition removing advertisement to the effect that the limitation is removed, when the obstructed transmission line has not been restored even after the predicted time period which is retained by the predicted time period information retention section has elapsed from the emission of the limited advertisement, and wherein the advertisement control device further comprising a section which, for the upper layer node, prevents advertisement to the other ones of the upper layer nodes by the receipt of the limited advertisement, according to the limitation information, until the receipt of the prohibition removing advertisement.

141. An advertisement control device as described in claim 140, wherein the predicted time period information retention section comprises:

a retention section which retains link state information relating to the detailed structure of the lower layer network; and a predicted time period calculation section which calculates the predicted time period for each of the transmission lines, based upon a capability for alternate path establishment which is attributed to each of the transmission lines, as estimated from the link state information which is retained by the retention section.

142. An advertisement control device as described in claim 141, wherein the predicted time period calculation section comprises a section which, as the capability for alternate path establishment along with calculating the predicted time period for a transmission line during duplex operation as being almost zero, also re-recognizes the transmission line, during the occurrence of an obstruction, as being a simplex transmission line.

143. An advertisement control device as described in claim 141, wherein the predicted time period calculation section comprises a section which, as the capability for alternate path establishment, calculates the predicted time period based upon the presence or absence of alternate paths at both the ends of the obstructed transmission line, and upon the state of vacancy or occupancy of the alternate paths.

144. An advertisement control device as described in claim 140, wherein the predicted time period information retention section comprises a section which calculates the predicted time period between two of the nodes between which a working path and a protection path are established, the time period which is required for changing over from a virtual working path to a virtual protection path when a simulated obstruction has been generated in the virtual working path, by taking paths which occupy vacant bands in the vicinity of the working path and the protection path respectively as the virtual working path and as the virtual protection path.

145. An advertisement control device as described in claim 140, wherein the predicted time period information retention section comprises a section which calculates the predicted time period between two of the nodes between which a path is already established, the time period which is required for changing over from a virtual path to an alternate path, by taking a path which occupies a vacant band in the vicinity of the already established path as a virtual path, and by searching for the alternate path for the virtual path when a simulated obstruction has been generated in the virtual path.

146. An advertisement control device as described in claim 138, wherein the processing section comprises:
  a production section which produces command information for the upper layer node according to the result of analysis by the obstruction situation analysis section; and
  a section which emits to the upper layer node an advertisement which includes the command information which has been produced by the production section, and
  wherein the upper layer node comprises a section which executes the processing which has been commanded according to the command information which is included in the advertisement.

147. A program embodied as computer executable instructions on a computer readable medium being a network control program which is used for control of a multi-layer network which comprises an upper layer network which performs switching and transfer in units of packets, and a lower layer network which accommodates the upper layer network, and which comprises optical transmission lines and optical switches; and which, by being installed upon an information processing device, causes the information processing device to implement a function, corresponding to a device which controls an upper layer node or an lower layer node and which is connected to the lower layer network which comprises a plurality of lower layer nodes which comprise obstruction restoration sections, and transmission lines, comprising:
  a detection function of detecting the occurrence of an obstruction upon a transmission line which the upper layer node or the lower layer node accommodates;
  an advertisement function of advertising the result of detection by the detection function as obstruction information;
  a retention function of retaining the topology information for the lower layer network;
  an updating function of updating the topology information which the upper layer node or the lower layer node retains, according to obstruction information which has been advertised, or obstruction information which the upper layer node or the lower layer node has detected; and
  an advertisement transfer function of advertising to other upper layer nodes obstruction information which has been advertised,
  wherein the function which corresponds to the device which controls the upper layer node comprises:
  a retention function of retaining a routing table which has been calculated based upon the topology information which has been updated according to the obstruction information, and also retaining a version of the routing table before the obstruction information was advertised; and
  a function of reverting to the version of the routing table before the obstruction information was advertised which is retained by the retention function, when the obstruction which was recorded in the obstruction information has been restored.

148. A program embodied as computer executable instructions on a computer readable medium being a network control program which is used for control of a multi-layer network which comprises an upper layer network which performs switching and transfer in units of packets, and a lower layer network which accommodates the upper layer network, and which comprises optical transmission lines and optical switches; and which, by being installed upon an information processing device, causes the information processing device to implement a function, corresponding to a device which controls an upper layer node or an lower layer node and which is connected to the lower layer network which comprises a plurality of lower layer nodes which comprise obstruction restoration sections, and transmission lines, comprising:
  a detection function of detecting the occurrence of an obstruction upon a transmission line which the upper layer node or the lower layer node accommodates;
  an advertisement function of advertising the result of detection by the detection function as obstruction information;
  a retention function of retaining the topology information for the lower layer network;
  an updating function of updating the topology information which the upper layer node or the lower layer node retains, according to obstruction information which has been advertised, or obstruction information which the upper layer node or the lower layer node has detected; and
  an advertisement transfer function of advertising to other upper layer nodes obstruction information which has been advertised,
  wherein the function corresponding to the device which controls the upper layer node comprises an alternate path establishment function of establishing an alternate path to the transmission line in which an obstruction has occurred according to the topology information which has been updated by the updating function and the alternate path establishment function comprises:
  a function of, along with establishing the alternate path, also retaining for a predetermined time period the original establishment of the path according to the version of the topology information before the obstruction information was advertised; and
  a function of canceling the establishment of the alternate path when the obstruction which was recorded in the obstruction information has been restored within the predetermined time period, while canceling the establishment of the original path when the obstruction which was recorded in the obstruction information has not been restored even though the predetermined time period has elapsed.

149. A program embodied as computer executable instructions on a computer readable medium being a network control program which is used for control of a multi-layer network which comprises an upper layer network which performs switching and transfer in units of packets, and a lower layer network which accommodates the upper layer network, and which comprises optical transmission lines and optical switches; and which, by being installed upon an information processing device, causes the information processing device to implement a function, corresponding to a device which controls an upper layer node or an lower layer node and which is connected to the lower layer network which comprises a plurality of lower layer nodes which comprise obstruction restoration sections, and transmission lines, comprising:
  a detection function of detecting the occurrence of an obstruction upon a transmission line which the upper layer node or the lower layer node accommodates;

an advertisement function of advertising the result of detection by the detection function as obstruction information;

a retention function of retaining the topology information for the lower layer network;

an updating function of updating the topology information which the upper layer node or the lower layer node retains, according to obstruction information which has been advertised, or obstruction information which the upper layer node or the lower layer node has detected; and an advertisement transfer function of advertising to other upper layer nodes obstruction information which has been advertised, wherein, as the function corresponding to the device which controls the upper layer node, the updating function comprises a function of deferring the updating of the topology information for a time period T from the time instant that the occurrence of an obstruction has been detected by the detection function.

150. A program embodied as computer executable instructions on a computer readable medium being a network control program which is used for control of a multi-layer network which comprises an upper layer network which performs switching and transfer in units of packets, and a lower layer network which accommodates the upper layer network, and which comprises optical transmission lines and optical switches; and which, by being installed upon an information processing device, causes the information processing device to implement a function, corresponding to a device which controls an upper layer node or an lower layer node and which is connected to the lower layer network which comprises a plurality of lower layer nodes which comprise obstruction restoration sections, and transmission lines, comprising:

a detection function of detecting the occurrence of an obstruction upon a transmission line which the upper layer node or the lower layer node accommodates;

an advertisement function of advertising the result of detection by the detection function as obstruction information;

a retention function of retaining the topology information for the lower layer network;

an updating function of updating the topology information which the upper layer node or the lower layer node retains, according to obstruction information which has been advertised, or obstruction information which the upper layer node or the lower layer node has detected; and an advertisement transfer function of advertising to other upper layer nodes obstruction information which has been advertised, wherein, as the function corresponding to the device which controls the upper layer node, the program comprises a link state information retention function of retaining link state information relating to the detailed structure of the lower layer network;

the detection function comprises a function of detecting even the detailed obstruction situation upon the lower layer network according to the link state information which is retained by the link state information retention function;

the updating function comprises a function of updating even the link state information which is retained by the link state information retention function.

151. A program embodied as computer executable instructions on a computer readable medium being a network control program which is used for control of a multi-layer network which comprises an upper layer network which performs switching and transfer in units of packets, and a lower layer network which accommodates the upper layer network, and which comprises optical transmission lines and optical switches; and which, by being installed upon an information processing device, causes the information processing device to implement a function, corresponding to a device which controls an upper layer node or an lower layer node and which is connected to the lower layer network which comprises a plurality of lower layer nodes which comprise obstruction restoration sections, and transmission lines, comprising:

a detection function of detecting the occurrence of an obstruction upon a transmission line which the upper layer node or the lower layer node accommodates;

an advertisement function of advertising the result of detection by the detection function as obstruction information;

a retention function of retaining the topology information for the lower layer network;

an updating function of updating the topology information which the upper layer node or the lower layer node retains, according to obstruction information which has been advertised, or obstruction information which the upper layer node or the lower layer node has detected; and an advertisement transfer function of advertising to other upper layer nodes obstruction information which has been advertised, wherein, as a function corresponding to a device which is provided to the lower layer network which connects between at least two of the upper layer nodes, and which controls the lower layer node, comprising an obstruction restoration function of performing obstruction restoration for the lower layer network, a detection function of detecting the occurrence of an obstruction upon a transmission line which the lower layer node accommodates, and an advertisement function of advertising the result of detection by the detection function as obstruction information, the advertisement function comprises a function of deferring the emission of the advertisement for a time period T from the time instant that the occurrence of an obstruction has been detected by the detection function.

152. A program embodied as computer executable instructions on a computer readable medium being a network control program which is used for control of a multi-layer network which comprises an upper layer network which performs switching and transfer in units of packets, and a lower layer network which accommodates the upper layer network, and which comprises optical transmission lines and optical switches; and which, by being installed upon an information processing device, causes the information processing device to implement a function, corresponding to a device which controls an upper layer node or an lower layer node and which is connected to the lower layer network which comprises a plurality of lower layer nodes which comprise obstruction restoration sections, and transmission lines, comprising:

a detection function of detecting the occurrence of an obstruction upon a transmission line which the upper layer node or the lower layer node accommodates;

an advertisement function of advertising the result of detection by the detection function as obstruction information;

a retention function of retaining the topology information for the lower layer network;

an updating function of updating the topology information which the upper layer node or the lower layer node retains, according to obstruction information which has been advertised, or obstruction information which the upper layer node or the lower layer node has detected; and an advertisement transfer function of advertising to other upper layer nodes obstruction information which has been advertised, wherein, as a function which corresponds to a control device for a node which is applied in the network, updating function comprises a function of deferring the updating of the topology information for a time period T from the time instant that the obstruction information was advertised.

153. A program embodied as computer executable instructions on a computer readable medium being a network control program which is used for control of a multi-layer network which comprises an upper layer network which performs switching and transfer in units of packets, and a lower layer network which accommodates the upper layer network, and which comprises optical transmission lines and optical switches; and which, by being installed upon an information processing device, causes the information processing device to implement a function, corresponding to a device which controls an upper layer node or an lower layer node and which is connected to the lower layer network which comprises a plurality of lower layer nodes which comprise obstruction restoration sections, and transmission lines, comprising:

a detection function of detecting the occurrence of an obstruction upon a transmission line which the upper layer node or the lower layer node accommodates;

an advertisement function of advertising the result of detection by the detection function as obstruction information;

a retention function of retaining the topology information for the lower layer network;

an updating function of updating the topology information which the upper layer node or the lower layer node retains, according to obstruction information which has been advertised, or obstruction information which the upper layer node or the lower layer node has detected; and an advertisement transfer function of advertising to other upper layer nodes obstruction information which has been advertised, wherein, as a function which corresponds to a device which is applied in the network and is provided between the upper layer nodes, the program comprises: an obstruction situation analysis function of analyzing the obstruction situation according to the obstruction information, and a function of processing the contents of the advertisement including the obstruction information according to the result of analysis by the obstruction situation analysis function.

* * * * *